US011796813B2

(12) United States Patent
Huang et al.

(10) Patent No.: US 11,796,813 B2
(45) Date of Patent: Oct. 24, 2023

(54) OPTICAL SYSTEM AND METHOD FOR PROVIDING COMPRESSED EYEBOX

(71) Applicant: Meta Platforms Technologies, LLC, Menlo Park, CA (US)

(72) Inventors: Ningfeng Huang, Redmond, WA (US); Oleg Yaroshchuk, Redmond, WA (US); Heeyoon Lee, Kirkland, WA (US); Giuseppe Calafiore, Redmond, WA (US); Barry David Silverstein, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 292 days.

(21) Appl. No.: 17/064,567

(22) Filed: Oct. 6, 2020

(65) Prior Publication Data
US 2021/0199970 A1    Jul. 1, 2021

Related U.S. Application Data

(60) Provisional application No. 62/955,122, filed on Dec. 30, 2019.

(51) Int. Cl.
| | | |
|---|---|---|
| *G02B 27/01* | (2006.01) | |
| *G02B 27/00* | (2006.01) | |
| *F21V 8/00* | (2006.01) | |
| *G02B 3/00* | (2006.01) | |

(52) U.S. Cl.
CPC ..... *G02B 27/0172* (2013.01); *G02B 27/0081* (2013.01); *G02B 27/0093* (2013.01); *G02B 3/0006* (2013.01); *G02B 6/0026* (2013.01); *G02B 6/0078* (2013.01); *G02B 2027/0174* (2013.01)

(58) Field of Classification Search
CPC ............ G02B 27/0081; G02B 27/0172; G02B 27/0093; G02B 6/0026; G02B 6/0078
See application file for complete search history.

(56) References Cited

U.S. PATENT DOCUMENTS

| | | |
|---|---|---|
| 9,341,846 B2 | 5/2016 | Popovich et al. |
| 9,400,395 B2 | 7/2016 | Travers et al. |
| 10,133,168 B1 | 11/2018 | Taylor et al. |

(Continued)

OTHER PUBLICATIONS

Weng, Y., et al., "Polarization volume grating with high efficiency and large diffraction angle," Optics Express, vol. 24, No. 16, Aug. 8, 2016, pp. 17746-17759 (14 pages).

(Continued)

*Primary Examiner* — Doon Y Chow
*Assistant Examiner* — Dennis Chow
(74) *Attorney, Agent, or Firm* — MILLBURN IP PLLC

(57) ABSTRACT

A system includes one or more waveguides, and a plurality of grating sets coupled with the one or more waveguides. A plurality of combinations of gratings from the grating sets are configurable to direct an image light to propagate through a plurality of sub-eyeboxes forming an uncompressed eyebox. The system also includes a controller configured to selectively configure one or more combinations of gratings to operate in a diffraction state to direct the image light to propagate through one or more sub-eyeboxes forming a compressed eyebox having a size smaller than a size of the uncompressed eyebox.

13 Claims, 43 Drawing Sheets

(56) References Cited

U.S. PATENT DOCUMENTS

| | | | |
|---|---|---|---|
| 10,185,393 B2 | 1/2019 | Sulai et al. | |
| 10,914,950 B2 * | 2/2021 | Waldern | G02B 27/0179 |
| 11,073,697 B1 * | 7/2021 | Sharma | G02F 1/225 |
| 11,391,950 B2 * | 7/2022 | Calafiore | G02B 5/1866 |
| 11,422,369 B1 * | 8/2022 | Parsons | G02B 27/0081 |
| 11,435,585 B1 * | 9/2022 | Yaroshchuk | G02B 6/0026 |
| 11,435,586 B2 * | 9/2022 | Calafiore | G02F 1/3137 |
| 11,436,814 B2 * | 9/2022 | Silverstein | G09G 5/026 |
| 11,442,541 B1 * | 9/2022 | Dong | G06F 3/013 |
| 2016/0033784 A1 | 2/2016 | Levola et al. | |
| 2016/0238844 A1 | 8/2016 | Dobschal | |
| 2018/0284884 A1 | 10/2018 | Sulai et al. | |
| 2019/0317450 A1 | 10/2019 | Yaroshckuk et al. | |
| 2019/0369403 A1 | 12/2019 | Leister | |
| 2021/0011300 A1 | 1/2021 | Leister et al. | |

OTHER PUBLICATIONS

Sakhno, O., et al., "Fabrication and performance of efficient thin circular polarization gratings with Bragg properties using bulk photo-alignment of a liquid crystalline polymer," Applied Physics B, 124:52, Feb. 28, 2018 (10 pages).

Waldern, J.D., et al., "DigiLens switchable Bragg grating waveguide optics for augmented reality applications," Proceedings of SPIE, vol. 10676, Digital Optics for Immersive Displays, 106760G-1 to 106760G-16, May 21, 2018 (16 pages).

International Preliminary Report on Patentability for International Application No. PCT/US2020/063509, dated Jul. 14, 2022, 9 pages.

International Search Report and Written Opinion dated Mar. 18, 2021, in International Application No. PCT/US2020/063509, filed on Dec. 5, 2020 (9 pages).

* cited by examiner

1700

1705

Determine eye tracking information of an eye pupil

1710

Selectively configure, based on the eye tracking information, one or more combinations of gratings included in a plurality of grating sets coupled with one or more waveguides to operate in a diffraction state to direct an image light to propagate through one or more sub-eyeboxes of a plurality of sub-eyeboxes, the plurality of sub-eyeboxes defining an uncompressed eyebox, and the one or more sub-eyeboxes of the plurality of sub-eyeboxes defining a compressed eyebox having a size smaller than a size of the uncompressed eyebox

Generate an image light

1790

Selectively configure one or more light deflecting elements of a plurality of light deflecting elements to operate in a deflection state to direct the image light to propagate through one or more sub-eyeboxes of a plurality of sub-eyeboxes, the plurality of sub-eyeboxes defining an uncompressed eyebox, and the one or more sub-eyeboxes of the plurality of sub-eyeboxes defining a compressed eyebox having a size smaller than a size of the uncompressed eyebox

FIG. 17C

OPTICAL SYSTEM AND METHOD FOR PROVIDING COMPRESSED EYEBOX

CROSS-REFERENCE TO RELATED APPLICATION

This application claims the benefit of U.S. Provisional Patent Application No. 62/955,122, filed on Dec. 30, 2019, which is incorporated by reference in its entirety.

TECHNICAL FIELD

The present disclosure generally relates to optical systems and, more specifically, to an optical system and a method for providing a compressed eyebox.

BACKGROUND

Near-eye displays ("NEDs") have been widely used in a wide variety of applications, such as aviation, engineering, scientific research, medical devices, computer games, videos, sports, training, and simulations. NEDs can function as a virtual reality ("VR") device, an augmented reality ("AR") device, and/or a mixed reality ("MR") device. When functioning as AR and/or MR devices, NEDs are at least partially transparent from the perspective of a user, enabling the user to view a surrounding real world environment. Such NEDs are also referred to as optically see-through NEDs. When functioning as VR devices, NEDs are opaque such that the user is substantially immersed in the VR imagery provided via the NEDs. An NED may be switchable between functioning as an optically see-through device and functioning as a VR device.

Pupil-replication (or pupil-expansion) waveguide display systems with diffractive coupling structures are promising designs for NEDs, which can potentially offer eye-glasses form factors, a moderately large field of view ("FOV"), a high transmittance, and a large eyebox. A pupil-replication waveguide display system includes a display element (e.g., an electronic display) that generates an image light, and a waveguide (or a light guide) that guides the image light to an eyebox provided by the waveguide display system. Diffraction gratings may be coupled with the optical waveguide as in-coupling and out-coupling elements. The waveguide may also function as an AR and/or MR combiner to combine the image light and a light from the real world, such that virtual images generated by the display element are superimposed with real-world images or see-through images.

SUMMARY OF THE DISCLOSURE

Consistent with an aspect of the present disclosure, a system is provided. The system includes one or more waveguides, and a plurality of grating sets coupled with the one or more waveguides. A plurality of combinations of gratings from the grating sets are configurable to direct an image light to propagate through a plurality of sub-eyeboxes forming an uncompressed eyebox. The system also includes a controller configured to selectively configure one or more combinations of gratings to operate in a diffraction state to direct the image light to propagate through one or more sub-eyeboxes forming a compressed eyebox having a size smaller than a size of the uncompressed eyebox.

Consistent with another aspect of the present disclosure, a system is provided. The system includes a light source configured to emit an image light. The system also includes a plurality of light deflecting elements optically coupled with the light source. The system further includes a controller configured to selectively configure one or more light deflecting elements of the plurality of light deflecting elements to operate in a deflection state to direct the image light to propagate through one or more sub-eyeboxes of a plurality of sub-eyeboxes, the plurality of sub-eyeboxes defining an uncompressed eyebox, and the one or more sub-eyeboxes defining a compressed eyebox having a size smaller than a size of the uncompressed eyebox.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The accompanying drawings are provided for illustrative purposes according to various disclosed embodiments and are not intended to limit the scope of the present disclosure. In the drawings:

FIG. 17A is a flowchart illustrating a method for providing a compressed eyebox, according to an embodiment of the present disclosure;

FIG. 17C is a flowchart illustrating a method for providing a compressed eyebox, according to another embodiment of the present disclosure;

DETAILED DESCRIPTION

Figure 1:
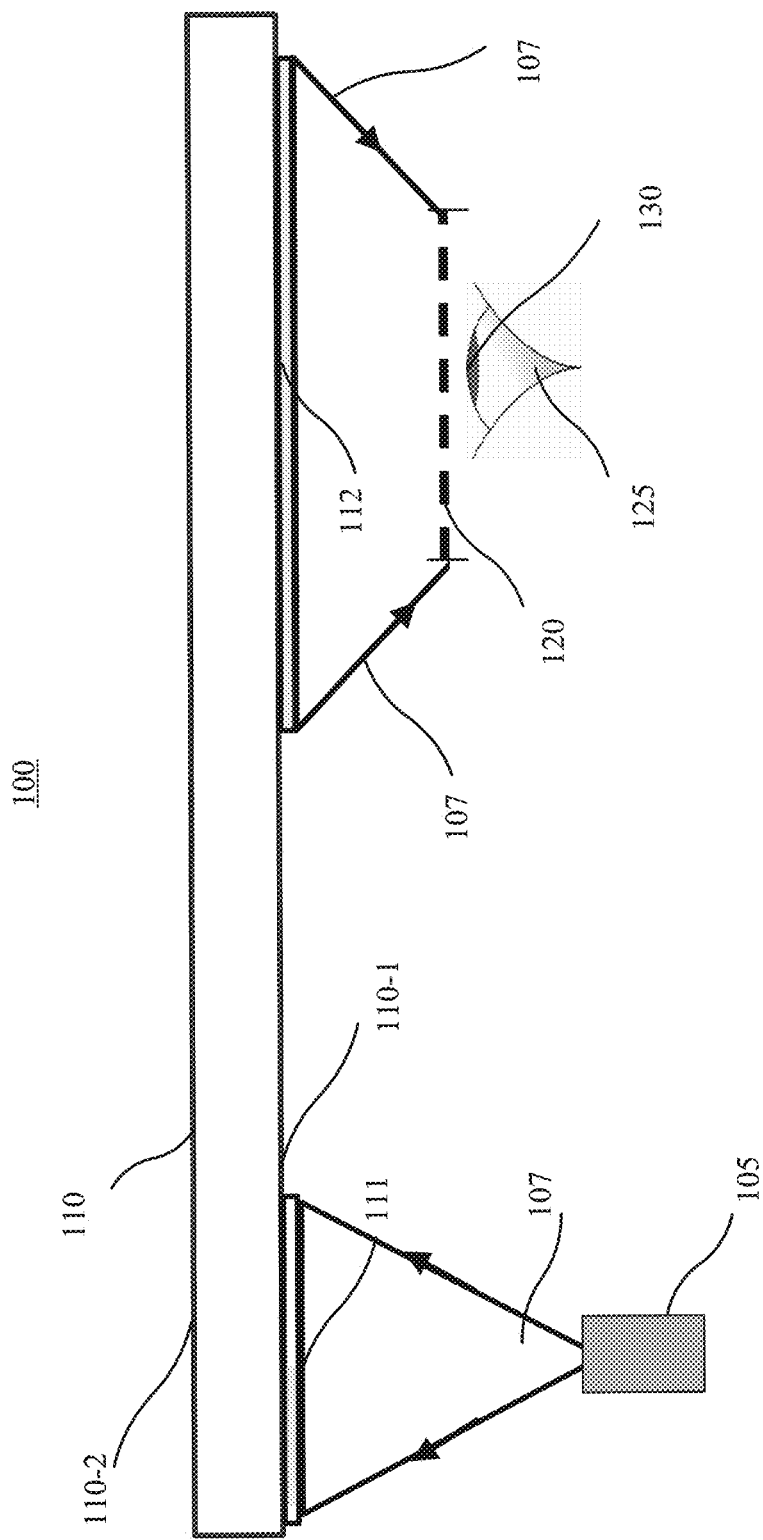
FIG. 1 illustrates a schematic diagram of a conventional waveguide optical system implemented in a near-eye display ("NED")

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

FIG. 1 illustrates a schematic diagram of a conventional waveguide (or light guide) optical system 100 implemented in a near-eye display ("NED"). The optical system 100 may also be referred to as a waveguide display system 100. As shown in FIG. 1, the waveguide display system 100 includes a light source assembly 105 configured to emit an image light 107 and a waveguide 110 configured to direct the image light 107 to propagate through an eyebox 120 provided by the waveguide display system 100. The "image light" refers to a light associated with a computer-generated (or virtual) image. The waveguide display system 100 includes an in-coupling element 111 (e.g., a diffractive in-coupling element) disposed at the waveguide 110 (e.g., at a surface of the waveguide 110). The in-coupling element 111 may be configured to couple the image light 107 generated by the light source assembly 105 into a total internal reflection ("TIR") path inside the waveguide 110. The waveguide display system 100 also includes an out-coupling element 112 (e.g., a diffractive out-coupling element) disposed at the waveguide 110 (e.g., at a surface of the waveguide 110). The out-coupling element 112 may be configured to couple the image light 107 out of the waveguide 110 toward the eyebox 120. The eyebox 120 is a region in space where an eye pupil 130 of an eye 125 of a user can perceive the full extent of the virtual image delivered by the waveguide 110 from the light source assembly 105. The eyebox 120 overlaps with all, or most, of the possible positions of the eye pupil 130. This feature, referred to as "pupil expansion," creates the effect of a full real-life image as perceived by the user, rather than a moving eye pupil characteristic provided by other viewing instruments (e.g., binoculars, microscopes, or telescopes). The waveguide 110 is also referred to as a waveguide pupil expander.

The parameters of the eyebox 120 (e.g., position, size, depth) are affected by a desirable field of view ("FOV") and a desirable eye relief of the near-eye display ("NED"). FOV is defined as the angular size of the image (e.g., angular size of the diagonal of the image) as seen by the eye of the user. The eye relief is a distance between the eye pupil and a nearest component of the NED. The size of the eyebox often decreases as the FOV and/or the eye relief increase. A large eyebox allows the user to move the eye pupil 130 in a wider range without losing sight of the image generated by the light source assembly 105, and offers better accommodate for interpupillary distance ("IPD") variation among different users. Typical IPD values range between 51 mm to 77 mm, depending on the age, gender, and other physiological factors of the user. Although a large eyebox provides better accommodation for eye movement in a wide range and IPD variation among different users, the image light out-coupled from the waveguide 110 is distributed across the entire eyebox 120. Thus, the average light intensity provided at the eyebox 120 may be low, and the brightness of the image perceived by the eye pupil 130 may be low. On the other hand, the area of the eye pupil 130 only occupies a small portion of the eyebox 120. The size of the eye pupil of an average adult user may vary in a range of 4-8 millimeters ("mm") in diameter when dilated (e.g., when in dark), or vary in a range of 2-4 mm in diameter when constricted (e.g., in bright light). In other words, the size of the eye pupil may vary in the range of 2-8 mm depending on the light intensity (or brightness) of the image light. Therefore, the eye pupil 130 only receives a small portion of the image light propagating through the eyebox 120. A significant portion of the image light propagating through the eyebox 120 may not be received by the eye pupil 130, and may be lost. Accordingly, the waveguide display system 100 may not be power efficient.

The present disclosure provides a system (e.g., an optical system) including a waveguide display system configured to increase the intensity of the image light received by the eye pupil, to reduce the loss of the image light outside the eye pupil, and to increase the power efficiency of the waveguide display system. The waveguide display system may include a waveguide (or a waveguide stack) and a plurality of grating sets (e.g., sets of gratings) coupled with the waveguide. The plurality of grating sets may be included in at least one of an in-coupling element, an out-coupling element, or a redirecting element (if included) coupled with the waveguide. For example, each of the in-coupling element, the out-coupling element, and the redirecting element may include a grating set, e.g., an in-coupling grating set, an out-coupling grating set, and a redirecting/folding grating set. Each grating set may include one or more gratings. A plurality of combinations of gratings from the grating sets may be configurable to guide an image light to propagate through a plurality of sub-eyeboxes forming an uncompressed eyebox. The waveguide display system may also include a controller configured to selectively configure one or more combinations (less than the plurality of combinations) of gratings to operate in a diffraction state to direct the image light to propagate through one or more sub-eyeboxes. The one or more sub-eyeboxes may form a compressed eyebox having a size smaller than a size of the uncompressed eyebox, and a field of view ("FOV") that is substantially the same as the FOV of the uncompressed eyebox. The gratings in a grating set may be disposed in the same plane or different planes, e.g., the gratings may be stacked or disposed side by side in an interleaved configuration or disposed side by side partially overlapping one another.

A grating set included in at least one of the in-coupling element, the out-coupling elements, or the redirecting element may be a switchable grating set or a non-switchable grating set. A switchable grating set may include one or more gratings, at least one of which may be a switchable grating. In some embodiments, all of the gratings included in the switchable grating set may be switchable gratings. In some embodiments, a switchable grating set may include at least one switchable grating and at least one non-switchable grating. A switchable grating may be directly or indirectly controlled or switched, e.g., by a controller, between operating in a diffraction state, in which the grating may diffract an incident light, and operating in a non-diffraction state, in which the grating may transmit the incident light with negligible or no diffraction. A switchable grating set may operate in a diffraction state when the at least one switchable grating operates in the diffraction state to diffract an image light. A switchable grating set may operate in a non-diffraction state when the at least one switchable grating operates in the non-diffraction state and all other gratings also operate in the non-diffraction state. When the at least one switchable grating included in the switchable grating set is switched between the diffraction state and the non-diffraction state, the switchable grating set is referred to as being switched between the diffraction state and the non-diffraction state.

A non-switchable grating set may include one or more gratings, each of which may be a non-switchable grating. A non-switchable grating may not be directly or indirectly controlled or switched, e.g., by a controller, between operating in a diffraction state, in which the grating may diffract an incident light, and operating in a non-diffraction state, in which the grating may transmit the incident light with negligible or no diffraction. Instead, a non-switchable grating may be fixedly configured to operate in a diffraction state for an image light within a predetermined wavelength range and a predetermined incidence angle range. For the simplicity of discussion, in the following descriptions, all gratings included in the switchable grating set are presumed to be switchable gratings. A non-switchable grating set may include one or more non-switchable gratings, and may not include a switchable grating.

In some embodiments, the plurality of grating sets coupled with the waveguide may include one or more switchable grating sets, one or more non-switchable grating sets, or a combination thereof. For the convenience of discussion, unless otherwise noted, all of the plurality of grating sets coupled with the waveguide and shown in the figures are presumed to be switchable grating sets, although in some embodiments at least one of the illustrated or disclosed grating sets may be a non-switchable grating set. Hence, for the simplicity of discussion, the term "switchable grating sets" may be simply referred to as "grating sets" in below descriptions.

In some embodiments, a combination of gratings selected from the grating sets may be formed by one or more gratings included in the in-coupling element (e.g., in-coupling grating set), one or more grating included in the out-coupling element (e.g., out-coupling grating set), and one or more grating included the redirecting element (e.g., redirecting grating set, if the optical system includes the redirecting element). When multiple gratings are included in at least one of the in-coupling element, the out-coupling element, or the redirecting element, a plurality of combinations of gratings may be formed by selecting different gratings from the in-coupling element, the out-coupling element, and/or the redirecting element. A combination of gratings may be controlled or configured to operate in a diffraction state when the gratings are controlled or configured to operate in the diffraction state. For example, when each of the gratings included in the combination operates in the diffraction state, the combination of gratings may operate in the diffraction state. A combination of gratings may be controlled or configured to operate in a non-diffraction state when the gratings are controlled or configured to operate in the non-diffraction state. For example, when each of the gratings included in the combination operates in the non-diffraction state, the combination of gratings may operate in the non-diffraction state.

When the plurality of grating sets (or the plurality of combinations of gratings) included in the optical system are controlled or configured to operate in the diffraction state, the plurality of grating sets may direct and concentrate, via diffraction, an image light received from a light source assembly to propagate through a plurality of sub-eyeboxes that form an uncompressed eyebox. The controller may selectively configure or control a combination of gratings (out of the plurality of combinations) selected from the plurality of grating sets to operate in a diffraction state to direct the image light to a sub-eyebox, while configuring or controlling the remaining one or more gratings (or remaining one or more combinations of gratings) to operate in the non-diffraction state. In other words, a combination of gratings selected from different grating sets (e.g., from the in-coupling grating set, the out-coupling grating set, and the redirecting grating set if the optical system includes the redirecting grating set) may correspond to (or provide) a sub-eyebox. At a specific time instance or time duration, one or more combinations (which may be less than all of the plurality of combinations) of gratings may be selectively configured to operate in a diffraction state to direct an image light to one or more sub-eyeboxes, which may form a compressed eyebox. A field of view ("FOV") of the image light propagating through the compressed eyebox may be substantially the same as an FOV of the image light propagating through the uncompressed eyebox.

The plurality of sub-eyeboxes may be arranged in a sub-eyebox array (e.g., a one-dimensional ("1D") array or a two-dimensional ("2D") array). That is, the uncompressed eyebox may include an array of sub-eyeboxes selected from the entire sub-eyebox array. In some embodiments, an area of the sub-eyebox array (e.g., total area of all of the sub-eyeboxes) may be substantially the same as an area of the uncompressed eyebox. In some embodiments, at least two of the sub-eyeboxes may at least partially overlap with one another. In some embodiments, the sub-eyeboxes may not overlap with one another. That is, the sub-eyeboxes may be arranged in a non-overlapping configuration. In some embodiments, the sizes of the sub-eyeboxes may be substantially the same. In some embodiments, the sizes of at least two (e.g., all) of the sub-eyeboxes may be different. In some embodiments, the shapes of the sub-eyeboxes may be the same. In some embodiments, the shapes of at least two (e.g., all) of the sub-eyeboxes may be different. In some embodiments, the size of a sub-eyebox may be fixed (or non-adjustable). The sub-eyeboxes may have the same shape and size, or may have different combinations of shapes and sizes. The sub-eyeboxes may be all non-overlapping, all overlapping with adjacent ones, or may include a combination of non-overlapping sub-eyeboxes and overlapping sub-eyeboxes.

In some embodiments, the switchable grating may be directly switchable between the diffraction state and the non-diffraction state via an external field, e.g., an external electric field applied to electrodes included in or coupled with the switchable grating. A directly switchable grating may be an active grating, such as an active grating fabricated based on active liquid crystals ("LCs"). An active grating includes molecules, of which physical and/or optical properties, such as orientations, can be changed by the external field (e.g., external electric field). The active grating may be polarization sensitive (or polarization selective) or may be polarization insensitive (or polarization non-selective). Examples of the active and polarization sensitive (or selective) gratings may include, but not be limited to, holographic polymer-dispersed liquid crystal ("H-PDLC") gratings, surface relief gratings provided (e.g., filled) with active LCs, Pancharatnam-Berry phase ("PBP") gratings, polarization volume holograms ("PVHs") based on active LCs, etc. An example of active and polarization insensitive (or polarization non-selective) gratings may include two stacked active and polarization selective LC gratings with orthogonal alignment directions. In some embodiments, when the directly switchable grating operates in the diffraction state, the diffraction efficiency of the directly switchable grating may be tunable via, e.g., changing an external electric field applied to the directly switchable grating, as controlled by a controller.

In some embodiments, the switchable grating may be indirectly switchable between the diffraction state and the non-diffraction state via a polarization switch (which may be controlled by controller) coupled to the switchable grating. An indirectly switchable grating may be an active and polarization sensitive (or polarization selective) grating, or a passive and polarization sensitive (or polarization selective) grating. Examples of the passive and polarization selective gratings may include, e.g., polarization volume hologram ("PVH") gratings based on passive LCs, surface relief gratings provided (e.g., filled) with passive LCs. A passive grating may include molecules, of which physical and/or optical properties, such as orientations, remain substantially unchanged when subjecting to an external field (e.g., external electric field) in normal operations.

Due to the polarization sensitivity (or polarization selectivity) of the indirectly switchable grating, the indirectly switchable grating may diffract an image light having a first polarization, or transmit, with negligible or no diffraction, an image light having a second polarization different from the first polarization. When the first polarization is a linear polarization, the second polarization may be a linear polarization that is orthogonal to the first polarization. Two polarizations are orthogonal when an inner product of two vectors representing the two polarizations is substantially zero. When the first polarization is a circular polarization, the second polarization may be a circular polarization that has a handedness opposite to the handedness of the first polarization. Thus, when the polarization switch disposed at a light incidence side of the indirectly switchable grating is configured to control (e.g., switch or maintain) the polarization of the image light before the image light is incident onto the indirectly switchable grating, the indirectly switchable grating may be configured to operate in the diffraction state for the image light having the first polarization or in the non-diffraction state for the image light having the second polarization.

The polarization switch may be controlled by the controller to operate in a switching state or a non-switching state to switch or maintain the polarization of the image light before the image light is incident onto the indirectly switchable grating. In the present disclosure, when an indirectly switchable grating is described as being controlled or configured by the controller to operate in the diffraction state or non-diffraction state, it means that the associated polarization switch is controlled or configured by the controller to change (e.g., switch) or maintain the polarization of the image light before the image light is incident onto the indirectly switchable grating, such that the indirectly switchable grating diffracts the image light when the image light incident onto the indirectly switchable grating has the first polarization, or transmits, with negligible or no diffraction, the image light when the image light incident onto the indirectly switchable grating has the second polarization orthogonal to the first polarization.

In some embodiments, to control the polarization switch disposed at a light incidence side of the indirectly switchable grating to operate in a switching state or a non-switching state, the controller may control a power source electrically coupled with the polarization switch. The controller may control the voltage output from the power source to the polarization switch, thereby controlling the polarization switch to operate in the switching state (when a first voltage is supplied to the polarization switch) or the non-switching state (when a second voltage is supplied to the polarization switch). In the switching state, the polarization switch may change or switch the polarization of the image light, e.g., from the first polarization to the second polarization or from the second polarization to the first polarization, before the image light is incident onto the indirectly switchable grating. In the non-switching state, the polarization switch may maintain the polarization (e.g., the first polarization or the second polarization) of the image light before the image light is incident onto the indirectly switchable grating. By controlling the polarization of the image light incident onto the indirectly switchable grating through the polarization switch, the indirectly switchable grating may be configured to operate in a diffraction state for an incident light having the first polarization or to operate in a non-diffraction state for an incident light having the second polarization.

The gratings coupled with the waveguide may be individually or independently controlled or configured by the controller to operate in the diffraction state or in the non-diffraction state. According to the disclosed embodiments, at different time instances during a time period in which the optical system is in operation, less than all of the plurality of switchable gratings coupled with the waveguide (e.g., less than all of the switchable gratings included in the out-coupling element) may be selectively controlled or configured by the controller to operate in the diffraction state. The remaining one or more switchable gratings coupled with the waveguide may be selectively controlled or configured by the controller to operate in the non-diffraction state. To selectively control a first switchable grating to operate in the diffraction state, the controller may either switch the first switchable grating from the non-diffraction state to the diffraction state, or maintain the diffraction state, depending on the state of the first switchable grating at a preceding time instance or time duration. To selectively control a second switchable grating to operate in the non-diffraction state, the controller may switch the second switchable grating from the diffraction state to the non-diffraction state, or maintain the non-diffraction state of the second switchable grating, depending on the state of the second switchable grating at a preceding time instance or time duration.

In some embodiments, multiple combinations of gratings selected from those included in the in-coupling element (e.g., the in-coupling grating set), the out-coupling element (e.g., the out-coupling grating set), and/or the redirecting element (e.g., the redirecting/folding grating set, if included) may be controlled or configured to operate in the diffraction state to direct the image lights of a substantially same FOV to respective sub-eyeboxes. Thus, ghosting effects, distortion, and interference between different sub-eyeboxes to which the image light is directed and concentrated may be suppressed. In some embodiments, the FOV of the image light directed to the sub-eyebox (which may form a compressed eyebox) by a combination of gratings selected from those included in the in-coupling element, the out-coupling element, and/or the redirecting element (if included) may be substantially the same as the FOV of the image light directed to the uncompressed eyebox. In some embodiments, the FOV of the image light directed to the uncompressed eyebox may be substantially the same as the FOV of the image light output by the light source assembly. That is, the FOV of the image light directed to the sub-eyebox (which may form the compressed eyebox) by the combination of gratings may be substantially the same as the FOV of the image light output by the light source assembly. In some embodiments, the FOV of the image light directed to the sub-eyebox (which may form the compressed eyebox) by the combination of gratings may be different (e.g., may be enlarged or expanded) from the FOV of the image light output by the light source assembly.

When the optical system is in operation, an image light emitted by the light source assembly may be directed and concentrated to propagate through a portion of the uncompressed eyebox, i.e., to one or more (e.g., less than all) of the sub-eyeboxes included in the uncompressed eyebox, through selectively configuring (e.g., by the controller) one or more gratings included in at least one of the in-coupling element, the out-coupling element, or the redirecting element to operate in the diffraction state, and selectively configuring the remaining one or more gratings included in at least one of the in-coupling element, the out-coupling element, or the redirecting element to operate in the non-diffraction state. The one or more (e.g., less than all) of the sub-eyeboxes may form a compressed eyebox. Thus, the size of the compressed eyebox may be smaller than the size of the uncompressed eyebox while the optical system is in operation. The size, location, and/or the shape of the compressed eyebox may vary according to the number and positions of the sub-eyeboxes forming the compressed eyebox. The location of the compressed eyebox may be dynamically aligned with the position of the eye pupil.

The size of the compressed eyebox may be comparable with (e.g., the same as or slightly larger than) the size of the eye pupil. The size of the eye pupil of an average adult user may vary in a range of 4-8 millimeters ("mm") in diameter when dilated (e.g., when in dark), or vary in a range of 2-4 mm in diameter when constricted (e.g., in bright light). In other words, the size of the eye pupil may vary in the range of 2-8 mm depending on the light intensity (or brightness) of the image light. In some embodiments, the size of the eye pupil may be measured from the image of the eye pupil. Thus, in some embodiments, the size of the compressed eyebox may be in the range of 2-8 mm. In some embodiments, the size of the compressed eyebox may be dynamically adjusted within the range of 2-8 mm (e.g., 5-8 mm) based on at least one of a size of the eye pupil measured or determined at a specific time instance, a position of the eye pupil measured or determined at a specific time instance, a predicted size of the eye pupil estimated for a future time instance, or a predicted position of the eye pupil estimated for a future time instance.

The size of the compressed eyebox may be smaller than the size of the uncompressed eyebox. For example, the size of the compressed eyebox may be 5%, 10%, 15%, 20%, 25%, 30%, 35%, 40%, 45%, 50%, 55%, 60%, 65%, 70%, 75%, 80%, 85%, or 90% of the size of the uncompressed eyebox. In some embodiments, the size of the compressed eyebox may be in a range of 5%-30%, 5%-50%, 5%-70%, 5%-80%, or 5%-90%, of the size of the uncompressed eyebox. In some embodiments, the size of the compressed eyebox may be 1.0-1.5 times, 1.5-2.0 times, 2.0-2.5 times, etc., of the size of the eye pupil. In some embodiments, the location of the compressed eyebox may correspond to the position of the eye pupil. In some embodiments, the image light propagating through the compressed eyebox may have an FOV that is substantially the same as the FOV of the image light output by the light source assembly.

It is understood that in some embodiments, while the size of the compressed eyebox may be smaller than that of the uncompressed eyebox for the majority of a time period during which the optical system is in operation, the size of the compressed eyebox may still be temporarily adjusted to be substantially the same as that of the uncompressed eyebox when all of the grating sets are configured to operate in the diffraction state to direct the image light to all of the sub-eyeboxes included in the uncompressed eyebox.

In some embodiments, a switchable grating may be referred to as being "activated" or being in the diffraction state when the switchable grating is controlled or configured to operate in the diffraction state. A switchable grating may be referred to as being "deactivated" or being in the non-diffraction state when the switchable grating is controlled or configured to operate in the non-diffraction state. In the deactivated state, the switchable grating may transmit the image light therethrough with negligible or no diffraction. The plurality of gratings included in at least one of the in-coupling element, the out-coupling element, or the redirecting element coupled with a waveguide may be individually, independently, or selectively controlled or activated by the controller to form various combinations of gratings to direct and concentrate the image light received from the light source assembly to propagate through various corresponding sub-eyeboxes. When one or more gratings in the combination of gratings are activated to direct and concentrate, via diffraction, an image light to a corresponding sub-eyebox, the sub-eyebox may be referred to as being activated. When one or more gratings in the combination of gratings are deactivated such that the image light is not directed and concentrate, via diffraction, to the corresponding sub-eyebox, the sub-eyebox may be referred to as being deactivated.

In some embodiments, the controller may dynamically control or adjust a location, a shape, and/or size of the compressed eyebox based on eye tracking information of the eye pupil. That is, the controller may dynamically and/or selectively control or configure different combinations of gratings based on different eye tracking information to direct and concentrate the image light to different corresponding sub-eyeboxes. The dynamic adjustment of the location, shape, and/or size of the compressed eyebox may be performed by the controller in real time, in near real time, or at a predetermined time interval. At different time instances, as the eye moves, the controller may obtain real time eye tracking information from an eye tracking device or system (e.g., based on image data captured in real time by an optical sensor included in an eye tracking device or system). The eye tracking device or system may include one or more suitable elements (not only limited to optical sensor) to obtain eye tracking information in a suitable method (not limited to capturing image data). At different time instances, the controller may selectively and/or dynamically configure different combinations of gratings coupled to the waveguide to operate in a diffraction state to direct and concentrate, via diffraction, the image light of a predetermined FOV to a different compressed eyebox formed by different one or more corresponding sub-eyeboxes. Different remaining gratings (or combinations of gratings) may be dynamically and/or selectively controlled or configured to operate in the non-diffraction state, such that image lights may be transmitted therethrough with negligible or no diffraction.

In some embodiments, the eye tracking information may include, but not be limited to, a size of the eye pupil, a position of the eye pupil, a moving direction of the eye pupil, and/or a viewing direction of the eye pupil (e.g., gaze direction of the eye pupils). For example, the size of the eye pupil may include at least one of a measured size of the eye pupil for a current time instance or a predicted size of the eye pupil for a future or subsequent time instance. In some embodiments, the measured size may be estimated or measured, by the controller or the eye tracking system, based on the image data of the eye pupil. In some embodiments, the predicted size of the eye pupil may be predicted or estimated based on the current size and/or the historical sizes. In some embodiments, the predicted size may be estimated based on the current image data and/or historical image data of the eye pupil. In some embodiments, the position of the eye pupil may include at least one of an actual, current position of the eye pupil, or a predicted position of the eye pupil. The current position may be measured or estimated based on the current image data of the eye pupil. The predicted position of the eye pupil may be estimated based on at least one of the current position, the historical position, or a moving direction of the eye pupil.

In some embodiments, the moving direction of the eye pupil may include at least one of an actual, current moving direction of the eye pupil, or a predicted moving direction of the eye pupil. The current moving direction of the eye pupil may be determined or estimated based on the current image data of the eye pupil and/or the historical image data of the eye pupil. The predicted moving direction may be a predicted trajectory of the movement of the eye pupil estimated based on the current movement and/or the historic movement of the eye pupil (e.g., based on current image data and/or the historical image data of the eye pupil). The viewing direction may include at least one of an actual, current viewing direction or a predicted viewing direction. The actual, current viewing direction may be determined based on current image data of the eye pupil. The predicted viewing direction may be estimated or predicted based on at least one of a current viewing direction, a historical viewing direction, or content to be displayed to the user at a specific portion of an image that may attract the attention of the user, etc. The controller may execute various computing algorithms to determine or predict various eye tracking information. In some embodiments, image analysis algorithms, artificial intelligence and machine learning algorithms (such as algorithms based on convolutional neural networks) may be executed by the controller to identify or predict the eye tracking information. The controller may dynamically adjust the location, shape, and/or the size of the compressed eyebox based on at least one type of the eye tracking information, e.g., at least one of the size of the eye pupil, the position of the eye pupil, the moving direction of the eye pupil, or the viewing direction of the eye pupil. For discussion purposes, the position of the eye pupil may be used as an example of the eye tracking information in the following descriptions.

In some embodiments, the eye tracking system or device may include the optical sensor configured to obtain image data of the eye pupil. In some embodiments, the eye tracking system may transmit the image data to the controller, and the controller may analyze the image data to obtain the eye tracking information. The controller may control the switching of the switchable gratings (e.g., including controlling electric fields applied to directly switchable gratings or controlling electrical fields applied to polarization switches coupled with indirectly switchable gratings) based on the eye tracking information to adjust at least one of the location, shape, or size of the compressed eyebox.

In some embodiments, the eye tracking system may include an internal processor, which may be configured to determine the eye tracking information. In some embodiments, the processor may analyze the image data obtained by the optical sensor to determine or obtain the eye tracking information. The processor may determine the above-mentioned various types of eye tracking information. In some embodiments, the processor may provide the eye tracking information to the controller, which may control the switching of the switchable gratings based on the eye tracking information to adjust at least one of the location, shape, or size of the compressed eyebox. In some embodiments, the processor of the eye tracking system may control the switching of the switchable gratings (e.g., including controlling electric fields applied to directly switchable gratings or electric fields applied to polarization switches coupled with indirectly switchable gratings) based on the eye tracking information to adjust at least one of the location, shape, or size of the compressed eyebox. For functions or controls described herein as being performed by the controller, in some embodiments, some or all of the functions or controls may be performed by the processor of the eye tracking system. In some embodiments, the controller may be omitted. For discussion purposes, the controller is described as performing various functions and controls.

In some embodiments, based on the eye tracking information, the controller may selectively control or configure one or more gratings (e.g., less than all of the gratings) coupled to the waveguide (e.g., less than all of the gratings included in the out-coupling element) to direct and concentrate the image light received from the light source assembly to propagate through one or more corresponding sub-eyeboxes. The controller may selectively control or configure the remaining one or more gratings to operate in the non-diffraction state. The one or more (less than all) sub-eyeboxes to which the image light is directed and concentrated may form the compressed eyebox. Thus, the compressed eyebox may have a size smaller than that of the uncompressed eyebox. The size of the compressed eyebox may cover at least the size of the eye pupil. For example, in some embodiments, the compressed eyebox may have a size that is at least comparable with (e.g., the same as or slightly larger than) the size of the eye pupil. The location of the compressed eyebox may be dynamically aligned with the position of the eye pupil.

In some embodiments, the FOV of the image light propagating through the compressed eyebox may be substantially the same as the FOV of the image light propagating through of the uncompressed eyebox. Thus, the eye pupil located within the compressed eyebox may observe full content of an image generated by the light source assembly. Because the compressed eyebox has a smaller size than the uncompressed eyebox, the light intensity of an image light delivered to the eye pupil through the compressed eyebox may be increased as compared to the light intensity of the image light delivered to the eye pupil through the entire uncompressed eyebox (e.g., the light received by the eye pupil through the compressed eyebox may have a higher brightness). The loss of the image light directed to regions outside the eye pupil and the undesirable illumination around the eye pupil may be reduced. As a result, the power consumption of the light source assembly may be significantly reduced, while the power efficiency of the waveguide display system can be significantly improved. The reduced power consumption may enable a smaller light source assembly and a smaller power supply to be used, which in turn reduces the overall form factor of the optical system. On the other hand, benefits associated with the uncompressed eyebox (e.g., receiving at least the full FOV that determines the angular size of the image) may be maintained with the compressed eyebox, and ghosting effects, distortion, and interference may be suppressed.

In some embodiments, the present disclosure also provides a system including a light source configured to emit an image light. The system also includes plurality of gratings optically coupled with the light source and configured to direct the image light to an eyebox (which may be an uncompressed eyebox or a compressed eyebox). The system further includes a controller configured to selectively configure one or more gratings of the plurality of gratings to operate in a diffraction state to direct the image light to propagate through one or more sub-eyeboxes of a plurality of sub-eyeboxes. The plurality of sub-eyeboxes define an uncompressed eyebox, and the one or more sub-eyeboxes (less than all of the plurality of sub-eyeboxes) define a compressed eyebox having a size smaller than a size of the uncompressed eyebox.

Figure 2A:
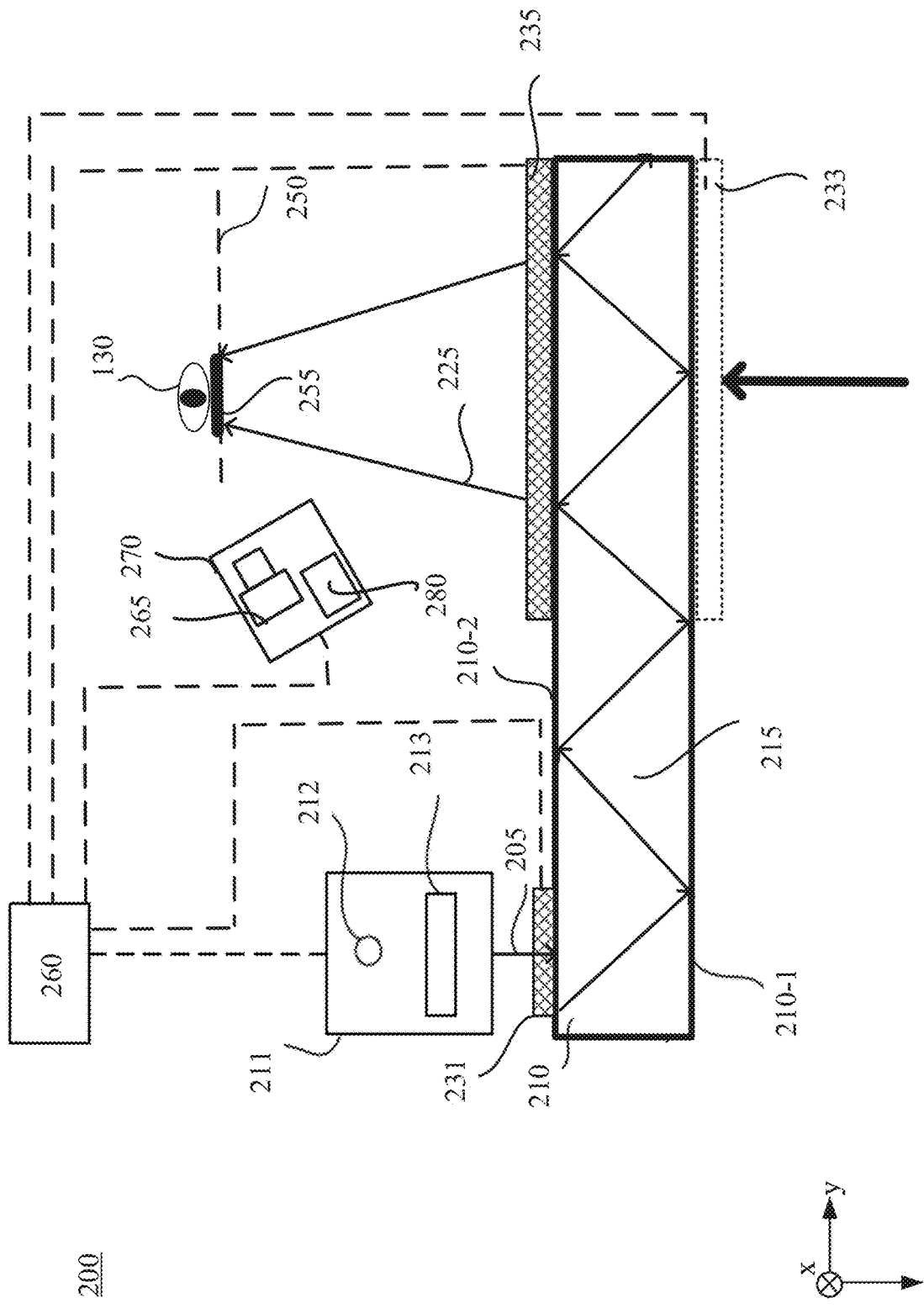
FIGS. 2A and 2B illustrate schematic diagrams of an optical system configured to provide a compressed eyebox at different time instances, according to an embodiment of the present disclosure.
Figure 2B:
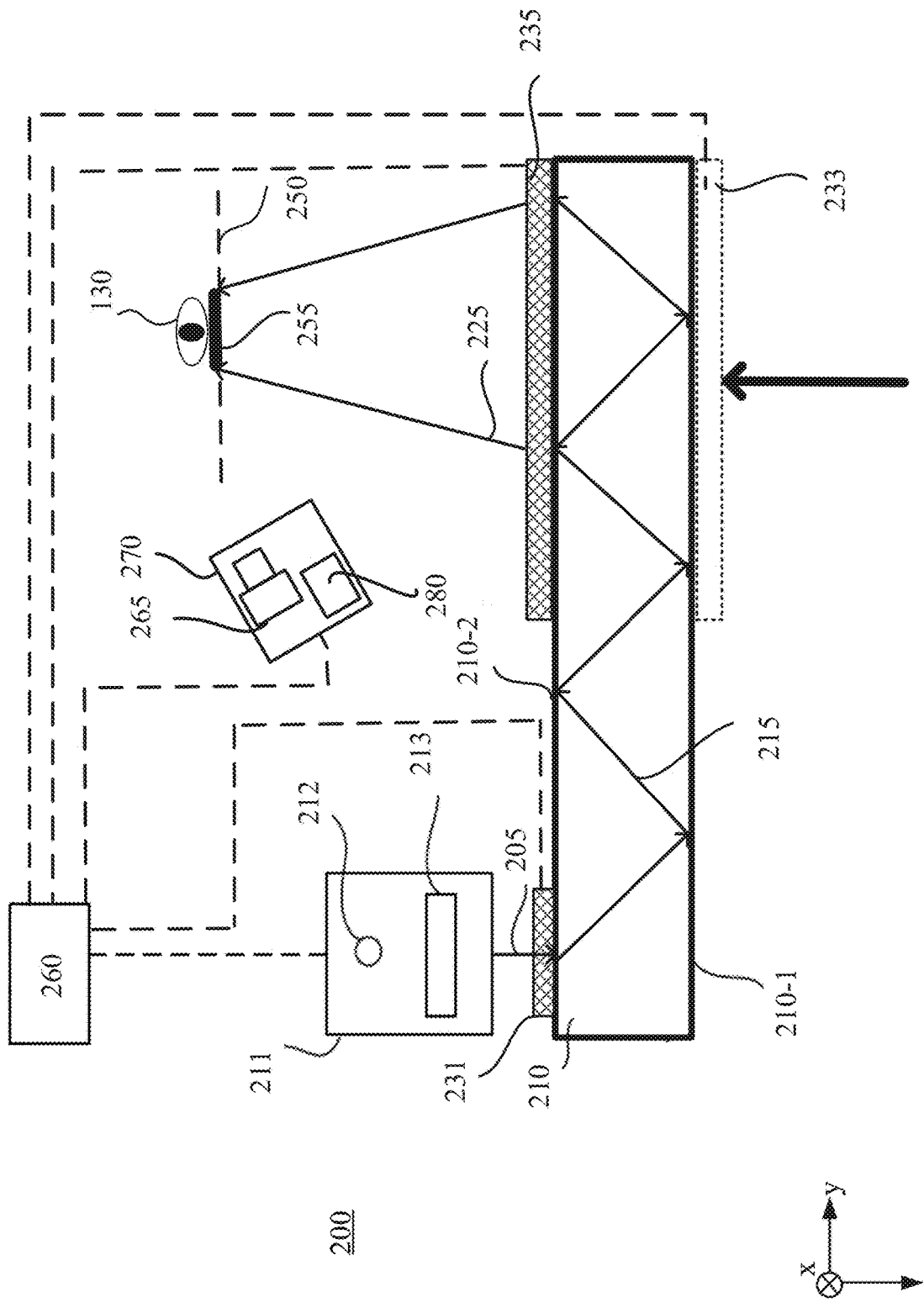

FIGS. 2A and 2B illustrate schematic diagrams of a system (e.g., an optical system) or device 200 configured to provide a compressed eyebox 255 aligned with a position of an eye pupil 130 at different time instances, according to embodiments of the present disclosure. The optical system 200 may also be referred to as a waveguide display system 200. FIG. 2A illustrates the optical system 200 providing a compressed eyebox 255 at a first time instance. The optical system 200 may be implemented in NEDs for VR, AR, and/or MR applications. Various optical devices, elements, configurations, and methods disclosed herein may be implemented in the optical system 200 to provide the compressed eyebox 255. As shown in FIG. 2A, the optical system 200 may include a light source assembly 211, a waveguide 210, a controller 260, and an eye tracking system 270. In other embodiments, the optical system 200 may include additional elements not shown in FIG. 2A, or may omit one or more elements shown in FIG. 2A.

The light source assembly 211 may include a light source 212 and a light conditioning system 213. In some embodiments, the light source 212 may be configured to generate an image light. The light conditioning system 213 may include one or more optical components configured to condition the image light generated by the light source 212, and to output a conditioned image light 205 toward the waveguide 210. The light source 212 may include, e.g., a laser diode, a vertical cavity surface emitting laser, a light emitting diode, or a combination thereof. In some embodiments, the light source 212 may be a display panel, such as a liquid crystal display ("LCD") panel, an liquid-crystal-on-silicon ("LCoS") display panel, an organic light-emitting diode ("OLED") display panel, a micro light-emitting diode ("micro-LED") display panel, a digital light processing ("DLP") display panel, a laser scanning projector, a super luminous diode ("SLED") scanning projector, or a combination thereof. In some embodiments, the light source 212 may be a self-emissive panel, such as an OLED display panel or a micro-LED display panel. In some embodiments, the light source 212 may be a display panel that is illuminated by an external source, such as an LCD panel, an LCoS display panel, or a DLP display panel. Examples of an external source may include a laser, an LED, an OLED, or a combination thereof. In some embodiments, the controller 260 may control the light conditioning system 213 to condition the image light generated by the light source 212, which may include, e.g., transmitting, attenuating, expanding, collimating, polarizing, and/or adjusting propagating direction of the image light. The light source assembly 211 may output an image light 205 toward the waveguide 210.

The optical system 200 may include one or more in-coupling elements 231 disposed at or coupled with a first portion of the waveguide 210, and one or more out-coupling elements 235 disposed or coupled with a second portion of the waveguide 210. For illustrative purposes, one in-coupling element 231 and one out-coupling element 235 are shown in FIG. 2A. The first portion and the second portion may be located at different portions of the waveguide 210. The in-coupling element 231 may be configured to couple an image light 205 output from the light source assembly 211 into the waveguide 210 as an image light 215 that propagates inside the waveguide 210 through total internal reflection ("TIR"). For discussion purposes, the field of view ("FOV") of the image light 215 is presumed to be the same as the FOV of the image light 205, although in some embodiments, the FOVs of the image lights 205 and 215 may be different. The out-coupling element 235 may be configured to couple the image light 215 propagating inside the waveguide 210 through TIR out of the waveguide 210 as an image light 225 propagating through a compressed eyebox 255, which is dynamically aligned with a position of the eye pupil 130. The FOV of the image light 225 may be the same as the FOV of the image light 215 and the image light 205. Thus, the optical system may direct the image light of a full FOV to the eye pupil 130 through the compressed eyebox 255. In some embodiments, the FOV of the image light 225 may be larger (or expanded) than the FOV of the image light 215.

The waveguide 210 may include a first surface or side 210-1 facing the real-world environment and an opposing second surface or side 210-2 facing an eye pupil 130. In some embodiments, at least one (e.g., each) of the in-coupling element 231 or the out-coupling element 235 may be integrally formed as a part of the waveguide 210 at the first surface 210-1 or the second surface 210-2. In some embodiments, at least one (e.g., each) of the in-coupling element 231 and the out-coupling element 235 may be separately formed and disposed at (e.g., affixed to) the first surface 210-1 or the second surface 210-2 of the waveguide 210. In some embodiments, one of the in-coupling element 231 and the out-coupling element 235 may be separately formed and disposed at (e.g., affixed to) the first surface 210-1 or the second surface 210-2 of the waveguide 210, and the other of the in-coupling element 231 and the out-coupling element 235 may be integrally formed as a part of the waveguide 210 at the first surface 210-1 or the second surface 210-2. For illustrative purposes, FIG. 2A shows that the in-coupling element 231 and the out-coupling element 235 are disposed at the first surface 210-1 and the second surface 210-2 of the waveguide 210, respectively.

In some embodiments, the optical system 200 may include additional elements configured to redirect, fold, and/or expand the image light generated by the light source assembly 211. For example, as shown in FIG. 2A, the optical system 200 may include one or more redirecting elements 233 (represented by a dotted box to indicate that the redirecting element 233 may be optional) configured to direct the image light 215 propagating inside the waveguide 210 in a predetermined direction. In some embodiments, the redirecting element 233 may be arranged at a location of the waveguide 210 opposing the out-coupling element 235. Although not shown, in some embodiments, the redirecting element 233 and the out-coupling element 235 may be disposed at different locations of the same surface of the waveguide 210. In some embodiments, the redirecting element 233 may be disposed at the first surface 210-1 or the second surface 210-2 of the waveguide 210. In some embodiments, the redirecting element 233 may be separately formed and disposed at (e.g., affixed to) the first surface 210-1 or the second surface 210-2 of the waveguide 210. In some embodiments, the redirecting element 233 may be integrally formed as a part of the waveguide 210 at the first surface 210-1 or the second surface 210-2. In some embodiments, multiple functions, e.g., out-coupling, redirecting, folding, and/or expanding the image light 215 may be combined into a single element, e.g. the out-coupling element 235. When the out-coupling element 235 is configured to also perform the functions provided by a redirecting element, the redirecting element 233 may be omitted. Although the waveguide 210, the in-coupling element 231, and the out-coupling element 235 are shown as having flat surfaces 210-1 and 210-2 for illustrative purposes, in some embodiments, any of the waveguides, in-coupling elements, out-coupling elements, and redirecting elements disclosed herein may include one or more curved surfaces or curved shapes.

At least one of the in-coupling element 231, the out-coupling element 235, or the redirecting element 233 may be a diffractive element. In some embodiments, the at least one of the in-coupling element 231, the out-coupling element 235, or the redirecting element 233 may be a diffractive element that includes one or more diffraction gratings, such as a surface relief grating ("SRG") filled with LCs, an H-PDLC grating, a volume hologram, a polarization selective grating, a polarization volume hologram ("PVH"), a metasurface grating, or any combination thereof. A diffraction grating included in the in-coupling element 231 may be referred to as an in-coupling grating. A diffraction grating included in the out-coupling element 235 may be referred to as an out-coupling grating. A diffraction grating included in the redirecting element 233 may be referred to as a folding or redirecting grating. A period of the in-coupling grating may be configured, such that the in-coupling grating may couple the image light 205 via diffraction as the image light 215 propagating inside the waveguide 210 through total internal reflection ("TIR"). A period of the out-coupling grating may be configured, such that the out-coupling grating may couple the image light 215 propagating inside the waveguide 210 through TIR out of the waveguide 210 via diffraction. For example, the out-coupling grating may diffract the image light 215 such that total internal reflection conditions are no longer satisfied, and the image light 215 is diffracted out of the waveguide 210.

The redirecting element 233 may be configured to expand the image light 215 propagating inside the waveguide 210 through TIR in a first direction (e.g., x-axis direction in FIG. 2A). The redirecting element 233 may be configured to redirect the expanded image light 215 to the out-coupling element 235. The out-coupling element 235 may couple the image light 215 directed by the redirecting element 233 out of the waveguide 210, and expand the image light 215 in a second direction (e.g., y-axis direction in FIG. 2A). Thus, a two-dimensional ("2D") expansion of the image light 215 (or the image light 205) may be achieved.

The waveguide 210 may include one or more materials configured to facilitate the image light 215 to propagate through TIR inside the waveguide 210. The waveguide 210 may include, for example, a plastic, a glass, and/or polymers. The waveguide 210 may have a relatively small form factor. For example, the waveguide 210 may be approximately 50 mm wide along the x-axis dimension, 30 mm long along the y-axis dimension, and 0.5-1 mm thick along the z-axis dimension. The waveguide 210, the in-coupling element 231, the out-coupling element 235, and the redirecting element 233 may form a waveguide display assembly. In some embodiments, the waveguide display assembly may also include the light source assembly 211. With the disclosed waveguide display assembly, the physical display and electronics may be moved to a side of a front body of an NED, and a substantially fully unobstructed view of the real world environment may be achieved, which enhances the AR user experience.

The optical system 200 may include a plurality of grating sets coupled to the waveguide 210. The plurality of grating sets may be included in at least one of the in-coupling element 231, the out-coupling element 235, or the redirecting element 233 coupled to the waveguide 210. For example, the in-coupling element 231 may include an in-coupling grating set, the out-coupling element 235 may include an out-coupling grating set, and the redirecting element 233 may include a redirecting/fold grating sets. Each grating set may include one or more gratings. The plurality of grating sets coupled to the waveguide 210 may include at least one of a switchable grating set (including at least one switchable grating) or a non-switchable grating set (including all non-switchable gratings), as described above. The switchable grating or switchable grating set may be directly switchable or indirectly switchable, as described above. For illustrative and discussion purposes, the gratings included in the in-coupling element 231, the out-coupling element 235, and the redirecting element 233 are presumed to be directly switchable gratings.

A combination of gratings may be formed by at least one grating selected from one or more gratings included in the in-coupling element 231, and at least one grating selected from one or more gratings included in the out-coupling element 235. In some embodiments, the combination of gratings may also include at least one grating selected from one or more gratings included in the redirecting element 233. Various combinations of gratings may be formed by selecting different gratings from the in-coupling element 231, the out-coupling element 235, and/or the redirecting element 233. In some embodiments, the controller 260 may perform the selection. That is, the controller 260 may selectively control or configure one or more gratings (forming a selected combination of gratings) to operate in the diffraction state, and selectively control or configure the remaining one or more gratings to operate in the non-diffraction state. The one or more gratings (forming the selected combination of gratings) operating in the diffraction state may direct and concentrate the image light 205 output from the light source assembly 211 to propagate through a corresponding sub-eyebox.

A plurality of combinations of gratings formed by the gratings included in the in-coupling element 23'1, the out-coupling element 235, and/or the redirecting element 233 may direct and concentrate, via diffraction, the image light 205 received from the light source assembly 211 to propagate through a plurality of sub-eyeboxes. In some embodiments, each combination of gratings may direct and concentrate the image light 205 received from the light source assembly 211 to a sub-eyebox. The plurality of sub-eyeboxes may be arranged in a sub-eyebox array (e.g., a 1D array or a 2D array), forming an uncompressed eyebox 250.

An area of the sub-eyebox array may be substantially the same as an area of the uncompressed eyebox 250. Properties of the uncompressed eyebox 250 may be determined by the physical properties of the waveguide display assembly. In some embodiments, the uncompressed eyebox 250 may have a width of equal to or greater than 8 mm and equal to or less than 50 mm, and/or a height of equal to or greater than 6 mm and equal to or less than 60 mm. The size of the uncompressed eyebox disclosed herein is not limited to the above example sizes. The uncompressed eyebox may have any suitable size, depending on the application of the disclosed technology.

A selected combination of gratings operating in the diffraction state may direct the image light 225 with an FOV, which may be substantially the same as the FOV of an image light propagating through the entire uncompressed eyebox 250, to a sub-eyebox. In some embodiments, a selected combination of gratings operating in the diffraction state may direct the image light 225 with an FOV that is substantially the same as, or greater than, the FOV of the image light 215 (or the image light 205) to a sub-eyebox. The plurality of combinations formed by the plurality of grating sets may direct and concentrate, via diffraction, the image light 205 received from the light source assembly 211 to propagate through the plurality of sub-eyeboxes with a substantially same FOV. Thus, ghosting effects, distortion, and interference between different sub-eyeboxes to which the image light is directed and concentrated may be suppressed. In some embodiments, the image light 225 directed to the eye pupil 130 may have a diagonal FOV of equal to or greater than 60 degrees and equal to or less than 150 degrees.

The controller 260 may be communicatively coupled (e.g., through wired and/or wireless communication) with one or more other elements or devices included in the optical system 200, such as the light source assembly 211, the eye tracking system 270, the in-coupling element 231, the out-coupling element 235, and the redirecting element 233. The controller 260 may receive signal or data from the communicatively coupled devices or elements, and may control the operating states of the optical devices or elements.

The eye tracking system 270 may include an optical sensor (or imaging sensor) 265, such as a camera, configured to capture one or more images (or image data) of the eye pupil 130 of the eye 125. In some embodiments, the eye tracking system 270 may include an internal processor 280 wired or wirelessly coupled with the optical sensor 265. In some embodiments, the internal processor 280 may control the operations of the optical sensor 265. In some embodiments, the internal processor 280 may receive image data from the optical sensor 265. The internal processor 280 may execute computer-executable codes or instructions (e.g., software codes) stored in a non-transitory computer-readable medium (not shown) included in the eye tracking system 270 to perform various steps or functions. For example, the internal processor 280 may analyze or process the one or more captured images (or the image data) to obtain eye tracking information relating to the eye pupil 130. The internal processor 280 may include hardware components (e.g., circuit, gates), software components (codes, instructions), or both. Any suitable processor may be used. The eye tracking system 270 may also include a light source configured to emit a light (e.g., an infrared light) to illuminate the eye 125 (including the eye pupil 130) for the purpose of capturing images of the eye pupil 130 to obtain the eye tracking information. The light source is not shown in FIG. 2A for the simplicity of illustration. It is noted that the optical sensor is only an example for implementing eye tracking by the eye tracking system. Other suitable technologies may be implemented in lieu of, or in addition to, the optical sensor in the eye tracking system to predict the location (or position) and/or size of the eye pupil within the uncompressed eyebox of the waveguide. For example, data relating to the eye pupil may be obtained through sensors other than the optical sensor. Algorithms such as artificial intelligence and/or machine learning algorithms may be implemented to predict the eye tracking information (including, e.g., the position and/or the size of the eye pupil) based on data measured by sensors other than the optical sensor (or in combination with the data obtained by the optical sensor), based on historical eye tracking information of the eye pupil, etc.

In some embodiments, the controller 260 may be provided as a separate element or device from the eye tracking system 270. In some embodiments, the controller 260 may be an integral part of the eye tracking system 270 (e.g., the controller 260 may be the internal processor 280). For illustrative purposes, the controller 260 is shown as a separate device from the eye tracking system 270. The controller 260 may be configured to control other elements, devices, or sensors included in the optical system 200, such as at least one of the in-coupling element 231, the out-coupling element 235, the redirecting element 233, and/or other optical elements optically coupled with at least one of the in-coupling element 231, the out-coupling element 235, or the redirecting element 233. The dashed lines shown in FIG. 2A schematically represent the connections between the controller 260 and various other system, device, element, or sensor.

In some embodiments, the controller 260 may be configured to control, based on the eye tracking information of the eye pupil 130, various optical elements (e.g., gratings or grating sets) included in or coupled with the waveguide 210 to guide (e.g., direct and concentrate) the image light 205 generated by the light source assembly 211 toward the compressed eyebox 255. The waveguide display assembly (including the waveguide 210, the in-coupling element 231, and the out-coupling element 235) may deliver the full FOV of the image light 205 to the eye pupil 130 through the compressed eyebox 255. The compressed eyebox 255 may be formed by one or more sub-eyeboxes of the uncompressed eyebox 250 provided by the waveguide display assembly. The position of the compressed eyebox 255 may be dynamically aligned with the position of the eye pupil 130, such that the image light of the full FOV may be received by the eye pupil 130. As a result, the user can perceive the full content of an image (in form of the image light 205) generated by the light source assembly 211.

When the eye pupil 130 is moved or rotated such that the position is changed within the uncompressed eyebox 250, the controller 260 may dynamically and selectively control one or more optical elements (e.g., gratings) included in or coupled with the waveguide 210 to adjust the location, shape, and/or size of the compressed eyebox 255, such that the location of the compressed eyebox 255 is aligned with the new position of the eye pupil 130. The size of the compressed eyebox 255 may be smaller than the size of the uncompressed eyebox 250, and may be at least comparable with (e.g., the same as or slightly larger than) the size of the eye pupil 130. In some embodiments, the shape and/or size of the compressed eyebox may also be dynamically adjusted based on the shape and/or size of the eye pupil 130.

In some embodiments, the internal processor 280 of the eye tracking system 270 may determine the eye tracking information based on captured image data of the eye pupil 130. For example, the internal processor 280 may determine or detect a position and/or a movement of the eye pupil 130 up to six degrees of freedom for each eye (i.e., 3D positions, roll, pitch, and yaw) based on captured image data of the eye pupil 130. Any suitable image processing and/or facial recognition algorithms may be used. In some embodiments, the internal processor 280 may determine a size of the eye pupil 130 based on the captured image data. In some embodiments, the internal processor 280 may transmit a signal or data containing various determined eye tracking information to the controller 260. Alternatively, the processor 280 may transmit the image data to the controller 260, and the controller 260 may perform the analysis of the image data to obtain the eye tracking information relating to the eye pupil 130.

In some embodiments, the controller 260 may control, based on the eye tracking information, the gratings included in at least one of the in-coupling element 231, the out-coupling element 235, or the redirecting element 233 to guide and/or direct the image light 205 emitted by the light source assembly 211 to the compressed eyebox 255, which may be dynamically aligned with the eye pupil 130. As described above, the controller 260 may dynamically adjust the size, shape and/or location of the compressed eyebox 255 based on the real time eye tracking information, including, e.g., the size of the eye pupil 130, the position of the eye pupil 130, the moving direction of the eye pupil 130, the viewing direction of the eye pupil 130, or any suitable combination thereof. For example, at different time instances, based on the eye tracking information obtained in real time, the controller 260 may dynamically configure different gratings (e.g., different combinations of gratings) included in at least one of the in-coupling element 231, the out-coupling element 235, or the redirecting element 233 to direct and concentrate image lights of a predetermined FOV to different sub-eyeboxes of the uncompressed eyebox 250, thereby dynamically providing a compressed eyebox at a different location and/or with a different size and/or shape.

In some embodiments, the optical system 200 may include a plurality of waveguides 210 disposed in a stacked configuration (not shown in FIG. 2A). At least one (e.g., each) of the plurality of waveguides 210 may be coupled with or include one or more diffractive elements (e.g., in-coupling element, out-coupling element, and/or redirecting element), which may be configured to direct and concentrate the image light 205 toward (e.g., propagating through) one or more sub-eyeboxes, forming the compressed eyebox 255. In some embodiments, the plurality of waveguides 210 disposed in the stacked configuration may be configured to output a polychromatic image light 225 (e.g., a full-color image light).

In some embodiments, the optical system 200 may include one or more light source assemblies 211 and/or one or more waveguides 210. In some embodiments, at least one (e.g., each) of the light source assemblies 211 may be configured to emit a monochromatic image light of a specific wavelength band corresponding to a primary color (e.g., red, green, or blue) and a predetermined FOV (or a predetermined portion of an FOV). In some embodiments, the optical system 200 may include three different waveguides 210 configured to deliver component color images (e.g., primary color images) by in-coupling and subsequently out-coupling, e.g., red, green, and blue lights, respectively, in any suitable order. At least one (e.g., each) of the three waveguides 210 may be coupled with one or more grating sets. In some embodiments, the waveguide display assembly may include two different waveguides configured to deliver component color images (e.g., primary color images) by in-coupling and subsequently out-coupling, e.g., a combination of red and green lights, and a combination of green and blue lights, respectively, in any suitable order. In some embodiments, at least one (e.g., each) of the light source assemblies 211 may be configured to emit a polychromatic image light (e.g., a full-color image light) with a predetermined FOV.

FIG. 2B illustrates the optical system 200 providing the compressed eyebox 255 at a different location at a second time instance (different from the time instance depicted in FIG. 2A). As shown in FIG. 2B, when the eye pupil 130 has moved to a second position within the uncompressed eyebox 250, the eye tracking system 270 or the controller 260 may determine or detect, based on newly acquired image data of the eye pupil 130, a change in the eye tracking information (e.g., new eye tracking information), including, e.g., a change in the position of the eye pupil 130. Based on the change in the eye tracking information (e.g., change in the position of the eye pupil 130, or the new position of the eye pupil 130), the controller 260 may selectively configure or control one or more gratings (e.g., a different combination of gratings) included in at least one of the in-coupling element 231, the out-coupling element 235, or the redirecting element 233 to direct and concentrate, via diffraction, the image light 205 toward a different sub-eyebox, which forms the compressed eyebox 255 located at a different location corresponding to the changed position of the eye pupil 130. In some embodiments, the size and/or shape of the compressed eyebox 255 may also be changed based on the eye tracking information of the eye pupil 130. Although the position of the eye pupil 130 is used as an example of the eye tracking information, other types of the eye tracking information (e.g., size, viewing direction, and/or moving direction of the eye pupil 130) may be used as the basis for adjusting the location, shape, and/or size of the compressed eyebox, in place of or in combination with the position of the eye pupil 130. In addition, any suitable combination of these types of eye tracking information may be used as a basis for dynamically rendering the compressed eyebox 255.

Figure 2C:
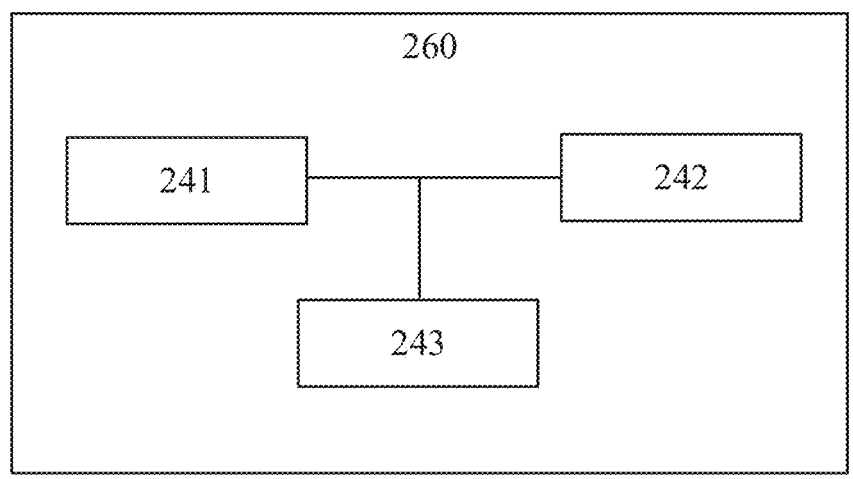
FIG. 2C illustrates a schematic diagram of a controller, according to an embodiment of the present disclosure.

FIG. 2C illustrates a schematic diagram of the controller 260, according to an embodiment of the present disclosure. The controller 260 may include a processor or processing unit 241, a storage device 242, and an input/output interface 243. The processor 241 may include any suitable processor, such as a central processing unit, a graphics processing unit, a microprocessor, an application-specific integrated circuit, a programmable logic device, a complex programmable logic device, a field-programmable gate array, etc. The processor 241 may be specially programmed to control the eye tracking system 270 (e.g., the light source and/or the optical sensor 265) to obtain eye tracking information, such as a size, a position (or location), a moving direction (e.g., translational and/or rotational moving direction), and/or a viewing direction of the eye pupil 130 of the user. The processor 241 may be configured to dynamically control, based on the eye tracking information, the switchable gratings included in at least one of the in-coupling element 231, the out-coupling element 235, or the redirecting element 233, to direct and concentrate the image light 205 from the light source assembly 211 to propagate through the compressed eyebox 255, which is located at a location corresponding to the position of the eye pupil 130 of the user.

The storage device 242 may be configured to store data, signal, information, or computer-readable codes or instructions. The storage device 242 may include a non-transitory computer-readable storage medium, such as a magnetic disk, an optical disk, a flash memory, a read-only memory ("ROM"), or a random-access memory ("RAM"), etc. The processor 241 may access the storage device 242 and retrieve data or instructions from the storage device 242. In some embodiments, the storage device 242 may store image data provided by the eye tracking system 270. In some embodiments, the processor 241 may retrieve the image data, and may process or analyze the image data to obtain the eye tracking information. In some embodiments, the processor 241 may retrieve the eye tracking information from the storage device 242, and may control various optical elements included in the optical system 200 based on the eye tracking information to direct image lights to the compressed eyebox 255. In some embodiments, the storage device 242 may store the current and/or historic operating states of the grating sets included in at least one of the in-coupling element 231, the out-coupling element 235, or the redirecting element 233. The processor 241 may retrieve the current and/or historic operating states when determining next operating states of the grating sets included in at least one of the in-coupling element 231, the out-coupling element 235, or the redirecting element 233.

The input/output interface 243 may be any suitable data or signal interface. The input/output interface 243 may be an interface configured for wired or wireless communication (hence the input/output interface 243 may also be referred to as a communication interface). In some embodiments, the input/output interface 243 may include a transceiver configured to receive and transmit signals or data. In some embodiments, the input/output interface 243 may be configured to communicate with the eye tracking system 270, the in-coupling element 231, the out-coupling element 235, the redirecting element 233, and/or one or more power sources for supplying voltages to active gratings or polarization switches. The input/output interface 243 may receive data or signal (or transmit data or signal) from (or to) the eye tracking system 270, the in-coupling element 231, the out-coupling element 235, the redirecting element 233, and/or the power sources. In some embodiments, the input/output interface 243 may communicate data with another external device other than the eye tracking system 270.

Figure 3A:
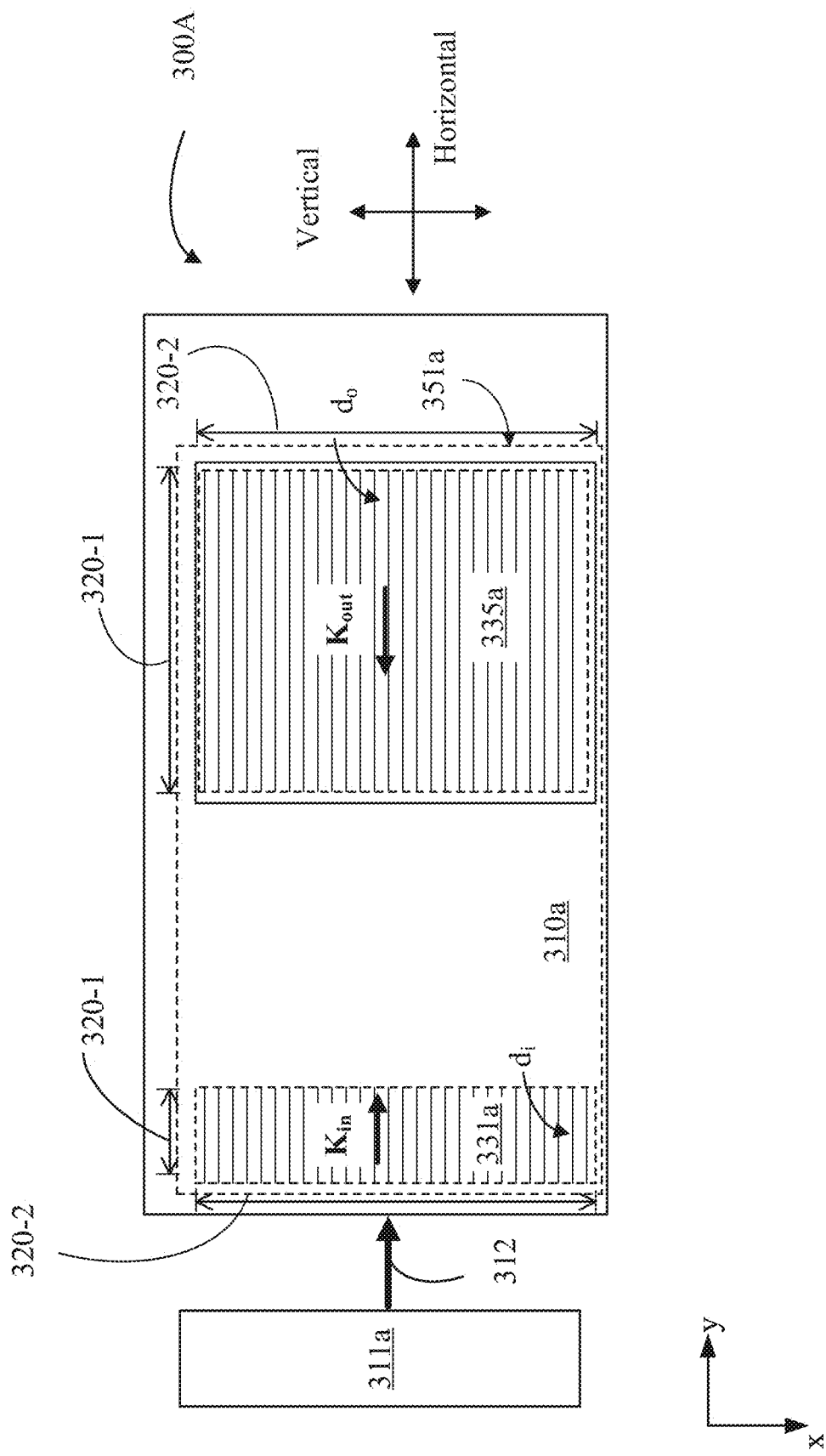
FIG. 3A illustrates a schematic diagram of a waveguide display assembly configured to provide a one-dimensional ("1D") pupil replication and eyebox compression, according to an embodiment of the present disclosure.

FIG. 3A illustrates a schematic diagram of a waveguide display assembly 300A configured to provide a one-dimensional ("1D") pupil replication (or pupil expansion) and eyebox compression (e.g., in a horizontal direction 320-1), according to an embodiment of the present disclosure. For illustrative purposes, a horizontal direction 320-1 and a vertical direction 320-2 may be defined hereinafter in relation with the eye position of a user. The waveguide display assembly 300A may include a light source assembly 311a configure to emit an image light 312, and a waveguide 310a configured to guide the image light to propagate through an eyebox (not shown in FIG. 3A). An in-coupling element 331a and an out-coupling element 335a may be disposed at the same surface or different surfaces of the waveguide 310a. For illustrative purpose, FIG. 3A shows the in-coupling element 331a and the out-coupling element 335a are disposed at the same surface of the waveguide 310a. The in-coupling element 331a may be configured to couple the image light 312 emitted by the light source assembly 311a into the waveguide 310a. The image light 312 may propagate inside the waveguide 310a through TIR toward the out-coupling element 335a. The out-coupling element 335a may be configured to couple the image light 312 propagating inside the waveguide 310a through TIR out of the waveguide 310a toward the eyebox.

In some embodiments, at least one (e.g., each) of the in-coupling element 331a or the out-coupling element 335a may be a diffractive element, which may include a grating set. Each grating set may include one or more gratings. Each grating set may be a switchable grating set or a non-switchable grating set. A switchable grating set may include at least one switchable grating. In some embodiments, the in-coupling element 331a (or the out-coupling element 335a) may include all switchable gratings, all non-switchable gratings, or a combination of at least one switchable grating and at least one non-switchable grating. For illustrative purposes, FIG. 3A shows that one grating is included in the in-coupling element 331a (hence the in-coupling element 331a is also referred to as an in-coupling grating 331a), and one grating is included in the out-coupling element 335a (hence the out-coupling element 335a is also referred to as an out-coupling grating 335a). In some embodiments, at least one of the in-coupling grating 331a or the out-coupling grating 335a may be a transmissive or a reflective grating. In some embodiments, at least one of the in-coupling grating 331a or the out-coupling grating 335a may be a directly switchable grating (e.g., an active grating) or an indirectly switchable grating (e.g., a passive and polarization sensitive grating, or an active and polarization sensitive grating). When at least one of the in-coupling grating 331a or the out-coupling grating 335a is an indirectly switchable grating, a polarization switch may be disposed at a light incidence side of the indirectly switchable grating. An exemplary indirectly switchable grating and an exemplary polarization switch are described below in connection with FIGS. 9A and 9B.

A grating vector $K_{in}$ of the in-coupling grating 331a may be configured to have a magnitude of $2\pi/d_i$, where $d_i$ is the period of the grating. A direction of the grating vector $K_{in}$ may be in a direction of periodicity of the in-coupling grating 331a. A grating vector $K_{out}$ of the out-coupling grating 335a may be configured to have a magnitude of $2\pi/d_o$, where $d_o$ is the period of out-coupling grating 335a. A direction of the grating vector $K_{out}$ may be in a direction of periodicity of the out-coupling grating 335a. A grating vector (e.g., $K_{in}$, $K_{out}$) may indicate the diffraction effect of the grating on the incident image light. In the embodiment shown in FIG. 3A, the grating vectors $K_{in}$ and $K_{out}$ may be substantially parallel (or anti-parallel).

In some embodiments, both the in-coupling grating 331a and the out-coupling grating 335a may be configured to have the vertically extending grating features. The in-coupling grating 331a may be configured to bend the light path of the image light 312 received from the light source assembly 311a along the horizontal direction 320-1, and the out-coupling grating 335a may be configured to bend the light path of the image light 312 received along the horizontal direction 320-1, thereby expanding the image light 312 received from the light source assembly 311a in the horizontal direction 320-1. That is, the combination of the waveguide 310a, the in-coupling grating 331a, and the out-coupling grating 335a may provide a 1D pupil expansion as well as the eyebox compression described above. In some embodiments, the image light 312 propagating through TIR inside the waveguide 310a may not change (or may not substantially change) its polarization when travelling from the in-coupling grating 331a to the out-coupling grating 335a.

In some embodiments, the image light 312 propagating through TIR inside the waveguide 310a may change its polarization when travelling from the in-coupling grating 331a to the out-coupling grating 335a. In some embodiments, to suppress or reduce a change in the polarization state of the image light 312 that may occur when the image light 312 propagates inside the waveguide 310a, the waveguide 310a may include a polarization correction film 351a. In some embodiments, the polarization correction film 351a may be configured to preserve the polarization state of the image light 312 when the image light 312 propagates inside the waveguide 310a. In some embodiments, the polarization correction film 351a may include a complex compensation film (e.g., a polarization correcting anisotropic plate) configured for a specific waveguide configuration. In some embodiments, the polarization correction film 351a may be disposed adjacent or on a surface of the waveguide 310a, and may at least partially cover an area of propagation of the image light 312. In some embodiments, when one or more of the in-coupling grating 331a and the out-coupling grating 335a are indirectly switchable gratings, the waveguide display assembly 300A may also include one or more polarization switches coupled with the indirectly switchable gratings to provide a 2D pupil expansion as well as the eyebox compression described above.

Figure 3B:
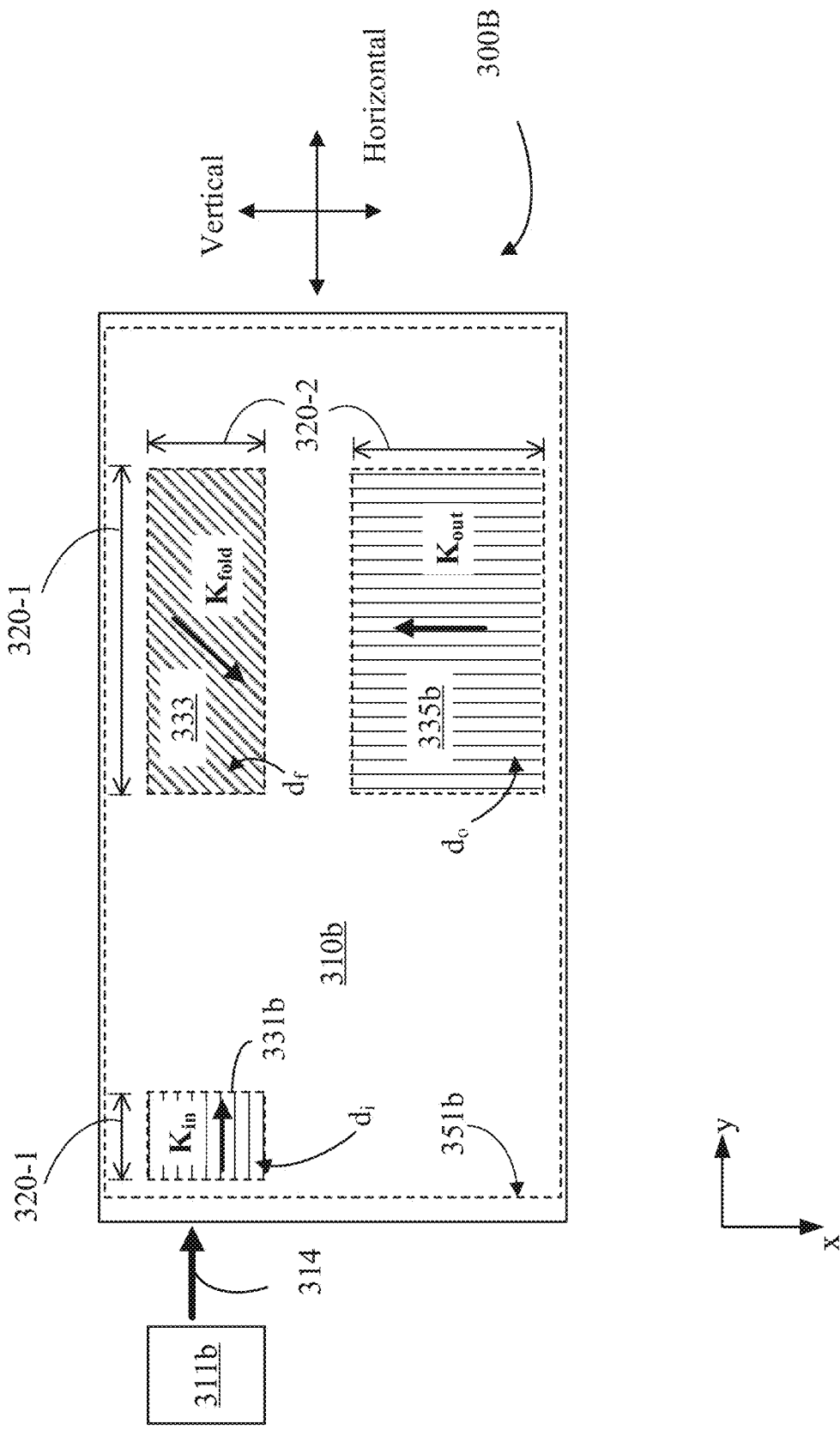
FIG. 3B illustrates a schematic diagram of a waveguide display assembly configured to provide a two-dimensional ("2D") pupil replication and eyebox compression, according to an embodiment of the present disclosure.

FIG. 3B illustrates a schematic diagram of a waveguide display assembly 300B configured to provide a two-dimensional ("2D") pupil replication (or pupil expansion) and eyebox compression, e.g., in both the horizontal direction 320-1 and a vertical direction 320-2, according to an embodiment of the present disclosure. The waveguide display assembly 300B may include a light source assembly 311b configure to emit an image light 314, and a waveguide 310b configured to guide the image light 314 to propagate through an eyebox (not shown). The size of the light source assembly 311b shown in FIG. 3B may be reduced in the vertical direction as compared to that of the light source assembly 311a shown in FIG. 3A. The waveguide 310b may be coupled with an in-coupling element 331b, a redirecting element 333, and an out-coupling element 335b. The in-coupling element 331b may be configured to couple the image light 314 emitted by the light source assembly 311b into the waveguide 310b. The image light 314 may propagate through TIR inside the waveguide 310b toward the redirecting element 333 and the out-coupling element 335b. The redirecting element 333 may be configured to direct the image light 314 to the out-coupling element 335b. The out-coupling element 335b may be configured to couple the image light 314 out of the waveguide 310b toward the eyebox.

In some embodiments, the in-coupling element 331b, the redirecting element 333, and the out-coupling element 335b may be disposed at the same surface or different surfaces of the waveguide 310b. For illustrative purpose, FIG. 3B shows that the in-coupling element 331b, the redirecting element 333, and the out-coupling element 335b are disposed at the same surface of the waveguide 310b. In some embodiments, each of the in-coupling element 331b, the out-coupling element 335b, and the redirecting element 333 may be a diffractive element including a grating set. Each grating set may include one or more gratings. For illustrative purposes, FIG. 3A shows that one grating is included in the in-coupling element 331b (hence the in-coupling element 331b is also referred to as an in-coupling grating 331b), one grating is included in the redirecting element 333 (hence the redirecting element 333 is also referred to as a redirecting grating 333), and one grating is included in the out-coupling element 335a (hence the out-coupling element 335a is also referred to as an out-coupling grating 335a). In some embodiments, at least one of the in-coupling grating 331b, the redirecting grating 333, and the out-coupling grating 335b may be a transmissive or a reflective grating. At least one of the in-coupling grating 331b, the redirecting grating 333, or the out-coupling grating 335b may be a directly switchable grating (e.g., an active grating) or an indirectly switchable grating (e.g., a passive and polarization sensitive grating, or an active and polarization switchable grating).

Grating vectors $K_{in}$ and $K_{out}$ may be grating vectors associated with the in-coupling grating 331b and the out-coupling grating 335b, similar to the $K_{in}$ and $K_{out}$ described above in connection with the in-coupling grating 331a and the out-coupling grating 335a. In some embodiments, the redirecting grating 333 may be associated with a grating vector $K_{fold}$ having a magnitude of $2\pi/d_f$, where $d_f$ is the pitch of the grating. In some embodiments, the in-coupling grating 331b may be configured to have the vertically extending grating features, and the out-coupling grating 33b may be configured to have the horizontally extending grating features. The redirecting grating 333 may be configured to have the grating features extending in a direction forming a predetermined angle with respect to the horizontal direction. The redirecting grating 333 may be configured to diffract the image light 314 propagating in one direction (e.g., the horizontal direction as an image light propagating in an orthogonal direction (e.g., the vertical direction). Thus, the redirecting grating 333 may be configured to provide a first beam expansion long the horizontal direction 320-1, and the out-coupling grating 335b may be configured to provide a second, orthogonal beam expansion long the vertical direction 320-2. That is, the redirecting grating 333 may enable a 2D beam expansion in a single waveguide. As a result, the combination of the waveguide 310b, the in-coupling element 331b, the redirecting element 333, and the out-coupling element 335b may provide a 2D pupil expansion as well as the eyebox compression described above.

In some embodiments, at least one of the in-coupling gratings 331b, the redirecting grating 333, or the out-coupling grating 335b may be a polarization sensitive grating. In some embodiments, the image light 314 propagating through TIR inside the waveguide 310b may not change its polarization when travelling from the in-coupling grating 331b to the redirecting grating 333 and the out-coupling grating 335b. In some embodiments, the image light 314 propagating through TIR inside the waveguide 310b may change its polarization when travelling from the in-coupling grating 331b to the redirecting grating 333 and the out-coupling grating 335b. In some embodiments, to suppress or reduce a change in the polarization state of the image light 314 when that may occur when the image light 314 propagates inside the waveguide 310b, the waveguide 310b may include a polarization correction film 351. In some embodiments, the polarization correction film 351 may be configured to preserve the polarization state of the image light 314 when the image light 314 propagates inside the waveguide 310b. In some embodiments, the polarization correction film 351 may include a complex compensation film (e.g., a polarization correcting anisotropic plate) configured for a specific waveguide configuration. In some embodiments, the polarization correction film 351 may be disposed adjacent or on a surface of the waveguide 310b, and may at least partially cover an area of propagation of the image light 314. In some embodiments, when one or more of the in-coupling grating 331b, the redirecting grating 333, and the out-coupling grating 335b are indirectly switchable gratings, the waveguide display assembly 300B may also include one or more polarization switches coupled with the indirectly switchable gratings to provide a 2D pupil expansion as well as the eyebox compression described above.

Figure 4A:
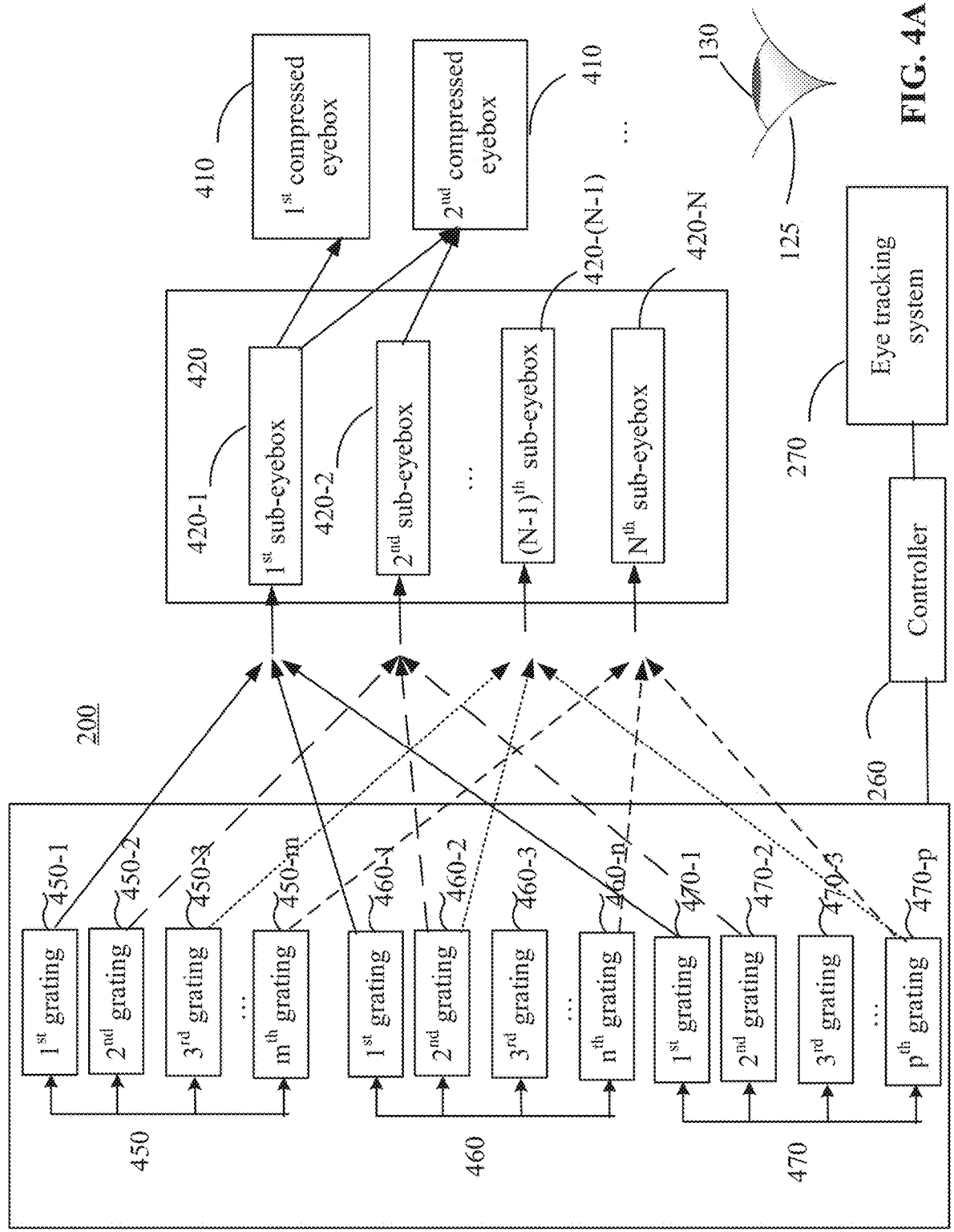
FIG. 4A schematically illustrates a block diagram of the optical system shown in FIGS. 2A and 2B, according to an embodiment of the present disclosure.

FIG. 4A schematically illustrates a block diagram of the optical system 200 shown in FIG. 2A and FIG. 2B, according to an embodiment of the present disclosure. For illustrative purposes, one or more waveguides and the light source assembly included in the optical system 200 are not shown in FIG. 4A. As schematically illustrated in FIG. 4A, the optical system 200 may include a plurality of grating sets 450, 460, and 470 coupled to the waveguide 210. For example, the grating set 450 (including gratings 450-1, 450-2, . . . , 450-$m$) may be included in the in-coupling element 231, the grating set 460 (including gratings 460-1, 460-2, . . . , 460-$n$) may be included in the out-coupling element 235, and the grating set 470 (including gratings 470-1, 470-2, . . . , 470-$p$) may be included in the redirecting element 233. Thus, the grating sets 450, 460, and 470 may be referred to as an in-coupling grating set 450, an out-coupling grating set 460, and a redirecting/folding grating set 470, respectively. When the redirecting element 233 is omitted (e.g., when the out-coupling element 235 includes the function provided by the redirecting element 233), the grating set 470 may be omitted or may be included in the out-coupling element 235. The numbers m, n, and p may be any suitable positive integer, depending on the specific application. For discussion purposes, each grating is presumed to be a switchable grating.

As shown in FIG. 4A, the controller 260 may selectively control or configure a combination of gratings including one or more gratings selected from the in-coupling element 231 (e.g., selected from the gratings 450-1, 450-2, . . . , 450-$m$), one or more gratings selected from the out-coupling element 235 (e.g., selected from the gratings 460-1, 460-2, . . . , 460-$n$), and one or more gratings selected from the redirecting element 233 (e.g., selected from the gratings 470-1, 470-2, . . . , 470-$p$), to operate in a diffraction state, and selectively control or configure the remaining one or more gratings to operate in a non-diffraction state. The combination of gratings operating in the diffraction state may direct and concentrate, via diffraction, an image light received from the light source assembly 211 to propagate through a waveguide toward a sub-eyebox. When a grating 450-1 is selected from the in-coupling grating set 450, a grating 460-1 is selected from the out-coupling grating set 460, and a grating 470-1 is selected from the redirecting grating set 470, the combination of gratings (450-1, 460-1, and 470-1) may direct and concentrate, via diffraction, an image light received from the light source assembly 211 to propagate through a waveguide toward a first sub-eyebox. N combinations of gratings may be obtained through selecting different gratings from the in-coupling grating set 450, the out-coupling grating set 460, and the redirecting grating set 470. N may be any suitable positive integer. The N combinations of gratings may correspond to N number of sub-eyeboxes.

For illustrative purposes, FIG. 4A shows that a combination of gratings (e.g., 450-1, 460-1, and 470-1) may direct and concentrate, via diffraction, the image light received from the light source assembly 211 to propagate through the waveguide toward a first sub-eyebox 420-1. A combination of gratings (e.g., 450-2, 460-2, and 470-2) may direct and concentrate, via diffraction, the image light received from the light source assembly 211 to propagate through the waveguide toward a second sub-eyebox 420-2. A combination of gratings (e.g., 450-3, 460-3, and 470-3) may direct and concentrate, via diffraction, the image light received from the light source assembly 211 to propagate through the waveguide toward an (N−1)$^{th}$ sub-eyebox 420-(N−1). A combination of gratings (450-$m$, 460-$n$, and 470-$p$) may direct and concentrate, via diffraction, the image light received from the light source assembly 211 to propagate through the waveguide toward an N$^{th}$ sub-eyebox 420-N.

Figure 4B:
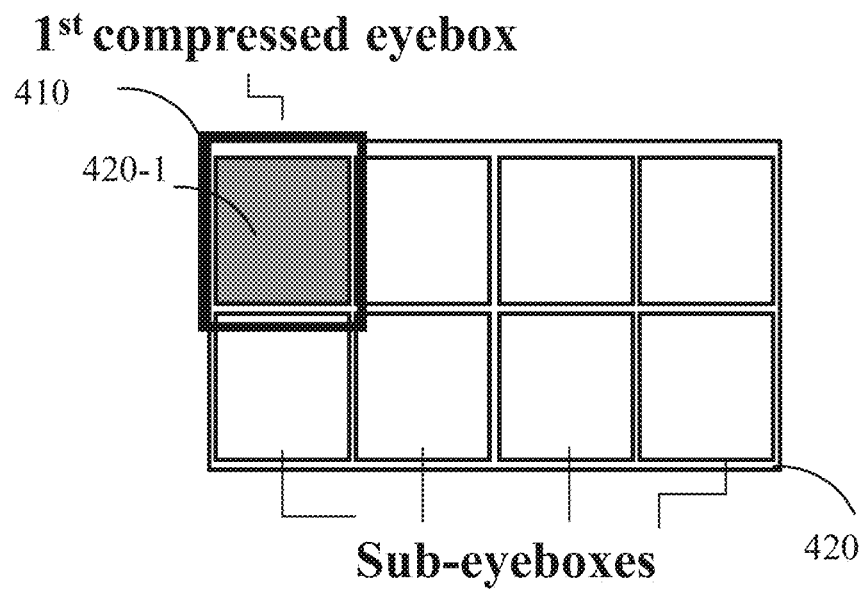
FIG. 4B schematically illustrates a first compressed eyebox provided by the optical system shown in FIG. 4A according to an embodiment of the present disclosure.
Figure 4C:
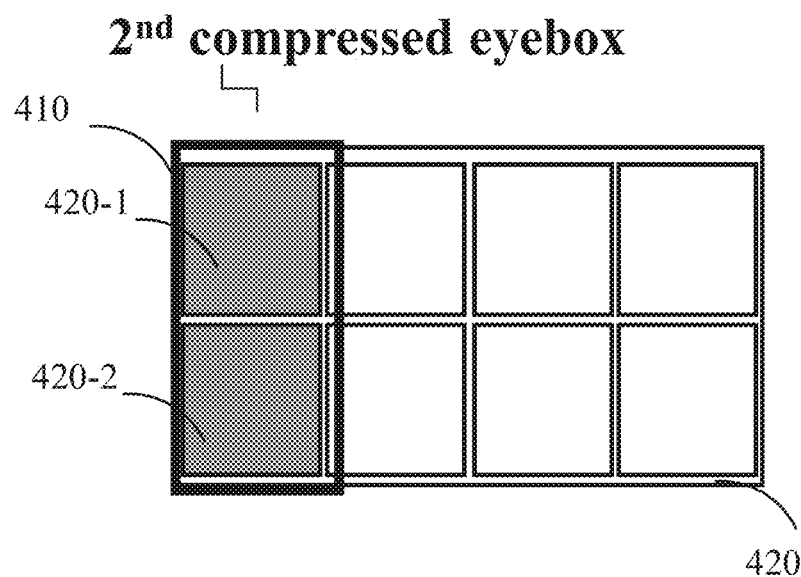
FIG. 4C schematically illustrates a second compressed eyebox provided by the optical system shown in FIG. 4A, according to an embodiment of the present disclosure.

The N number of sub-eyeboxes may form an uncompressed eyebox 420. In some embodiments, one or more (which may be less than all) activated sub-eyeboxes may form a compressed eyebox 410. The image light propagating through the compressed eyebox 410 may be received by the eye pupil 130. The compressed eyebox 410 may have a size smaller than a size of the uncompressed eyebox 420. In some embodiments, when multiple combinations of gratings are selectively configured to direct the image light to multiple sub-eyeboxes, the compressed eyebox 420 may be formed by multiple sub-eyeboxes. For illustrative purposes, FIG. 4A and FIG. 4B show that when the first sub-eyebox 420-1 is activated while the remaining one or more sub-eyeboxes are deactivated, the first sub-eyebox 420-1 may form the compressed eyebox 410 (referred to as a first compressed eyebox). FIG. 4A and FIG. 4C show that when the first sub-eyebox 420-1 and the second sub-eyebox 420-2 are activated while the remaining one or more sub-eyeboxes are deactivated, the first sub-eyebox 420-1 and the second sub-eyebox 420-2 may form another compressed eyebox 410 (referred to as a second compressed eyebox). For discussion purposes, FIGS. 4B and 4C show that eight sub-eyeboxes may form the uncompressed eyebox 420.

The controller 260 may dynamically configure different combinations of gratings to direct the image light to different sub-eyeboxes (which form different compressed eyeboxes) at different time instances or durations based on dynamically obtained changing eye tracking information of the eye pupil 130. For example, at least one of a location, a shape, or a size of the compressed eyebox 410 may be dynamically adjusted based on the changing eye tracking information (e.g., a change in the size, position, viewing direction, and/or the moving direction of the eye pupil 130). The adjustment may be performed in real time based on eye tracking information obtained in real time. The eye tracking information may be obtained by the eye tracking system 270 and transmitted to the controller 260, or may be obtained by the controller 260 based on image data of the eye pupil 130 acquired by the eye tracking system 270 and transmitted to controller 260. For the convenience of discussion, in the following descriptions, it is presumed that each combination of gratings selected from the in-coupling element, the out-coupling element, and the redirecting element (if included) is configured to direct an image light to a different sub-eyebox.

FIGS. 5A-5F illustrate various schemes for providing a compressed eyebox 525 that is dynamically aligned with the position of the eye pupil 130, according to embodiments of the present disclosure. For the simplicity of illustration and discussion, the change in the position of the eye pupil 130 is illustrated in FIGS. 5A-5F as an example of a change in the eye tracking information. It is understood that any other suitable type of eye tracking information may be used as the basis for adjusting the location, shape, and/or size of the compressed eyebox, in place of or in combination with the position of the eye pupil 130. For illustrative purposes, as shown in FIGS. 5A-5F, the uncompressed eyebox is represented by the area labeled as 550, and each sub-eyebox is represented by a circle. The plurality of sub-eyeboxes may be arranged in a sub-eyebox array, and an area of the sub-eyebox array may be substantially the same as an area of the uncompressed eyebox 550. The uncompressed eyebox 550 may have any suitable shape, and the sub-eyebox may have any suitable shape. The sub-eyeboxes are shown as at least partially overlapping with one another. In some embodiments, the sub-eyeboxes may not overlap with one another. The sub-eyeboxes are shown as having the same shape and size. In some embodiments, at least two (e.g., all) of the sub-eyeboxes may have different shapes. In some embodiments, at least two (e.g., all) of the sub-eyeboxes may have different sizes. The compressed eyebox 525 is presented by a range of dark grey color. The compressed eyebox 525 may include one or more sub-eyeboxes.

Figures 5A, 5B, 5C:
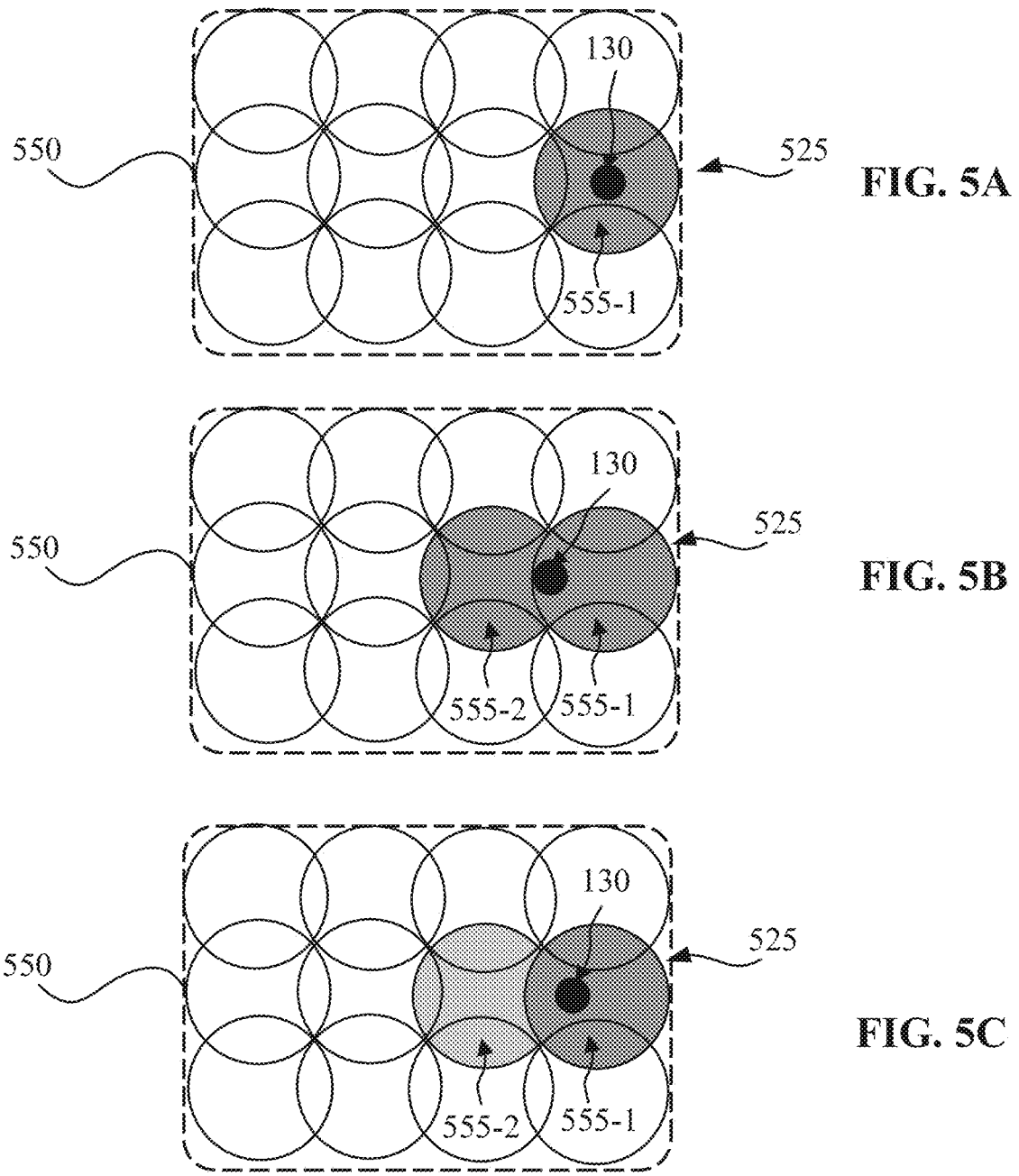
FIGS. 5A-5F illustrate various schemes for providing a compressed eyebox, according to embodiments of the present disclosure.

FIG. 5A shows that at a first time instance, the eye tracking system 270 or the controller 260 may detect or determine, based on image data of the eye pupil 130, that the eye pupil 130 (represented by the black dot) is at a first location (or position) within a sub-eyebox 555-1, e.g., at or near the center of the sub-eyebox 555-1. The controller 260 may selectively control or configure a first combination of gratings (e.g., as described above in connection with FIG. 4A) corresponds to the sub-eyebox 555-1 to operate in a diffraction state to direct and concentrate an image light received from the light source assembly to propagate through the sub-eyebox 555-1. The controller 260 may selectively control or configure the remaining one or more gratings (or remaining one or more combinations of gratings) to operate in the non-diffraction state (as indicated by the unfilled or un-shaded white sub-eyeboxes). That is, the controller 260 may selectively activate the sub-eyebox 555-1 or maintain the sub-eyebox 555-1 to be in the activated state, to form a compressed eyebox 525. The controller 260 may selectively deactivate the remaining one or more sub-eyeboxes included in the uncompressed eyebox 550, if the remaining one or more sub-eyeboxes were in an activated state in a preceding time instance or time period, or may maintain the remaining one or more sub-eyeboxes in a deactivated state if the remaining one or more sub-eyeboxes were in the deactivated state in the preceding time instance or time period.

FIG. 5B shows that at a second time instance, the eye tracking system 270 or the controller 260 may detect or determine, based on currently (or newly) acquired image data of the eye pupil 130, that the eye pupil 130 is located at a second location (or position) within an overlapping region between the sub-eyebox 555-1 and an adjacent sub-eyebox 555-2. The controller 260 may selectively control or configure two combinations of gratings respectively corresponding to the sub-eyeboxes 555-1 and 555-2 to operate in the diffraction state to direct and concentrate an image light received from the light source assembly to propagate through the adjacent sub-eyeboxes 555-1 and 555-2. The controller 260 may selectively configure the remaining one or more gratings or one or more combinations of gratings to operate in the non-diffraction state. That is, the controller 260 may selectively activate the adjacent sub-eyeboxes 555-1 and 555-2 to form the compressed eyebox 525. Thus, an aperture (cutoff) effect may be suppressed when the eye pupil 130 is in an overlapping region of two adjacent sub-eyeboxes. In some embodiments, the two combinations of gratings corresponding to the sub-eyeboxes 555-1 and 555-2 may be configured to diffract the image light received from the light source assembly to propagate through the sub-eyeboxes 555-1 and 555-2 with a substantially same diffraction efficiency. That is, the light intensity of the image lights propagating through the sub-eyeboxes 555-1 and 555-2 may be substantially the same.

FIG. 5C shows that at a third time instance, the eye tracking system 270 or the controller 260 may detect or determine, based on currently (or newly) acquired image data of the eye pupil 130, that the eye pupil 130 is located at a third location (or position) within the sub-eyebox 555-1 near but not yet within the overlapping region. The controller 260 may selectively control or configure the two combinations of gratings to operate in the diffraction state to direct and concentrate the image light received from the light source assembly to propagate through the sub-eyeboxes 555-1 and 555-2, respectively. The sub-eyeboxes 555-1 and 555-2 may form the compressed eyebox 525. The controller 260 may selectively configure the remaining one or more gratings or one or more combinations of gratings to operate in the non-diffraction state. Different from the second time instance shown in FIG. 5B, where the light intensity of the image lights propagating through the two sub-eyeboxes are substantially the same, at the third time instance shown in FIG. 5C, the light intensities of the image lights propagating through the two sub-eyeboxes may be different, as shown by the darker and lighter color. That is, the two combinations of grating sets corresponding to the sub-eyeboxes 555-1 and 555-2 may diffract the image light received from the light source assembly to propagate through the sub-eyeboxes 555-1 and 555-2 with different diffraction efficiencies. For example, as shown in FIG. 5C, the light intensity of the image light propagating through the sub-eyeboxes 555-1 that is closer to the eye pupil 130 may be higher than the light intensity of the image light propagating through the sub-eyeboxes 555-2 that is further away from the eye pupil 130.

Figure 5D:
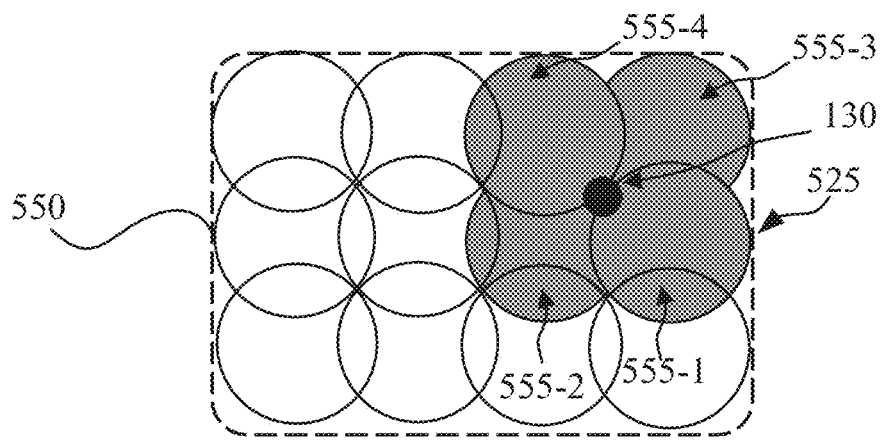

FIG. 5D shows that at a fourth time instance, the eye tracking system 270 or the controller 260 may detect or determine, based on currently (or newly) acquired image data of the eye pupil 130, that the eye pupil 130 is located at a fourth location (or position), which has a substantially equal distance to the centers of the sub-eyeboxes 555-1, 555-2, 555-3, and 555-4. The controller 260 may selectively control or configure four different combinations of gratings corresponding to operate in the diffraction state to direct and concentrate an image light received from the light source assembly to propagate through the four sub-eyeboxes 555-1, 555-2, 555-3, and 555-4, respectively. The controller 260 may selectively configure or control the remaining one or more gratings or one or more combinations of gratings to operate in the non-diffraction state. That is, the controller 260 may selectively activate the sub-eyeboxes 555-1, 555-2, 555-3, and 555-4 to form the compressed eyebox 525, while deactivate the remaining one or more sub-eyeboxes.

In some embodiments, the controller 260 may selectively control or configure the four combinations of gratings to diffract the image light received from the light source assembly to propagate through the sub-eyeboxes 555-1, 555-2, 555-3, and 555-4 at a substantially same diffraction efficiency. That is, the light intensity of the image lights propagating through the sub-eyeboxes 555-1, 555-2, 555-3, and 555-4 may be substantially the same, as shown by the substantially the same color in FIG. 5D. In some embodiments, the four combinations of grating sets may diffract the image light received from the light source assembly to propagate through the sub-eyeboxes 555-1, 555-2, 555-3, and 555-4 at different diffraction efficiencies. In some embodiments, the light intensity of the image light propagating through the sub-eyeboxes 555-1, 555-2, 555-3, and 555-4 may be a function of the distances from the eye pupil 130 to the centers of the circles representing the sub-eyeboxes 555-1, 555-2, 555-3, and 555-4. For example, the light intensity of the image light propagating through a sub-eyebox may be inversely proportional to the distance from the eye pupil 130 to the center of the sub-eyebox. In some embodiments, the shorter the distance, the greater (or higher) the light intensity of the image light propagating through the sub-eyebox. In other words, the controller 260 may control or configure a combination of gratings to diffract the image light at a diffraction efficiency that is inversely proportional to the distance from the eye pupil 130 is closer to the center of the circle representing the sub-eyebox corresponding to the combination of grating sets. Thus, depending on the distances from the eye pupil 130 to the centers of the sub-eyeboxes, the light intensities of the image lights propagating through the sub-eyeboxes 555-1, 555-2, 555-3, and 555-4 may be the same or may be different.

Figure 5E:
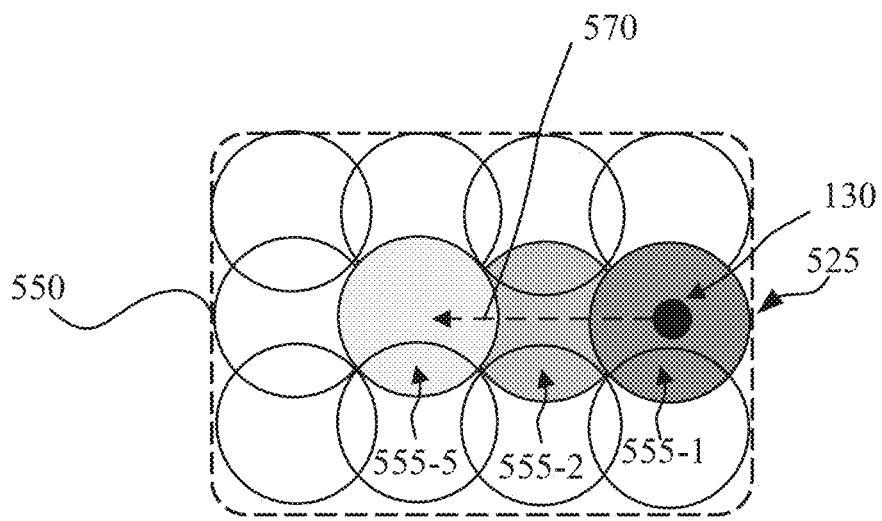

FIG. 5E shows that at a fifth time instance, the eye tracking system 270 or the controller 260 may determine or predict, based on currently (or newly) acquired image data of the eye pupil 130, that the eye pupil 130 is moving in a horizontal direction indicated by an arrow 570. The controller 260 may selectively control or configure one or more combinations of gratings to operate in the diffraction state to diffract image lights to one or more sub-eyeboxes. For illustrative purposes, three sub-eyeboxes 555-1, 555-2, and 555-5 are shown as being activated, which form the compressed eyebox 525. That is, the controller 260 may control three different combinations of gratings to operate in the diffraction state to direct and concentrate, via diffraction, image lights to propagate through three sub-eyeboxes 555-1, 555-2, and 555-5. The three sub-eyeboxes 555-1, 555-2, and 555-5 may be located along the moving direction 570 of the eye pupil 130. The controller 260 may selectively control or configure the remaining one or more gratings or one or more combinations of gratings to operate in the non-diffraction state. That is, the controller 260 may activate the sub-eyeboxes 555-1, 555-2, and 555-5 to form the compressed eyebox 525, while deactivate the remaining one or more sub-eyeboxes.

In some embodiments, the controller 260 may control or configure the three combinations of gratings corresponding to the sub-eyeboxes 555-1, 555-2, and 555-5 to diffract the image light to propagate through the sub-eyeboxes 555-1, 555-2, and 555-5 at a substantially same diffraction efficiency. That is, the light intensity of the image lights propagating through the sub-eyeboxes 555-1, 555-2, and 555-5 may be substantially the same. In some embodiments, the controller 260 may control or configure the three combinations of gratings corresponding to the sub-eyeboxes 555-1, 555-2, and 555-5 to diffract the image light to propagate through the sub-eyeboxes 555-1, 555-2, and 555-5 at different diffraction efficiencies. That is, the light intensities of the image lights propagating through at least two of the sub-eyeboxes 555-1, 555-2, and 555-5 may be different. For example, the light intensities may gradually reduce along the moving direction 570, e.g., the light intensity of the image light at the sub-eyebox 555-5 may be greater than the light intensity of the image light at the sub-eyebox 555-2, which may be greater than the light intensity of the image light directed to the sub-eyebox 555-1.

In some embodiments, the controller 260 may sequentially activate sub-eyeboxes 555-1, 555-2, and 555-5 by sequentially controlling the corresponding three combinations of gratings to start operating in the diffraction state. The time interval between the activation of the sub-eyeboxes 555-1, 555-2, and 555-5 may be any suitable value, which may be configured or set based on specific application. In some embodiments, the controller 260 may substantially simultaneously activate the sub-eyeboxes 555-1, 555-2, and 555-5 by substantially simultaneously control the three combinations of grating sets to operate in the diffraction state.

In some embodiments, the controller 260 may selectively activate two or more sub-eyeboxes located along the moving direction 570 in the horizontal direction, as shown in FIG. 5E. Likewise, when the moving direction 570 is in the vertical direction, the controller 260 may selectively activate two or more combinations of gratings corresponding to two or more sub-eyeboxes in the vertical direction to direct and concentrate an image light toward the two or more sub-eyeboxes. In some embodiments, the moving direction 570 may be a current moving direction of the eye pupil 130, which may be obtained by the eye tracking system 270 or the controller 260 based on the current image data of the eye pupil 130. In some embodiments, the moving direction 470 may be a predicted direction (or predicted trajectory) estimated by the eye tracking system 270 or the controller 260 based on a current moving direction of the eye pupil 130 and a historical moving direction or position of the eye pupil 130. For example, the controller 260 may analyze two or more sequential images or image frames (e.g., a current image frame and a preceding image frame) to predict a moving direction of the eye pupil 130. The controller 260 may activate the sub-eyeboxes based on the predicted moving direction before the eye pupil 130 actually moves to the sub-eyeboxes along the predicted moving direction. This may improve a user experience of the optical system 200. The prediction may be performed by the controller 260 based on a suitable algorithm, which may be embodied in computer-readable instructions or codes (e.g., software codes) stored in a memory of the eye tracking system 270 or the storage device of the controller 260.

Figure 5F:
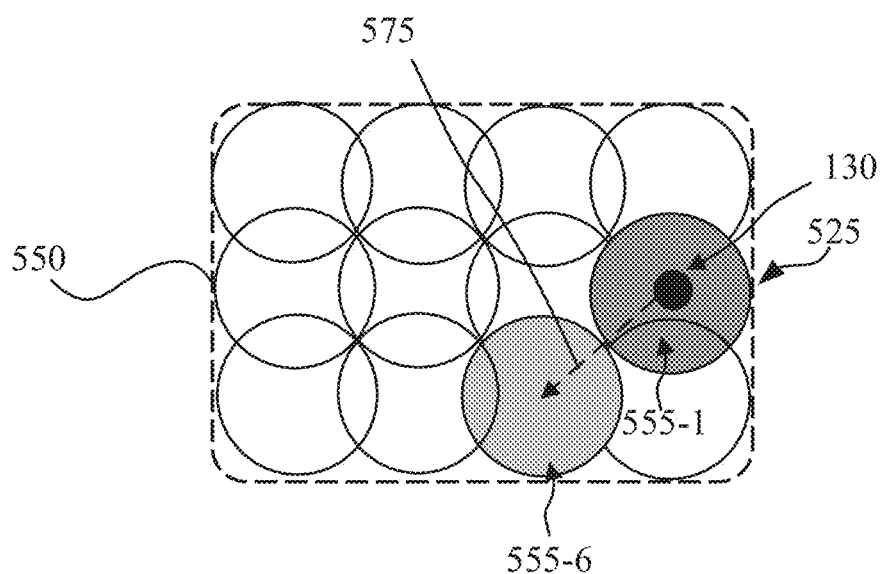

FIG. 5F shows that at a sixth time instance, the eye tracking system 270 or the controller 260 may predict or determine, based on currently acquired image data of the eye pupil 130, that the eye pupil 130 is moving in a direction indicated by an arrow 575 (e.g., a diagonal direction). The moving direction 575 represents any moving direction that is neither horizontal nor vertical. The controller 260 may selectively activate the sub-eyeboxes 555-1 and 555-6 along the moving direction 575, while selectively deactivate the remaining one or more sub-eyeboxes. That is, the controller 260 may selectively control two or more combinations of gratings to operate in the diffraction state to direct and concentrate, via diffraction, an image light received from the light source assembly to the sub-eyeboxes 555-1 and 555-6. In some embodiments, the controller 260 may sequentially or substantially simultaneously activate the sub-eyeboxes 555-1 and 555-6. The light intensities of the image lights propagating through the sub-eyeboxes 555-1 and 555-6 may be substantially the same or may be different (e.g., gradually decreasing along the moving direction 575). Although not shown, more than two sub-eyeboxes along the moving direction 475 may be activated substantially simultaneously or sequentially.

Although not shown in FIGS. 5A-5F, the activation of the sub-eyeboxes may also be based on the size of the eye pupil 130 measured from the image data of the eye pupil 130. For example, the size of the eye pupil may become larger (dilated) in low-light situations. Accordingly, in some embodiments, more sub-eyeboxes may be activated such that the compressed eyebox 525 has a size that is at least comparable with (e.g., the same as or slightly larger than) the size of the eye pupil 130. In some embodiments, the adjustment of the activation of the sub-eyeboxes (and hence the location, shape, and/or size of the compressed eyebox 525) may be based on a combination of two or more types of the eye tracking information, such as the size of the eye pupil 130 and the position of the eye pupil 130, the size of the eye pupil 130 and the moving direction of the eye pupil 130, the size of the eye pupil 130 and the viewing direction of the eye pupil 130, the position of the eye pupil 130 and the moving direction of the eye pupil 130, the position of the eye pupil 130 and the viewing direction of the eye pupil 130, etc. Any suitable combination of these types of eye tracking information may be used as a basis for dynamically rendering the compressed eyebox.

FIGS. 6A-6D schematically illustrate various arrangements of a plurality of gratings that may be included in a diffractive element (e.g., an in-coupling element, an out-coupling element, and/or a redirecting element) coupled to a waveguide, according to various embodiments of the present disclosure. For example, the arrangements may be applicable to the gratings included in the in-coupling element 231, the out-coupling element 235, and the redirecting element 233 shown in FIG. 2A and FIG. 2B, to the gratings included in the in-coupling element 331a (or 331b), the out-coupling element 335a (or 335b), and the redirecting element 333 shown in FIG. 3A and FIG. 3B, or to the gratings shown in FIG. 4. The gratings may include at least one (e.g., all) switchable grating. Detailed descriptions of the switchable grating can refer to the above descriptions.

Figure 6A:
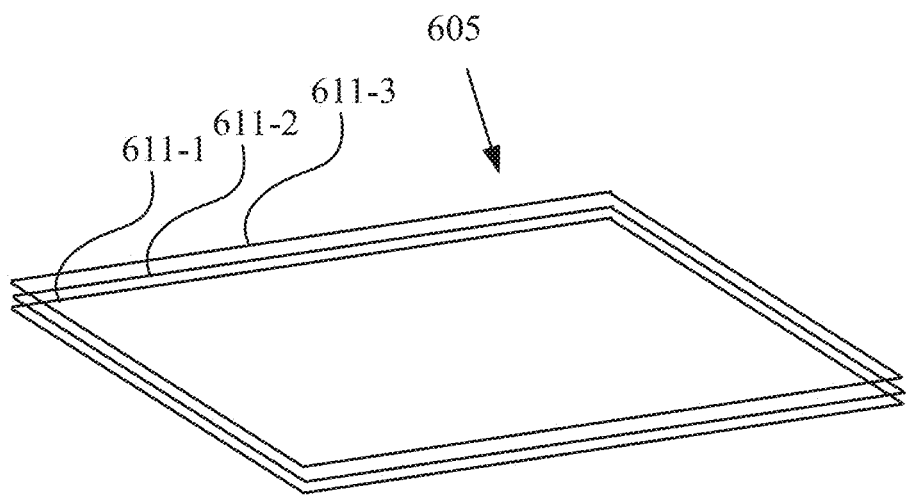
FIGS. 6A-6D illustrate schematic diagrams of various arrangements of a plurality of grating sets, according to various embodiments of the present disclosure.

FIG. 6A schematically illustrates an arrangement of a plurality of gratings, according to an embodiment of the present disclosure. As shown in FIG. 6A, the plurality of gratings may be stacked. In FIG. 6A, a diffractive element 605 may include a stack of a plurality of gratings 611-1, 611-2, and 611-3. The number of gratings may be any suitable number, such as two, four, five, six, etc. The gratings 611-1, 611-2, and 611-3 may represent the gratings included in an in-coupling element (e.g., in-coupling element 231 shown in FIG. 2A), an out-coupling element (e.g., out-coupling element 235 shown in FIG. 2A), or a redirecting element (e.g., redirecting element 233 shown in FIG. 2A). For example, in some embodiments, the gratings shown in FIG. 6A may represent the gratings 450-1, 450-2, . . . , 450-$m$ shown in FIG. 4A, which may be included in an in-coupling element. In some embodiments, the gratings shown in FIG. 6A may represent the gratings 460-1, 460-2, . . . , 460-$n$ shown in FIG. 4A, which may be included in an out-coupling element. In some embodiments, the gratings shown in FIG. 6A may represent the gratings 470-1, 470-2, . . . , 470-$p$ shown in FIG. 4A, which may be included in a redirecting element. Accordingly, the diffractive element 605 may represent an in-coupling element, an out-coupling element, or a redirecting element. For example, each of an in-coupling element, out-coupling element, and redirecting element coupled to the waveguide may have a plurality of gratings arranged in the stacked configuration shown in FIG. 6A.

The gratings are schematically represented by rectangle plates for illustrative purposes. The gratings may be disposed at a same surface or different surfaces of a waveguide, e.g., the waveguide 210 shown in FIGS. 2A and 2B. The controller 260 may select one or more combinations of gratings from the gratings included in the in-coupling element (which may have the configuration shown in FIG. 6A), the gratings included in the out-coupling element (which may have the configuration shown in FIG. 6A), and the gratings included in the redirecting element (if included, which may have the configuration shown in FIG. 6A). The controller 260 may configure the selected combinations of gratings to operate in a diffraction state, while configuring the remaining one or more gratings or one or more combinations of gratings are configured to operate in a non-diffraction state. The selected combinations of gratings operating in the diffraction state may direct and concentrate, via diffraction, an image light from a light source assembly to one or more sub-eyeboxes. An sub-eyebox may be one of an array of sub-eyeboxes included in an uncompressed eyebox. In some embodiments, the one or more sub-eyeboxes may form a compressed eyebox. Detailed descriptions of the uncompressed eyebox, the sub-eyeboxes, and the compressed eyebox can refer to the above descriptions.

In some embodiments, when the optical system includes a plurality of waveguides stacked together, the plurality of gratings may be disposed at the plurality of waveguides. At least one (e.g., each) of the waveguides may be coupled with an in-coupling element (which may have the configuration shown in FIG. 6A), an out-coupling element (which may have the configuration shown in FIG. 6A), and an redirecting element (if included, which may have the configuration shown in FIG. 6A). The controller 260 may select a combination of gratings from the gratings included in the in-coupling elements, the gratings included in the out-coupling elements, and the gratings included in the redirecting elements (if included) coupled with the waveguide.

Figure 6B:
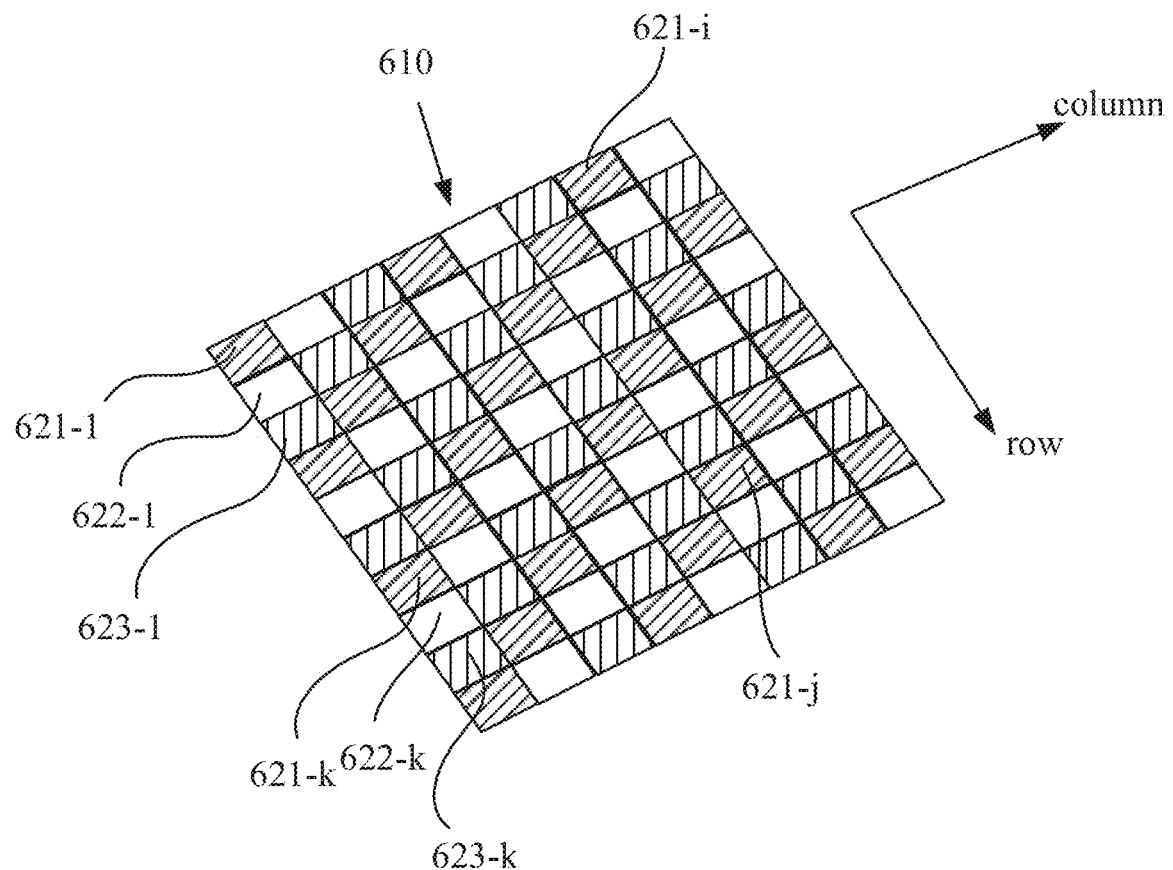

FIG. 6B schematically illustrates an arrangement of a plurality of gratings with sub-gratings of different gratings arranged in an interleaved configuration, according to another embodiment of the present disclosure. The plurality of gratings may be the in-coupling gratings included in an in-coupling element, the out-coupling gratings included in an out-coupling element, or the redirecting gratings included in a redirecting element. At least one (e.g., each) of the gratings may include a plurality of sub-gratings. Different sub-gratings of the plurality of gratings may be arranged in an interleaved grating array 610 (also referred to as a diffractive element 610). The interleaved grating array 610 may represent the gratings included in an in-coupling element, an out-coupling element, or a redirecting element. In some embodiments, the gratings 450-1, 450-2, . . . , 450-$m$ shown in FIG. 4A, which may be included in an in-coupling element, may be arranged in an interleaved grating array 610. In some embodiments, the gratings 460-1, 460-2, . . . , 460-$n$ shown in FIG. 4A, which may be included in an out-coupling element, may be arranged in an interleaved grating array 610. In some embodiments, the gratings 470-1, 470-2, . . . , 470-$p$ shown in FIG. 4A, which may be included in a redirecting element, may be arranged in an interleaved grating array 610.

In the interleaved configuration shown in FIG. 6B, sub-gratings belonging to different gratings may be interleaved in a single layer or plate. The interleaved grating array 610 may include a grating matrix formed by a plurality of sub-gratings disposed in a number of rows and a number of columns in a mixed manner. Two adjacent sub-gratings in the grating matrix may belong to different gratings. For example, as shown in FIG. 6B, a sub-grating 621-1 may belong to a first grating (e.g., the grating 450-1, 460-1, or 470-1 shown in FIG. 4A). A sub-grating 622-1 disposed adjacent the sub-grating 621-1 in the row direction may belong to a second grating (e.g., the grating 450-2, 460-2, or 470-2 shown in FIG. 4A). A sub-grating 623-1 disposed adjacent the sub-grating 622-1 in the row direction may belong to a third grating (e.g., the grating 450-3, 460-3, or 470-3 shown in FIG. 4A). The interleaved configuration may be repeated in the rows and columns. Sub-gratings illustrated with the same filling pattern in FIG. 6B may belong to the same grating. The grating matrix may be referred to as an interleaved grating matrix.

In some embodiments, in the interleaved grating array 610 shown in FIG. 6B, any two sub-gratings belonging to the same grating may not be located adjacent one another in the same row or same column. In some embodiments, in other interleaved configurations, two sub-gratings belonging to the same grating may be located adjacent one another either in the same row or in the same column. In some embodiments, sub-gratings belonging to different gratings may be randomly distributed in the grating matrix. In some embodiments, sub-gratings belonging to the same grating may be disposed in the same row or in the same column. In such embodiments, different gratings may be disposed side by side in rows or in columns. In some embodiments, different sub-gratings in the same grating may be configured to deliver different portions of the predetermined FOV of the image light to a corresponding sub-eyebox. The controller 260 may select one or more combinations of gratings from the in-coupling element (which may have the configuration shown in FIG. 6B), the out-coupling element (which may have the configuration shown in FIG. 6B), and the redirecting element (if included, which may have the configuration shown in FIG. 6B). The controller 260 may configure the selected one or more combinations of gratings to operate in a diffraction state, while configuring the remaining one or more gratings or one or more combinations of gratings are configured to operate in a non-diffraction state. The one or more combinations of gratings operating in the diffraction state may direct and concentrate, via diffraction, an image light from a light source assembly to one or more sub-eyeboxes. In some embodiments, the one or more eyeboxes may form a compressed eyebox.

Figure 6C:
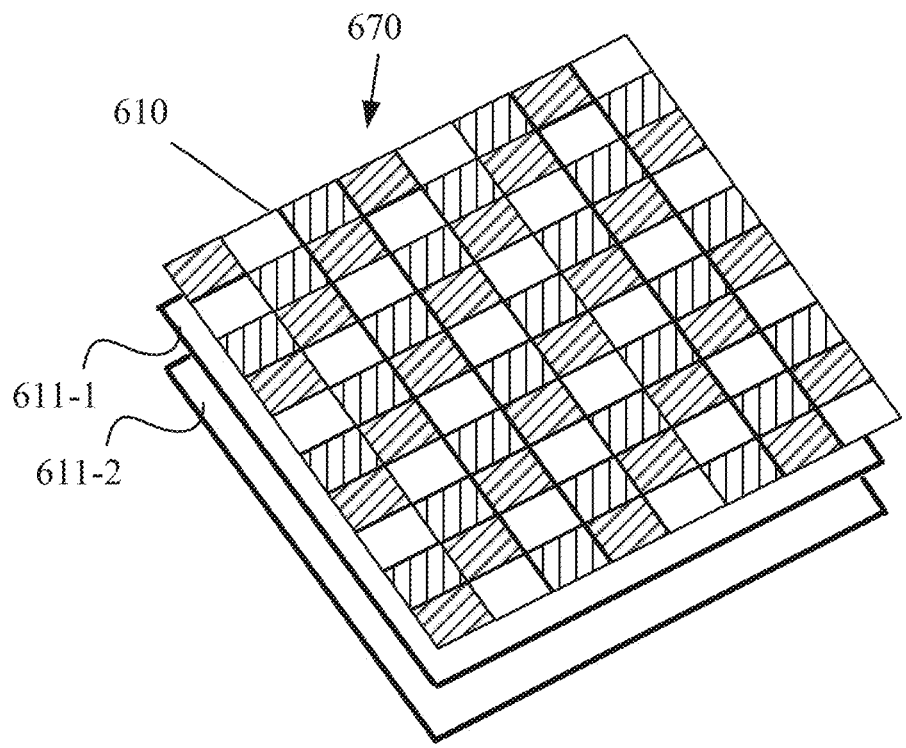

FIG. 6C schematically illustrates an arrangement of the plurality of gratings, according to another embodiment of the present disclosure. The plurality of gratings may form or be included in a diffractive element 670, which may be an in-coupling element (e.g., in-coupling element 231), an out-coupling element (e.g., out-coupling element 235), or a redirecting element (e.g., redirecting element 233). For example, in some embodiments, the gratings 450-1, 450-2, . . . , 450-m shown in FIG. 4A, which may be included in an in-coupling element, may be arranged in the configuration shown in FIG. 6C. In some embodiments, the gratings 460-1, 460-2, . . . , 460-n shown in FIG. 4A, which may be included in an out-coupling element, may be arranged in the configuration shown in FIG. 6C. In some embodiments, the gratings 470-1, 470-2, . . . , 470-p shown in FIG. 4A, which may be included in a redirecting element, may be arranged in the configuration shown in FIG. 6C.

Gratings included in the diffractive element 670 shown in FIG. 6C may be disposed in a configuration that is a combination of the stacked configuration shown in FIG. 6A and the interleaved configuration shown in FIG. 6B. For illustrative purposes, FIG. 6C shows that the diffractive element 670 may include two or more gratings from FIG. 6B stacked together (e.g., the grating 611-1 and the grating 611-2). The two or more stacked gratings from FIG. 6A may be further stacked with the interleaved grating array 610. In some embodiments, additional gratings from the stacked configuration shown in FIG. 6A may be included in the diffractive element 670. In some embodiments, additional interleaved grating arrays similar to the interleaved grating array 610 may be included in the diffractive element 670. The controller 260 may select one or more combinations of gratings from the in-coupling element (which may have the configuration shown in FIG. 6C), the out-coupling element (which may have the configuration shown in FIG. 6C), and the redirecting element (if included, which may have the configuration shown in FIG. 6C). The controller 260 may configure the selected one or more combinations of gratings to operate in a diffraction state, while configuring the remaining one or more gratings or one or more combinations of gratings are configured to operate in a non-diffraction state. The one or more combinations of gratings operating in the diffraction state may direct and concentrate, via diffraction, an image light from a light source assembly to one or more sub-eyeboxes. In some embodiments, the one or more eyeboxes may form a compressed eyebox.

Figure 6D:
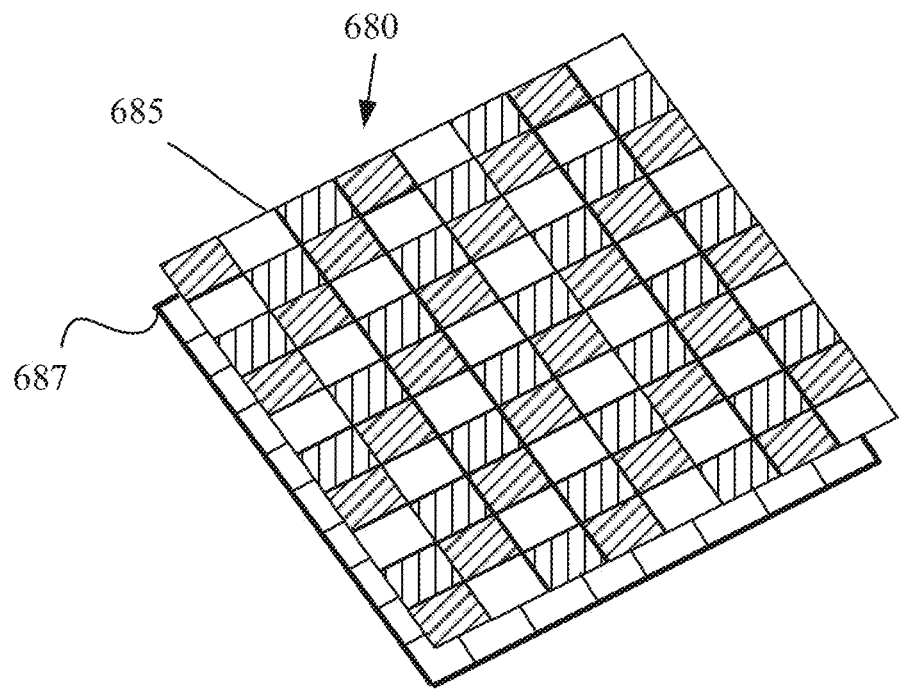

FIG. 6D schematically illustrates an arrangement of a plurality of gratings, according to another embodiment of the present disclosure. The plurality of gratings may form or be included in a diffractive element 680, which may be an in-coupling element (e.g., in-coupling element 231), an out-coupling element (e.g., out-coupling element 235), or a redirecting element (e.g., redirecting element 233). For example, in some embodiments, the gratings 450-1, 450-2, . . . , 450-m shown in FIG. 4A, which may be included in an in-coupling element, may be arranged in the configuration shown in FIG. 6D. In some embodiments, the gratings 460-1, 460-2, . . . , 460-n shown in FIG. 4A, which may be included in an out-coupling element, may be arranged in the configuration shown in FIG. 6D. In some embodiments, the gratings 470-1, 470-2, . . . , 470-p shown in FIG. 4A, which may be included in a redirecting element, may be arranged in the configuration shown in FIG. 6D.

Gratings included in the diffractive element 680 may be arranged in a stack of interleaved grating arrays. The stack of interleaved grating arrays may include two or more interleaved grating arrays (each may be similar to the interleaved grating array 610) stacked together. For illustrative purposes, two interleaved grating arrays 685 and 687 are shown in FIG. 6D as stacked together. Additional interleaved grating arrays may be included. The controller 260 may select one or more combinations of gratings from the in-coupling element (which may have the configuration shown in FIG. 6D), the out-coupling element (which may have the configuration shown in FIG. 6D), and the redirecting element (if included, which may have the configuration shown in FIG. 6D). The controller 260 may configure the selected one or more combinations of gratings to operate in a diffraction state, while configuring the remaining one or more gratings or one or more combinations of gratings are configured to operate in a non-diffraction state. The one or more combinations of gratings operating in the diffraction state may direct and concentrate, via diffraction, an image light from a light source assembly to one or more sub-eyeboxes. In some embodiments, the eyeboxes may form a compressed eyebox.

Figure 7:
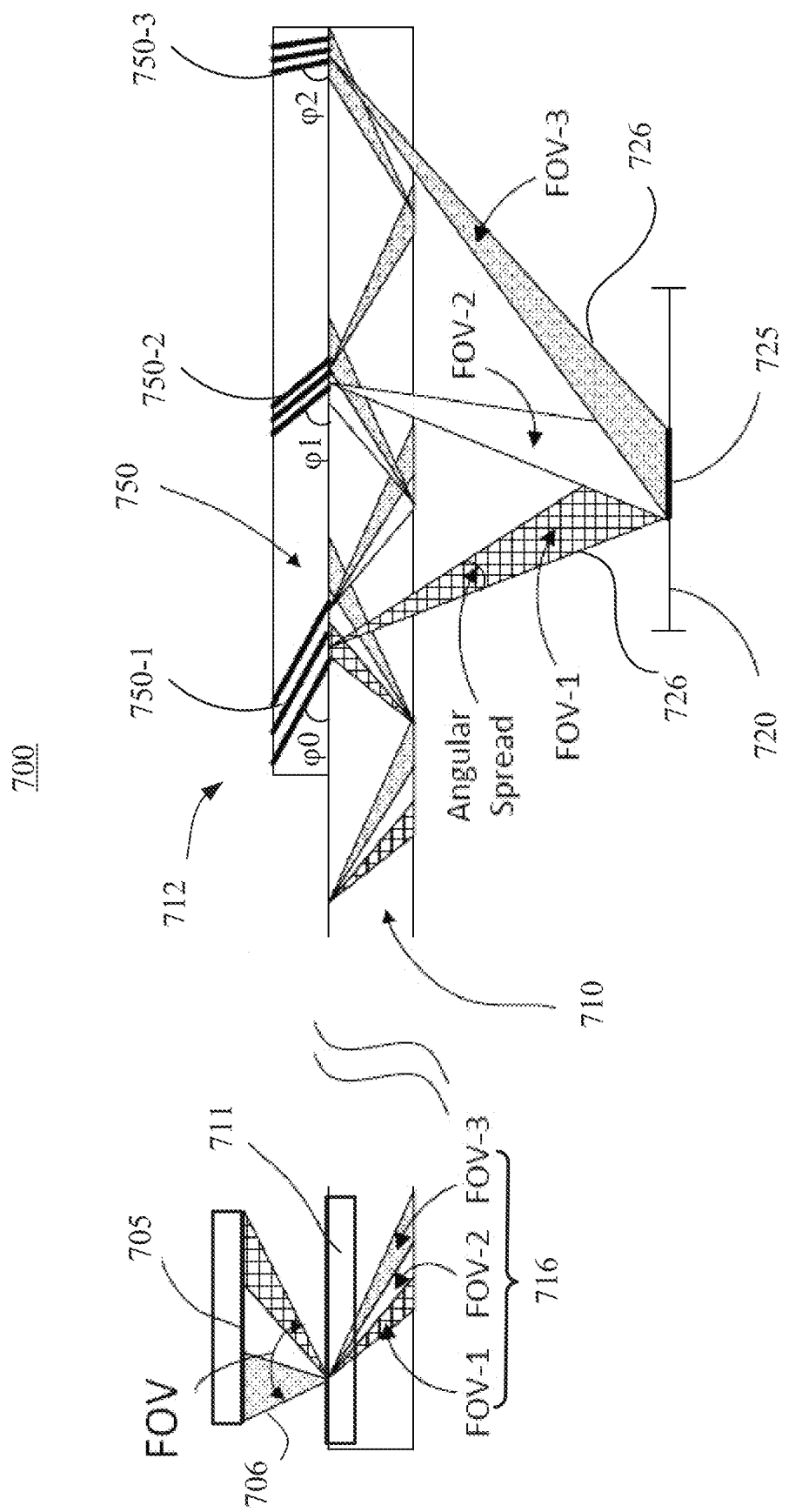
FIG. 7 illustrates a schematic diagram of a waveguide display assembly, according to an embodiment of the present disclosure.

FIG. 7 schematically illustrates a waveguide display assembly 700 configured to deliver a full field of view ("FOV") of an image light received from a light source assembly to a compressed eyebox, according to an embodiment of the present disclosure. The waveguide display assembly 700 may be implemented in any optical system disclosed herein, such as the optical system 200. In other words, the exemplary structures and mechanism for delivering a full FOV of an image light to a compressed box may be applicable to any other optical system or waveguide display assembly (or waveguide display system) disclosed herein.

As shown in FIG. 7, the waveguide display assembly 700 may include a waveguide 710, an in-coupling element 711 coupled with (e.g., disposed at a surface of) the waveguide 710, and an out-coupling element 712 coupled with (e.g., disposed at a surface of) the waveguide 710. In some embodiments, the waveguide display assembly 700 may also include a redirecting element (not shown). Each of the in-coupling element 711, the out-coupling element 712, and the redirecting element (if included) may include a grating set. In each of the in-coupling element 711, the out-coupling element 712, and the redirecting element (if included), the gratings may be arranged in any of the configurations shown in FIGS. 6A-6D. For discussion purposes, the in-coupling element 711 is presumed to include a single grating, and the out-coupling element 712 is presumed to include a single grating that is a switchable grating.

In some embodiments, the waveguide display assembly 700 may also include a light source assembly 705 configured to output an image light 706 with an input field of view ("FOV") to the waveguide 710. The in-coupling element 711 may be configured to couple the image light 706 into the waveguide 710 as an image light 716 propagating inside the waveguide 710 through total internal reflection ("TIR"). For discussion purposes, the FOV of the image light 716 is presumed to be substantially the same as the FOV of the image light 706 generated by the light source assembly 705. In some embodiment, although not shown, the FOV of the image light 716 may be smaller than the FOV of the image light 706.

The image light 716 may propagate through TIR along the waveguide 710 toward the out-coupling element 712. The controller 260 (not shown in FIG. 7) may be coupled with the switchable gratings included in the out-coupling element 712. The controller 260 may selectively control or configure a grating included in the out-coupling element 712 (which may form a combination of gratings with the grating included in the in-coupling element 711) to operate in the diffraction state, and selectively control or configure the remaining one or more gratings included in the out-coupling element 712 (which may form one or more remaining one or more combinations of gratings with the grating included in the in-coupling element) to operate in the non-diffraction state. The grating of the out-coupling element 712 operating in the diffraction state may couple, via diffraction, the image light 716 out of the waveguide 710 as an image light 726. The image light 726 may propagate through a sub-eyebox 725. The sub-eyebox 725 may form a compressed eyebox or form a part of a compressed eyebox. The sub-eyebox 725 is a part of an uncompressed eyebox 720.

The FOV of the image light 726 may be substantially the same as the FOV of the image light 716 (and the FOV of the image light 706). That is, each grating in the out-coupling element 712, when configured to operate in the diffraction state, may deliver the full FOV of the image light 716 (or the image light 706) to a corresponding sub-eyebox. For example, each grating included in the out-coupling element 712 may be configured with a continuously varying slant angle (φ0, φ1, φ2) to provide a continuous FOV. In each grating, the plurality of gratings may be configured to have different angular selectivities, such that different portions of the grating may diffract different portions (or light beams) of the image light 716 corresponding to different portions of the full FOV with different diffraction efficiencies. For example, each grating included in the out-coupling element 712 may be configured to provide a higher diffraction efficiency to a light beam associated with a corresponding portion of the FOV than light beams associated with other portions of the FOV.

For illustrate purposes, FIG. 7 shows an exemplary configuration of a grating 750 for delivering the full FOV of the image light 716 to the sub-eyebox 725 (which may form a compressed eyebox or may be part of a compressed eyebox) of an uncompressed eyebox 720. The grating 750 may be a disclosed switchable grating with a varying (e.g., continuously varying) slant angle. For example, the slant angle of the grating 750 may continuously vary (e.g., increase) in the y-axis direction in FIG. 7. For illustrative purposes, the FOV of the image light 716 may be divided into three portions, FOV-1, FOV-2, and FOV-3. The three portions, FOV-1, FOV-2, and FOV-3 of the FOV of the image light 716 may correspond to a left portion, a central portion, and a right portion of the FOV of the image light 716, respectively. The grating 750 may include a first portion 750-1, a second portion 750-2, and a third portion 750-3. In some embodiments, the first portion 750-1, the second portion 750-2, and the third portion 750-3 may be configured with different slanted angles. When the controller 260 controls or configures the grating 750 to operate in the diffraction state, the first portion 750-1 may provide a higher diffraction efficiency to a first light beam associated with FOV-1 than a second light beam associated with FOV-2 or a third light beam associated with FOV-3. For example, the diffraction efficiency provided by the first portion 750-1 to the light beams associated with FOV-2 and FOV-3 may be negligible. Thus, the first portion 750-1 may primarily deliver the FOV-1 of the image light 716 to the sub-eyebox 725.

Likewise, the second portion 750-2 of the grating 750 may provide a higher diffraction efficiency to the second light beam associated with FOV-2 than the first light beam associated with FOV-1 or the third light beam associated with FOV-3. For example, the diffraction efficiency provided by the second portion 750-2 to the light beams associated with FOV-1 and FOV-3 may be negligible. Thus, the second portion 750-2 may primarily deliver FOV-2 of the image light 716 to the sub-eyebox 725.

The third portion 750-3 of the grating 750 may provide a higher diffraction efficiency to the third light beam associated with FOV-3 than the first light beam associated with FOV-1 or the second light beam associated with FOV-2. For example, the diffraction efficiency provided by the third portion 750-3 to the light beams associated with FOV-1 and FOV-2 may be negligible. Thus, the third portion 750-3 may primarily deliver FOV-3 of the image light 716 to the sub-eyebox 725. Thus, the grating 705 may be configured or controlled by the controller 260 to deliver the full FOV of the image light 716 (or the image light 706) to the sub-eyebox 725. The image light 726 propagating through the compressed eyebox 725 may have an FOV that is substantially the same as the FOV of the image light propagating through the uncompressed eyebox 720. As a result, the image content delivered to the compressed eyebox 725 may be substantially the same as the image content delivered to the uncompressed eyebox 720.

The grating 750 shown in FIG. 7 may be any grating shown in other figures and described herein. The arrangement of the plurality of gratings included in the out-coupling element 712 may be any arrangements shown in other figures, such as those shown in FIG. 6A-FIG. 6D. In some embodiments, the optical system 700 may include a plurality of waveguides stacked together. The out-coupling element coupled with or disposed at a waveguide may include a plurality of gratings. Each of the gratings may be configured to direct a full FOV of the image light received from the light source assembly 705 to a corresponding sub-eyebox.

Figure 8A:
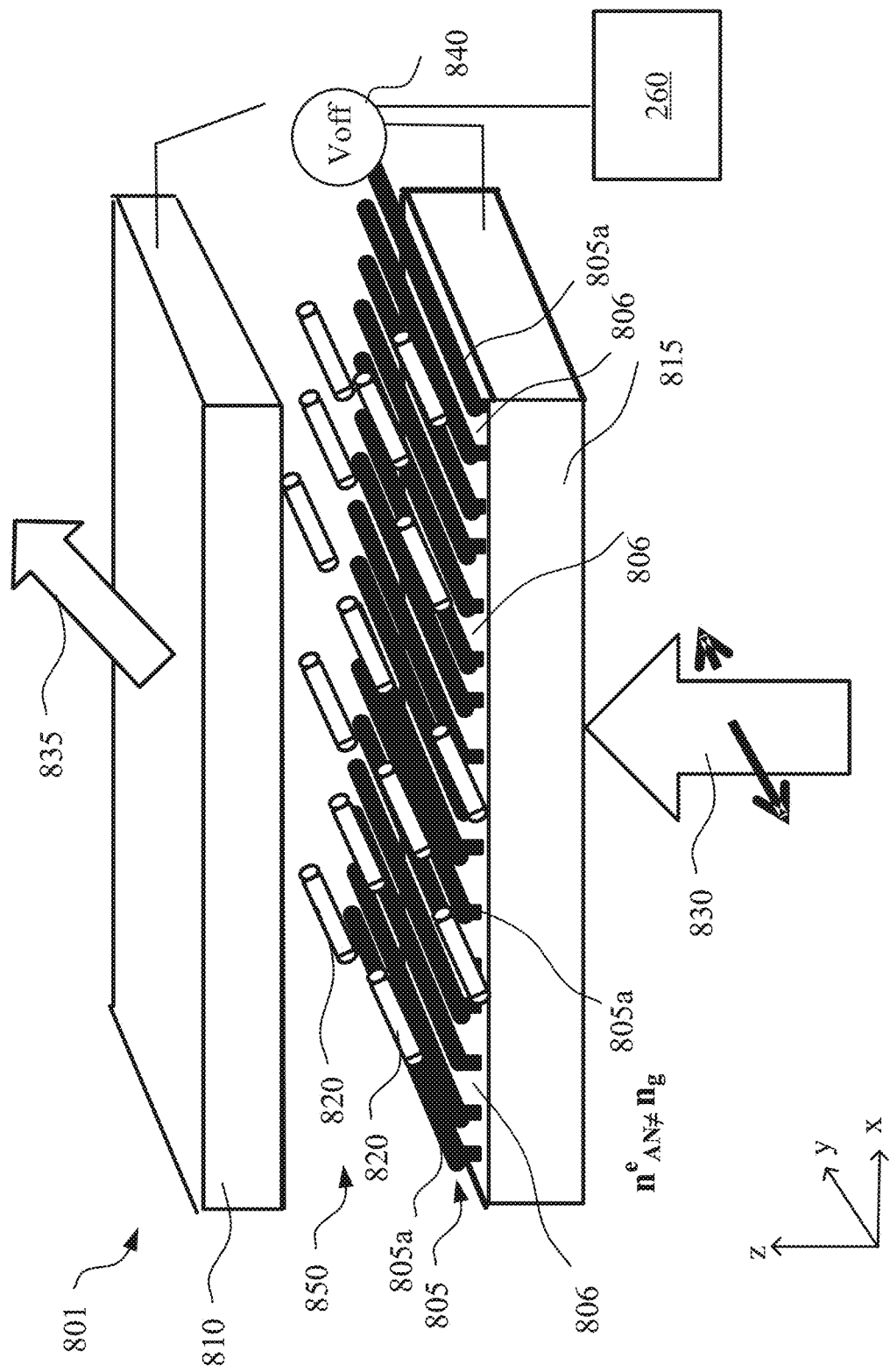
FIGS. 8A and 8B illustrate schematic diagrams of a grating in a diffraction state and a non-diffraction state, respectively, according to an embodiment of the present disclosure.
Figure 8B:
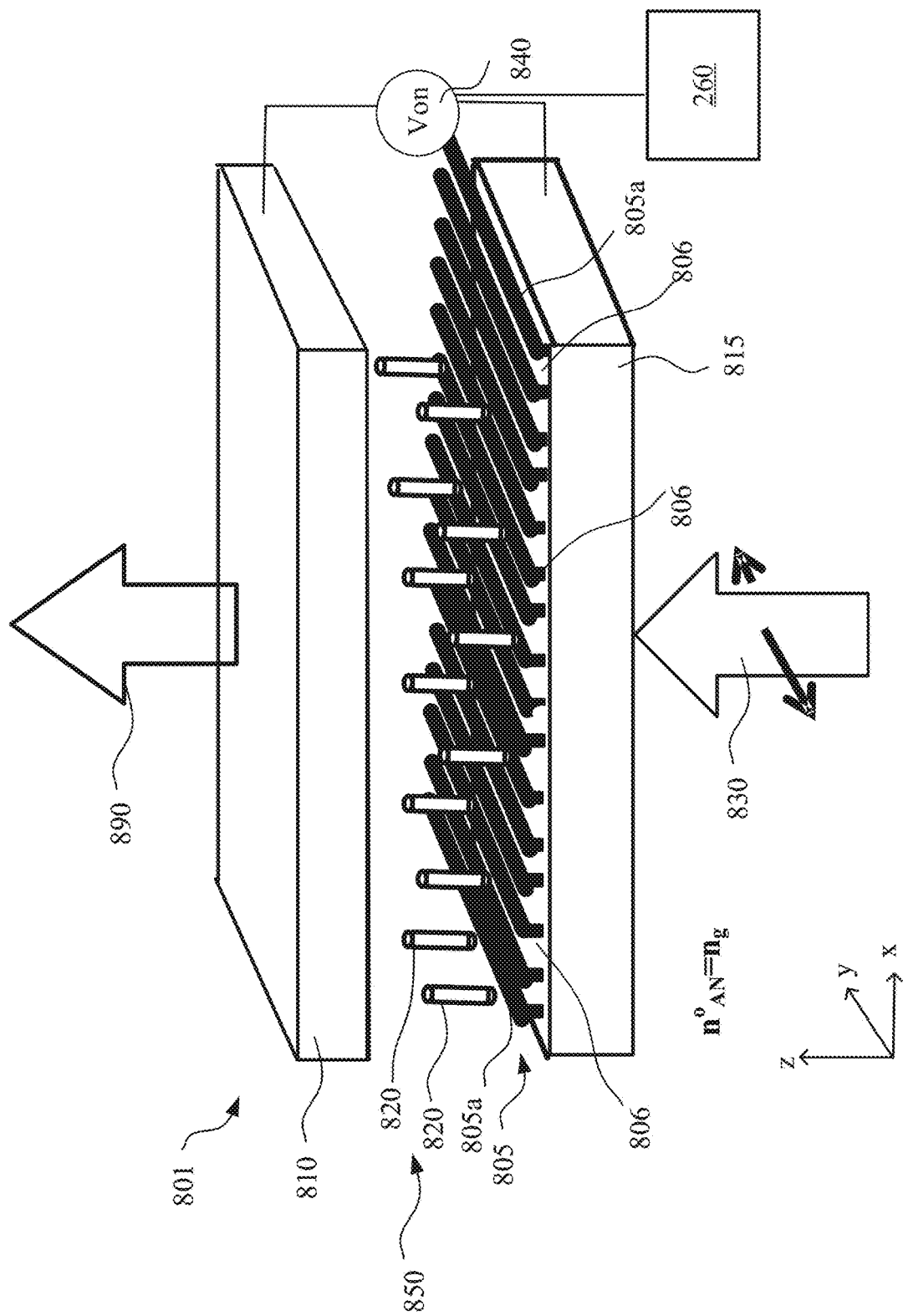

FIGS. 8A and 8B illustrate a schematic diagram of a diffractive optical element (or diffractive element) 801 at a diffraction state and a non-diffraction state, respectively, according to an embodiment of the disclosure. The diffractive optical element 801 may be a directly switchable grating controlled by the controller 260. A power source 840 may be electrically coupled with the diffractive optical element 801.

The power source 840 may be configured to provide an electric field to the diffractive optical element 801. The controller 260 may be electrically coupled (e.g., through wired or wireless connection) with the power source 840, and may be configured to control the output of a voltage and/or current of the power source 840. The diffractive optical element 801 shown in FIGS. 8A and 8B may be implemented in optical elements, devices, and systems disclosed herein, for example, as a grating described above and shown in other figures for providing a compressed eyebox, such as those shown in or described in connection with FIGS. 2A, 2B, 3A, 3B, 4, 6A-6D, and 7, and other latter figures. As described above, a directly switchable grating may be an active, polarization sensitive grating, or an active, polarization insensitive grating. For illustrative purposes, the diffractive optical element 801 is shown as an active, polarization sensitive grating. The diffractive optical element 801 may be directly switchable between a diffraction state and a non-diffraction state, when the controller 260 controls the power source 840 to generate an electric field in the diffractive optical element 801.

As shown in FIGS. 8A and 8B, the diffractive optical element 801 may include an upper substrate 810 and a lower substrate 815 arranged opposing (e.g., facing) one another. In some embodiments, at least one (e.g., each) of the upper substrate 810 or the lower substrate 815 may be provided with a transparent electrode at a surface (e.g., an inner surface) of the substrate for supplying an electric field to the diffractive optical element 801, such as an indium tin oxide ("ITO") electrode. The power source 840 may be electrically coupled with the transparent electrodes to supply a voltage for providing the electric field to the diffractive optical element 801.

In some embodiments, the diffractive optical element 801 may include a surface relief grating ("SRG") 805 disposed at (e.g., bonded to or formed on) a surface of the lower substrate 815 facing the upper substrate 810. The SRG 805 may include a plurality of microstructures 805*a* (with sizes in micron level or nano level) defining or forming a plurality of grooves 806 (the microstructures 805*a* are schematically illustrated as the solid black longitudinal structures, and the grooves 806 are shown as the white portions between the solid black portions in FIGS. 8A and 8B). The number of the grooves 806 included in the SRG 805 may be determined by the grating period and the size of the SRG 805. The grooves 806 may be at least partially provided (e.g., filled) with an optically anisotropic material 850. Molecules 820 of the optically anisotropic material 850 may have an elongated shape (represented by white rods in FIGS. 8A and 8B). The molecules 820 may be aligned within the grooves 806, e.g., homeotropically aligned, homogeneously aligned, or both. The optically anisotropic material 850 may have a first principal refractive index (e.g., $n^e_{AN}$) along a groove direction (e.g., y-axis direction, length direction, or longitudinal direction) of the grooves 806 of the SRG 805. The optically anisotropic material 850 may have a second principal refractive index (e.g., $n^o_{AN}$) along an in-plane direction (e.g., x-axis direction, width direction, or lateral direction) perpendicular to the groove direction of the SRG 805.

When the grooves 806 have a substantially rectangular prism shape, or a longitudinal shape, the groove direction may be, e.g., a groove length direction. some embodiments, the groove 806 may have other shapes. In some embodiments, the groove direction may be defined to be other suitable directions. The optically anisotropic material 850 may be an active, optically anisotropic material, such as active liquid crystals ("LCs") with LC directors reorientable by an external field, e.g., an external electric field provided by the power source 840. The molecules 820 of the optically anisotropic material 850 may also be referred to as LC molecules 820. The active LCs may have a positive or negative dielectric anisotropy.

The SRG 805 may be fabricated based on an organic material, such as amorphous or liquid crystalline polymers, or cross-linkable monomers including those having LC properties (reactive mesogens ("RMs")). In some embodiments, the SRG 805 may be fabricated based on an inorganic material, such as metals or oxides used for manufacturing of metasurfaces. The materials of the SRG 805 may be isotropic or anisotropic. In some embodiments, the SRG 805 may provide an alignment for the optically anisotropic material 850. In some embodiments, the SRG 805 may provide an alignment for the optically anisotropic material 850. That is, the SRG 805 may function as an alignment layer or alignment structure to align the optically anisotropic material 850. In some embodiments, the molecules 820 of the optically anisotropic material 850 may be aligned within the grooves 806 of the SRG 805 by a suitable aligning method, such as a mechanical force (e.g., a stretch), a light (e.g., through photoalignment), an electric field, a magnetic field, or a combination thereof. For illustrative purposes, FIGS. 8A and 8B show that the SRG 805 may be a binary non-slanted grating with a periodic rectangular profile. That is, the cross-sectional profile of the grooves 806 of the SRG 805 may have a periodic rectangular shape. In some embodiments, the SRG 805 may be a binary slanted grating in which the microstructures 805*a* are slanted with a slant angle. In some embodiments, the slant angle of the SRG 805 may continuously vary (e.g., similar to that shown in FIG. 7). In some embodiments, the cross-sectional profile of the grooves 806 of the SRG 805 may be non-rectangular, for example, sinusoidal, triangular, parallelogram (e.g., when the microstructures 805*a* are slanted), or saw-tooth shaped, depending on the applications.

In some embodiments, the alignment of the optically anisotropic material 850 may be provided by one or more alignment structures (e.g., alignment layers) other than by the SRG 805. An alignment structure may be disposed at the substrate 810 and/or 815 (e.g., two alignment layers may be disposed at the respective opposing surfaces of the two substrates 810 and 815). In some embodiments, the alignment structures disposed at the two substate 810 and 815 may be configured to provide parallel planar alignments. In some embodiments, the alignment structures disposed at the two substates 810 and 815 may be configured to provide hybrid alignments. For example, the alignment structure disposed at one of the two substates 810 and 815 may be configured to provide a planar alignment, and the alignment structure disposed at the other substate 810 or 815 may be configured to provide a homeotropic alignment. In some embodiments, the alignment of the optically anisotropic material 850 may be provided by both the SRG 805 and one or more alignment structures (e.g., alignment layers) disposed at the substrate 810 and/or 815. For example, the alignment of the optically anisotropic material 850 may be provided by both the SRG 805 and the alignment layer disposed at the upper substrate 810.

For discussion purposes, as shown in FIG. 8A, the optically anisotropic material 850 may include active LCs having a positive anisotropy, such as nematic liquid crystals ("NLCs"). The LC molecules 820 of the optically anisotropic material 850 may be homogeneously aligned within the plurality of grooves 806 in the groove direction (e.g., y-axis direction). The second principal refractive index (e.g., $n^o_{AN}$)

may substantially match with a refractive index $n_g$ of the SRG 805, and the first principal refractive index (e.g., $n^e_{AN}$) may not match with the refractive index $n_g$ of the SRG 805. The diffractive optical element 801 may be linear polarization dependent. For example, referring to FIG. 8A, when a linearly polarized incoming light 830 polarized in the groove direction (e.g., y-axis direction) of the SRG 805 is incident onto the diffractive optical element 801, due to the refractive index difference between $n^e_{AN}$ and $n_g$, the incoming light 830 may experience a periodic modulation of the refractive index in the diffractive optical element 801. As a result, the diffractive optical element 801 may diffract the incoming light 830 as a light 835. Due to the substantial match between the refractive indices $n^o_{AN}$ and $n_g$, the diffractive optical element 801 may function as a substantially optically uniform plate for a linearly polarized incoming light polarized in the in-plane direction (e.g., x-axis direction) perpendicular to the groove direction (e.g., y-axis direction) of the SRG 805 (not shown in FIGS. 8A and 8B). That is, the diffractive optical element 801 may not diffract the incoming light linearly polarized in the in-plane direction perpendicular to the groove direction. Rather, the diffractive optical element 801 may transmit the incoming light polarized in the in-plane direction perpendicular to the groove direction with negligible or no diffraction.

In some embodiments, the diffractive optical element 801 may be an active grating, which may be directly switchable between a diffraction state (or an activated state) and a non-diffraction state (or a deactivated state) by an external field, e.g., an external electric field provided by the power source 840. For example, the diffractive optical element 801 may include electrodes (not shown in FIGS. 8A and 8B for the simplicity of illustration) disposed at the upper and lower substrate 810 and 815, and the power source 840 may be electrically coupled with the electrodes to provide the electric field to the diffractive optical element 801. The controller 260 may control an output (e.g., a voltage and/or current) of the power source 840. For discussion purposes, the voltage is used as an example of the output of the power source 840, which may be controlled by the controller 260 to affect the electric field provided to the diffractive optical element 801. By controlling the voltage output by the power source 840, the controller 260 may control the switching of the diffractive optical element 801 between the diffraction state and the non-diffraction state. For example, the controller 260 may control the voltage supplied by the power source 840 to the electrodes of the diffractive optical element 801 to switch the diffractive optical element 801 between the diffraction state and the non-diffraction state. When the diffractive optical element 801 operates in the diffraction state, in some embodiments, the controller 260 may adjust the voltage supplied by the power source 840 to the electrodes of the diffractive optical element 801 to adjust the diffraction efficiency of the diffractive optical element 801.

In some embodiments, the controller 260 may configure the diffractive optical element 801 to operate in the diffraction state (or activated state) by controlling a voltage supplied by the power source 840 to the diffractive optical element 801 to be lower than or equal to a threshold voltage. In some embodiments, the threshold voltage may be determined by physical parameters of the diffractive optical element 801. When the voltage is lower than or equal to the threshold voltage, the electric field generated by the supplied voltage may be insufficient to reorient the LC molecules 820. In some embodiments, the controller 260 may configure the diffractive optical element 801 to operate in the non-diffraction state (or deactivated state) by controlling the supplied voltage to be higher than the threshold voltage (and sufficiently high) to reorient the LC molecules 820 to be parallel with the direction of the electric field.

As shown in FIG. 8A, when the controller 260 controls the power source 840 to supply a voltage that is lower than or equal to the threshold voltage (e.g., when the power source 840 supplies a substantially zero voltage), for the linearly polarized incoming light 830 polarized in the groove direction (e.g., y-axis direction) of the SRG 805, due to the difference between the refractive indices $n^e_{AN}$ and $n_g$, the light 830 may experience a periodic modulation of the refractive index in the diffractive optical element 801 while propagating therethrough. As a result, the light 830 may be diffracted by the diffractive optical element 801 as the light 835. That is, the controller 260 may control the power source 840 to supply a voltage that is lower than or equal to the threshold voltage, thereby configuring the diffractive optical element 801 to operate in the diffraction state to diffract the linearly polarized incoming light 830. In some embodiments, the modulation of a refractive index nm (i.e., the difference between $n^e_{AN}$ and $n_g$) provided by the diffractive optical element 801 operating in the diffraction state to the incoming light 830 polarized in the groove direction may be larger than the modulation provided by the diffractive optical element 801 operating in the non-diffraction state to the light 830. When operating in the diffraction state, the diffraction efficiency of the diffractive optical element 801 may be tunable (or adjustable). The controller 260 may tune (or adjust) a magnitude of the supplied voltage to tune the diffraction efficiency of the diffractive optical element 801.

As shown in FIG. 8B, when a voltage is supplied to the diffractive optical element 801, an electric field (e.g., along a z-axis direction) may be generated between the two opposingly disposed substrates 810 and 815. When the voltage is higher than the threshold voltage and is gradually increased, the LC molecules 820 having the positive dielectric anisotropy may trend to be reoriented by the electric field (e.g., may gradually become oriented parallel with the electric field direction). As the voltage changes, for the linearly polarized incoming light 830 polarized in the groove direction (e.g., y-axis direction) of the SRG 805, the modulation of the refractive index nm (i.e., the difference between $n^e_{AN}$ and $n_g$) provided by the diffractive optical element 801 to the light 830 may change accordingly, which in turn may change the diffraction efficiency provided by the diffractive optical element 801 to the light 830.

When the voltage is sufficiently high, as shown in FIG. 8B, directors of the LC molecules 820 having the positive dielectric anisotropy may be reoriented to be parallel with the electric field direction (e.g., z-axis direction). Due to the substantial match between the refractive indices $n^o_{AN}$ and $n_g$, the diffractive optical element 801 may function as a substantially optically uniform plate for the incoming light 830 polarized in the groove direction of the SRG 805. That is, the diffractive optical element 801 may operate in a non-diffraction state for the light 830 polarized in the groove direction of the SRG 805. When operating in the non-diffraction state, the diffractive optical element 801 may transmit the light 830 therethrough as an image light 890 with negligible or no diffraction.

In the embodiment shown in FIGS. 8A and 8B, the diffractive optical element 801 is configured such that the diffractive optical element 801 operates in the diffraction state when the voltage supplied by the power source 840 is lower than or equal to the threshold voltage, and operates in the non-diffraction state when the voltage is sufficiently higher than the threshold voltage. In other embodiments, by configuring the initial orientations of the LC molecules 820 differently, the diffractive optical element 801 may be configured such that the diffractive optical element 801 operates in the diffraction state when the voltage supplied by the power source 840 is sufficiently higher than the threshold voltage, and operates in the non-diffraction state when the voltage supplied by the power source 840 is lower than or equal to the threshold voltage.

Figure 9A:
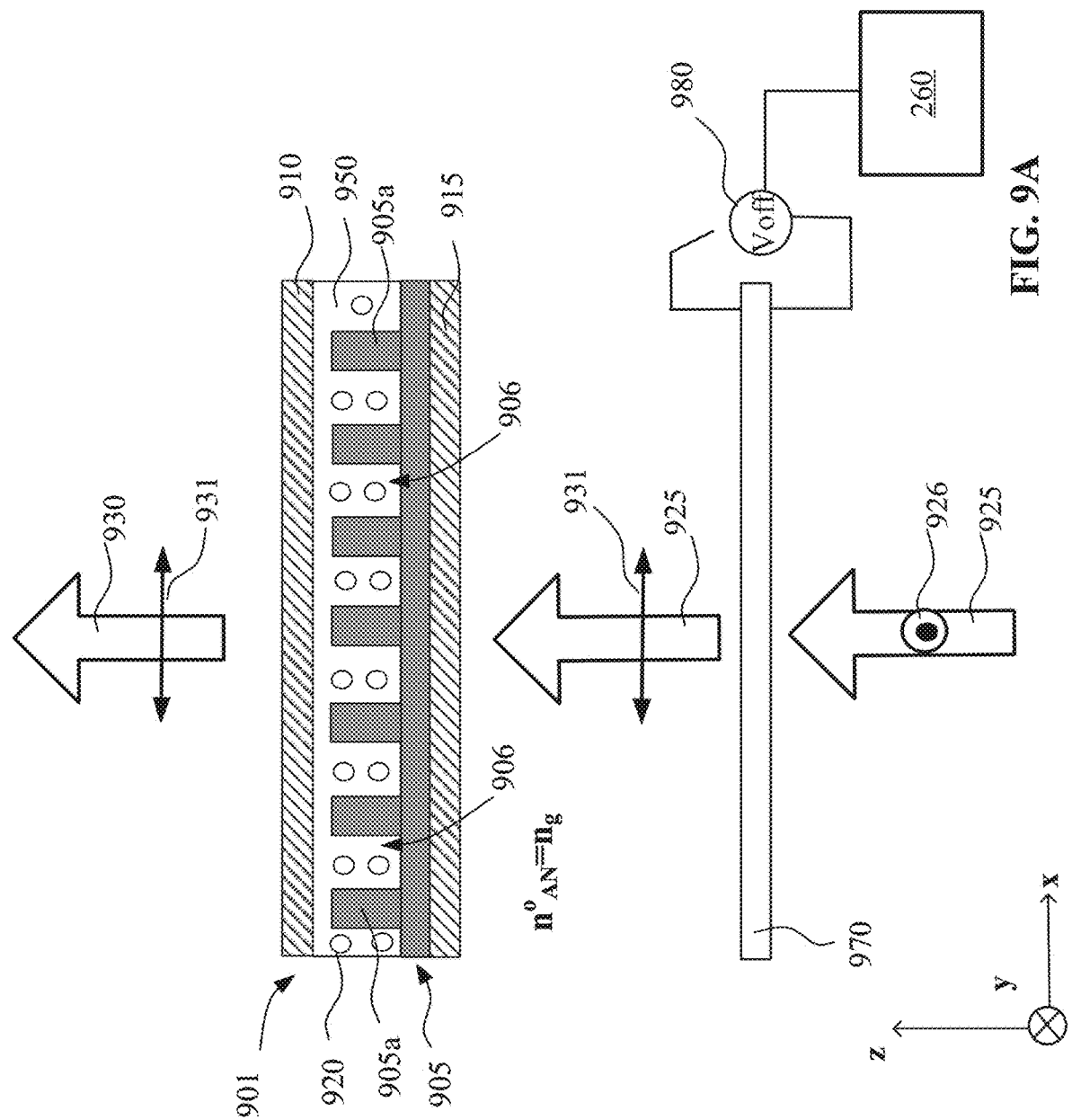
FIGS. 9A and 9B illustrate schematic diagrams of a grating in a non-diffraction state and a diffraction state, respectively, according to another embodiment of the present disclosure.
Figure 9B:
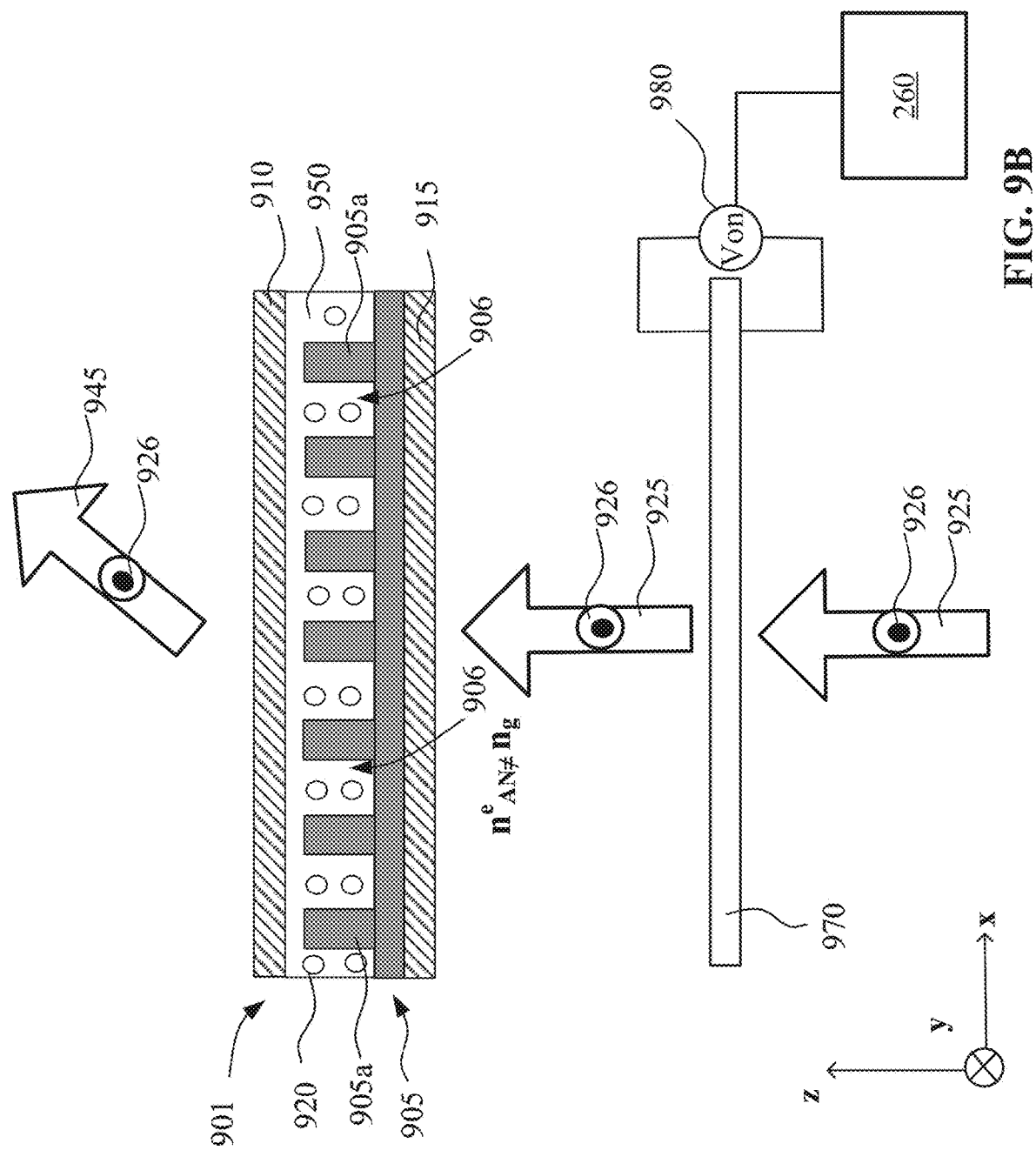

FIGS. 9A and 9B illustrate schematic diagrams of a diffractive optical element 901 at a non-diffraction state and a diffraction state, respectively, according to an embodiment of the present disclosure. The diffractive optical element 901 may be an indirectly switchable grating. A polarization switch 970 may be disposed at a light incidence side of the diffractive optical element 901. A power source 980 may be electrically coupled with the polarization switch 970 to provide an electric field in the polarization switch 970. The controller 260 may control the output of the power source 980 to control the electric field in the polarization switch 970.

The indirectly switchable diffractive optical element 901 may be implemented in various optical elements, devices, and systems disclosed herein, for example, as a grating described above and shown in other figures for providing a compressed eyebox, such as the grating(s) shown in or described in connection with FIGS. 2A, 2B, 3A, 3B, 4, 6A-6D, and 7, and other latter figures. The indirectly switchable diffractive optical element 901 may be an active grating that is polarization sensitive (or selective), or may be a passive grating that is polarization sensitive (or selective). The indirectly switchable diffractive optical element 901 may be linear polarization dependent (or linear polarization selective or sensitive) or circular polarization dependent (or circular polarization selective or sensitive). For illustrative purpose, the indirectly switchable diffractive optical element 901 is shown as linear polarization dependent. For example, the diffractive optical element 901 may be configured to diffract a linearly polarized light having a first polarization and transmit a linearly polarized light having a second polarization that is orthogonal to the first polarization. Because the diffractive optical element 901 is not directly switchable, the controller 260 may indirectly switch the diffractive optical element 901 to operate in the diffraction state for an image light having the first polarization or to operate in the non-diffraction state for an image light having the second polarization, by controlling the polarization of the image light incident onto the diffractive optical element 901. To control the polarization of the image light incident onto the diffractive optical element 901, the controller 260 may control the polarization switch 970 disposed at a light incidence side of the diffractive optical element 901. The polarization switch 970 may control the polarization of the image light before the image light is incident onto the diffractive optical element 901.

The diffractive optical element 901 may include elements that are similar to or the same as those included in diffractive optical element 801 shown in FIGS. 8A and 8B. For example, the diffractive optical element 901 may include an upper substrate 910 and a lower substrate 915 arranged opposing one another, which may be similar to the substrates 810 and 815. The diffractive optical element 901 may include an SRG 905 disposed at (e.g., bonded to or formed on) a surface of the lower substrate 915 facing the upper substrate 910. The SRG 905 may be an embodiment of the SRG 805 shown in FIGS. 8A and 8B, and FIGS. 9A and 9B show a cross-sectional view of the SRG 805. The SRG 905 may include a plurality of microstructures 905a defining or forming a plurality of grooves 906, which may be similar to the grooves 806 included in the SRG 805. At least one (e.g., each) of the grooves 906 of the SRG 905 may be at least partially provided (e.g., filled) with an optically anisotropic material 950, which may be similar to the optically anisotropic material 850. Molecules 920 of the optically anisotropic material 950, which may be similar to the molecules 820 shown in FIGS. 8A and 8B, may be aligned within the grooves 906 of the SRG 905. Similar to the SRG 805, the SRG 905 may function as an alignment structure for aligning the molecules 920 of the optically anisotropic material 950.

When the optically anisotropic material 950 includes active or reorientable LCs, the diffractive optical element 901 may be active, similar to the diffractive optical element 801. As mentioned above, an active and polarization sensitive (or selective) grating may still be indirectly switchable. When the optically anisotropic material 950 includes passive or non-reorientable LCs, the diffractive optical element 901 may be passive. Passive or non-reorientable LCs may not be directly switchable by an external field (e.g., an electric field). A passive and polarization sensitive grating with passive LCs may be indirectly switchable through the polarization switch 970. Passive LCs may include, for example, an optically anisotropic polymer that is polymerized from polymerizable pre-polymeric compositions or polymerizable LC precursors. In some embodiments, the polymerizable LC precursors may include RMs that are polymerizable molecules with optical properties similar to those of LC molecules.

The optically anisotropic material 950 may have a first principal refractive index (e.g., $n^e_{AN}$) along a groove direction (e.g., y-axis direction) of the a plurality of grooves 906 of the SRG 905 and a second principal refractive index (e.g., $n^o_{AN}$) along an in-plane direction (e.g., x-axis direction) perpendicular to the groove direction of the SRG 905. For discussion purposes, in FIGS. 9A and 9B, the molecules 920 may be homogeneously aligned within the grooves 906 in the groove direction (e.g., y-axis direction). The second principal refractive index (e.g., $n^o_{AN}$) may substantially match with a refractive index $n_g$ of the SRG 905, and the first principal refractive index (e.g., $n^e_{AN}$) may not match with the refractive index $n_g$ of the SRG 905.

In some embodiments, the controller 260 may control the polarization switch 970 disposed at the light incident side of the diffractive optical element 901 to change or maintain a polarization an image light before the image light is incident onto the diffractive optical element 901. When the polarization of the image light incident onto the diffractive optical element 901 is switched or maintained, the diffractive optical element 901 may operate in a diffraction state when the incident light has the first polarization, or operate in a non-diffraction state when the incident light has the second polarization.

The controller 260 may control an electric field applied to the polarization switch 970. For example, the controller 260 may control the power source 980 electrically coupled with the polarization switch 970 to supply different voltages to the polarization switch 970. When different voltages are supplied to the polarization switch 970, the polarization switch 970 may be configured to operate in a switching state or a non-switching state. For example, when a voltage supplied to the polarization switch 970 is lower than or equal to a predetermined voltage value (e.g., when zero voltage is supplied), the polarization switch 970 may operate in the switching state, as shown in FIG. 9A. When a voltage higher than the predetermined voltage value is supplied to the polarization switch 970 (e.g., when a non-zero voltage, such as 5V, 10V, is supplied), the polarization switch 970 may operate in the non-switching state. In the switching state, the polarization switch 970 switches the polarization of an image light 925 from a first polarization 926 (e.g., polarization in the y-axis direction) to a second polarization 931 (e.g., polarization in the x-axis direction), as shown in FIG. 9A. In the non-switching state, as shown in FIG. 9B, the polarization switch 970 may maintain the first polarization 926 of the light 925 before the light 925 is incident onto the diffractive optical element 901.

The polarization switch 970 may be any suitable polarization switch. In some embodiments, the polarization switch 970 may include an LC-based polarization switch, such as a 90° twist-nematic liquid crystal ("TNLC") cell. The TNLC cell may have a light incidence surface and a light exiting surface providing substantially orthogonal alignment directions of LC directors. The alignment direction provided by the light incidence surface of the TNLC cell may be oriented substantially parallel with the polarization direction (e.g., first polarization 926) of the linearly polarized light 925 incident onto the TNLC cell, thereby rotating the polarization of the light 925 by about 90° when the TNLC cell operates in the switching state, or maintaining the polarization of the light 925 incident onto the TNLC cell when the TNLC cell operates in the non-switching state. In some embodiments, the TNLC cell may operate in the switching state when the voltage supplied by the power source 980 is lower than or equal to a predetermined voltage value of the TNLC cell, as shown in FIG. 9A, or operate in the non-switching state when the voltage is higher than the predetermined voltage value (and sufficiently high) to reorient the LC directors along the electric field direction, as shown in FIG. 9B.

In some embodiments, the polarization switch 970 may include a switchable half-wave plate ("SHWP"). The SHWP operating in the switching state may be configured to switch a polarization of a linearly polarized incoming light 925 to an orthogonal polarization. The SHWP operating in the non-switching state may maintain the polarization of the linearly polarized incoming light 925. In some embodiments, the SHWP may include an LC layer, and an external electric field (e.g., a voltage) may be applied to the LC layer to change the orientation of the LCs, thereby controlling the polarization switch 970 to operate in a switching state or in a non-switching state. For example, the SHWP may operate in the switching state when an externally applied voltage is lower than or equal to a predetermined voltage value of the LC layer, as shown in FIG. 9A, or operate in the non-switching state when an externally applied voltage is higher than the predetermined voltage value (and sufficiently high) to reorient the LC directors along the electric field direction, as shown in FIG. 9B.

For discussion purposes, the polarization switch 970 shown in FIGS. 9A and 9B is presumed to include a TNLC cell. The alignment direction provided by the light incidence surface of the TNLC cell may be parallel with a polarization direction (e.g., y-axis direction) of the light 925. The power source 980 may be electrically coupled with electrodes included in the TNLC cell to provide an electric field. The controller 260 may be electrically coupled with the power source 980, and may control the output (e.g., a voltage and/or current) of the power source 980. Voltage is used as an example of the control parameter of the power source 980 in the following descriptions.

For example, as shown in FIG. 9A, when the applied voltage is lower than the threshold voltage (e.g., when voltage is zero), the TNLC cell may operate in the switching state. The polarization direction of the image light 925 having the first polarization 926 may be rotated by the twisted structure of the TNLC cell by about 90° when exiting the polarization switch 970. Thus, the TNLC cell included in the polarization switch 970 may switch the polarization of the incoming light 925 from the first polarization 926 (e.g., polarization in a y-axis direction in FIG. 9A) to the second polarization 931 (e.g., polarization in an x-axis direction in FIG. 9A) perpendicular to the first polarization 926. That is, the image light 925 having the first polarization 926 may exist the polarization switch 970 as the image light 925 having the second polarization 931. Due to the substantial match between the refractive indices $n°_{AN}$ of the optically anisotropic material 950 and $n_g$ of the SRG 905, the diffractive optical element 901 may function as a substantially optically uniform plate for the light 930. That is, the diffractive optical element 901 may operate in a non-diffraction state for the image light 925 having the second polarization 931. The diffractive optical element 901 may transmit the image light 925 therethrough with negligible or no diffraction as an image light 930 having the second polarization 931. That is, the diffraction effect of the diffractive optical element 901 may be substantially zero for the image light 925 having the second polarization 931.

The twisted structure of the TNLC cell included in the polarization switch 970 may become untwisted due to an external force, such as an external field provided by the power source 980. As a result, the polarization of the image light 925 propagating through the polarization switch 970 may be unaffected or maintained. As shown in FIG. 9B, when the applied voltage is higher than the predetermined voltage value (and sufficiently high), the TNLC cell may operate in the non-switching state. An electric field may be generated between two opposingly disposed substrates with electrodes, when the power source 980 provides a voltage to the electrodes. LC molecules in the TNLC cell may be reoriented by the electric field and trend to be (e.g., gradually become) parallel with the electric field direction when the electric field is increased to become sufficiently strong. Thus, the twisted structure of the TNLC cell may become untwisted, and the TNLC cell may transmit the image light 925 having the first polarization 926 without affecting the polarization. Due to the difference between the refractive indices $n^e_{AN}$ and $n_g$, the image light 925 propagating through the diffractive optical element 901 may experience a periodic modulation of the refractive index in the diffractive optical element 901. As a result, the diffractive optical element 901 may diffract the image light 925 having the first polarization 926 as an image light 945 having the first polarization 926.

The switching time of the TNLC cell may be about 3-5 milliseconds ("ms"). In some embodiments, to further increase the switching speed of the diffractive optical element 901, a polarization switch based on ferroelectric liquid crystal ("FLCs") may be adopted, such as an SHWP based on FLCs. The switching time may be reduced to an order of microseconds ("μs"), e.g., less than 100 μs. Further, when the diffractive optical element 901 is indirectly switched between the diffraction state and the non-diffraction state through the external polarization switch 970, electrodes that may be included in the diffractive optical element 901 may be omitted, such that undesirable light absorption and modification of refractive index may be significantly suppressed.

The indirectly switchable diffractive optical element 901 and the polarization switch 970 shown in FIG. 9A and FIG. 9B may be implemented in any grating sets or grating arrays described herein and shown in other figures, such as FIGS. 2A, 2B, 3A, 3B, 4, 6A-6D, and 7, and latter figures. For example, when a grating shown in any other figure is a passive grating that is indirectly switchable or an active grating that is indirectly switchable, the grating may be coupled with a polarization switch disposed at a light incidence side of the grating and controlled by the controller 260. The polarization switch may control the polarization of the incident light of the grating, thereby indirectly controlling the grating to operate in the diffraction state for an image light having a first polarization or to operate in the non-diffraction state for an image light having a second polarization.

For example, when the gratings 611-1, 611-2, and 611-3 included in the diffractive element 605 shown in FIG. 6A include indirectly switchable gratings, one or more polarization switches (each may be similar to the polarization switch 970) may be coupled with the gratings 611-1, 611-2, and 611-3, such that the indirectly switchable gratings may be switched between operating in the diffraction state when an incident light has a first polarization, and operating in the non-diffraction state when the incident light has a second polarization.

In some embodiments, the diffractive element 610 (also referred to as an interleaved grating array 610) shown in FIG. 6B may include one or more indirectly switchable gratings. One or more polarization switches (each may be similar to the polarization switch 970) may be coupled with the diffractive element 610 for switching the one or more indirectly switchable gratings. In some embodiments, each indirectly switchable grating included in the interleaved configuration may be coupled with an individual polarization switch. In some embodiments, the polarization switches may also be arranged in an array configuration, corresponding to the grating array in the interleaved diffractive element 610.

In some embodiments, the diffractive element 670 shown in FIG. 6C may include one or more indirectly switchable gratings. One or more polarization switches (each may be similar to the polarization switch 970) may be coupled with the diffractive element 670 for switching one or more indirectly switchable gratings. For example, when the gratings 611-1 and 611-2 include indirectly switchable gratings, the polarization switches corresponding to each of the gratings 611-1 and 611-2 may each have a plurality of individual polarization switches corresponding to the indirectly switchable gratings. When the interleaved grating array 610 includes indirectly switchable gratings, a corresponding polarization switch may include a polarization switch array including an array of individual polarization switches corresponding to the grating array in the interleaved grating array 610.

In some embodiments, the diffractive element 680 shown in FIG. 6D may include one or more indirectly switchable gratings. One or more polarization switches (each may be similar to polarization switch 970) may be coupled with the diffractive element 680 for switching one or more indirectly switchable gratings. For example, when both of the interleaved grating arrays 685 and 687 include indirectly switchable gratings, two polarization switch arrays may be coupled with the grating arrays 685 and 687, respectively. Each polarization switch array may include a plurality of individual polarization switches corresponding to the indirectly switchable gratings included in the grating arrays 685 and 687.

In some embodiments, when at least one of the in-coupling element 231, the out-coupling element 235, or the redirecting element 233 shown in FIG. 2A and FIG. 2B includes one or more indirectly switchable gratings, one or more polarization switches (each may be similar to the polarization switch 970) may be coupled with at least one of the in-coupling element 231, the out-coupling element 235, or the redirecting element 233 for switching one or more indirectly switchable gratings. In some embodiments, when at least one of the in-coupling element 331a (or 331b), the out-coupling element 335a (or 335b), or the redirecting (or folding) element 333 shown in FIG. 3A and FIG. 3B includes one or more indirectly switchable gratings, one or more polarization switches (each may be similar to the polarization switch 970) may be coupled with at least one of the in-coupling element 331a (or 331b), the out-coupling element 335a (or 335b), or the redirecting (or folding) element 333 for switching one or more indirectly switchable gratings. In some embodiments, when at least one grating from the gratings 450-1 to 450-m, 460-1 to 460-n, and 470-1 to 470-p shown in FIG. 4A includes an indirectly switchable grating, the at least one grating may be coupled with at least one polarization switch (e.g., polarization switch 970) for switching the indirectly switchable grating. In some embodiments, when at least one of the in-coupling element 711 or the out-coupling element 712 shown in FIG. 7 includes an indirectly switchable grating, a polarization switch may be coupled with at least one of the in-coupling element 711 or the out-coupling element 712 for switching the indirectly switchable grating.

Figure 10B:
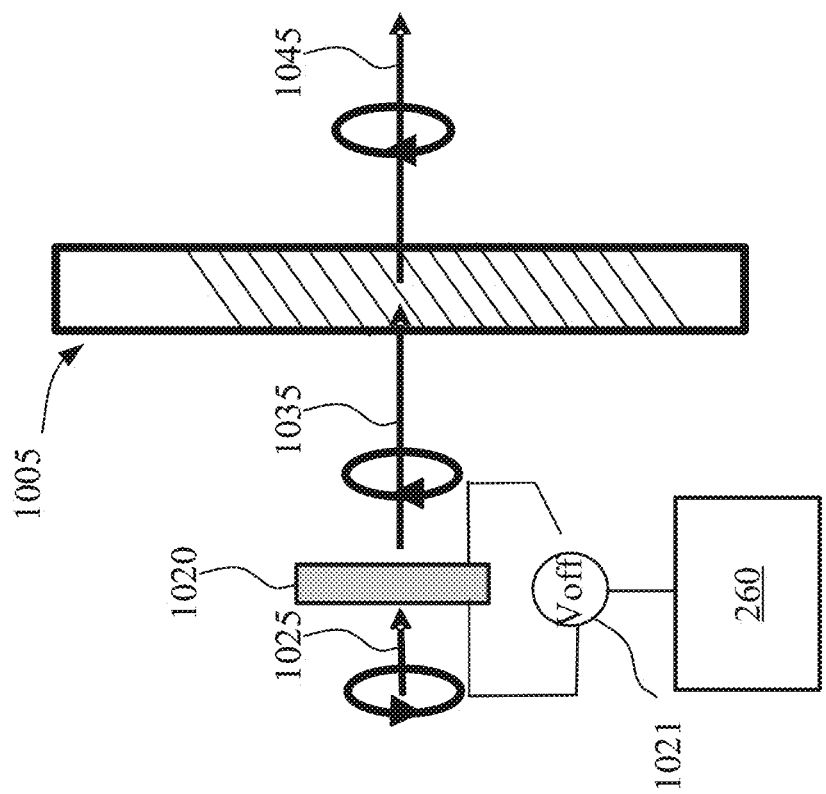
FIGS. 10A and 10B illustrate schematic diagrams of a grating in a diffraction state and a non-diffraction state, respectively, according to another embodiment of the present disclosure.
Figure 10A:
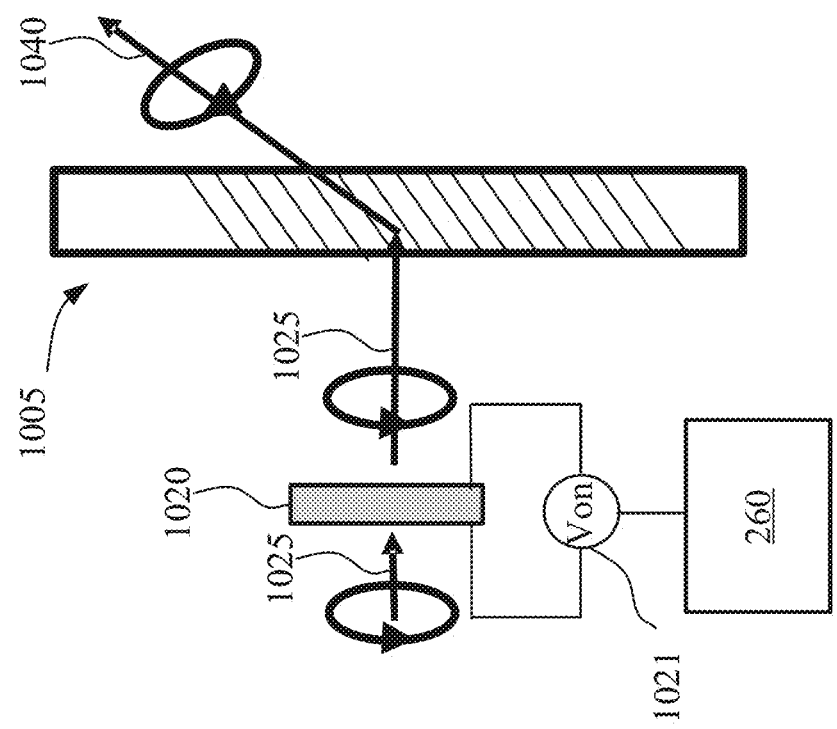

FIGS. 10A and 10B illustrate schematic diagrams of a transmissive-type indirectly switchable grating 1005 in a diffraction state and a non-diffraction state, respectively, according to an embodiment of the present disclosure. The controller 260 may indirectly switch the grating 1005 through a polarization switch 1020. A power source 1021 may be electrically coupled with the polarization switch 1020. The controller 260 may control the power source 1021 to control the polarization switch 1020. The polarization switch 1020 may be similar to the polarization switch 970. Detailed descriptions of controlling a polarization switch to indirectly switch an indirectly switchable grating can refer to the above descriptions rendered in connection with FIGS. 9A and 9B. The polarization switch 1020 may be disposed at a light incidence side of the grating 1005. The polarization switch 1020 may be configured to switch or maintain a polarization of an image light incident onto the grating 1005, thereby indirectly switching the grating 1005 to operate in a diffraction state when the incident image light has a first polarization, or to operate in a non-diffraction state when the incident image light has a second.

Figure 10D:
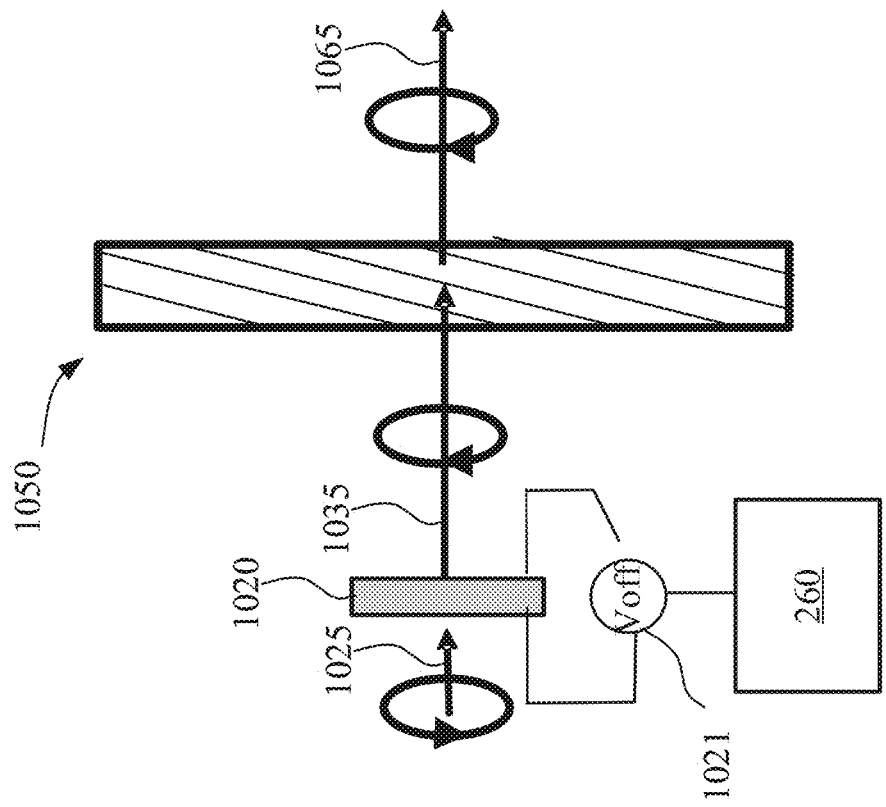
FIGS. 10C and 10D illustrate schematic diagrams of a grating in a diffraction state and a non-diffraction state, respectively, according to another embodiment of the present disclosure.
Figure 10C:
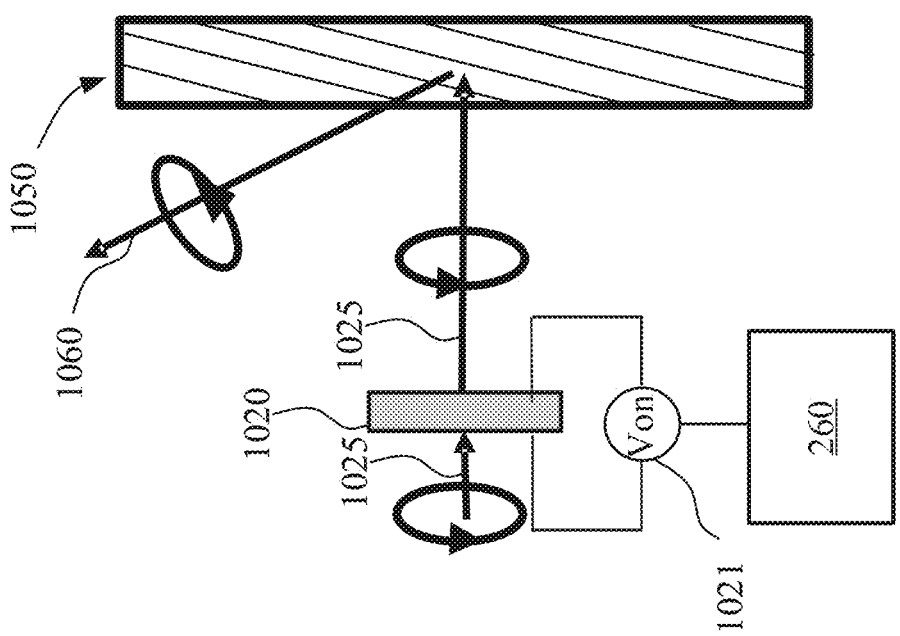

FIGS. 10C and 10D illustrate schematic diagrams of a reflective-type indirectly switchable grating 1050 in a diffraction state and a non-diffraction state, respectively, according to an embodiment of the present disclosure. The polarization switch 1020 may be disposed at a light incidence side of the grating 1050. The controller 260 may control the power source 1021 to control the polarization switch 1020. The polarization switch 1020 may switch or maintain a polarization of an image light incident onto the grating 1050. By switching or maintaining the polarization of the image light incident onto the grating 1050, the controller 260 may indirectly switch the grating 1050 between operating in a diffraction state when the incident image light has the first polarization, and operating in a non-diffraction state when the incident image light has the second polarization. The first and second polarizations of the image light incident onto the grating 1005 or 1050 may be orthogonal linear polarizations or circular polarizations with opposite handednesses. For illustrative purposes, the first and second polarizations are shown in FIGS. 10A-10D as circular polarizations with opposite handednesses.

In the embodiments shown in FIGS. 10A-10D, the controller 260 may control a voltage supplied by the power source 1021 to the polarization switch 1020. The descriptions of controlling the voltage to control the switching state and the non-switching state of the polarization switch 1020 can refer to the above descriptions relating to the polarization switch 970. The indirectly switchable gratings 1005 and 1050 may be implemented in various devices, systems, and assemblies disclosed herein, including those described above and shown in other figures for providing a compressed eyebox. The gratings 1005 and 1050 may be circular polarization selective (or sensitive, dependent), and may be active or passive. The controller 260 may control the polarization switch 1020 to control the polarization of the image light to be incident onto the gratings 1005 and 1050, thereby controlling the gratings 1005 and 1050 to operate in the diffraction state or the non-diffraction state.

In some embodiments, the indirectly switchable transmissive-type grating 1005 shown in FIGS. 10A and 10B may be a transmissive-type PVH grating, and the indirectly switchable reflective-type grating 1050 shown in FIGS. 10C and 10D may be a reflective-type PVH grating. A PVH grating may include a PVH layer (or film) having optically anisotropic molecules (e.g., LC molecules) arranged in a three-dimensional ("3D") orientational pattern. The PVH layer may be configured to diffract an incident image light via Bragg diffraction. The PVH layer may be referred to as a left-handed PVH or a right-handed PVH, based on a handedness of a helix twist in the PVH layer. The PVH layer may be configured to primarily diffract a circularly polarized light having a handedness that is the same as the handedness of the helix twist in the PVH layer, and primarily transmit a circularly polarized light having a handedness that is opposite to the handedness of the helix twist in the PVH layer. For example, a left-handed PVH layer may be configured to primarily diffract a left-handed circularly polarized ("LHCP") light and primarily transmit a right-handed circularly polarized ("RHCP") light. A right-handed PVH layer may be configured to primarily diffract an RHCP light beam and primarily transmit an LHCP light. For discussion purposes, the grating 1005 shown in FIGS. 10A and 10B may include a right-handed transmissive PVH layer, and the grating 1050 shown in FIGS. 10C and 10D may include a right-handed reflective PVH layer.

In some embodiments, the polarization switch 1020 may include an SHWP. As shown in FIG. 10A, the controller 260 may control the voltage supplied by the power source 1021 to the polarization switch 1020, such that the applied voltage is higher than a predetermined voltage value (and sufficiently high), thereby controlling the polarization switch 1020 to operate in the non-switching state. In the non-switching state, the polarization switch 1020 may transmit an RHCP light 1025 as an RHCP light 1030 without affecting the handedness. The grating 1005 including a right-handed transmissive PVH layer may primarily forwardly diffract the RHCP light 1030 to, e.g., a+1$^{st}$ order, as an LHCP light 1040. That is, the right-handed transmissive PVH layer may diffract the RHCP light 1030 and switch the handedness of the polarization to left handedness. As shown in FIG. 10B, the controller 260 may control the voltage supplied by the power source 1021 to the polarization switch 1020, such that the applied voltage is lower than or equal to the predetermined voltage value, thereby controlling the polarization switch 1020 to operate in the switching state. In the switching state, the polarization switch 1020 may reverse the handedness of the RHCP light 1025 to be left handedness. Thus, an image light 1035 output from the polarization switch 1020 may be an LHCP light 1035. The grating 1005 including the right-handed transmissive PVH layer may primarily transmit the LHCP light 1035 to the 0$^{th}$ order as an LHCP light 1045. That is, the right-handed transmissive PVH layer may transmit the LHCP light 1035 without affecting the handedness of the polarization.

As shown in FIG. 10C, the controller 260 may control the voltage supplied by the power source 1021 to the polarization switch 1020, such that the supplied voltage is higher than a predetermined voltage value (and sufficiently high), thereby controlling the polarization switch 1020 to operate in the non-switching state. When operating in the non-switching state, the polarization switch 1020 may transmit the RHCP light 1025 as an RHCP light 1030, without affecting the handedness. The grating 1050 including a right-handed reflective PVH layer may primarily backwardly diffract the RHCP light 1030 to, e.g., a+1$^{st}$ order, as an RHCP light 1060. As shown in FIG. 10D, the controller 260 may control the voltage supplied by the power source 1021 to the polarization switch 1020, such that the supplied voltage is lower than or equal to the predetermined voltage value, thereby controlling the polarization switch 1020 to operate in the switching state. When operating in the switching state, the polarization switch 1020 may reverse the handedness of the RHCP light 1025, and transmit the RHCP light 1025 as an LHCP light 1035. The grating 1050 including the right-handed reflective PVH layer may primarily transmit the LHCP light 1035 to the 0$^{th}$ order as an LHCP light 1065.

Exemplary optical systems, which include one or more waveguides, and the control of various diffractive elements (diffractive optical elements) coupled to the waveguides to direct an image light to different compressed eyeboxes based on eye tracking information (e.g., eye pupil positions) of a user acquired in real time at different time instances, will be explained. For discussion purposes, when one or more waveguides are configured to direct an image light to different sub-eyeboxes forming different compressed eyeboxes at different time instances based on different eye tracking information of a user, the polarization of the image light is presumed to be unaffected while propagating inside the one or more waveguides. In some embodiments, the polarization of the image light may change while the image light propagates inside the one or more waveguides. When the polarization of the image light changes inside the one or more waveguides, a polarization correction film and a cleanup polarizer may be disposed adjacent or on the respective waveguide to block undesirable (or ghost) image lights. The polarization correction film may be configured to preserve the polarization state of the image light when the image light propagates inside the waveguide.

For illustrative purposes, various waveguide display assemblies for one-dimensional ("1D") pupil expansion and eyebox compression (e.g., in an x-axis direction) are used as examples to explain the principle of the eyebox compression (or providing a compressed eyebox), such as those shown in FIGS. 11A-12C and 14A-16C. In some embodiments, two-dimensional ("2D") pupil expansion and eyebox compression (e.g., in both x-axis direction and y-axis direction) may be achieved by introducing an additional diffractive optical element (e.g., a folding or redirecting element) that redirects the guided image light by 90°. An example waveguide display assembly for 2D pupil expansion and eyebox compression (e.g., in both x-axis direction and y-axis direction)

is shown in FIGS. 13A-13D. In the embodiments shown in FIGS. 11A-12C and 14A-16C, a redirecting element may be included (although not shown) to realize 2D pupil expansion and eyebox compression. In some embodiments, the out-coupling elements shown in the FIGS. 11A-12C and 14A-16C may include the folding function, and the redirecting element may be omitted. Thus, although 1D pupil expansion is used to explain the principle of the eyebox compression in FIGS. 11A-12C and 14A-16C, the optical systems included in FIGS. 11A-12C and 14A-16C can provide 2D pupil expansion and eyebox compression. For illustrative purposes, the waveguide display assemblies for pupil expansion and eyebox compression are presumed to include linear polarization selective or dependent gratings. In some embodiments, the waveguide display assemblies for pupil expansion and eyebox compression may also be configured to include other suitable polarization selective or dependent gratings, such as circular polarization selective or dependent gratings, following the same design principles for the waveguide display assemblies including linear polarization selective or dependent gratings.

Figure 11A:
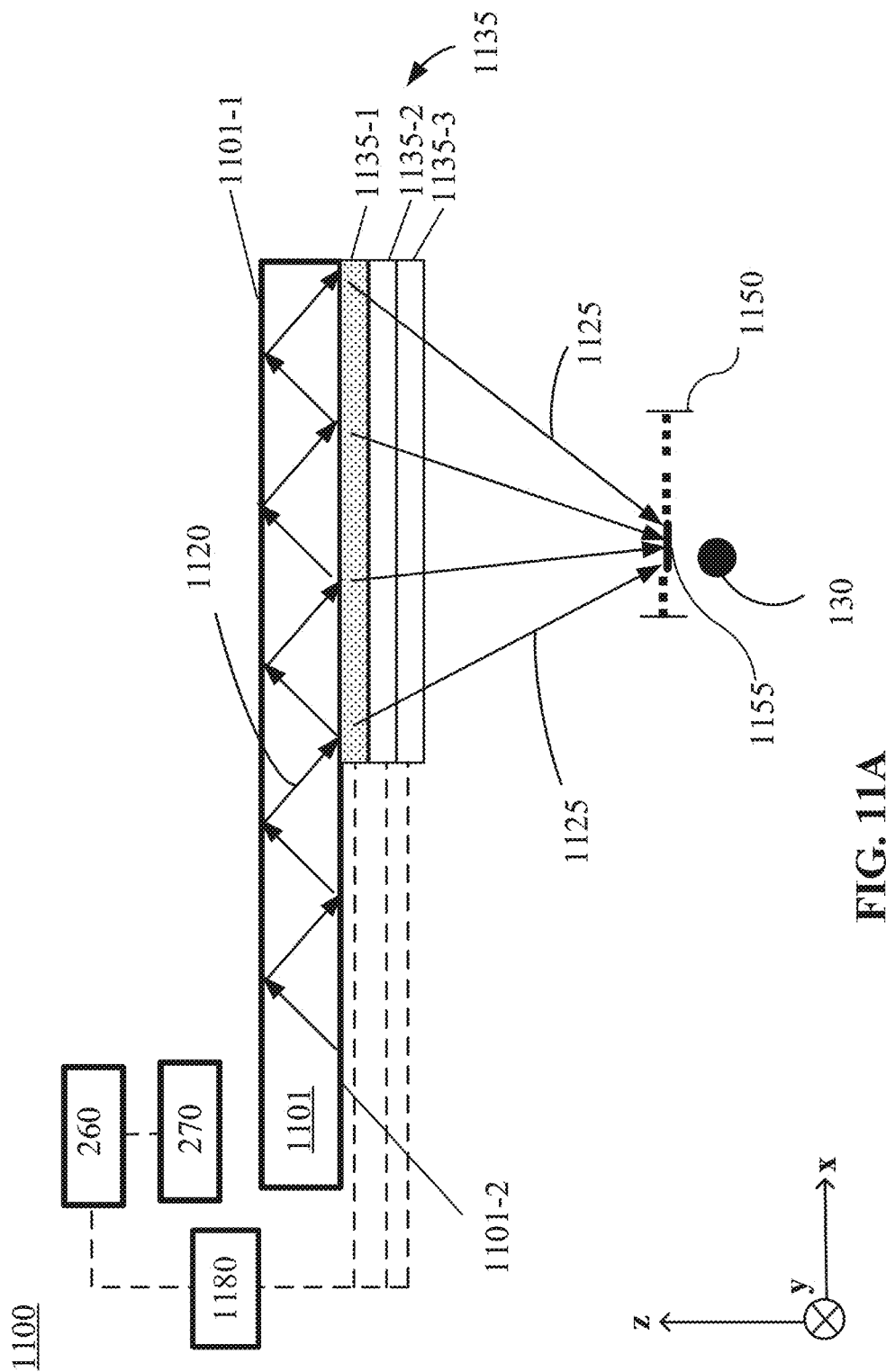
FIGS. 11A-11C illustrate schematic diagrams of an optical system configured to provide a compressed eyebox at different time instances, according to an embodiment of the present disclosure.
Figure 11B:
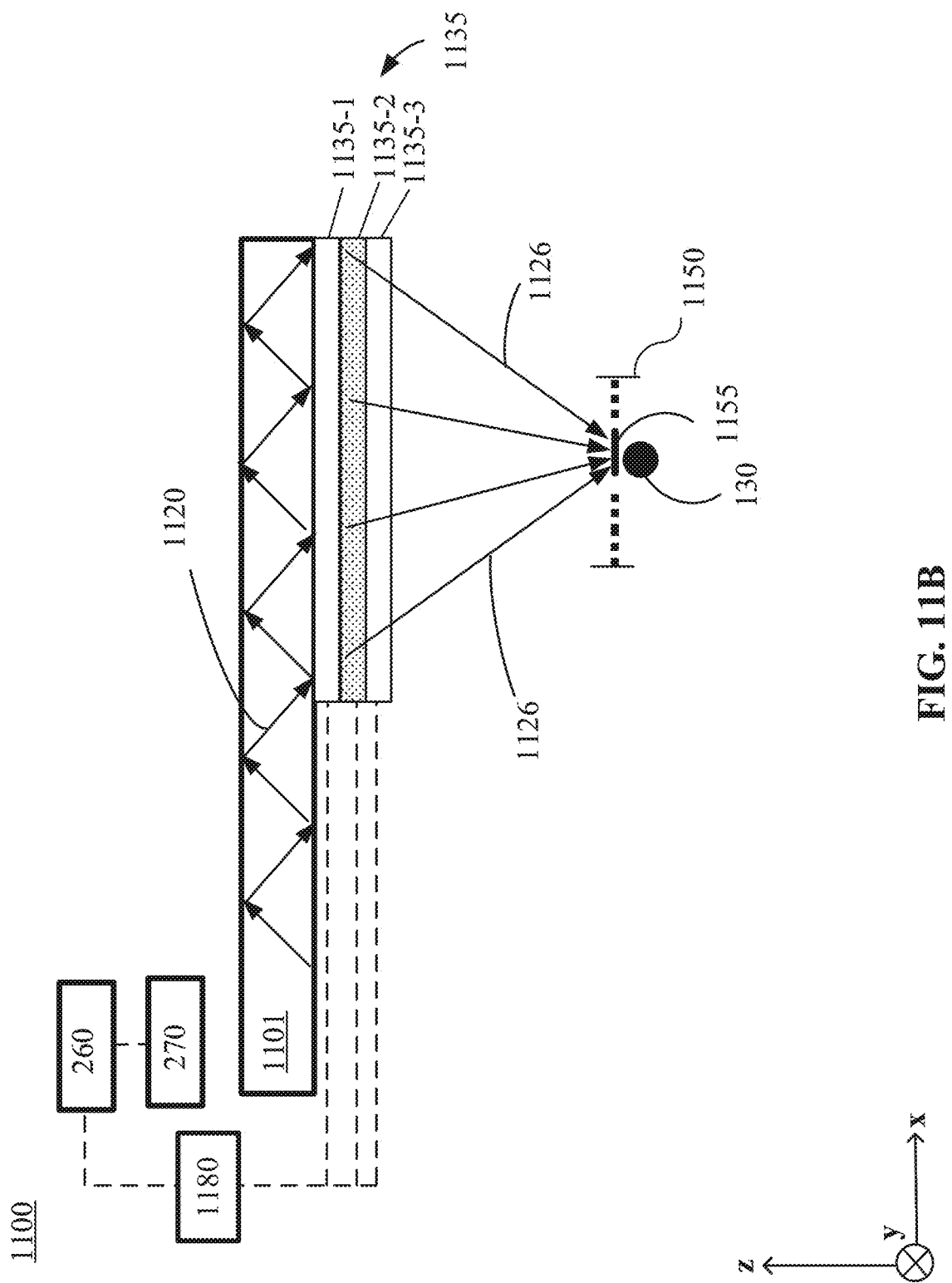
Figure 11C:
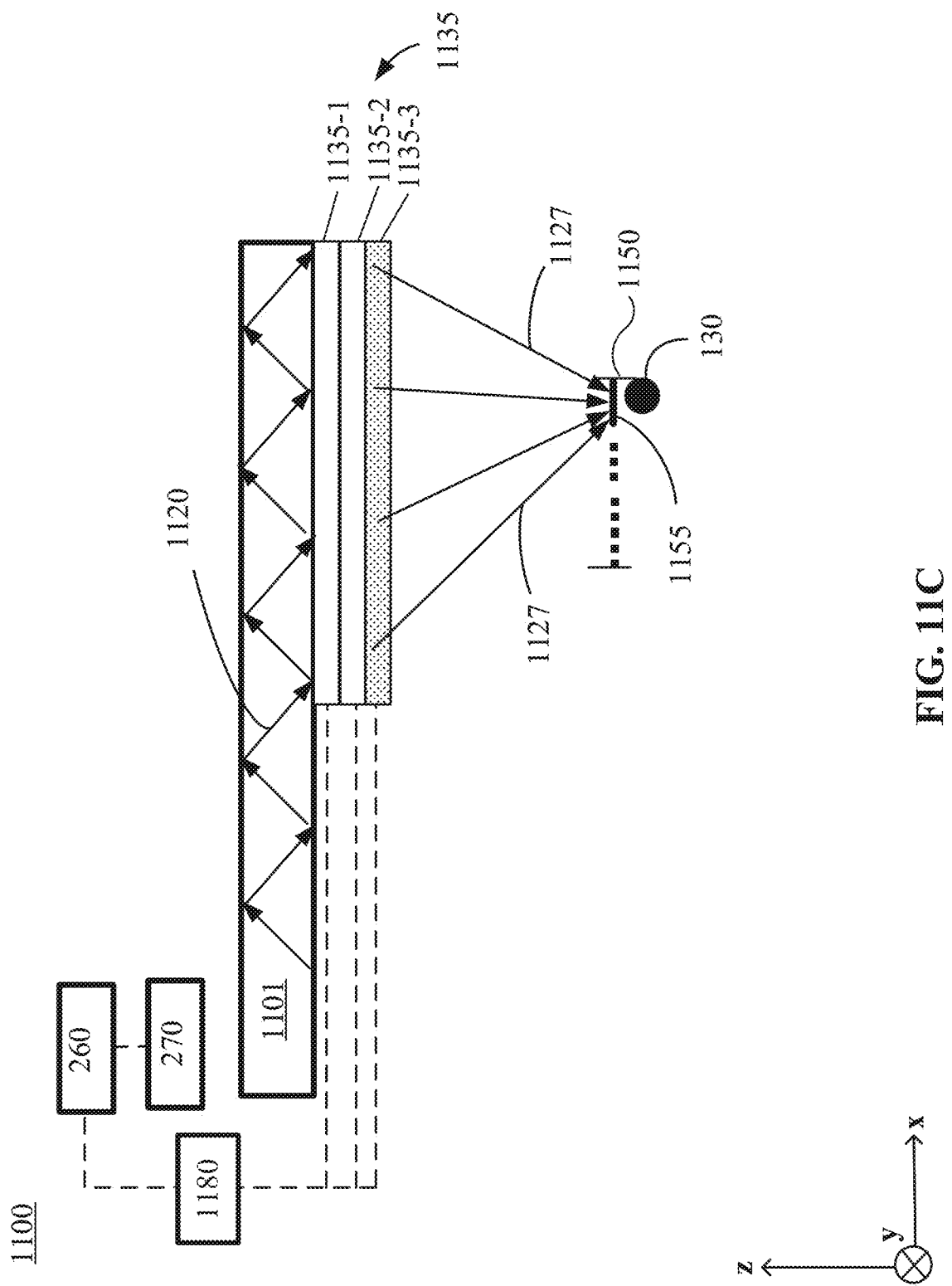

FIGS. 11A-11C illustrate schematic diagrams of an optical system 1100 configured to provide a compressed eyebox at different time instances, according to an embodiment of the present disclosure. The optical system 1100 may include elements that are similar to or the same as those included in other optical systems disclosed herein and shown in other figures. Features shown in other figures, even if not explicitly described below for the simplicity of discussion, may also be applicable to the embodiment shown in FIGS. 11A-11C. Descriptions of the same or similar elements or features can refer to the above corresponding descriptions, including those rendered in connection with FIGS. 2A-10D. The optical system 1100 may include a light source assembly (not shown), a waveguide 1101, the controller 260, and the eye tracking system 270. The light source assembly may be any of the light source assemblies disclosed herein, including those shown in other figures, such as the light source assembly 211 shown in FIGS. 2A and 2B. The waveguide 1101 may be any of the waveguides disclosed herein, including those shown in other figures, such as the waveguide 210.

An in-coupling element (not shown) and an out-coupling element 1135 may be coupled to the waveguide 1101. The in-coupling element may be any of the in-coupling elements disclosed herein, including those shown in other figures, such as the in-coupling element 231 shown in FIGS. 2A and 2B. The in-coupling element may include an in-coupling grating set that includes one or more in-coupling gratings. The in-coupling grating set may include all switchable gratings, all non-switchable gratings, or at least one switchable grating and at least one non-switchable grating. When the in-coupling grating set includes a directly switchable grating, a power source may be electrically coupled with the in-coupling grating set to provide a voltage to electrodes included in the directly switchable grating for switching the directly switchable grating. When the in-coupling grating set includes an indirectly switchable grating, a polarization switch may be coupled with the indirectly switchable grating to switch the grating to operate in the diffraction state for an incident light having a first polarization, or to operate in the non-diffraction state for an incident light having a second polarization different from the first polarization.

The out-coupling element 1135 may be any of the out-coupling elements disclosed herein, including those shown in other figures, such as the out-coupling element 235 shown in FIGS. 2A and 2B. The out-coupling element 1135 may include an out-coupling grating set that includes one or more out-coupling gratings. For discussion purposes, the out-coupling element 1135 may also be referred to as the out-coupling grating set 1135. The out-coupling grating set 1135 may include all switchable gratings, all non-switchable gratings, or at least one switchable grating and at least one non-switchable grating. For discussion purposes, all of the out-coupling gratings included in the out-coupling element 1135 are presumed to be switchable gratings. The out-coupling element 1135 may be disposed at a first surface 1101-1 or a second surface 1101-2 of the waveguide 1101. In FIGS. 11A-11C, the out-coupling element 1135 is shown as being disposed at the second surface 1101-2 of the waveguide 1101 for illustrative purposes.

The light source assembly may be configured to emit an image light with a predetermined FOV. The in-coupling element may couple the image light generated by the light source assembly as an image light 1120, which may propagate through TIR inside the waveguide 1101. The FOV of the image light 1120 may be substantially the same as the FOV of the image light generated by the light source assembly. The out-coupling element 1135 may be configured to direct and concentrate, via diffraction, the image light 1120 out of the waveguide 1101 toward a compressed eyebox 1155. In some embodiments, the FOV of the image light propagating through the compressed eyebox 1155 may be substantially the same as the FOV of the image light 1120 propagating inside the waveguide 1101 or the image light generated by the light source assembly.

In FIGS. 11A-11C, the out-coupling element 1135 may include a plurality of out-coupling gratings 1135-1, 1135-2, and 1135-3, at least one (e.g., each) of which may be a directly switchable grating. The number of the out-coupling gratings is not limited to three, and can be any suitable number, such as two, four, five, six, etc. The directly switchable grating may be the diffractive optical element 801 shown in FIGS. 8A and 8B. The out-coupling gratings 1135-1, 1135-2, and 1135-3 may have any suitable configuration shown in FIGS. 6A-6D. The plurality of out-coupling gratings 1135-1, 1135-2, and 1135-3 are shown as being stacked together in FIGS. 11A-11C, although in other embodiments, the out-coupling gratings may be disposed side by side (e.g., in an interleaved configuration as described above). The out-coupling gratings 1135-1, 1135-2, and 1135-3 may be electrically coupled with a power source 1180, which may be controlled by the controller 260 to independently provide voltages to the out-coupling gratings 1135-1, 1135-2, and 1135-3 for independently switching the respective out-coupling grating to operate in a diffraction state or a non-diffraction state for an incident light.

Each of the out-coupling gratings 1135-1, 1135-2, and 1135-3, when operating in a diffraction state, may be configured to direct and concentrate the image light 1120 to propagate through a corresponding sub-eyebox. When all of the plurality of out-coupling gratings 1135-1, 1135-2, and 1135-3 operate in a diffraction state, the plurality of out-coupling gratings may direct and concentrate the image light 1120 to propagate through a plurality of sub-eyeboxes, e.g., three sub-eyeboxes. The plurality of sub-eyeboxes may form an uncompressed eyebox 1150. When one or more (in some embodiments less than all) of the out-coupling gratings operate in a diffraction state to direct and concentrate the image light 1120 to propagate through one or more (in some embodiments less than all) corresponding sub-eyeboxes, the compressed eyebox 1155 may be formed by the one or more sub-eyeboxes.

In the embodiment shown in FIGS. 11A-11C, each of the out-coupling gratings 1135-1, 1135-2, and 1135-3 may correspond to a different sub-eyebox. When one of the out-coupling gratings 1135-1, 1135-2, and 1135-3 is activated, a corresponding sub-eyebox is activated, and the compressed eyebox 1155 may be formed by the single sub-eyebox. When two or more of the out-coupling gratings 1135-1, 1135-2, and 1135-3 are activated simultaneously or sequentially within a time period, two or more sub-eyeboxes may be activated, and the compressed eyebox 1155 may be formed by the two or more sub-eyeboxes. The size of the compressed eyebox 1155 may be at least substantially comparable with (or slightly larger than) the size of the eye pupil 130, and smaller than that of the uncompressed eyebox 1150.

The plurality of out-coupling gratings 1135-1, 1135-2, and 1135-3 in the out-coupling element 1135 may be individually and/or independently controlled by the controller 260. The controller 260 may selectively control or configure one or more of the out-coupling gratings 1135-1, 1135-2, and 1135-3 individually and/or independently to operate in a diffraction state, and selectively control or configure the remaining one or more out-coupling gratings to operate in a non-diffraction state. For example, the controller 260 may control the power source 1180 (which may include multiple power supplying units or output terminals) to independently control the voltages supplied to the out-coupling gratings 1135-1, 1135-2, and 1135-3, thereby independently controlling the diffraction state or non-diffraction state of the out-coupling gratings 1135-1, 1135-2, and 1135-3.

In some embodiments, the eye tracking system 270 may be configured to obtain the eye tracking information relating to the eye pupil 130, and may transmit the eye tracking information to the controller 260. In some embodiments, the eye tracking system 270 may transmit image data relating to the eye pupil 130 to the controller 260, and the controller 260 may analyze the image data to obtain the eye tracking information. For discussion purposes, a position of the eye pupil 130 is used an example of the eye tracking information relating to the eye pupil 130 in the following discussions. Any one or any combination of other types of eye tracking information (e.g., size, moving direction, or viewing direction of the eye pupil 130) described above may be used in place of or in combination with the position of the eye pupil 130 as a basis for dynamically rendering the compressed eyebox. Any suitable combination of these types of eye tracking information may be used as a basis for dynamically rendering the compressed eyebox. Also for discussion purposes, the eye tracking information may be referred to as being obtained by the controller 260 through analyzing image data received from the eye tracking system 270.

Based on the eye tracking information, the controller 260 may selectively control or configure one or more of the out-coupling gratings 1135-1, 1135-2, and 1135-3 included in the out-coupling element 1135 to operate in the diffraction state, and selectively control or configure the remaining one or more out-coupling gratings included in the out-coupling element 1135 to operate in the non-diffraction state. The one or more out-coupling gratings controlled to operate in the diffraction state may direct and concentrate the image light 1120 to the compressed eyebox 1155. The remaining one or more out-coupling gratings controlled to operate in the non-diffraction state may function as a substantially optically uniform plate for the image light 1120. That is, the out-coupling gratings operating in the non-diffraction state may transmit an incident light therethrough with negligible or no diffraction. To selectively control an out-coupling grating to operate in the diffraction state, or to selectively control the out-coupling grating to operate in the non-diffraction state, the controller 260 may either switch the out-coupling grating from the diffraction state to the non-diffraction state, or switch the out-coupling grating from the non-diffraction state to the diffraction state, or maintain the diffraction state or the non-diffraction state of the out-coupling grating, depending on the state of the out-coupling grating at a preceding time instance or time duration.

The location, shape, and/or the size of the compressed eyebox 1155 may be dynamically changed by the controller 260 based on the real time eye tracking information. FIGS. 11A-11C show that the compressed eyebox 1155 may be located at different locations when the position of the eye pupil 130 changes. Referring to FIG. 11A, at a first time instance, the eye tracking system 270 or the controller 260 may detect or determine, based on image data relating to the eye pupil 130 captured by the optical sensor 265, that the eye pupil 130 is located at a first position within the uncompressed eyebox 1150. Based on the position information of the eye pupil 130, the controller 260 may selectively control or configure the first out-coupling grating 1135-1 to operate in the diffraction state, and selectively control or configure the remaining out-coupling gratings 1135-2 and 1135-3 to operate in the non-diffraction state. The out-coupling grating 1135-1 operating in the diffraction state may couple the image light 1120 out of the waveguide 1101 as an image light 1125. The out-coupling grating 1135-1 may direct and concentrate the image light 1125 to a corresponding first sub-eyebox of the uncompressed eyebox 1150. In some embodiments, the first sub-eyebox may form the compressed eyebox 1155.

The out-coupling gratings 1135-2 and 1135-3 operating in the non-diffraction state may transmit the image light 1125 therethrough with negligible or no diffraction. The size and location of the compressed eyebox 1155 may be maintained for a first time period until a change in the eye tracking information of the eye pupil 130 is detected (e.g., a change in the size of the eye pupil 130, a change in the position of the eye pupil 130, a change in the moving direction of the eye pupil 130, and/or a change in the viewing direction of the eye pupil 130).

Referring to FIG. 11B, at a second time instance, the eye tracking system 270 or the controller 260 may detect or determine, based on the image data relating to the eye pupil 130 captured by the optical sensor 265, that the eye pupil 130 has moved to, or is moving to, a second position within the uncompressed eyebox 1150. Based on the new position information of the eye pupil 130, the controller 260 may selectively control or configure the second out-coupling grating 1135-2 to operate in the diffraction state, and selectively control or configure the remaining out-coupling gratings 1135-1 and 1135-3 to operate in the non-diffraction state. The out-coupling grating 1135-1 operating in the non-diffraction state may transmit the image light 1120 therethrough with negligible or no diffraction toward the out-coupling grating 1135-2. The out-coupling grating 1135-2 operating in the diffraction state may couple the image light 1120 out of the waveguide 1101 as an image light 1126, and direct and concentrate the image light 1126 to a corresponding second sub-eyebox of the uncompressed eyebox 1150. The out-coupling grating 1135-3 operating in the non-diffraction state may transmit the image light 1126 therethrough with negligible or no diffraction. The second sub-eyebox may be different from the first sub-eyebox, and may form the compressed eyebox 1155.

At least one of the location, shape, and/or size of the compressed eyebox 1155 at the second time instance may be different from the at least one of the location, shape, and/or size of the compressed eyebox 1155 at the first time instance. For example, at the second time instance, both of the location and the size may be different from those at the first time instance. In some embodiments, at the first and second time instances, the size of the compressed eyebox 1155 may remain the same, and the location of the compressed eyebox 1155 may be different. The size and location of the compressed eyebox 1155 may be maintained for a second time period until a change in the eye tracking information of the eye pupil 130 is detected.

Referring to FIG. 11C, at a third time instance, the eye tracking system 270 or the controller 260 may detect or determine, based on the image data relating to the eye pupil 130 captured by the optical sensor 265, that the eye pupil 130 has moved to, or is moving to, a third position within the uncompressed eyebox 1150. Based on the new position information of the eye pupil 130, the controller 260 may selectively control or configure the third out-coupling grating 1135-3 to operate in the diffraction state, and selectively control or configure the first and second out-coupling gratings 1135-1 and 1135-2 to operate in the non-diffraction state. The out-coupling gratings 1135-1 and 1135-2 operating in the non-diffraction state may transmit the image light 1120 therethrough with negligible or no diffraction. The out-coupling grating 1135-3 operating in the diffraction state may couple the image light 1120 out of the waveguide 1101 as an image light 1127, and direct and concentrate the image light 1127 to a corresponding third sub-eyebox of the uncompressed eyebox 1150. The third sub-eyebox may be different from the second sub-eyebox, and may form the compressed eyebox 1155.

At least one of the location, shape, and/or size of the compressed eyebox 1155 at the third time instance may be different from the at least one of the location, shape, and/or size of the compressed eyebox 1155 at the second time instance. For example, at the third time instance, both of the location and the size may be different from the corresponding location and size at the second time instance. In some embodiments, as compared with the second time instance, the size of the compressed eyebox 1155 may be the same at the third time instance, and the location of the compressed eyebox 1155 at the third time instance may be different. The size and location of the compressed eyebox 1155 may be maintained for a third time period until a change in the eye tracking information of the eye pupil 130 is detected.

In some embodiments, the image light 1125, 1126, or 1127 propagating through the compressed eyebox 1155 may have an FOV that is substantially the same as the FOV of the image light propagating through the uncompressed eyebox 1150. As a result, the image content delivered to the compressed eyebox 1155 may be substantially the same as the image content delivered to the uncompressed eyebox 1150. In some embodiments, the image light 1125, 1126, or 1127 may have an FOV that is substantially the same as the FOV of the image light generated by the light source assembly. As a result, the eye of the user may perceive the full content of an image generated by the light source assembly 211.

For illustrative purposed, FIGS. 11A-11C show that at a time instance, the controller 260 may selectively control one of the out-coupling gratings 1135-1, 1135-2, and 1135-3 to operate in the diffraction state, and selectively control the remaining out-coupling gratings to operate in the non-diffraction state, thereby directing and concentrating the image light 1120 from the waveguide 1101 to the compressed eyebox that includes a single sub-eyebox. In some embodiments, the controller 260 may selectively control or configure two or more of the out-coupling gratings (e.g., 1135-1 and 1135-3, 1135-2 and 1135-3, or 1135-1 and 1135-2) to operate in the diffraction state, and selectively control or configure the remaining out-coupling grating to operate in the non-diffraction state. The two or more out-coupling gratings operating in the diffraction state may direct and concentrate the image light 1120 propagating through TIR inside the waveguide 1101 toward two or more corresponding sub-eyeboxes that cover at least the area of the eye pupil 130. The compressed eyebox 1155 may be formed by the two or more sub-eyeboxes. The locations of the two or more sub-eyeboxes (hence the location of the compressed eyebox 1155) may correspond to the position of the eye pupil 130. The two or more sub-eyeboxes may be simultaneously activated or sequentially activated within a time period. The light intensity in the two or more sub-eyeboxes may be uniform (e.g., substantially the same), or may be different.

Figure 12A:
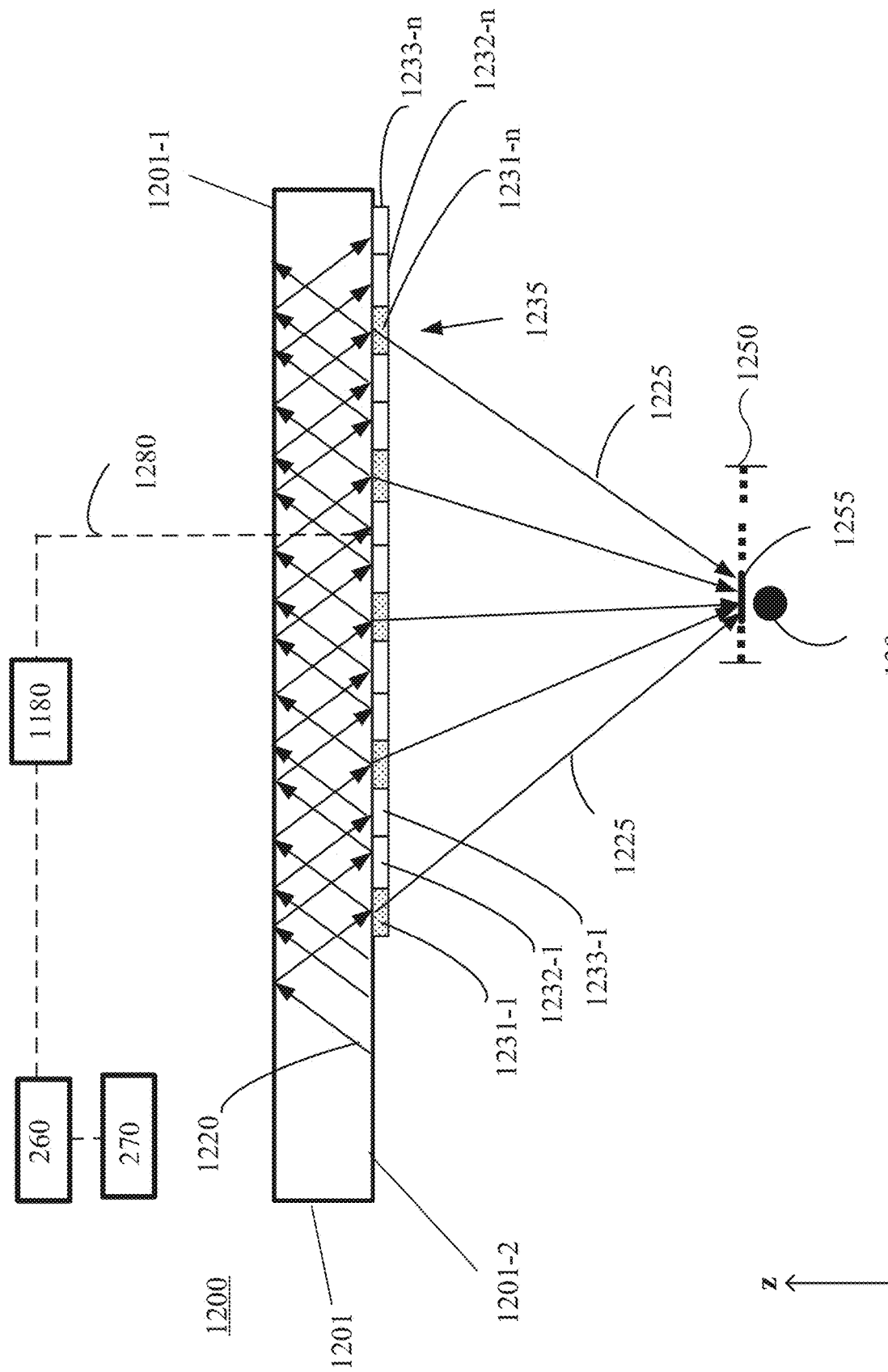
FIGS. 12A-12C illustrate schematic diagrams of an optical system configured to provide a compressed eyebox at different time instances, according to another embodiment of the present disclosure.
Figure 12B:
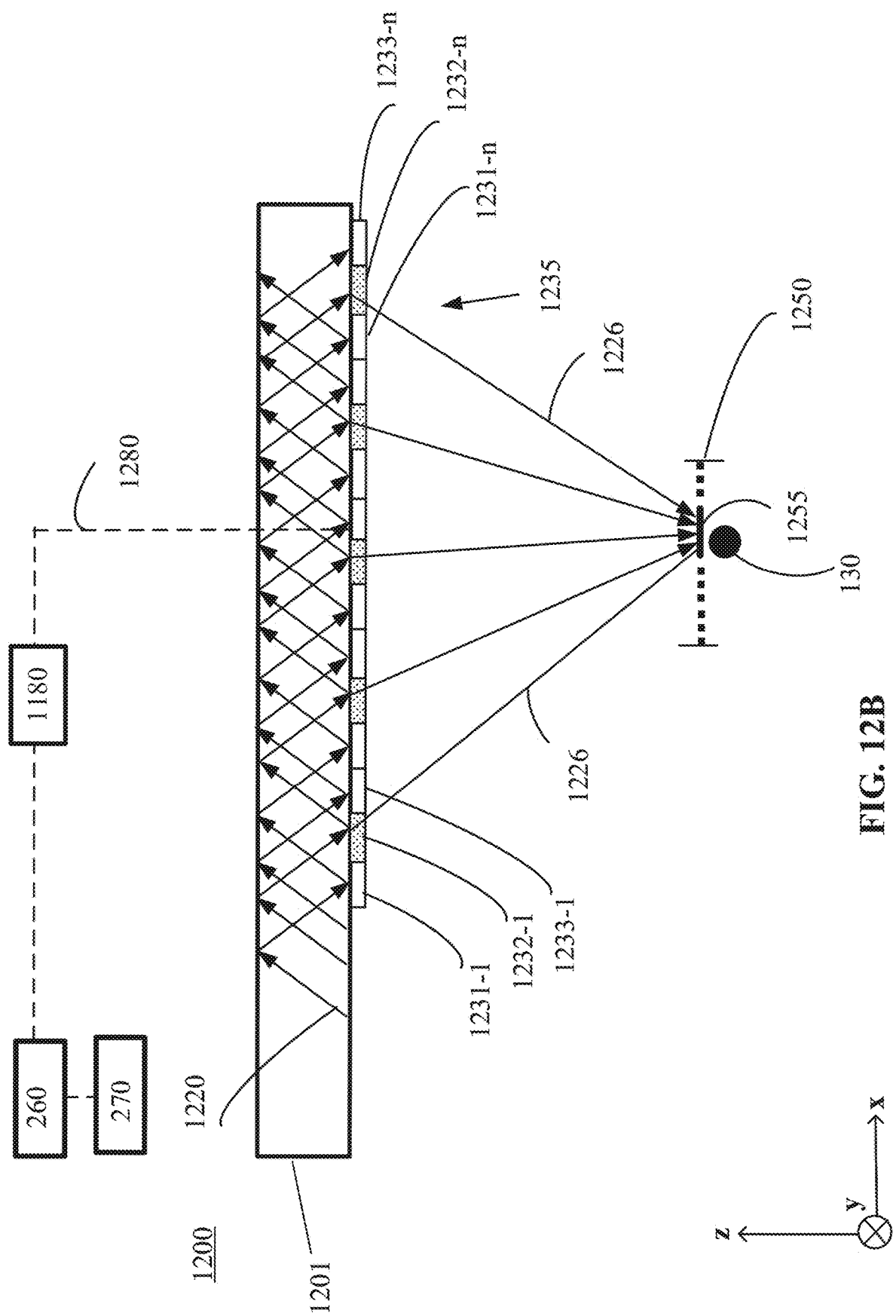
Figure 12C:
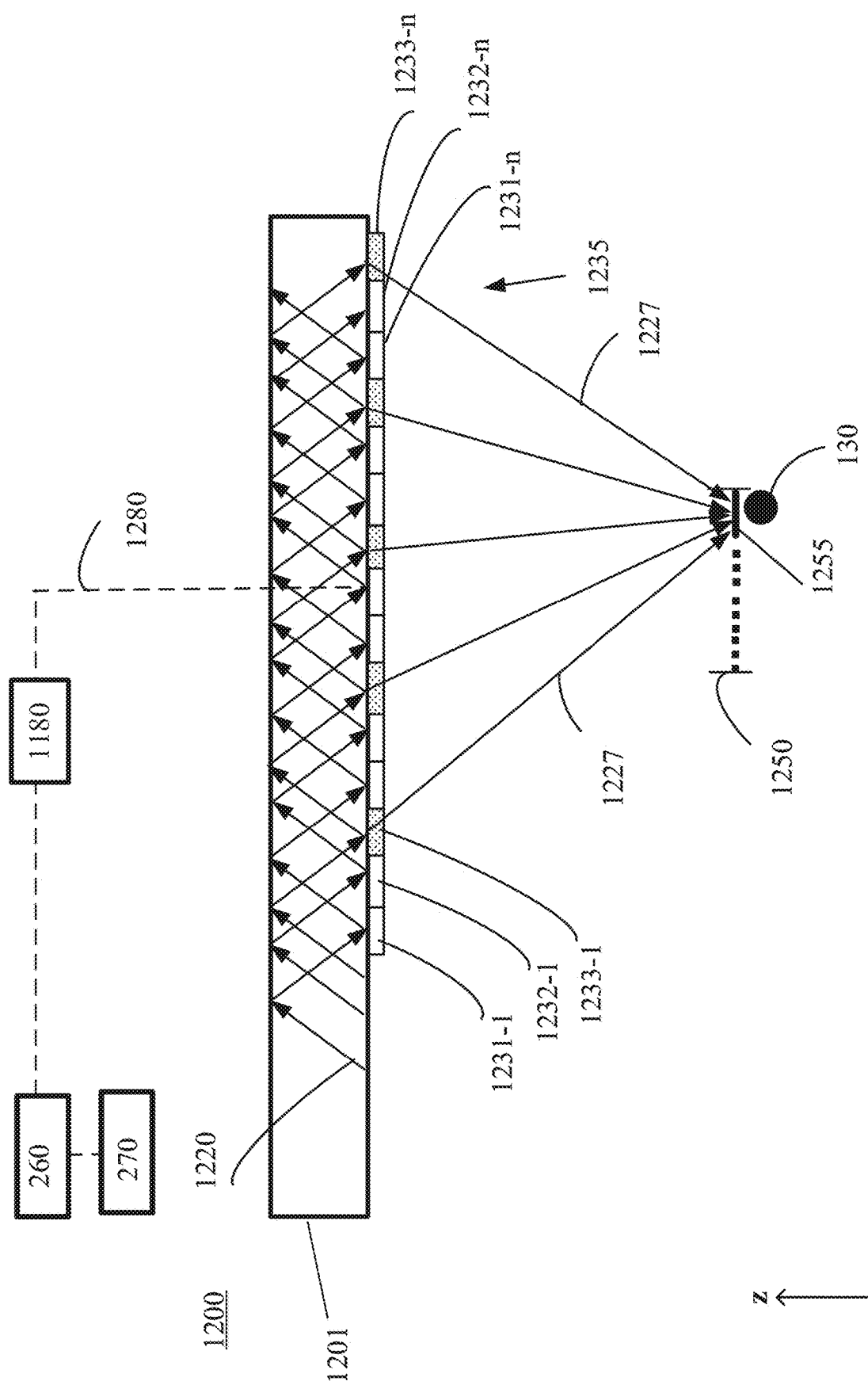

FIGS. 12A-12C illustrate schematic diagrams of an optical system 1200 configured to provide a compressed eyebox at different time instances, according to an embodiment of the present disclosure. The optical system 1200 may include elements similar to those included in other optical systems disclosed herein, such as the optical system 200 or 1100. Features shown in other figures, even if not explicitly described below for the simplicity of discussion, may also be applicable to the embodiment shown in FIGS. 12A-12C. Descriptions of the same or similar elements can refer to the above descriptions, including those rendered in connection with FIGS. 2A-11C. The optical system 1200 may include the controller 260, the eye tracking system 270, and the power source 1180. The optical system 1200 may include a waveguide 1201, which may be an embodiment of any of the disclosed waveguides, such as the waveguide 210 or the waveguide 1101. The optical system 1200 may include a light source assembly (not shown) configured to emit an image light with a predetermined FOV toward the waveguide 1201. An in-coupling element (not shown) may be coupled with the waveguide 1201, and configured to couple the image light emitted from the light source assembly into the waveguide 1201 as an image light 1220. The image light 1220 may propagate inside the waveguide 1201 through TIR. The FOV of the image light 1220 may be substantially the same as the FOV of the image light emitted from the light source assembly. Descriptions of the light source assembly and the in-coupling element can refer to the above descriptions.

An out-coupling element 1235 may be coupled to the waveguide 1201 and configured to couple the image light 1220 out of the waveguide 1201 toward a compressed eyebox 1255. The out-coupling element 1235 may be disposed at a first surface 1201-1 or a second surface 1201-2 of the waveguide 1201. For illustration purposes, the out-coupling element 1235 is shown as disposed at the second surface 1201-2 of the waveguide 1201. In some embodiments, the out-coupling element 1235 may include an out-coupling grating set (which is also referred to as 1235 for discussion purposes). The out-coupling grating set 1235 may include a plurality of out-coupling gratings. Each out-coupling grating may include a plurality of sub-gratings. All the plurality of sub-gratings of the plurality of out-coupling gratings may be mixed and interleaved together in an interleaved grating array, similar to the embodiment shown in FIG. 6B. At least one (e.g., each) grating included in the out-coupling element 1235 may be a directly switchable grating. Detailed descriptions of the interleaved configuration of the grating array can refer to the above descriptions.

For example, the out-coupling element 1235 may include a plurality of out-coupling gratings each including a plurality of sub-gratings. For example, the out-coupling element 1235 may include a first out-coupling grating including a plurality of sub-gratings 1231-1, . . . , 1231-$n$. The out-coupling element 1235 may include a second out-coupling grating including a plurality of sub-gratings 1232-1, . . . , 1232-$n$. The out-coupling element 1235 may include a third out-coupling grating including a plurality of sub-gratings 1233-1, . . . , 1233-$n$. The sub-gratings gratings 1231-1, 1231-2, . . . , 1231-$n$ included in the first out-coupling grating may be distributed at different locations in the interleaved configuration (e.g., matrix configuration). The sub-gratings gratings 1232-1, 1232-2, . . . , 1232-$n$ included in the second out-coupling grating may be distributed at different locations in the interleaved configuration (e.g., matrix configuration). The sub-gratings gratings 1233-1, 1233-2, . . . , 1233-$n$ included in the third out-coupling grating may be distributed at different locations in the interleaved configuration (e.g., matrix configuration). The number of out-coupling gratings is not limited to three, which may be any suitable number, such as two, four, five, six, etc. The number "n" of the sub-gratings may be any suitable number. Sub-gratings belonging to the same out-coupling grating may be configured to deliver different portions of the FOV of the image light 1220 propagating inside the waveguide 1201 through TIR to a same sub-eyebox. In some embodiments, the sub-gratings belonging to the same out-coupling grating may be configured to deliver different portions of the wavelength spectrum of the image light 1220 to the same sub-eyebox.

The controller 260 may selectively control or configure one or more (e.g., each) of the out-coupling gratings included in the out-coupling element 1235, e.g., through direct switching, to operate in the diffraction state or non-diffraction state. The connection between the controller 260, and the power source 1180 and the gratings, for controlling the direct switching of the out-coupling gratings, is schematically represented by the dashed line 1280. The plurality of out-coupling gratings of the out-coupling element 1235 may be individually or independently controllable by the controller 260 to operate in the diffraction state to direct the image light 1220 propagating inside the waveguide 1201 through TIR toward a plurality of sub-eyeboxes. For example, in the embodiments shown in FIGS. 12A-12C, the first out-coupling grating may correspond to a first sub-eyebox, the second out-coupling grating may correspond to a second sub-eyebox, and the third out-coupling grating may correspond to a third sub-eyebox, etc. When all of the out-coupling gratings are controlled by the controller 260 to operate in the diffraction state, the image light 1220 propagating inside the waveguide 1201 through TIR may be directed and concentrate to the plurality of sub-eyeboxes, which form the uncompressed eyebox 1250.

The optical sensor 265 included in the eye tracking system 270 may obtain image data relating to the eye pupil 130. In some embodiments, the eye tracking system 270 may analyze, e.g., through the internal processor 280, the image data to obtain eye tracking information relating to the eye pupil 130. In some embodiments, the eye tracking system 270 may transmit the image data to the controller 260, and the controller 260 may analyze the image data to obtain the eye tracking information. Based on the eye tracking information, the controller 260 may selectively control or configure one or more of the out-coupling gratings included in the out-coupling element 1235 to operate in the diffraction state to direct and concentrate, via diffraction, the image light 1220 to one or more sub-eyeboxes, which form the compressed eyebox 1255.

The selectively controlled one or more out-coupling gratings included in the out-coupling element 1235 may form one or more combinations of gratings with one or more in-coupling gratings selected from the in-coupling element. In some embodiments, when the controller 260 selectively controls an out-coupling grating included in the out-coupling element 1235 to operate in the diffraction state, and selectively controls the remaining one or more out-coupling gratings included in the out-coupling element 1235 to operate in the non-diffraction state, the one or more out-coupling gratings operating in the diffraction state may form a combination of gratings with one or more in-coupling gratings included in the in-coupling element. Thus, a combination of gratings may be selectively controlled by the controller 260 to operate in the diffraction state, and the remaining one or more combinations of gratings may be selectively controlled by the controller 260 to operate in the non-diffraction state. The combination of gratings operating in the diffraction state may direct the image light 1220 to the compressed eyebox 1255, which may be formed by a single eyebox. When the controller 260 selectively controls two or more out-coupling gratings included in the out-coupling element 1235 to operate in the diffraction state, two or more combinations of gratings are selectively controlled by the controller 260 to operate in the diffraction state. The two or more out-coupling gratings (or combinations of gratings formed by the two or more out-coupling gratings with the one or more in-coupling gratings) operating in the diffraction state may direct the image light 1220 to two or more sub-eyeboxes, which form the compressed eyebox 1255. In the following descriptions of FIGS. 12A-12C, a single out-coupling grating from the out-coupling element 1235 (and hence a single combination of gratings formed by the out-coupling grating and one or more in-coupling gratings in the optical system 1200) is presumed to be selectively controlled to operate in the diffraction state at each time instance.

Referring to FIG. 12A, at a first time instance, the eye tracking system 270 or the controller 260 may detect or determine, based on image data of the eye pupil 130, that the eye pupil 130 is at a first position within the uncompressed eyebox 1250, the controller 260 may selectively control or configure the first out-coupling grating including the sub-gratings 1231-1, 1231-2, . . . , 1231-$n$ to operate in the diffraction state, and selectively control or configure the second out-coupling grating including the sub-gratings 1232-1, 1232-2, . . . , 1232-$n$ and the third out-coupling grating including the sub-gratings 1233-1, 1233-2, . . . , 1233-$n$ to operate in the non-diffraction state. The first out-coupling grating (including 1231-1, 1231-2, . . . , 1231-$n$) operating in the diffraction state may couple, via diffraction, the image light 1220 out of the waveguide 1201 as the image light 1225. The first out-coupling grating may direct and concentrate the image light 1225 to propagate through a first sub-eyebox of the uncompressed eyebox 1250. The first sub-eyebox may form a compressed eyebox 1255. The location of the compressed eyebox 1255 may correspond to the location of the eye pupil 130. The second out-coupling grating (including 1232-1, 1232-2, . . . , 1232-$n$) and the third out-coupling grating (including 1233-1, 1233-2, . . . , 1233-$n$) operating in the non-diffraction state may function as substantially optically uniform plates for the image light 1220. The second out-coupling grating and the third out-coupling grating may maintain the TIR path of the image light 1220 inside the waveguide 1201. The size and location of the compressed eyebox 1255 may be maintained for a first time period until a change in the eye tracking information of the eye pupil 130 is detected.

Referring to FIG. 12B, at a second time instance, the eye tracking system 270 or the controller 260 may detect or determine, based on image data of the eye pupil 130 acquired by the optical sensor 265, that the eye pupil 130 is moving to or has moved to a second position within the uncompressed eyebox 1250. Based on the newly acquired position information of the eye pupil 130, the controller 260 may selectively control or configure the second out-coupling grating (including 1232-1, 1232-2, . . . , 1232-*n*) to operate in the diffraction state, and selectively control or configure the first out-coupling grating (including 1231-1, 1231-2, . . . , 1231-*n*) and the third out-coupling grating (including 1233-1, 1233-2, . . . , 1233-*n*) to operate in the non-diffraction state. For example, the controller 260 may switch the first out-coupling grating from the diffraction state to the non-diffraction state, switch the second out-coupling grating from the non-diffraction state to the diffraction state, and maintain the non-diffraction state of the third out-coupling grating. The second out-coupling grating operating in the diffraction state may couple, via diffraction, the image light 1220 out of the waveguide 1201 as an image light 1226. The second out-coupling grating may concentrate the image light 1226 to a second sub-eyebox of the uncompressed eyebox 1250. The second sub-eyebox may form the compressed eyebox 1255. The second sub-eyebox at the second time instance may be different from the first sub-eyebox at the first time instance shown in FIG. 12A.

The location of the compressed eyebox 1255 may correspond to the new location of the eye pupil 130. The first out-coupling grating and the third out-coupling grating operating in the non-diffraction state may function as substantially optically uniform plates for the image light 1220. The first out-coupling grating and the third out-coupling grating may maintain the TIR path of the image light 1220 inside the waveguide 1201. The size and location of the compressed eyebox 1255 may be maintained for a second time period until a change in the eye tracking information of the eye pupil 130 is detected.

Referring to FIG. 12C, at a third time instance, the eye tracking system 270 or the controller 260 may detect or determine, based on image data of the eye pupil 130 acquired by the optical sensor 265, that the eye pupil 130 is moving to or has moved to a third position within the uncompressed eyebox 1250. Based on the position information of the eye pupil 130, the controller 260 may selectively control or configure the third out-coupling grating including (1233-1, 1233-2, . . . , 1233-*n*) to operate in the diffraction state, and selectively control or configure the second out-coupling grating (including 1232-1, 1232-2, . . . , 1232-*n*) and the first out-coupling grating (including 1231-1, 1231-2, . . . , 1231-*n*) to operate in the non-diffraction state. For example, the controller 260 may switch the second out-coupling grating from the diffraction state to the non-diffraction state, switch the third out-coupling grating from the non-diffraction state to the diffraction state, and maintain the non-diffraction state of the first out-coupling grating. The third out-coupling grating operating in the diffraction state may couple the image light 1220 out of the waveguide 1201 as an image light 1227. The third out-coupling grating may concentrate, via diffraction, the image light 1227 to propagate through a third sub-eyebox of the uncompressed eyebox 1250. The third sub-eyebox may be different from the second sub-eyebox at the second time instance. The third sub-eyeboxes may form the compressed eyebox 1255. The location of the compressed eyebox 1255 may correspond to the new location of the eye pupil 130.

The first out-coupling grating and the second out-coupling grating operating in the non-diffraction state may function as substantially optically uniform plates for the image light 1220. The first out-coupling grating and the second out-coupling grating may maintain the TIR path of the image light 1220 inside the waveguide 1201. The size and location of the compressed eyebox 1255 may be maintained for a third time period until a change in the eye tracking information of the eye pupil 130 is detected.

In some embodiments, the image light 1225, 1226, or 1227 propagating through the compressed eyebox 1255 may have an FOV that is substantially the same as the FOV of the image light propagating through the uncompressed eyebox 1250. As a result, the image content delivered to the compressed eyebox 1255 may be substantially the same as the image content delivered to the uncompressed eyebox 1250. In some embodiments, the image light 1225, 1226, or 1227 may have an FOV that is substantially the same as the FOV of the image light generated by the light source assembly. As a result, the eye of the user may perceive the full content of an image generated by the light source assembly 211.

For illustrative purposes, FIGS. 12A-12C show that at each time instance, one of the first, second, and third out-coupling gratings is selectively controlled or configured to operate in the diffraction state, and the remaining one or more out-coupling gratings are selectively controlled or configured to operate in the non-diffraction state. That is, at each time instance, the image light 1220 may be directed and concentrated to a compressed eyebox formed by a single sub-eyebox. In some embodiments, two or more out-coupling gratings included in the out-coupling element 1235 (hence two or more combinations of gratings from the in-coupling element and the out-coupling element 1235) may be selectively controlled or configured to operate in the diffraction state at the same time (e.g., simultaneously), or sequentially, to direct and concentrate, the image light 1220 to two or more neighboring (or adjacent) sub-eyeboxes, which form the compressed eyebox. The light intensity in the two or more sub-eyeboxes may be substantially the same, or may be different.

Although the out-coupling element 1235 is shown in FIGS. 12A-12C as including directly switchable out-coupling gratings, in some embodiments, the out-coupling element 1235 may include indirectly switchable out-coupling gratings arranged in the grating array. In such embodiments, an array of polarization switches (e.g., polarization switches 970) may be coupled with the out-coupling element 1235. In some embodiments, a polarization switch may correspond to an indirectly switchable out-coupling grating (or a sub-grating) for controlling a polarization of an incident light of the out-coupling grating (or sub-grating). In such embodiments, the power source 1180 may provide voltages to the polarization switches for controlling the switching state or non-switching state of the polarization switches. In some embodiments, the out-coupling element 1235 may include at least one directly switchable out-coupling grating and at least one non-switchable out-coupling grating arranged in the interleaved configuration.

In some embodiments, two or more out-coupling elements each having an interleaved configuration of out-coupling gratings (similar to the configuration of the out-coupling element 1235) may be included in the optical system 1200, similar to the configuration shown in FIG. 6D.

The two or more out-coupling elements may be stacked together and disposed at a same surface of the waveguide 1201, or may be disposed at different surfaces of the waveguide 1201. The two or more out-coupling elements may include directly switchable out-coupling gratings, or indirectly switchable out-coupling gratings, or both. When indirectly switchable out-coupling gratings are included, one or more polarization switches arranged in an interleaved configuration may be coupled with the corresponding out-coupling element.

FIGS. 13A-13D illustrate schematic diagrams of an optical system 1300 configured to provide a compressed eyebox at different time instances, according to an embodiment of the present disclosure. The optical system 1300 may be an embodiment of any of the disclosed optical systems, such as those shown in other figures. The optical system 1300 may include elements similar to those included in other optical systems disclosed herein, such as the optical system 200, 1100, or 1200. Features shown in other figures, even if not explicitly described below for the simplicity of discussion, may also be applicable to the embodiment shown in FIGS. 13A-13D. Descriptions of the same or similar elements can refer to the above descriptions, including those rendered in connection with FIGS. 2A-12C.

The optical system 1300 may be configured to provide a 2D pupil expansion (or pupil replication) and eyebox compression. The optical system 1300 may include a waveguide 1310. Detailed descriptions of the waveguide 1310 can refer to descriptions of other waveguides provided above. An in-coupling element 1331 may be disposed at a surface of the waveguide 1310, and configured to couple an image light with a predetermined FOV received from a light source assembly (not shown) into the waveguide 1310. The in-coupling element 1331 may include an in-coupling grating set (which is also referred to as 1331 for discussion purposes). The in-coupling grating set 1331 may include one or more in-coupling gratings. The in-coupling gratings included in the in-coupling grating set 1331 may include all switchable gratings, all non-switchable gratings, or a combination of at least one switchable grating and at least one non-switchable grating. The switchable grating may be directly switchable (e.g., as shown in FIGS. 8A and 8B) or indirectly switchable (e.g., as shown in FIGS. 9A-10D). When indirectly switchable gratings are included, one or more polarization switches may be coupled with the in-coupling element 1331. In some embodiments, the in-coupling grating set 1331 may include a stack of in-coupling gratings arranged in a suitable configuration, such as one shown in FIGS. 6A-6D.

The configuration shown in FIGS. 13A-13D for providing a compressed eyebox and 2D pupil expansion may be applicable to any other optical systems disclosed herein, including, but not limited to, the optical systems shown in FIGS. 11A-11C, 12A-12C, 14A, 14B, 15A-15C, and 16A-16C. In those optical systems, for the simplicity of illustration, a redirecting element is not shown, which may be included. Alternatively, the directing functions may be included in the out-coupling element(s) included in those optical systems. Thus, 2D pupil expansion is also provided in other optical systems disclosed herein.

An out-coupling element 1335 may be disposed at a surface of the waveguide 1310. The out-coupling element 1335 may include an out-coupling grating set (which is also referred to as 1335 for discussion purposes). The out-coupling grating set 1335 may include one or more out-coupling gratings. The out-coupling gratings of the out-coupling grating set 1335 may include all switchable gratings, all non-switchable gratings, or at least one switchable grating and at least one non-switchable grating. Two out-coupling gratings 1335*b* and 1335*d* are shown for illustrative purposes. The number of out-coupling gratings is not limited to two, which may be one, three, four, five, six, etc. For discussion purposes, the two out-coupling gratings 1335*b* and 1335*d* are presumed to be switchable gratings. The switchable gratings may be directly switchable (e.g., as shown in FIGS. 8A and 8B) or indirectly switchable (e.g., as shown in FIGS. 9A-10D). When indirectly switchable gratings are included, one or more polarization switches may be coupled with the out-coupling grating set 1335. In some embodiments, the out-coupling grating set 1335 may include a stack of switchable out-coupling gratings arranged in a suitable configuration, such as one shown in FIGS. 6A-6D.

A redirecting element (or folding element) 1333 may be disposed at a surface of the waveguide 1310. In some embodiments, the functions of the redirecting element may be included in the out-coupling element 1335, and the redirecting element 1333 may be omitted. The redirecting element 1333 may include a redirecting/folding grating set (which is also referred to as 1333 for discussion purposes). The redirecting/folding grating set 1333 may include one or more redirecting/folding gratings. The folding gratings of the folding element 1333 may include all switchable gratings, all non-switchable gratings, or at least one switchable grating and at least one non-switchable grating. Two folding gratings 1333*a* and 1333*c* are shown for illustrative purposes. The number of the folding gratings in the redirecting/folding grating set 1333 is not limited to two, which may be one, three, four, five, six, etc. For discussion purposes, the two folding gratings 1333*a* and 1333*c* are presumed to be switchable gratings. The switchable grating may be directly switchable (e.g., as shown in FIGS. 8A and 8B) or indirectly switchable (e.g., as shown in FIGS. 9A-10D). When indirectly switchable gratings are included, one or more polarization switches may be coupled with the redirecting/folding grating set 1333. In some embodiments, the redirecting/folding grating set 1333 may include a stack of switchable gratings arranged in a suitable configuration, such as one shown in FIGS. 6A-6D.

The optical system 1300 shown in FIGS. 13A-13D may be configured to provide a 2D eyebox compression. In the embodiment shown in FIGS. 13A-13D, the redirecting element 1333 may be configured to provide a pupil expansion (e.g., by directing an image light to sub-eyeboxes) in a first direction (e.g., the x-axis direction). The redirecting element 1333 may redirect the image light propagating inside the waveguide 1310 in a first propagating direction to a second propagating direction different from the first propagating direction (e.g., orthogonal to the first propagating direction). The out-coupling element 1335 may be configured to provide a pupil expansion (e.g., by directing an image light to sub-eyeboxes) in a second direction (e.g., the y-axis direction) perpendicular to the first direction. In some embodiments, at least one (e.g., each) of the gratings 1333*a*, 1333*c*, 1335*b*, or 1335*d* may be a directly switchable grating that is directly switchable by an external field (e.g., electric field). In some embodiments, at least one (e.g., each) of the gratings 1333*a*, 1333*c*, 1335*b*, or 1335*d* may be an indirectly switchable grating that is indirectly switchable by a polarization switch disposed at a light incidence side of the grating. For discussion purposes, the gratings 1333*a*, 1333*c*, 1335*b*, and 1335*d* shown in FIGS. 13A-13D are presumed to be directly switchable gratings. A power source for supplying an electric field to the directly switchable gratings is not shown in FIGS. 13A-13D. In some embodiments, the folding grating 1333*a* of the redirecting element 1333 and the out-coupling grating 1335*b* of the out-coupling element 1335 may be disposed at a first layer (e.g., a first surface) of the waveguide 1310. The folding grating 1333*c* of the redirecting element 1333 and the out-coupling grating 1335*d* of the out-coupling element 1335 may be disposed at a second layer (e.g., a second surface) of the waveguide 1310. Other configurations of the gratings 1333*a*, 1333*c*, 1335*b*, and 1335*d* may be used.

Figure 13B:
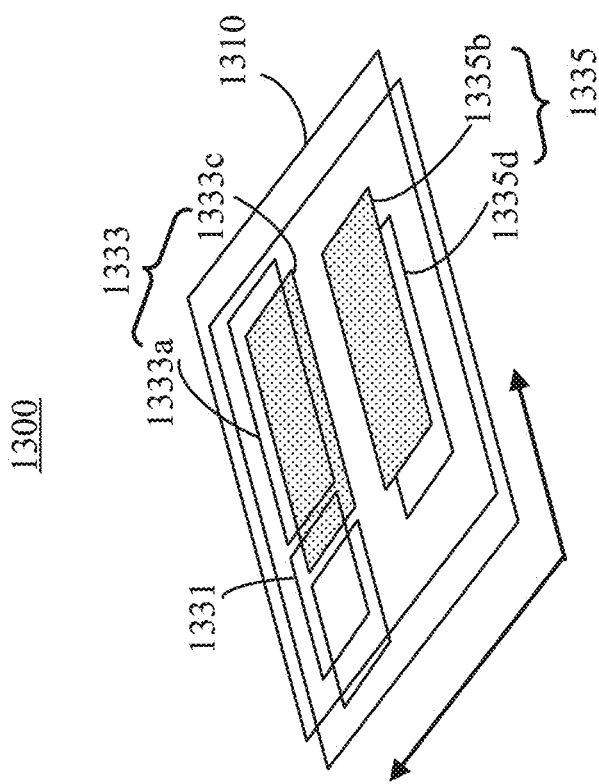
FIGS. 13A-13D illustrate schematic diagrams of an optical system configured to provide a compressed eyebox, according to another embodiment of the present disclosure.
Figure 13B:
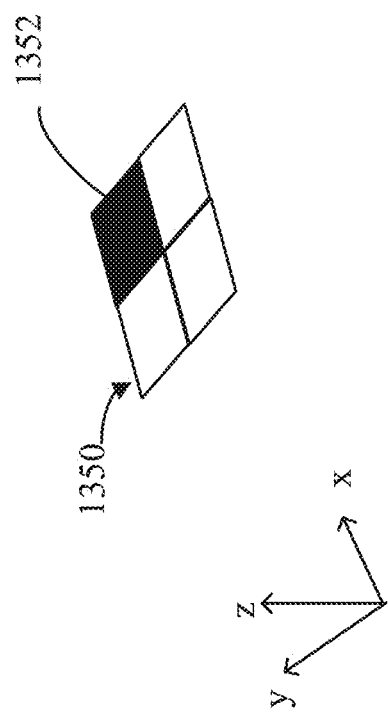
Figure 13A:
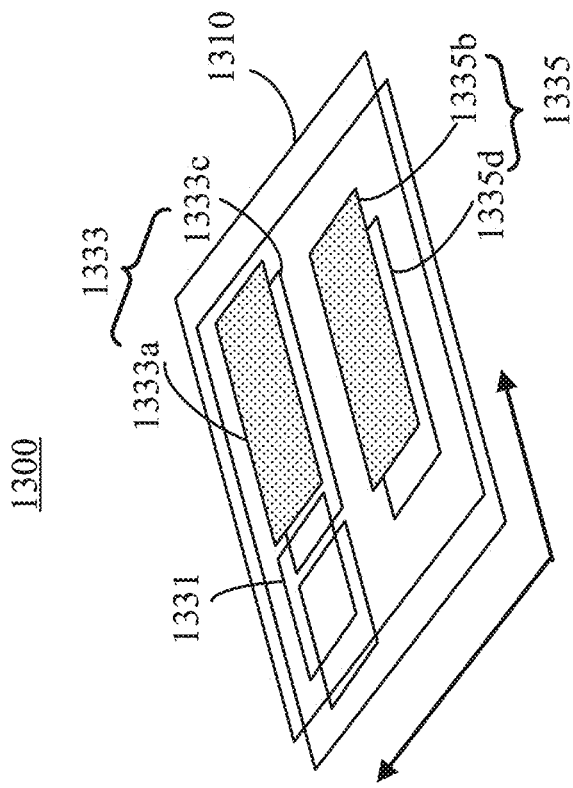
Figure 13A:
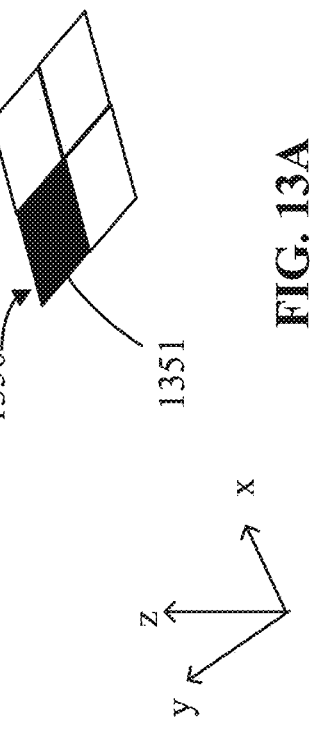

As shown in FIGS. 13A-13D, different combinations of the gratings 1333*a*, 1333*c*, 1335*b*, and 1335*d* may be activated to provide a plurality of sub-eyeboxes. When all of the plurality of sub-eyeboxes are activated, they form an uncompressed eyebox 1350. For discussion purposes, the in-coupling element 1331 is presumed to include a single in-coupling grating, which is included in all different combinations of gratings. In some embodiments, as shown in FIG. 13A, at a first time instance, the eye tracking system 270 or the controller 260 (not shown in FIG. 13A) may detect or determine, based on image data of the eye pupil (not shown), that the eye pupil is at a first position. Based on the position information of the eye pupil, the controller 260 may selectively control or configure a combination of gratings including the folding grating 1333*a* of the redirecting element 1333 and the out-coupling grating 1335*b* of the out-coupling element 1335 to operate in the diffraction state, and selectively control or configure the remaining gratings including the folding grating 1333*c* of the redirecting element 1333 and the out-coupling grating 1335*d* of the out-coupling element 1335 to operate in the non-diffraction state. Thus, the image light propagating inside the waveguide 1310 through TIR may be out-coupled, by the gratings 1333*a* and 1335*b*, from the waveguide 1310 to propagate through a sub-eyebox of the uncompressed eyebox 1350. The sub-eyebox may form a compressed eyebox 1351 corresponding to the first position of the eye pupil. The size and/or location of the compressed eyebox 1351 may be maintained for a first time period until a change in the eye tracking information of the eye pupil is detected by the eye tracking system 270 or the controller 260 (e.g., a change in the size of the eye pupil, a change in the position of the eye pupil, a change in the moving direction of the eye pupil, and/or a change in the viewing direction of the eye pupil).

As shown in FIG. 13B, at a second time instance, the eye tracking system 270 or the controller 260 may detect or determine, based on currently acquired image data of the eye pupil, that the eye pupil is moving to or has moved to a second position within the uncompressed eyebox 1350. The controller 260 may selectively control or configure a combination of gratings including the folding grating 1333*c* of the redirecting element 1333 and the out-coupling grating 1335*b* of the out-coupling element 1335 to operate in the diffraction state, and selectively control or configure the remaining gratings including the folding grating 1333*a* of the redirecting element 1333 and the out-coupling grating 1335*d* of the out-coupling element 1335 to operate in the non-diffraction state. Thus, the image light propagating inside the waveguide 1310 through TIR may be out-coupled, by the gratings 1333*c* and 1335*b*, from the waveguide 1310 by the gratings 1333*c* and 1335*b* to propagate through a second sub-eyebox of the uncompressed eyebox 1350. The second eyebox may form the compressed eyebox 1352 corresponding to the second position of the eye pupil. The size and/or location of the compressed eyebox 1352 may be maintained for a second time period until a change in the eye tracking information of the eye pupil is detected by the eye tracking system 270 or the controller 260.

Figure 13D:
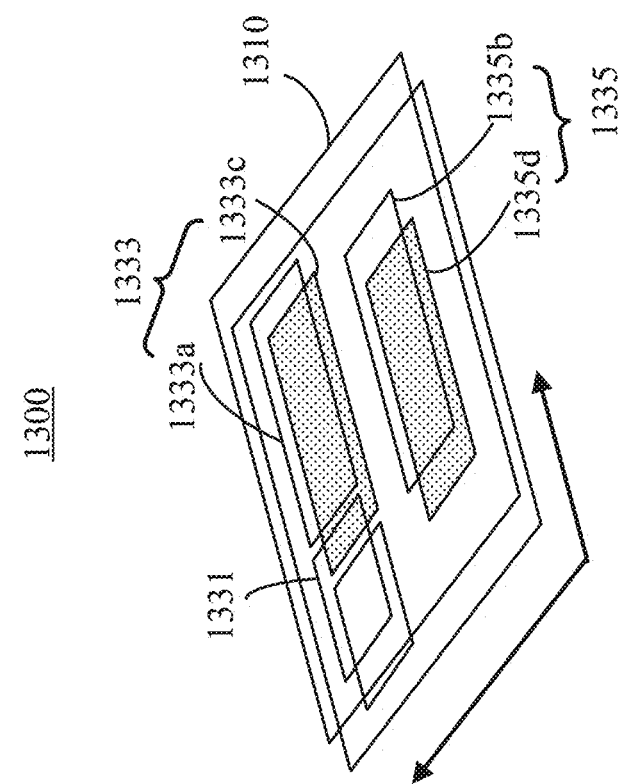
Figure 13D:
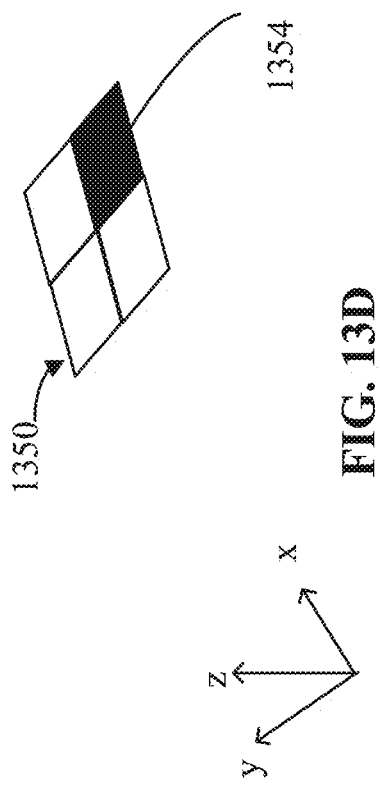
Figure 13C:
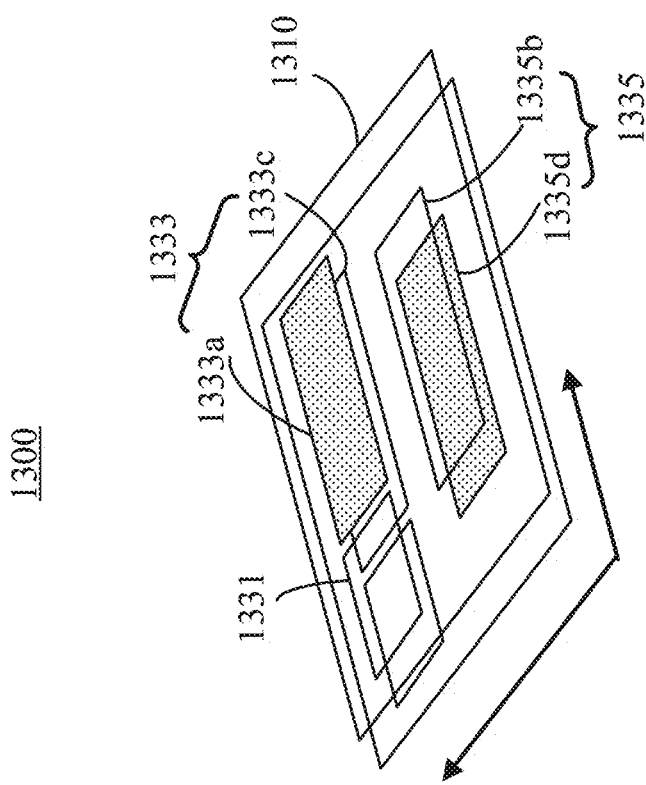

As shown in FIG. 13C, at a third time instance, the eye tracking system 270 or the controller 260 may detect or determine, based on currently acquired image data of the eye pupil, that the eye pupil is moving to or has moved to a third position within the uncompressed eyebox 1350. The controller 260 may selectively control or configure a combination of gratings including the folding grating 1333*a* of the redirecting element 1333 and the out-coupling grating 1335*d* of the out-coupling element 1335 to operate in the diffraction state, and selectively control or configure the remaining gratings including the folding grating 1333*c* of the redirecting element 1333 and the out-coupling grating 1335*b* of the out-coupling element 1335 to operate in the non-diffraction state. Thus, the image light propagating inside the waveguide 1310 through TIR may be out-coupled, by the gratings 1333*a* and 1335*d*, from the waveguide 1310 to propagate through a third sub-eyebox of the uncompressed eyebox 1350. The third sub-eyebox may form a compressed eyebox 1353 corresponding to the third position of the eye pupil. The size and/or location of the compressed eyebox 1353 may be maintained for a third time period until a change in the eye tracking information of the eye pupil is detected by the eye tracking system 270 or the controller 260.

As shown in FIG. 13D, at a fourth time instance, the eye tracking system 270 or the controller 260 may detect or determine, based on currently acquired image data of the eye pupil, that the eye pupil is moving to or has moved to a fourth position within the uncompressed eyebox 1350. The controller 260 may selectively control or configure a combination of gratings including the folding grating 1333*c* of the redirecting element 1333 and the out-coupling grating 1335*d* of the out-coupling element 1335 to operate in the diffraction state, and selectively control or configure the remaining gratings including the folding grating 1333*a* of the redirecting element 1333 and the out-coupling grating 1335*b* of the out-coupling element 1335 to operate in the non-diffraction state. Thus, the image light propagating inside the waveguide 1310 through TIR may be out-coupled, by the gratings 1333*c* and 1335*d*, from the waveguide 1310 to propagate through a fourth sub-eyebox of the uncompressed eyebox 1350. The fourth sub-eyebox may form a compressed eyebox 1354 corresponding to the fourth position of the eye pupil. The size, shape, and/or location of the compressed eyebox 1354 may be maintained for a fourth time period until a change in the eye tracking information of the eye pupil is detected by the eye tracking system 270 or the controller 260.

In some embodiments, the image light propagating through the compressed eyebox 1351, 1352, 1353, or 1354 may have an FOV that is substantially the same as the FOV of the image light propagating through the uncompressed eyebox 1350. As a result, the image content delivered to the compressed eyebox 1351, 1352, 1353, or 1354 may be substantially the same as the image content delivered to the uncompressed eyebox 1350. In some embodiments, the image light propagating through the compressed eyebox 1351, 1352, 1353, or 1354 may have an FOV that is substantially the same as the FOV of the image light generated by the light source assembly. As a result, the eye of the user may perceive the full content of an image generated by the light source assembly 211.

For illustrative purposed, FIGS. 13A-13D show that at each time instance, a combination of gratings including one folding grating in the redirecting element 1333 and one out-coupling grating in the out-coupling element 1335 is configured to operate in the diffraction state, and the remaining gratings (or combinations of gratings) included in the redirecting element 1333 and out-coupling element 1335 are configured to operate in the non-diffraction state. That is, at each time instance, a combination of gratings operating in the diffraction state may couple the image light out of the waveguide 1310, and direct and concentrate the out-coupled image light to a compressed eyebox that includes a single sub-eyebox. In some embodiments, more than one folding grating may be selected from the redirecting element 1333 and/or more than one out-coupling grating may be selected from the out-coupling element 1335 to form two or more combinations of gratings. The two or more combinations of gratings may be configured to operate in the diffraction state at the same time (e.g., simultaneously), or sequentially (e.g., during overlapping time periods) to direct the image light to two or more sub-eyeboxes. The compressed eyebox may be formed by the two or more sub-eyeboxes. The size and/or location of the compressed eyebox may be dynamically changed by the controller 260 based on currently acquired image data of the eye pupil (or currently acquired eye tracking information of the eye pupil).

Figure 14A:
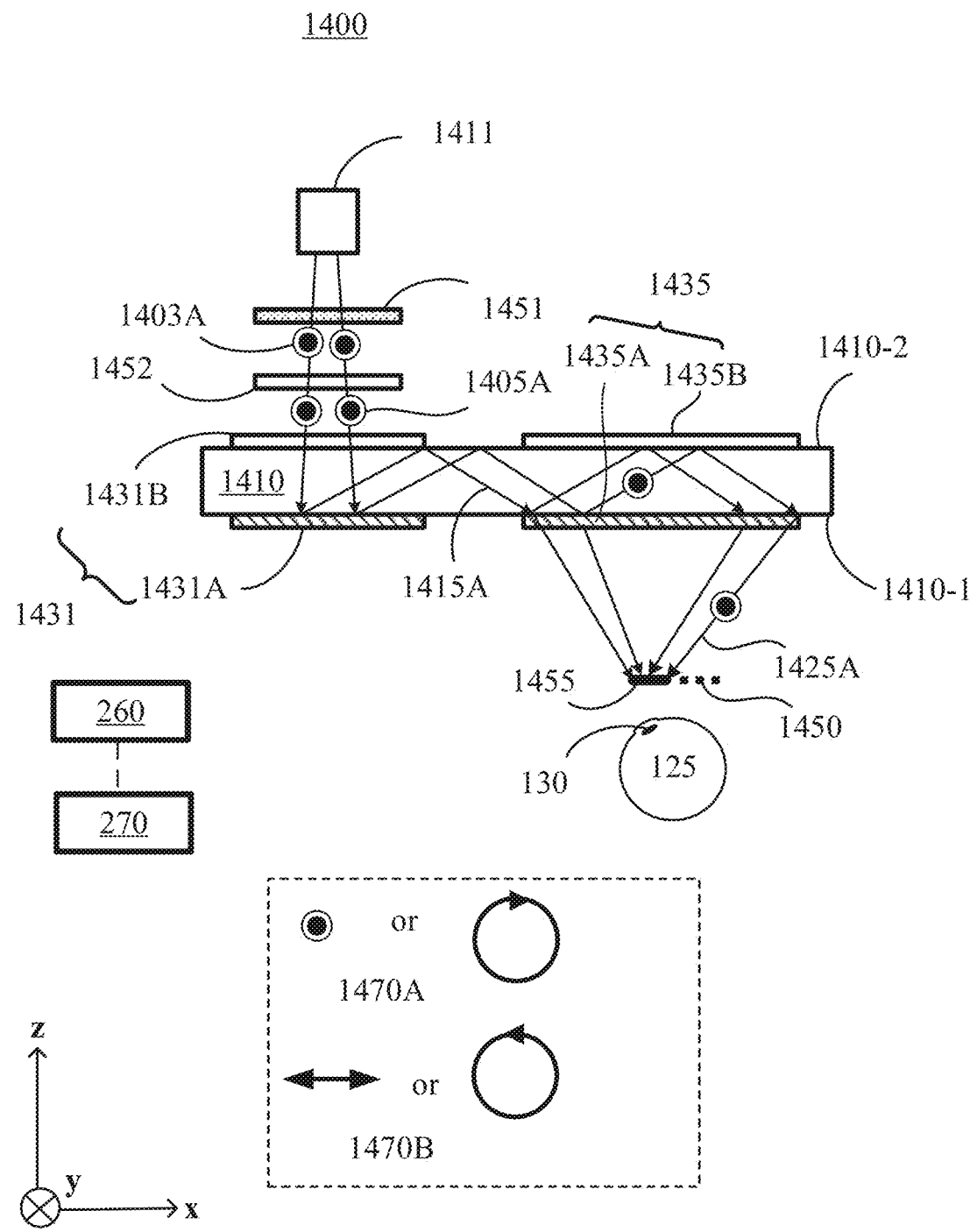
FIGS. 14A and 14B illustrate schematic diagrams of an optical system configured to provide a compressed eyebox, according to another embodiment of the present disclosure.
Figure 14B:
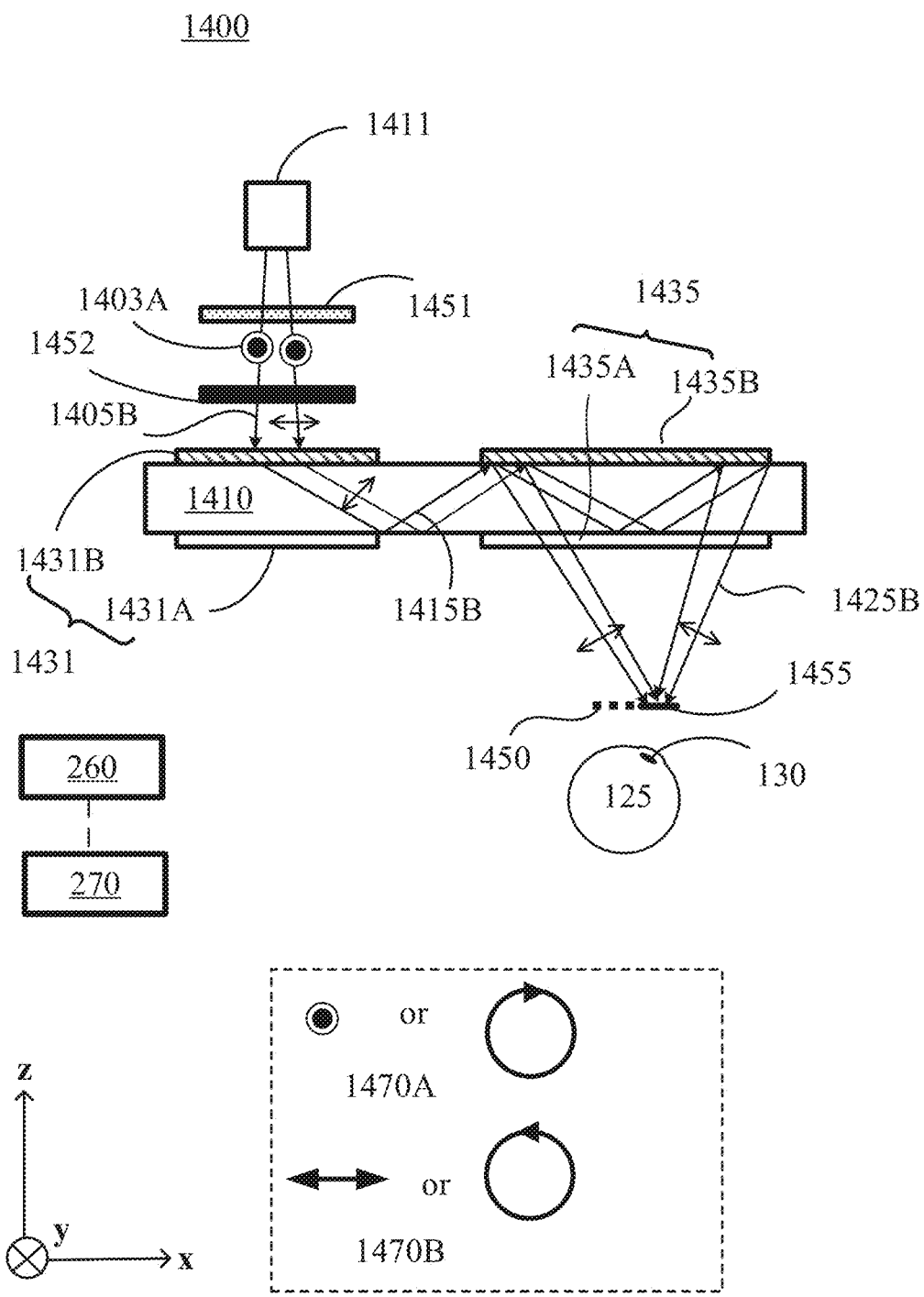

FIGS. 14A and 14B illustrate schematic diagrams of an optical system 1400 configured to provide a compressed eyebox at different time instances, according to an embodiment of the present disclosure. The optical system 1400 may include elements that are similar to or the same as those included in other optical systems disclosed herein, such as the optical system 200, 1100, 1200, or 1300. Features shown in other figures, even if not explicitly described below for the simplicity of discussion, may also be applicable to the embodiment shown in FIGS. 14A and 14B. Descriptions of the same or similar elements can refer to the above descriptions, including those rendered in connection with FIGS. 2A-13D. For example, the optical system 1400 may include the eye tracking system 270, the controller 260, and a waveguide 1410.

The waveguide 1410 may include an in-coupling element 1431 including an in-coupling grating set (also referred to as 1431 for discussion purposes). The in-coupling grating set 1431 may include one or more in-coupling gratings. For discussion purposes, each in-coupling grating is presumed to be an indirectly switchable grating. Each indirectly switchable grating may be an indirectly switchable grating shown in FIGS. 9A-10D. For example, the in-coupling grating set 1431 may include a first in-coupling grating 1431A and a second in-coupling grating 1431B. At least one (e.g., each) of the first grating 1431A and the second grating 1431B may be an indirectly switchable grating. In some embodiments, the first in-coupling grating 1431A may be disposed at a first surface 1410-1 of the waveguide 1410, and the second in-coupling grating 1431B may be disposed at a second surface 1410-2 of the waveguide 1410, as shown in FIG. 14A. In some embodiments, the first in-coupling grating 1431A and the second in-coupling grating 1431B may be stacked together and disposed at a same surface (e.g., the first surface 1410-1 or the second surface 1410-2) of the waveguide 1410.

The waveguide 1410 may include an out-coupling element 1435 including an out-coupling grating set (also referred to as 1435 for discussion purposes). The out-coupling grating set 1435 may include one or more out-coupling gratings. At least one (e.g., each) of the out-coupling gratings may be an indirectly switchable grating. Each indirectly switchable grating may be an indirectly switchable gratings shown in FIGS. 9A-10D. For example, the out-coupling grating set 1435 may include a first out-coupling grating 1435A and a second out-coupling grating 1435B. At least one (e.g., each) of the first out-coupling grating 1435A and the second out-coupling grating 1435B may be an indirectly switchable grating. The first out-coupling grating 1435A may be disposed at the first surface 1410-1 of the waveguide 1410, and the second out-coupling grating 1435B may be disposed at the second surface 1410-2 of the waveguide 1410, as shown in FIG. 14A. In some embodiments, the first out-coupling grating 1435A and the second out-coupling grating 1435B may be stacked together and disposed at the same surface (e.g., the first surface 1410-1 or the second surface 1410-2) of the waveguide 1410.

In some embodiments, the in-coupling grating set 1431 may include one in-coupling grating, such as 1431A or 1431B, or may include additional gratings. The additional in-coupling gratings may be stacked with the in-coupling gratings 1431A and/or 1431B. In some embodiments, the out-coupling element 1435 may include one out-coupling grating, such as 1435A or 1435B, or may include additional out-coupling gratings. The additional out-coupling gratings may be stacked with the out-coupling gratings 1435A and/or 1435B. In some embodiments, one or more redirecting (or folding) element (not shown) may be included in the optical system 1400.

The in-coupling gratings 1431A and 1431B of the in-coupling element 1431 may be configured to diffract image lights having different polarizations, respectively, e.g., orthogonal linear polarizations, or circular polarizations with opposite handednesses. For example, when an incident light has a first polarization 1470A, the in-coupling grating 1431A may operate in the diffraction state for the incident light having the first polarization 1470A, and the in-coupling grating 1431B may operate in the non-diffraction state for the incident light having the first polarization 1470A. When an incident light has a second polarization 1470B (orthogonal to the first polarization 1470A, or having a handedness opposite to the handedness of the first polarization 1470A), the in-coupling grating 1431A may operate in the non-diffraction state for the incident light having the second polarization 1470B, and the in-coupling grating 1431B may operate in the diffraction state for the incident light having the second polarization 1470B. The out-coupling gratings 1435A and 1435B of the out-coupling element 1435 may be configured to diffract image lights having different polarizations, respectively, e.g., orthogonal linear polarizations, or circular polarizations with opposite handednesses. For example, when an incident light has the first polarization 1470A, the out-coupling grating 1435A may operate in the diffraction state for the incident light having the first polarization 1470A, and the out-coupling grating 1435B may operate in the non-diffraction state for the incident light having the first polarization 1470A. When an incident light has the second polarization 1470B (orthogonal to the first polarization, or having a handedness opposite to the handedness of the first polarization), the out-coupling grating 1435A may operate in the non-diffraction state for the incident light having the second polarization 1470B, and the out-coupling grating 1435B may operate in the diffraction state for the incident light having the second polarization 1470B.

For discussion and illustrative purposes, the in-coupling grating 1431A of the in-coupling element 1431 and the out-coupling grating 1435A of the out-coupling element 1435 are presumed to have the same polarization sensitivity (or selectivity), and the in-coupling grating 1431B of the in-coupling element 1431 and the out-coupling grating 1435B of the out-coupling element 1435 are presumed to have the same polarization sensitivity (or selectivity). The operating state (diffraction state or non-diffraction state) of the in-coupling element 1431 and the out-coupling element 1435 may be controlled by the controller 260 controlling a polarization switch 1452 disposed at a light incidence side of the in-coupling element 1431. That is, the indirectly switchable in-coupling element 1431 and the out-coupling element 1435 may be switched to operate in the diffraction state or in a non-diffraction state by switching the polarization of the incident light of the in-coupling element 1431 (and hence the polarization of the incident light of the out-coupling element 1435). The controller 260 may control the operation state of the polarization switch 1452, i.e., a switching state to switch a polarization of an incident light or a non-switching state to transmit the incident light without affecting the polarization.

The optical system 1400 may include a light source assembly 1411. The controller 260 may control or configure the light source assembly 1411 to emit an unpolarized image light. The optical system 1400 may include a polarizer 1451 disposed between the light source assembly 1411 and the waveguide 1410. The polarizer 1451 may be configured to convert the unpolarized image light emitted by the light source assembly 1411 into a polarized image light 1403A having one of the first polarization 1470A or the second polarization 1470B, depending on the transmission axis of the polarizer 1451. For illustrative and discussion purposes, the image light 1403A is presumed to have the first polarization 1470A. The image light 1403A may have a predetermined FOV that may be substantially the same as the FOV of the image light emitted by the light source assembly 1411.

The optical system 1400 may also include a polarization switch 1452 disposed between the polarizer 1451 and the waveguide 1410. The polarization switch 1452 is disposed at a light incidence side of the in-coupling element 1431. The polarization switch 1452 may be an embodiment of any polarization switch disclosed herein, such as the polarization switch 970 shown in FIG. 9A and FIG. 9B, or the polarization switch 1020 shown in FIGS. 10A-10D. The controller 260 may control a power source (not shown) electrically connected with electrodes of the polarization switch 1452 for providing an electric field to the polarization switch 1452. The controller 260 may control the voltage supplied by the power source to the polarization switch 1452, thereby controlling the polarization switch 1452 to operate in the switching state or the non-switching state. By controlling the operating state (switching state or non-switching state) of the polarization switch 1452, the controller 260 may indirectly control a polarization of an image light incident onto the in-coupling element 1431 (and hence the polarization of the image light incident onto the out-coupling element 1435). Accordingly, the controller 260 may control the operating state (diffraction state or non-diffraction state) of the gratings included in the in-coupling element 1431 and the out-coupling element 1435. The controller 260 may be electrically coupled (e.g., through wired or wireless connections) with the light source assembly 1411 and the polarization switch 1452 (e.g., a power source coupled with the polarization switch 1452). The wired or wireless electrical connections and communications between the controller 260 and other elements are not shown in FIG. 14A and FIG. 14B for the simplicity of illustration.

For discussion purposes, in FIGS. 14A and 14B, the polarizer 1451 is presumed to be a linear polarizer configured to convert the unpolarized image light into the linearly polarized image light 1403A having the first polarization 1470A (e.g., a linear polarization in the y-axis direction). At a first time instance, as shown in FIG. 14A, the eye tracking system 270 or the controller 260 may detect or determine, based on image data of the eye pupil 130, that the eye pupil 130 is located at a first location within the uncompressed eyebox 1450. The controller 260 may control the polarization switch 1452 to operate in the non-switching state. As a result, the image light 1403A having the first polarization 1470A may transmit through the polarization switch 1452 as an image light 1405A having the first polarization 1470A. The image light 1405A may have the same FOV as the image light 1403A. Because the in-coupling grating 1431A and the out-coupling grating 1435A are configured to diffract an image light having the first polarization 1470A, and the in-coupling grating 1431B and the out-coupling grating 1435B are configured to transmit an image light having the first polarization 1470A, the image light 1405A having the first polarization 1470A may transmit through the in-coupling grating 1431B and the waveguide 1410 toward the in-coupling grating 1431A. The in-coupling grating 1431A may couple the image light 1405A having the first polarization 1470A into the waveguide 1410 via diffraction. The in-coupled image light is denoted as an image light 1415A having the first polarization 1470A. In some embodiments, the image light 1415A may have an FOV that is substantially the same as the FOV of the image light 1405A. The image light 1415A having the first polarization may propagate inside the waveguide 1410 through TIR toward the out-coupling element 1435.

The out-coupling grating 1435B may function as an optically uniform plate for the image light 1415A having the first polarization 1470A that is incident onto the out-coupling grating 1435B. For example, the out-coupling grating 1435B may maintain the TIR path of the image light 1415A having the first polarization 1470A that is incident onto the out-coupling grating 1435B. The out-coupling grating 1435A may couple the image light 1415A having the first polarization 1470A out of the waveguide 1410 via diffraction. The out-coupled image light may be denoted as an image light 1425A having the first polarization 1470A. The out-coupling grating 1435A may direct and concentrate the image light 1425A toward a first sub-eyebox of an uncompressed eyebox 1450. The first sub-eyebox may form the compressed eyebox 1455 corresponding to the first location of the eye pupil 130. The location, shape, and/or size of the compressed eyebox 1455 may be maintained for a first time period until a change in the eye tracking information of the eye pupil 130 is detected by the eye tracking system 270 or the controller 260.

Referring to FIG. 14B, at a second time instance, the eye tracking system 270 or the controller 260 may detect or determine, based on image data relating to the eye pupil 130 captured by the optical sensor 265, that the eye pupil 130 is moving to or has moved to a second position. The controller 260 may control the polarization switch 1452 to operate in the switching state. The polarization switch 1452 may switch the polarization of the image light 1403A and output an image light 1405B having the second polarization 1470B. Because the in-coupling grating 1431B and the out-coupling grating 1435B are configured to operate in a diffraction state for an incident light having the second polarization 1470B, and the in-coupling grating 1431A and the out-coupling grating 1435A are configured to operate in the non-diffraction state for an incident light having the second polarization 1470B, the in-coupling grating 1431B may couple the image light 1405B having the second polarization 1470B into a TIR inside the waveguide 1410 via diffraction. The in-coupled image light is denoted as an image light 1415B having the second polarization 1470B. In some embodiments, the image light 1415B may have an FOV that is substantially the same as the FOV of the image light 1405B.

The in-coupling grating 1431A and the out-coupling grating 1435A may function as optically uniform plate for the image light 1415B having the second polarization 1470B. For example, the in-coupling grating 1431A and the out-coupling grating 1435A may maintain the TIR path of the image light 1415B having the second polarization 1470B incident onto the in-coupling grating 1431A and the out-coupling grating 1435A, respectively. The out-coupling grating 1435B may couple the image light 1415B having the second polarization 1470B out of the waveguide 1410 via diffraction. The out-coupled image light is denoted as an image light 1425B having the second polarization. The out-coupling grating 1435B may direct and concentrate the image light 1425B to propagate through a second sub-eyebox different from the first sub-eyebox at the first time instance. The out-coupling grating 1435A may transmit the image light 1425B having the second polarization 1470B incident onto the out-coupling grating 1435A toward the second sub-eyebox. The second sub-eyebox may form the compressed eyebox 1455 corresponding to the second location of the eye pupil 130. The location, shape, and/or size of the compressed eyebox 1455 may be maintained for a second time period until a change in the eye tracking information of the eye pupil 130 is detected by the eye tracking system 270 or the controller 260.

In the embodiment shown in FIGS. 14A and 14B, the eye pupil 130 may be dynamically monitored by the eye tracking system 270. The eye tracking information relating to the eye pupil 130 may be dynamically updated. When a change in the eye tracking information is detected, at least one of the location, shape, and/or size of the compressed eyebox 1455 may be changed based on the currently acquired eye tracking information. The controller 260 may control the polarization switch 1452 dynamically to change the polarization of the image light 1405A or 1405B, such that different combinations of the gratings from the in-coupling element 1431 and the out-coupling element 1435 may function together to guide the image light to the compressed eyebox 1455 at different locations and/or with different sizes.

In some embodiments, the image light 1425A or 1425B propagating through the compressed eyebox 1455 may have an FOV that is substantially the same as the FOV of the image light propagating through the uncompressed eyebox 1450. As a result, the image content delivered to the compressed eyebox 1455 may be substantially the same as the image content delivered to the uncompressed eyebox 1450. In some embodiments, the image light propagating through the compressed eyebox 1425A or 1425B propagating through the compressed eyebox 1455 may have an FOV that is substantially the same as the FOV of the image light generated by the light source assembly 1411. As a result, the eye of the user may perceive the full content of an image generated by the light source assembly 1411.

Figure 15A:
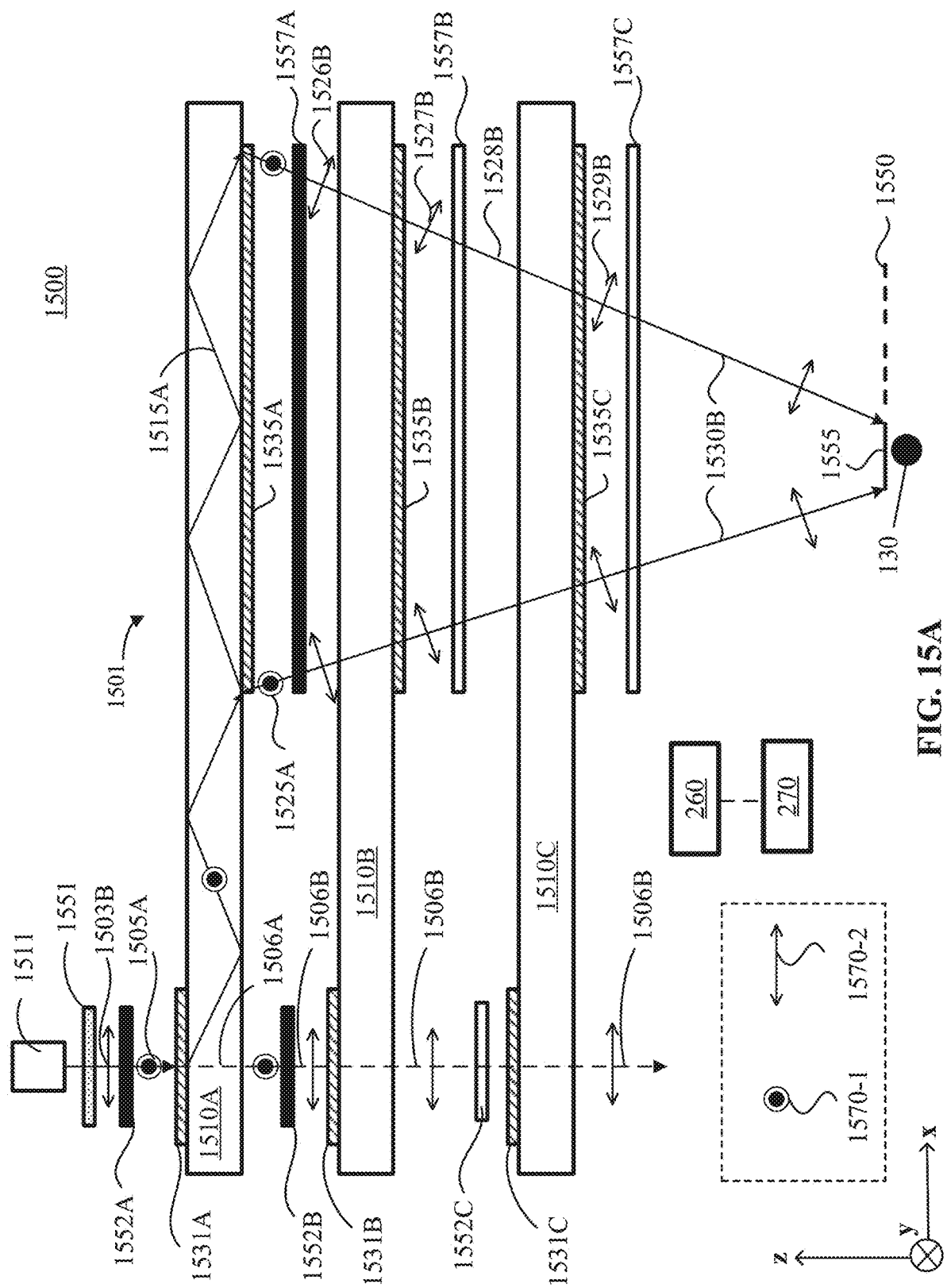
FIGS. 15A-15C illustrate schematic diagrams of an optical system configured to provide a compressed eyebox, according to another embodiment of the present disclosure.
Figure 15B:
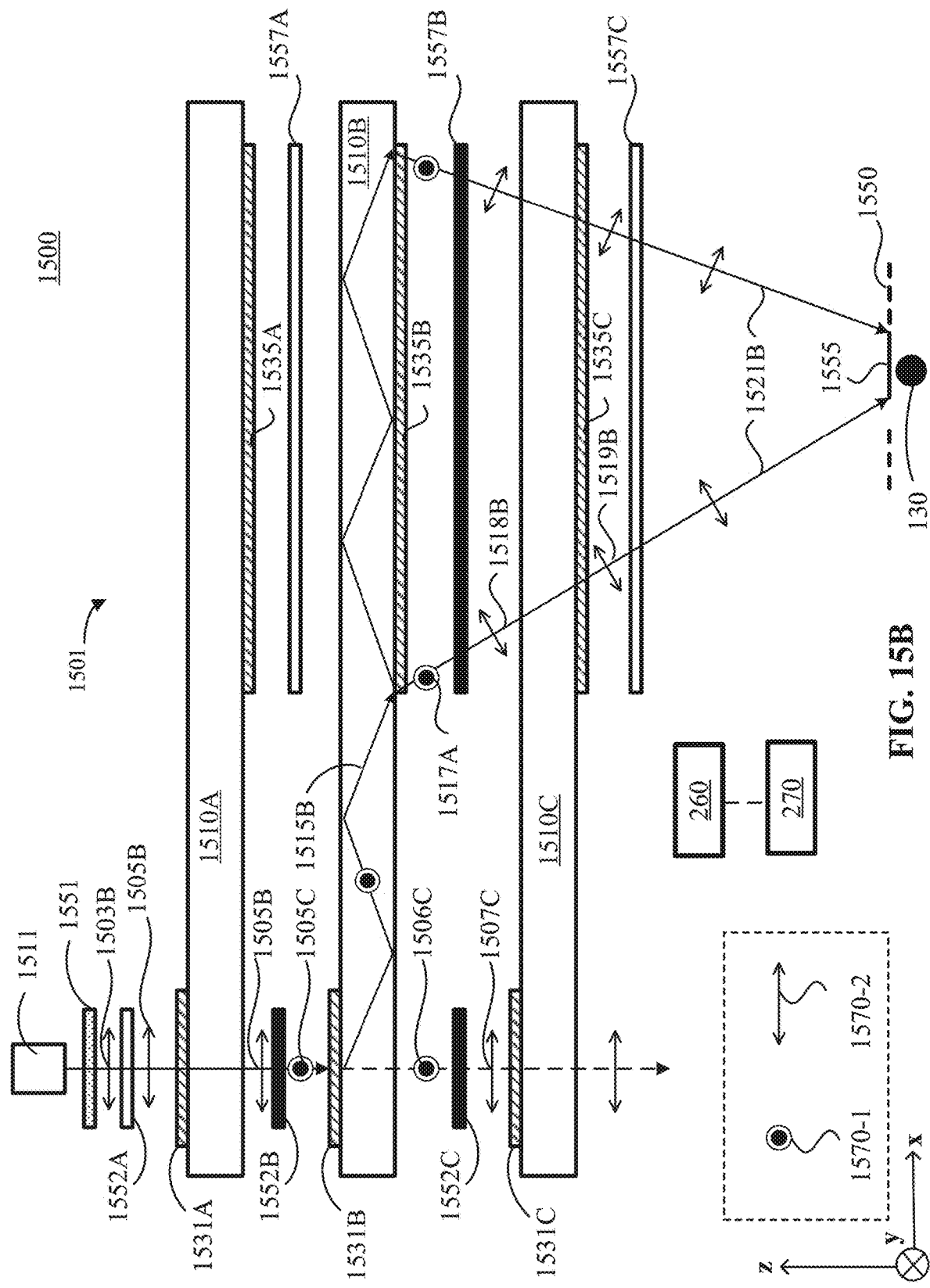
Figure 15C:
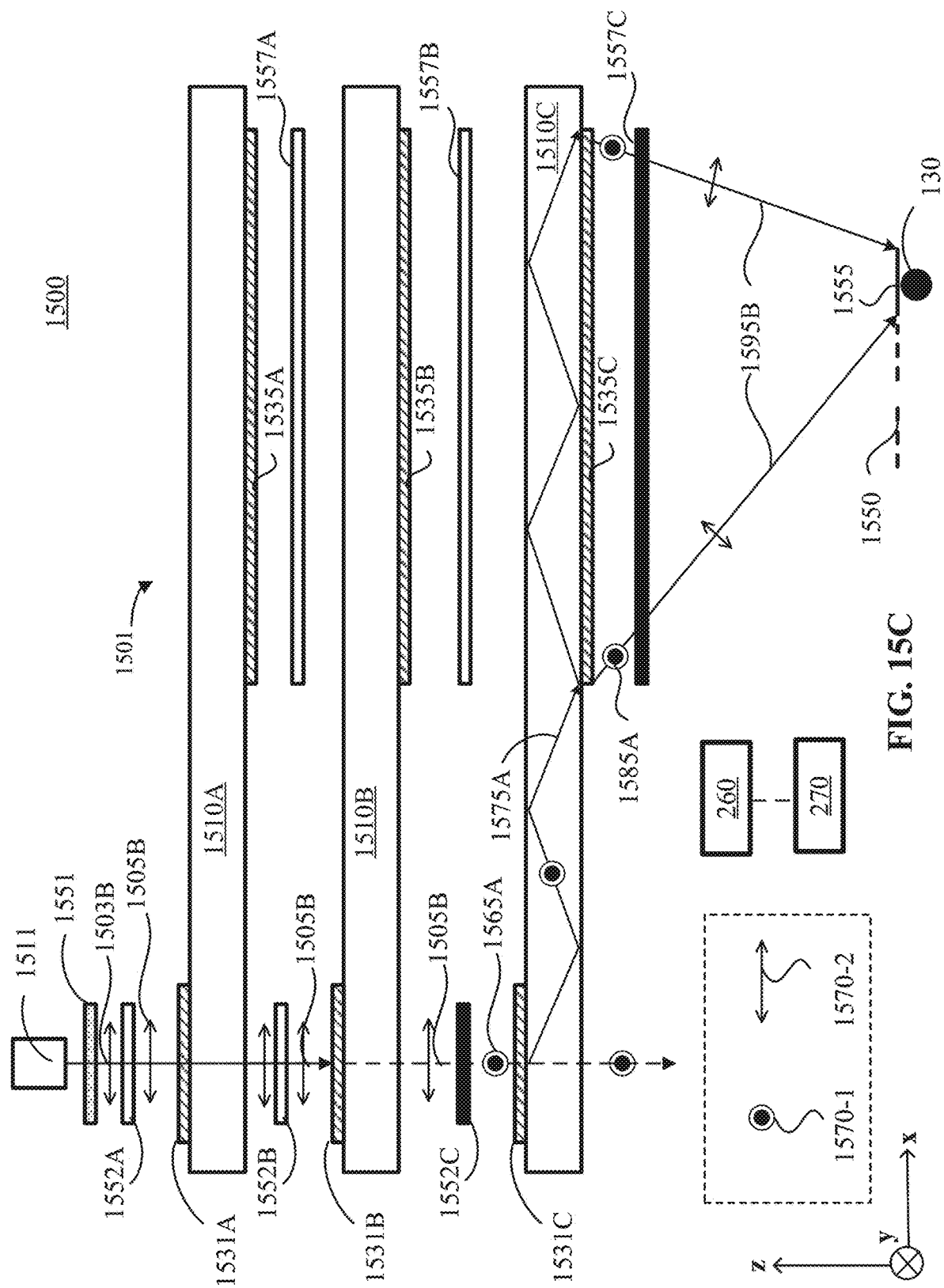

FIGS. 15A-15C schematically illustrate schematic diagrams of an optical system 1500 configured to provide a compressed eyebox at different time instances, according to an embodiment of the present disclosure. The optical system 1500 may include elements that are similar to or the same as those included in other optical systems disclosed herein, such as the optical system 200, 1100, 1200, 1300, or 1400. Features shown in other figures, even if not explicitly described below for the simplicity of discussion, may also be applicable to the embodiment shown in FIGS. 15A-15C. Descriptions of the same or similar elements can refer to the above descriptions, including those rendered in connection with FIGS. 2A-14B. For example, the optical system 1500 may include the eye tracking system 270 and the controller 260. The optical system 1500 may include a waveguide stack 1501 configured to direct or guide an image light to a compressed eyebox 1555. The waveguide stack 1501 may include a plurality of waveguides stacked together. At least one (e.g., each) waveguide may be coupled with an in-coupling element and an out-coupling element. In some embodiments, the waveguide stack 1501 may include a plurality of grating sets coupled to the waveguides. The plurality of grating sets may be included in a plurality of in-coupling elements and a plurality of out-coupling elements coupled to the plurality of waveguides. At least one (e.g., each) of the in-coupling element and the out-coupling element may include a grating set that includes one or more indirectly switchable gratings and one or more polarization switches described above and shown in other figures.

As shown in FIG. 15A, the optical system 1500 may include a light source assembly 1511. The controller 260 may control or configure the light source assembly 1511 to emit an image light with a predetermined FOV. The waveguide stack 1501 may be configured to direct the image light received from the light source assembly 1511 to the compressed eyebox 1555 corresponding to a position of the eye pupil 130. The compressed eyebox 1555 may be formed by one or more sub-eyeboxes of an uncompressed eyebox 1550. The uncompressed eyebox 1550 may be provided by the gratings included in the waveguide stack 1501. The compressed eyebox 1555 may have a size smaller than the size of the uncompressed eyebox 1550. For illustrative purposes, the compressed eyebox 1555 shown in FIGS. 15A-15C is presumed to be formed by a single sub-eyebox, as a single out-coupling element is presumed to be selectively configured in the diffraction state at every time instance. When multiple in-coupling elements and/or multiple out-coupling elements are configured to operate in the diffraction state, two or more sub-eyeboxes may be activated, and the compressed eyebox 1555 may be formed by two or more sub-eyeboxes.

The waveguide stack 1501 may include a plurality of waveguides stacked together. For illustrative purposes, three waveguides 1510A, 1510B, and 1510C are shown. Other suitable number of waveguides may be used, such as two, four, five, six, etc. In some embodiments, for a wave guiding to occur in the waveguides, the waveguides may be separated by air gaps. In some embodiments, the air gaps between the neighboring waveguides may be at least partially filled with a material (e.g., a liquid glue) having a refractive index lower than that of the waveguides. At least one (e.g., each) of the waveguides (1510A, 1510B, and 1510C) may be coupled with an in-coupling element (1531A, 1531B, or 1531C) and an out-coupling element (1535A, 1535B, or 1535C). The in-coupling element (1531A, 1531B, or 1531C) may be configured to couple an image light received from the light source assembly 1511 into the waveguide. The image light may propagate inside the waveguide through TIR. The out-coupling element (1535A, 1535B, or 1535C) may be configured to couple the image light propagating inside the waveguide out of the waveguide to propagate through the compressed eyebox 1555. A waveguide (1510A, 1510B, or 1510C) may form a waveguide display assembly with the corresponding in-coupling element (1531A, 1531B, or 1531C) and out-coupling element (1535A, 1535B, or 1535C) disposed at the waveguide. In the embodiments shown in FIGS. 15A-15C, the optical system 1500 may include three waveguide display assemblies.

As shown in FIGS. 15A-15C, at different time instances, the in-coupling element (1531A, 1531B, or 1531C) and the out-coupling element (1535A, 1535B, or 1535C) included in one or more of the three waveguide assemblies may be selectively controlled or configured by the controller 260 to direct an image light received from the light source assembly 1511 to the compressed eyebox 1555 at different locations (and/or with different sizes). At least one (e.g., each) of the in-coupling element (1531A, 1531B, or 1531C) and the out-coupling element (1535A, 1535B, or 1535C) may include a grating set that includes one or more indirectly switchable gratings. The indirect switching of the one or more indirectly switchable gratings of the in-coupling elements (1531A, 1531B, and 1531C) and the out-coupling elements (1535A, 1535B, and 1535C) may be controlled through one or more polarization switches, which may be controlled by the controller 260. For the simplicity of discussion and illustration, each of the in-coupling elements (1531A, 1531B, and 1531C) and the out-coupling elements (1535A, 1535B, and 1535C) is presumed to have a single indirectly switchable grating. It is understood that in some embodiments, each of the in-coupling elements (1531A, 1531B, and 1531C) and the out-coupling elements (1535A, 1535B, and 1535C) may include two or more gratings arranged in any of the configurations shown in FIGS. 6A-6D.

A polarization switch (e.g., 1552A, 1552B, or 1552C) may be disposed at a light incidence side of the corresponding in-coupling element (e.g., 1531A, 1531B, or 1531C). An image light may pass through the polarization switch before the image light is incident onto the in-coupling element. The polarization switch (e.g., 1552A, 1552B, or 1552C) may be controlled by the controller 260 to operate in a switching state or a non-switching state. Under the control of the controller 260, the polarization switch (e.g., 1552A, 1552B, or 1552C) may control the polarization of the image light incident onto the corresponding in-coupling element, thereby switching the in-coupling element (e.g., 1531A, 1531B, or 1531C) to operate in the diffraction state or the non-diffraction state.

In some embodiments, at least one (e.g., each) of the out-coupling elements (e.g., 1535A, 1535B, and 1535C) may be associated with a polarization switch (e.g., 1557A, 1557B, or 1557C). For example, the polarization switch 1557A may be associated with the out-coupling element 1535B, the polarization switch 1557B may be associated with the out-coupling element 1535C. The polarization switch 1557C may not be associated with an out-coupling element. In some embodiments, the polarization switch 1557C may be omitted. The out-coupling element 1535A may not be associated with a polarization switch. In some embodiments, the out-coupling element 1535A may be associated with a polarization switch disposed between the waveguide 1501A and the out-coupling element 1535A. For the simplicity of illustration, the polarization switch that may be associated with the out-coupling element 1535A is omitted.

The gratings included in the in-coupling elements (e.g., 1531A, 1531B, and 1531C) and out-coupling elements (e.g., 1535A, 1535B, and 1535C) of the waveguide stack 1501 may be configured to diffract image lights having the same polarization or different polarizations. For discussion purposes, in FIGS. 15A-15C, the gratings included in the in-coupling elements (e.g., 1531A, 1531B, and 1531C) and out-coupling elements (e.g., 1535A, 1535B, and 1535C) of the waveguide stack 1501 may be configured to diffract image lights having a same polarization, e.g., a first polarization 1570-1, which may be a linear polarization, and transmit image lights having a different polarization, e.g., a second polarization 1570-2 orthogonal to the first polarization 1570-1 with negligible or no diffraction. That is, the in-coupling elements (e.g., 1531A, 1531B, and 1531C) and the out-coupling elements (e.g., 1535A, 1535B, and 1535C) of the waveguide stack 1501 may be configured to have the same polarization selectivity. The linear polarizations 1570-1 and 1570-2 are used as example polarizations. In some embodiments, circular polarizations with opposite handednesses may be used as the first polarization 1570-1 and the second polarization 1570-2, respectively.

The light source assembly 1511 may be configured or controlled, e.g., by the controller 260, to emit an unpolarized image light. The optical system 1500 may include a polarizer 1551 disposed between the light source assembly 1511 and the waveguide stack 1501. The polarizer 1551 may be configured to convert the unpolarized image light into a polarized image light 1503B having the first polarization 1570-1 or the second polarization 1570-2. For discussion purposes, in FIGS. 15A-15C, the first polarization 1570-1 is presumed to be a linear polarization in the y-axis direction, and the second polarization 1570-2 is presumed to be a linear polarization in the x-axis direction. The polarizer 1551 may be a linear polarizer configured to convert the unpolarized image light into the linearly polarized image light 1503B having the second polarization 1570-2 (e.g., polarization in the x-axis direction).

Referring to FIG. 15A, at a first time instance, the eye tracking system 270 or the controller 260 may detect or determine, based on image data captured by the optical sensor 265, that the eye pupil 130 is at a first position. The controller 260 may selectively control or configure, based on the position information of the eye pupil 130, the polarization switches 1552A, 1552B, and 1557A to operate in a switching state. The controller 260 may also selectively control or configure the polarization switches 1552C, 1557B, and 1557C to operate in a non-switching state. For illustration purposes, a polarization switch operating in the switching state is depicted as a rectangle filled with black color, and a polarization switch operating in the non-switching state is depicted as a rectangle filled with white color (or a un-filled rectangle).

The polarization switch 1552A operating in the switching state may be configured to transmit the image light 1503B having the second polarization 1570-2 received from the polarizer 1551 as an image light 1505A having the first polarization 1570-1. Because the in-coupling element 1531A is configured to diffract an image light having the first polarization 1570-1 and transmit an image light having the second polarization 1570-2, the in-coupling element 1531A may couple the image light 1505A having the first polarization 1570-1 into the waveguide 1510A via diffraction. The in-coupled image light may be denoted as an image light 1515A having the first polarization 1570-1 and may propagate inside the waveguide 1510A through TIR toward the out-coupling element 1535A. In some embodiments, the image light 1515A may have an FOV that is substantially the same as the FOV of the image light 1505A. The out-coupling element 1535A may be configured to couple the image light 1515A having the first polarization 1570-1 out of the waveguide 1510A via diffraction. The out-coupled image light may be denoted as an image light 1525A having the first polarization 1570-1. The out-coupling element 1535A may direct and concentrate the image light 1525A having the first polarization 1570-1 toward a first sub-eyebox, which may form the compressed eyebox 1555 corresponding to the first position of the eye pupil 130.

At the out-coupling side of the waveguide stack 1501, the polarization switch 1557A operating in the switching state may convert the image light 1525A having the first polarization 1570-1 into an image light 1526B having the second polarization 1570-2. Because the out-coupling element 1535B is configured to diffract an image light having the first polarization 1570-1 and transmit an image light having the second polarization 1570-2, the image light 1526B having the second polarization 1570-2 output from the polarization switch 1557A may travel through the waveguide 1510B and the out-coupling element 1535B with negligible or no diffraction. The image light output from the out-coupling element 1535B may be denoted as an image light 1527B having the second polarization 1570-2. The polarization switch 1557B operating in the non-switching state may transmit the image light 1527B having the second polarization 1570-2 without affecting the polarization of the image light 1527B. The image light output from the polarization switch 1557B may be denoted as an image light 1528B having the second polarization 1570-2.

Because the out-coupling element 1535C is configured to diffract an image light having the first polarization 1570-1 and transmit an image light having the second polarization 1570-2, the image light 1528B having the second polarization 1570-2 may travel through the waveguide 1510C and the out-coupling element 1535C with negligible or no diffraction. The image light output from the out-coupling element 1535C may be denoted as an image light 1529B having the second polarization 1570-2. The polarization switch 1557C operating in the non-switching state may transmit the image light 1529B having the second polarization 1570-2 toward the first sub-eyebox without affecting the polarization. The first sub-eyebox may form the compressed eyebox 1555 corresponding to the first position of the eye pupil 130. The image light output by the polarization switch 1557C may be denoted as an image light 1530B having the second polarization 1570-2. The location, shape, and/or size of the compressed eyebox 1555 may be maintained for a first time period until a change in the eye tracking information of the eye pupil 130 is detected by the eye tracking system 270 or the controller 260.

In some embodiments, at the in-coupling side of the waveguide stack 1501, a portion 1506A of the image light 1505A having the first polarization 1570-1 may not be coupled into the waveguide 1510A by the in-coupling element 1531A to propagate therein through TIR. Rather, the portion 1506A of the image light 1505A may travel through the waveguide 1510A toward the waveguide 1510B. The polarization switch 1552B operating in the switching state may convert the portion 1506A of the image light 1505A having the first polarization 1570-1 into an image light 1506B having the second polarization 1570-2. Because the in-coupling element 1531B is configured to diffract an image light having the first polarization 1570-1, and transmit an image light having the second polarization 1570-2, the image light 1506B having the second polarization 1570-2 output from the polarization switch 1552B may not be coupled into the waveguide 1510B by the in-coupling element 1531B to propagate therein through TIR. Rather, the image light 1506B may travel through the in-coupling element 1531B and the waveguide 1510B toward the waveguide 1510C. The polarization switch 1552C operating in the non-switching state may transmit the image light 1506B having the second polarization 1570-2 without affecting the polarization. Because the in-coupling element 1531C is configured to diffract an image light having the first polarization 1570-1, and transmit an image light having the second polarization 1570-2, the image light 1506B having the second polarization 1570-2 output from the polarization switch 1552C may not be coupled into the waveguide 1510C by the in-coupling element 1531C to propagate therein through TIR. Rather, the image light 1506B having the second polarization 1570-2 may transmit through the in-coupling element 1531C and the waveguide 1510C.

Referring to FIG. 15B, at a second time instance, the eye tracking system 270 or the controller 260 may detect or determine, based on image data relating to the eye pupil 130 captured by the optical sensor 265, that the eye pupil 130 has moved to or is moving to a second position. The controller 260 may selectively control or configure the polarization switches 1552A, 1557A, and 1557C to operate in a non-switching state, and selectively control or configure the polarization switches 1552B, 1552C, and 1557B to operate in a switching state. The polarization switch 1552A operating in the non-switching state may transmit the linearly polarized image light 1503B having the second polarization 1570-2 emitted by the light source assembly 1511 without affecting the polarization. The image light output from the polarization switch 1552A may be denoted as a linearly polarized image light 1505B having the second polarization 1570-2.

Because the in-coupling element 1531A is configured to diffract an image light having the first polarization 1570-1 and transmit an image light having the second polarization 1570-2, the image light 1505B having the second polarization 1570-2 may not be coupled into a the waveguide 1510A by the in-coupling element 1531A to propagate therein through TIR. Rather, the image light 1505B having the second polarization 1570-2 may travel through the in-coupling element 1531A and the waveguide 1510A toward the waveguide 1510B. The polarization switch 1552B coupled to the in-coupling element 1531B at the waveguide 1510B operating in the switching state may convert the image light 1505B having the second polarization 1570-2 received from the waveguide 1510A into an image light 1505C having the first polarization 1570-1.

Because the in-coupling element 1531B is configured to diffract an image light having the first polarization 1570-1 and transmit an image light having the second polarization 1570-2, the in-coupling element 1531B may couple the image light 1505C into the waveguide 1510Bby. The in-coupled image light may be denoted as an image light 1515B having the first polarization 1570-1 and may propagate inside the waveguide 1510B through TIR. The image light 1515B may have the same FOV as the image light 1505C, 1505B, and/or 1503B. The image light 1515B having the first polarization 1570-1 may be coupled out of the waveguide 1510B via the out-coupling element 1535B as an image light 1517A having the first polarization 1570-1. The image light 1517A may have the same FOV as the image light 1515B. The out-coupling element 1535B may direct and concentrate the image light 1517A having the first polarization 1570-1 to propagate though a second sub-eyebox. The second sub-eyebox may be different from the first sub-eyebox at the first time instance. The second sub-eyebox may form the compressed eyebox 1555 corresponding to the second position of the eye pupil 130.

The polarization switch 1557B operating in the switching state may convert the image light 1517A having the first polarization 1570-1 output from the out-coupling element 1535B into an image light 1518B having the second polarization 1570-2. Because the out-coupling element 1535C is configured to diffract an image light having the first polarization 1570-1 and transmit an image light having the second polarization 1570-2, the image light 1518B having the second polarization 1570-2 may travel through the waveguide 1510C and the out-coupling element 1535C toward the polarization switch 1557C. The image light output from the out-coupling element 1535C may be denoted as an image light 1519B having the second polarization 1570-2. The polarization switch 1557C operating in the non-switching state may transmit the image light 1519B toward the second sub-eyebox without affecting the polarization as an image light 1521B. The second sub-eyebox may form the compressed eyebox 1555 corresponding to the second position of the eye pupil 130. The location of the compressed eyebox 1555 may correspond to the new position of the eye pupil 130, and the size of the compressed eyebox 1555 may cover at least the size of the eye pupil 130. At least one of the location, shape, or size of the compressed eyebox 1555 may be different from those at the first time instance. The location, shape, and/or size of the compressed eyebox 1555 may be maintained for a second time period until a change in the eye tracking information of the eye pupil 130 is detected by the eye tracking system 270 or the controller 260.

Referring back to the in-coupling side of the waveguide stack 1501, as shown in FIG. 15B, a portion 1506C of the image light 1505C may not be coupled into the waveguide 1510B to propagate therein through TIR. Rather, the portion 1506C of the image light (also referred to image light 1506C) may travel through the waveguide 1510B toward the polarization switch 1552C coupled to the in-coupling element 1531C at the waveguide 1510C. The polarization switch 1552C operating in the switching state may convert the image light 1506C having the first polarization 1570-1 into an image light 1507C having the second polarization 1570-2. Because the in-coupling element 1531C is configured to diffract an image light having the first polarization 1570-1 and transmit an image light having the second polarization 1570-2, the image light 1507C having the second polarization 1570-2 may not be coupled into the waveguide 1510C by the in-coupling element 1531C to propagate therein through TIR. Rather, the image light 1507C having the second polarization 1570-2 may travel through the in-coupling element 1531C and the waveguide 1510C.

Referring to FIG. 15C, at a third time instance, the eye tracking system 270 or the controller 260 may detect or determine, based on image data of the eye pupil 130 captured by the optical sensor 265, that the eye pupil 130 has moved to or is moving to a third position within the uncompressed eyebox 1550. The controller 260 may selectively control or configure, based on the position information of the eye pupil 130, the polarization switches 1552A, 1552B, 1557A, and 1557B to operate in a non-switching state, and selectively control or configure the polarization switches 1552C and 1557C to operate in a switching state. The polarization switch 1552A operating in the non-switching state may transmit the linearly polarized image light 1503B having the second polarization 1570-2 emitted by the light source assembly 1551 as the linearly polarized image light 1505B having the second polarization 1570-2, without affecting the polarization.

Because the in-coupling element 1531A is configured to diffract an image light having the first polarization 1570-1 and transmit an image light having the second polarization 1570-2, the image light 1505B having the second polarization 1570-2 may not be coupled into the waveguide 1510A by the in-coupling element 1531A to propagate therein through TIR. Rather, the image light 1505B having the second polarization 1570-2 may travel through the in-coupling element 1531A and the waveguide 1510A toward the waveguide 1510B. The polarization switch 1552B operating in the non-switching state may transmit the image light 1505B having the second polarization 1570-2 output from the waveguide 1510B without affecting the polarization. Because the in-coupling element 1531B is configured to diffract an image light having the first polarization 1570-1 and transmit an image light having the second polarization 1570-2, the image light 1505B having the second polarization 1570-2 output from the polarization switch 1552B may not be coupled into the waveguide 1510B by the in-coupling element 1531B to propagate therein through TIR. Rather, the image light 1505B having the second polarization 1570-2 output from the polarization switch 1552B may travel through the in-coupling element 1531B and the waveguide 1510B with negligible or no diffraction toward the waveguide 1510C.

The polarization switch 1552C operating in the switching state may convert the image light 1505B having the second polarization 1570-2 into an image light 1565A having the first polarization 1570-1. Because the in-coupling element 1531C is configured to diffract an image light having the first polarization 1570-1 and transmit an image light having the second polarization 1570-2, the in-coupling element 1531C may coupe the image light 1565A having the first polarization 1570-1 into the waveguide 1510C, as an image light 1575A having the first polarization 1570-1. The image light 1575A may propagate through TIR inside the waveguide 1510C toward the out-coupling element 1535C. The out-coupling element 1535C may be configured to couple, via diffraction, the image light 1575A having the first polarization 1570-1 out of the waveguide 1510C as an image light 1585A having the first polarization 1570-1. The out-coupling element 1535C may direct and concentrate the image light 1585A having the first polarization 1570-1 to propagate though a third sub-eyebox. The third sub-eyebox may be different from the second sub-eyebox at the second time instance. The third sub-eyebox may form the compressed eyebox 1555 corresponding to the third position of the eye pupil 130.

The polarization switch 1557C operating in the switching state may convert the image light 1585A having the first polarization 1570-1 into an image light 1595B having the second polarization 1570-2. The image light 1595B having the second polarization 1570-2 may propagate through the compressed eyebox 1555. The location of the compressed eyebox 1555 may correspond to the position of the eye pupil 130, and the size of the compressed eyebox 1555 may cover at least the size of the eye pupil 130. At least one of the location, shape, or size of the compressed eyebox 1555 may be different from those at the second time instance. The location, shape, and/or size of the compressed eyebox 1555 may be maintained for a third time period until a change in the eye tracking information of the eye pupil 130 is detected by the eye tracking system 270 or the controller 260.

In some embodiments, the image light 1530B, 1521B, or 1595B propagating through the compressed eyebox 1555 may have an FOV that is substantially the same as the FOV of the image light propagating through the uncompressed eyebox 1550. As a result, the image content delivered to the compressed eyebox 1555 may be substantially the same as the image content delivered to the uncompressed eyebox 1550. In some embodiments, the image light propagating through the compressed eyebox 1530B, 1521B, or 1595B propagating through the compressed eyebox 1555 may have an FOV that is substantially the same as the FOV of the image light generated by the light source assembly 1511. As a result, the eye of the user may perceive the full content of an image generated by the light source assembly 1511.

Referring to FIGS. 15A-15C, the optical system 1500 may dynamically deliver an image light with an FOV that is substantially the same as the FOV of the image light generated by the light source assembly 1511 and the same polarization (e.g., the second polarization 1570-2) to the eye pupil 130 through the compressed eyebox 1555. The location of the compressed eyebox 1555 may be dynamically aligned with the changing position of the eye pupil 130. The size of the compressed eyebox 1555 is smaller than that of the uncompressed eyebox 1550. The position information is used as an example of the eye tracking information of the eye pupil 130. The dynamic rendering of the compressed eyebox 1555 may be based on any one or any combination of other types of eye tracking information, such as the size of the eye pupil 130, the viewing direction of the eye pupil 130, and/or the moving direction of the eye pupil 130, in place of or in combination with the position of the eye pupil 130. Any suitable combination of these types of eye tracking information may be used as a basis for dynamically rendering the compressed eyebox.

Figure 16A:
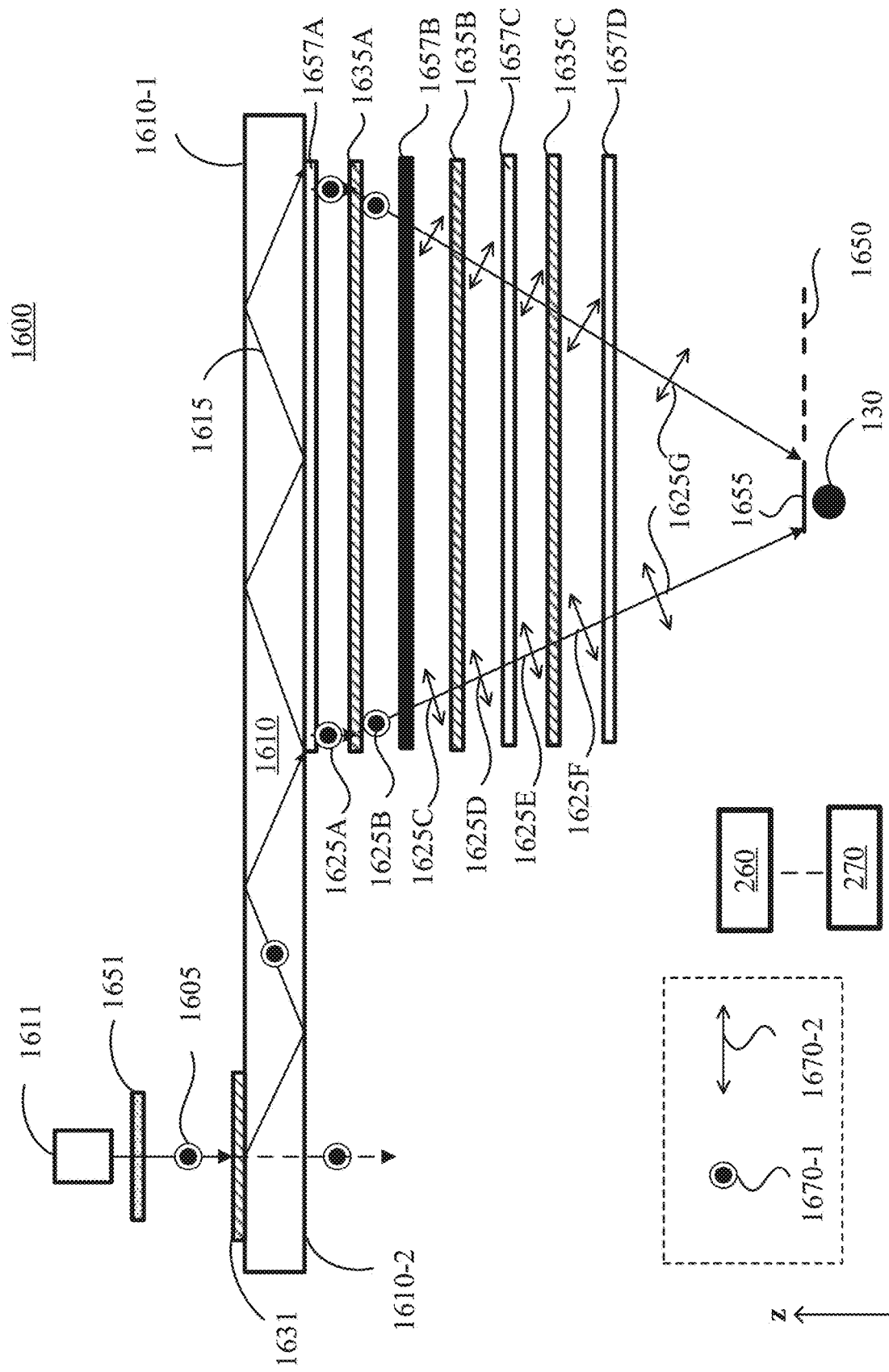
FIGS. 16A-16C illustrate schematic diagrams of an optical system configured to provide a compressed eyebox, according to another embodiment of the present disclosure.
Figure 16B:
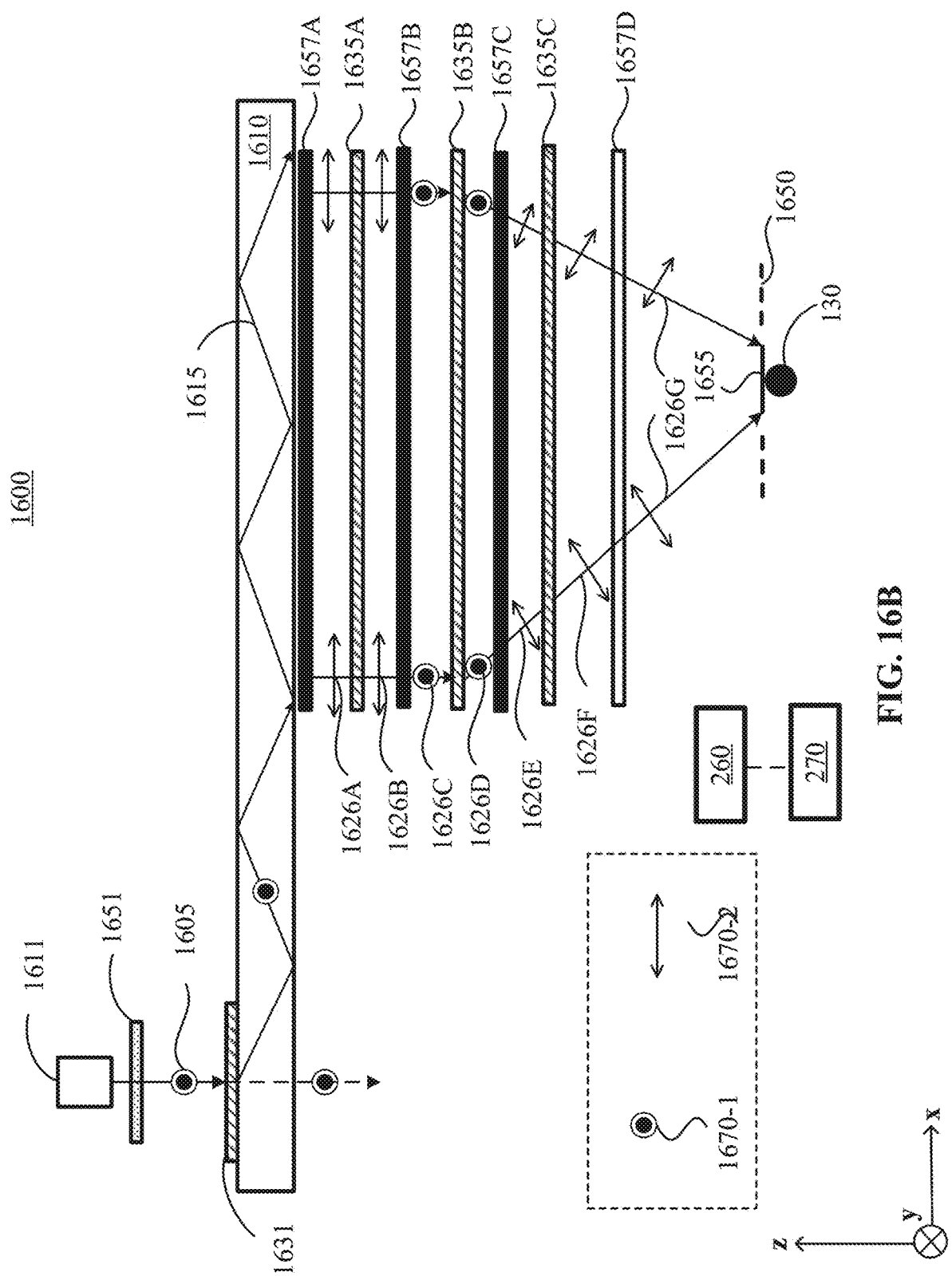
Figure 16C:
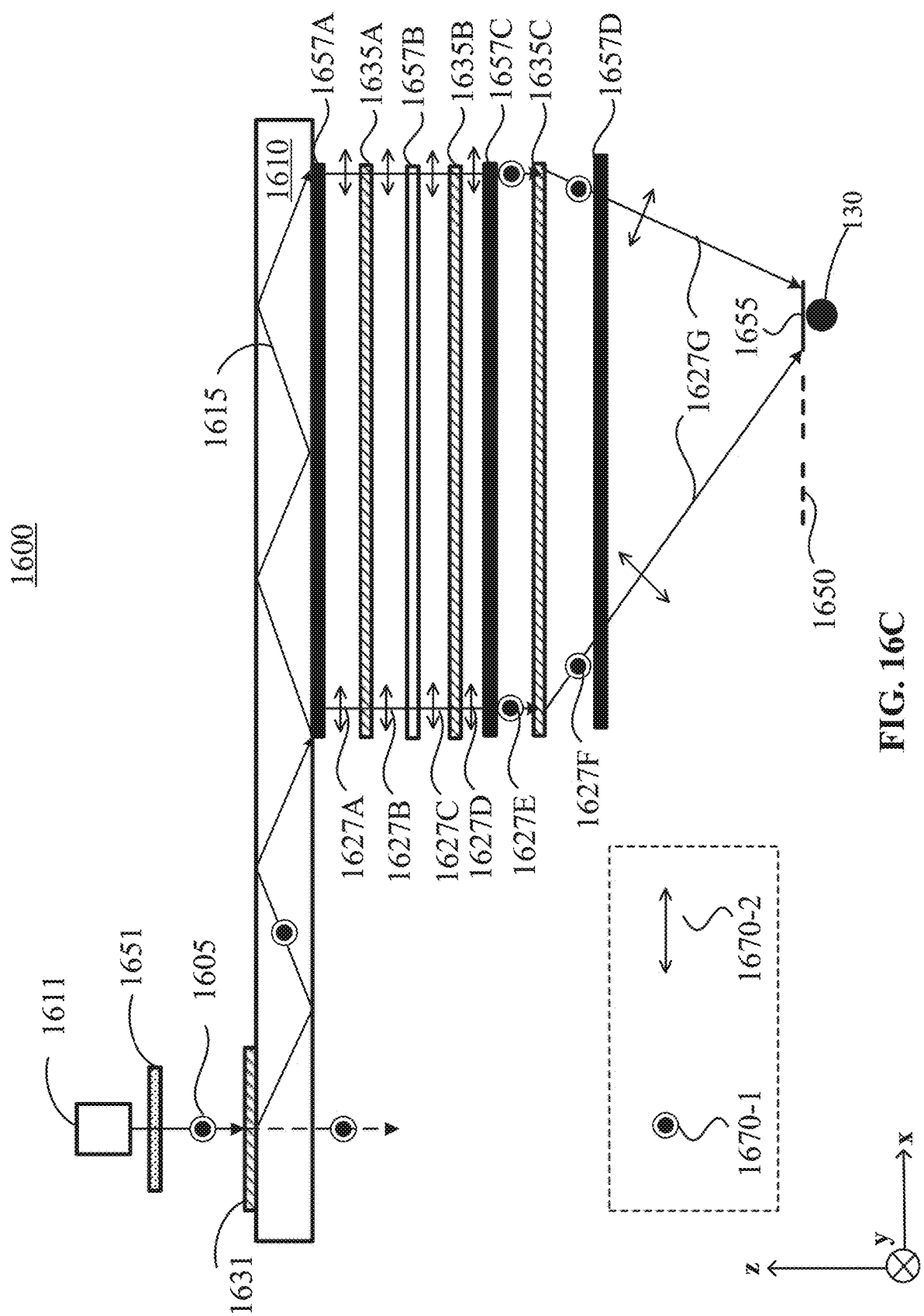

In some embodiments, the indirectly switchable in-coupling elements and the out-coupling elements may not be disposed at the respective waveguides in the waveguide stack. Rather, the in-coupling elements and out-coupling elements may be respectively stacked with corresponding polarization switches and attached to a common (e.g., a single) waveguide, as shown in FIGS. 16A-16C. FIGS. 16A-16C illustrate schematic diagrams of an optical system 1600 configured to provide a compressed eyebox at different time instance, according to an embodiment of the present disclosure. The optical system 1600 may include elements that are similar to or the same as those included in other optical systems described above and shown in other figures such as the optical system 200, 1100, 1200, 1300, 1400, or 1500. Features shown in other figures, even if not explicitly described below for the simplicity of discussion, may also be applicable to the embodiment shown in FIGS. 16A-16C. Descriptions of the same or similar elements can refer to the above descriptions, including those rendered in connection with FIGS. 2A-15C. For example, the optical system 1600 may include the eye tracking system 270 and the controller 260.

As shown in FIGS. 16A-16C, the optical system 1600 may include a light source assembly 1611 configured to emit an image light with a predetermined FOV, and a single waveguide 1610. The waveguide 1610 may include an in-coupling element 1631 disposed at a first surface 1610-1 or a second surface 1610-2 of the waveguide 1610. The number of in-coupling elements is not limited to one, and may be any suitable number, such as two, three, four, five, six, etc. For example, in some embodiments, the waveguide 1610 may include a plurality of in-coupling elements stacked together. The in-coupling element 1631 may include one or more directly switchable gratings, one or more indirectly switchable gratings (in which case one or more polarization switches may be coupled with the one or more indirectly switchable gratings), one or more non-switchable gratings, or any combination thereof.

The waveguide 1610 may also include a plurality of out-coupling elements 1635A, 1635B, and 1635C stacked together with corresponding polarization switches. The stack of the out-coupling elements and the polarization switches may be disposed at the first surface 1610-1 or the second surface 1610-2 of the waveguide 1610. The number of the out-coupling elements is not limited to three, and may be any suitable number, such as two, four, five, six, etc. At least one (e.g., each) out-coupling element may include one or more indirectly switchable gratings. The switching of the indirectly switchable gratings included in the out-coupling elements may be realized by controlling the polarization of the image light incident onto the out-coupling elements. The controlling the polarization of the image light incident onto the out-coupling elements may be realized by controlling the corresponding polarization switches.

The in-coupling element 1631 and the out-coupling elements 1635A, 1635B, and 1635C may be disposed at the same surface or different surfaces of the waveguide 1610. In some embodiments, at least one (e.g., each) of the out-coupling elements 1635A, 1635B, and 1635C may be coupled with a polarization switch, which may be disposed at a light incidence side of the corresponding out-coupling element, where the image light is incident onto the out-coupling element. The number of polarization switches optically coupled with the out-coupling elements may be the same as the number of the out-coupling elements, or may be smaller than or greater than the number of the out-coupling elements. For illustrative purposes, FIGS. 16A-16C show that the out-coupling elements 1635A, 1635B, and 1635C are coupled to polarization switches 1657A, 1657B, and 1657C, respectively.

In some embodiments, the optical system 1600 may include an additional polarization switch 1657D disposed between the out-coupling element 1635C and the eye pupil 130. The polarization switch 1657D may be included for the purposes of rendering the image lights of the same polarization to the eye pupil 130 at different time instances or time periods. In some embodiments, the polarization switch 1657D may be omitted, such that image lights of different polarizations may be delivered to the eye pupil 130 at different time instances or time periods. For illustrative purposes, in FIGS. 16A-16C, the plurality of out-coupling elements and polarization switches are shown as separated from one another with gaps. In some embodiments, the out-coupling elements and the polarization switches may be coupled with one another in direct contact with no gap.

In some embodiments, the light source assembly 1611 may be configured to emit an unpolarized image light. The optical system 1600 may include a polarizer 1651 disposed between the light source assembly 1611 and the waveguide 1610. The polarizer 1651 may be configured to convert the unpolarized image light into a polarized image light 1605 having a first polarization 1670-1 or a second polarization 1670-2 orthogonal to the first polarization 1670-1, depending on the transmission axis of the polarizer 1651. For discussion purposes, in FIGS. 16A-16C, the first polarization 1670-1 is presumed to be a linear polarization in the y-axis direction, and the second polarization 1670-2 is presumed to be a linear polarization in the x-axis direction. The polarizer 1651 is presumed to be a linear polarizer configured to convert the unpolarized image light into the linearly polarized image light 1605 having the first polarization 1670-1 (e.g., polarization in the y-axis direction). The image light 1605 may have a predetermined FOV. In some embodiments, circular polarizations with opposite handednesses may be used as the first polarization 1670-1 and the second polarization 1670-2, respectively.

For discussion purposes, the in-coupling element 1631 and the out-coupling elements 1635A, 1635B, and 1635C are presumed to have the same polarization selectivity. For example, the in-coupling element 1631 and the out-coupling elements 1635A, 1635B, and 1635C may be configured to diffract image lights having the first polarization 1670-1 and transmit image lights having the second polarization 1670-2 with negligible or no diffraction. The controller 260 may selectively control or configure each of the polarization switches 1657A, 1657B, 1657C, and 1657D to operate in a switching state or a non-switching state to switch or maintain a polarization of an image light before the image light is incident onto an out-coupling element, thereby indirectly controlling or configuring the respective out-coupling element to operate in the diffraction state for an image light having the first polarization 1670-1 or to operate in the non-diffraction state for an image light having the second polarization 1670-2.

The controller 260 may be communicatively coupled with other elements included in the optical system 1600, such as the eye tracking system 270 and the polarization switches 1657A, 1657B, 1657C, and 1657D. For example, the controller 260 may also be communicatively coupled with one or more power sources associated with the polarization switches 1657A, 1657B, 1657C, and 1657D for providing an electric field to the polarization switches. The connections between the controller 260 and other elements may be wired or wireless, and are not shown in FIGS. 16A-16C for the simplicity of illustration. The controller 260 may control the polarization switches (e.g., by controlling the electrically connected power sources) to indirectly configure the corresponding out-coupling elements to operate in the diffraction state for an image light having the first polarization 1670-1, or to operate in the non-diffraction state for an image light having the second polarization 1670-2.

Referring to FIG. 16A, at a first time instance, the eye tracking system 270 or the controller 260 may detect or determine, based on image data of the eye pupil 130 captured by the optical sensor 265, that the eye pupil 130 is at a first position. Based on the position information of the eye pupil 130, the controller 260 may selectively control or configure the polarization switches 1657A, 1657C, and 1657D to operate in a non-switching state, and selectively control or configure the polarization switch 1657B to operate in a switching state. For illustrative purposes, a polarization switch operating in the switching state is denoted by a rectangle filled with black color, and a polarization switch operating in the switching state is denoted by a rectangle filled with white color (or an un-filled rectangle). The in-coupling element 1631 may couple the image light 1605 having the first polarization 1670-1 into the waveguide 1610 as an image light 1615 having the first polarization 1670-1. The image light 1615 having the first polarization 1670-1 may propagate inside the waveguide 1610 through TIR toward the stack of out-coupling elements. The polarization switch 1657A operating in the non-switching state may not affect the polarization of the image light 1615 incident onto the polarization switch 1657A. The polarization switch 1657A may transmit the image light 1615 to the out-coupling element 1635A as an image light 1625A having the first polarization 1670-1.

Because the out-coupling element 1635A is configured to diffract an image light having the first polarization 1670-1 and transmit an image light having the second polarization 1670-2, the out-coupling element 1635A may couple the image light 1625A having the first polarization 1670-1 out of the waveguide 1610 via diffraction. The out-coupled image light may be denoted as an image light 1625B having the first polarization 1670-1. The out-coupling element 1635A may direct and concentrate the image light 1625B having the first polarization 1670-1 to propagate through a first sub-eyebox of an uncompressed eyebox 1650. The first sub-eyebox may form a compressed eyebox 1655 corresponding to the first position of the eye pupil 130. The polarization switch 1657B operating in the switching state may convert the image light 1625B having the first polarization 1670-1 into an image light 1625C having the second polarization 1670-2. Because the out-coupling element 1635B is configured to diffract an image light having the first polarization 1670-1 and transmit an image light having the second polarization 1670-2, the out-coupling element 1635B may transmit, with negligible or no diffraction, the image light 1625C having the second polarization 1670-2 toward the polarization switch 1657C as an image light 1625D having the second polarization 1670-2.

The polarization switch 1657C operating in the non-switching state may transmit the image light 1625D having the second polarization 1670-2 toward the out-coupling element 1635C, as an image light 1625E having the second polarization 1670-2. Because the out-coupling element 1635C is configured to diffract an image light having the first polarization 1670-1 and transmit an image light having the second polarization 1670-2, the out-coupling element 1635C may transmit, with negligible or no diffraction, the image light 1625E having the second polarization 1670-2 as an image light 1625F having the second polarization 1670-2. The polarization switch 1657D operating in the non-switching state may transmit the image light 1625F having the second polarization 1670-2 as an image light 1625G having the second polarization 1670-2 toward the first sub-eyebox that forms the compressed eyebox 1655 corresponding to the first position of the eye pupil 130. The location, shape, and/or size of the compressed eyebox 1655 may be maintained for a first time period until a change in the eye tracking information of the eye pupil 130 is detected by the eye tracking system 270 or the controller 260.

Referring to FIG. 16B, at a second time instance, the eye tracking system 270 or the controller 260 may detect or determine, based on currently acquired image data of the eye pupil 130 acquired by the optical sensor 265, that the eye pupil 130 has moved to or is moving to a second position. The controller 260 may selectively control or configure the polarization switches 1657A, 1657B, and 1657C to operate in a switching state, and selectively control or configure the polarization switch 1657D to operate in the non-switching state. The in-coupling element 1631 may couple the image light 1605 having the first polarization 1670-1 into the waveguide 1610 via diffraction. The image light 1615 having the first polarization 1670-1 may propagate inside the waveguide 1610 through TIR toward the stack of out-coupling elements.

When the image light 1615 is incident onto the polarization switch 1657A, the polarization switch 1657A operating in the switching state may convert the image light 1615 having the first polarization 1670-1 into an image light 1626A having the second polarization 1670-2. Because the out-coupling element 1635A is configured to diffract an image light having the first polarization 1670-1 and transmit an image light having the second polarization 1670-2, the out-coupling element 1635A may transmit, with negligible or no diffraction, the image light 1626A having the second polarization 1670-2 toward the polarization switch 1657B, as an image light 1626B having the second polarization 1670-2. The polarization switch 1657B operating in the switching state may convert the image light 1626B having the second polarization 1670-2 into an image light 1626C having the first polarization 1670-1, toward the out-coupling element 1635B.

Because the out-coupling element 1635B is configured to diffract an image light having the first polarization 1670-1 and transmit an image light having the second polarization 1670-2, the out-coupling element 1635B may couple the image light 1626C having the first polarization 1670-1 output of the out-coupling element 1635B via diffraction. The out-coupled image light may be denoted as an image light 1626D having the first polarization 1670-1. The out-coupling element 1635B may direct and concentrate the image light 1626D having the first polarization 1670-1 to propagate toward a second sub-eyebox different from the first sub-eyebox at the first time instance. The second sub-eyebox may form the compressed eyebox 1655 corresponding to the second position of the eye pupil 130.

The polarization switch 1657C operating in the switching state may convert the image light 1626D having the first polarization 1670-1 into an image light 1626E having the second polarization 1670-2. Because the out-coupling element 1635C is configured to diffract an image light having the first polarization 1670-1 and transmit an image light having the second polarization 1670-2, the out-coupling element 1635C may transmit, with negligible or no diffraction, the image light 1626E having the second polarization 1670-2 as an image light 1626F having the second polarization 1670-2. The polarization switch 1657D operating in the non-switching state may transmit the image light 1626F having the second polarization 1670-2 as an image light 1626G having the second polarization 1670-2 toward the second sub-eyebox that forms the compressed eyebox 1655. The location of the compressed eyebox 1655 may correspond to the new position of the eye pupil 130 at the second instance, and may be different from the location of the compressed eyebox 1655 at the first time instance. At least one of the location, shape, or size of the compressed eyebox 1655 at the second time instance may be different from those at the first time instance. The location, shape, and/or size of the compressed eyebox 1655 may be maintained for a second time period until a change in the eye tracking information of the eye pupil 130 is detected by the eye tracking system 270 or the controller 260.

Referring to FIG. 16C, at a third time instance, the eye tracking system 270 or the controller 260 may detect or determine, based on currently acquired image data of the eye pupil 130, that the eye pupil 130 has moved to or is moving to a third position. Based on the position information of the eye pupil 130, the controller 260 may selectively control or configure the polarization switches 1657A, 1657C, and 1657D to operate in a switching state, and selectively control or configure the polarization switch 1657B to operate in a non-switching state.

The in-coupling element 1631 may couple the image light 1605 having the first polarization 1670-1 into the waveguide 1610 via diffraction. The image light 1615 having the first polarization 1670-1 may propagate inside the waveguide 1601 through TIR toward the stack of out-coupling elements. When the image light 1615 is incident onto the polarization switch 1657A, the polarization switch 1657A operating in the switching state may convert the image light 1615 having the first polarization 1670-1 into an image light 1627A having the second polarization 1670-2 toward the out-coupling element 1635A. Because the out-coupling element 1635A is configured to diffract an image light having the first polarization 1670-1 and transmit an image light having the second polarization 1670-2, the out-coupling element 1635A may transmit, with negligible or no diffraction, the image light 1627A having the second polarization 1670-2 as an image light 1627B having the second polarization 1670-2.

The polarization switch 1657B operating in the non-switching state may transmit the image light 1627B having the second polarization 1670-2 received from the out-coupling element 1635A as an image light 1627C having the second polarization 1670-2. Because the out-coupling element 1635B is configured to diffract an image light having the first polarization 1670-1 and transmit an image light having the second polarization 1670-2, the out-coupling element 1635B may transmit, with negligible or no diffraction, the image light 1627C having the second polarization 1670-2 as an image light 1627D having the second polarization 1670-2. The polarization switch 1657C operating in the switching state may convert the image light 1627D having the second polarization 1670-2 received from the out-coupling element 1635B into an image light 1627E having the first polarization 1670-1.

Because the out-coupling element 1635C is configured to diffract an image light having the first polarization 1670-1 and transmit an image light having the second polarization 1670-2, the out-coupling element 1635C may couple the image light 1627E having the first polarization 1670-1 out of the waveguide 1601 via diffraction. The out-coupled light may be denoted as an image light 1627F having the first polarization 1670-1. The out-coupling element 1635C may direct and concentrate the image light 1627F having the first polarization 1670-1 to propagate toward a third sub-eyebox different from the second sub-eyebox at the second time instance. The third sub-eyebox may form the compressed eyebox 1655 corresponding to the third position of the eye pupil 130.

The polarization switch 1657D operating in the switching state may convert the image light 1627F having the first polarization 1670-1 into an image light 1627G having the second polarization 1670-2. The image light 1627G having the second polarization 1670-2 may propagate through the third sub-eyebox that forms the compressed eyebox 1655. The location of the compressed eyebox 1655C may correspond to the position of the eye pupil 130. At least one of the location, shape, or size of the compressed eyebox 1655 at the third time instance may be different from those at the second time instance. The location, shape, and/or size of the compressed eyebox 1655 may be maintained for a third time period until a change in the eye tracking information of the eye pupil 130 is detected by the eye tracking system 270 or the controller 260.

In some embodiments, the image light 1625G, 1626G, or 1627G propagating through the compressed eyebox 1655 may have an FOV that is substantially the same as the FOV of the image light propagating through the uncompressed eyebox 1650. As a result, the image content delivered to the compressed eyebox 1655 may be substantially the same as the image content delivered to the uncompressed eyebox 1650. In some embodiments, the image light propagating through the compressed eyebox 1625G, 1626G, or 1627G propagating through the compressed eyebox 1655 may have an FOV that is substantially the same as the FOV of the image light generated by the light source assembly 1611. As a result, the eye of the user may perceive the full content of an image generated by the light source assembly 1611.

As shown in FIGS. 16A-16C, the optical system 1600 may dynamically provide an image light propagating through the compressed eyebox 1655 with an FOV that is substantially the same as the FOV of the image light propagating through the uncompressed eyebox 1650 and with the same polarization (e.g., the second polarization 1670-2) to the eye pupil 130 through the compressed eyebox 1655 at different locations corresponding to the changing locations of the eye pupil 130. The location, shape, and/or size of the compressed eyebox 1655 may be dynamically changed to correspond to the changing locations of the eye pupil 130. In the above descriptions, the position information is used as an example of the eye tracking information of the eye pupil 130. Alternatively or additionally, the dynamic rendering of the compressed eyebox 1655 may be based on any one or any combination of other types of eye tracking information, such as the size of the eye pupil 130, the viewing direction of the eye pupil 130, and/or the moving direction of the eye pupil 130, in place of or in combination with the position of the eye pupil 130. Any suitable combination of these types of eye tracking information may be used as a basis for dynamically rendering the compressed eyebox.

FIG. 17A is a flowchart illustrating a method 1700 for providing a compressed eyebox, according to an embodiment of the present disclosure. The method 1700 may be performed by the controller 260, or the internal processor 280 of the eye tracking system 270. For discussion purposes, the various processes, steps, and methods may be described as being performed by the controller 260. The method 1700 may include determining eye tracking information of an eye pupil (Step 1705). For example, the optical sensor 265 of the eye tracking system 270 may capture image data of the eye pupil 130, e.g., in real time. The internal processor 280 of the eye tracking system 270 or the controller 260 may analyze the image data to obtain or determine the eye tracking information of the eye pupil 130. Various eye tracking information may be obtained from analyzing the image data of the eye pupil 130. In some embodiments, determining the eye tracking information may include predicting at least one of a size of the eye pupil, a position of the eye pupil, a viewing direction of the eye pupil, or a moving direction of the eye pupil, for example, through an artificial intelligence algorithm or any other suitable technologies. The prediction of the eye tracking information listed above may be based on the image data, or may be based on other sensor data (data obtained by sensors other than the optical sensor), including, for example, historical data of the eye tracking information of the eye pupil.

The method 1700 may also include selectively configuring, based on the eye tracking information, one or more combinations of gratings included in a plurality of grating sets coupled with one or more waveguides to operate in a diffraction state to direct an image light to propagate through one or more sub-eyeboxes of a plurality of sub-eyeboxes, the plurality of sub-eyeboxes defining an uncompressed eyebox, and the one or more sub-eyeboxes of the plurality of sub-eyeboxes defining a compressed eyebox having a size smaller than a size of the uncompressed eyebox (Step 1710). For example, the plurality of grating sets coupled with the waveguide may include an in-coupling grating set included in an in-coupling element, an out-coupling grating set included in an out-coupling element, and a redirecting grating set included in a redirecting element (if included). Each grating set may include one or more gratings. Based on the eye tracking information, the controller 260 may selectively configure or control one or more gratings (or one or more combinations of gratings) including one or more gratings from the in-coupling element (or in-coupling grating set), one or more gratings from the out-coupling element (or out-coupling grating set), and one or more gratings from a redirecting element (or redirecting grating set if included), to operate in the diffraction state. The one or more selected gratings operating in the diffraction state may direct and concentrate, via diffraction, the image light having a predetermined FOV toward the compressed eyebox. The steps 1705 and 1710 may be repeatedly and dynamically performed by the controller 260 to dynamically adjust, in real time, the location, shape, and/or the size of the compressed eyebox based on the real time eye tracking information of the eye pupil 130. For example, whenever a change in the eye tracking information is detected or determined at a time instance, step 1710 may be performed to change one or more of a location, a shape, and a size of the compressed eyebox.

The method 1700 may include other steps or processes, such as those described above in connection with other figures. For example, the method 1700 may include selectively configuring or controlling, by the controller 260, the remaining one or more gratings or one or more combinations of gratings included in the plurality of the gratings (e.g., those included in the in-coupling element, the out-coupling element, and the redirecting element (if included)) to operate in a non-diffraction state. In some embodiments, a grating of the plurality of gratings may be a directly switchable grating, which may include one or more directly switchable gratings. Controlling or configuring a grating to operate in the diffraction state or the non-diffraction state may include controlling a power source electrically coupled with a directly switchable grating to supply a voltage greater than a predetermined threshold voltage (and sufficient high) to configure the grating to operate in the diffraction state (or the non-diffraction state), or to supply a voltage lower than or equal to the predetermined threshold voltage to configure the grating to operate in the non-diffraction state (or the diffraction state).

In some embodiments, a grating in a grating set may be an indirectly switchable grating. The indirectly switchable grating may be polarization sensitive or selective. Controlling or configuring an indirectly switchable grating to operate in the diffraction state or the non-diffraction state may include controlling a polarization switch coupled with the grating to operate in a switching state to change a polarization of an image light before the image light is incident onto the grating, or to operate in a non-switching state to maintain the polarization of the image light before the image light is incident onto the grating. By controlling the polarization of the image light incident onto the grating, the indirectly switchable grating may be controlled to operate in a diffraction state for an image light having a first predetermined polarization, or to operate in a non-diffraction state for an image light having a second polarization that is different from the first predetermined polarization. The second polarization may be orthogonal to the first predetermined polarization, or the second polarization may have a handedness that is opposite to the handedness of the first predetermined polarization. The location of the compressed eyebox may correspond to a position of the eye pupil, and the size of the compressed eyebox may cover at least the size of the eye pupil, such that the image light propagating through the compressed eyebox may be received by the eye pupil. With the compressed eyebox, the light intensity of the image light received by the eye pupil may be increased. Power efficiency of the optical system may be improved.

Figure 17B:
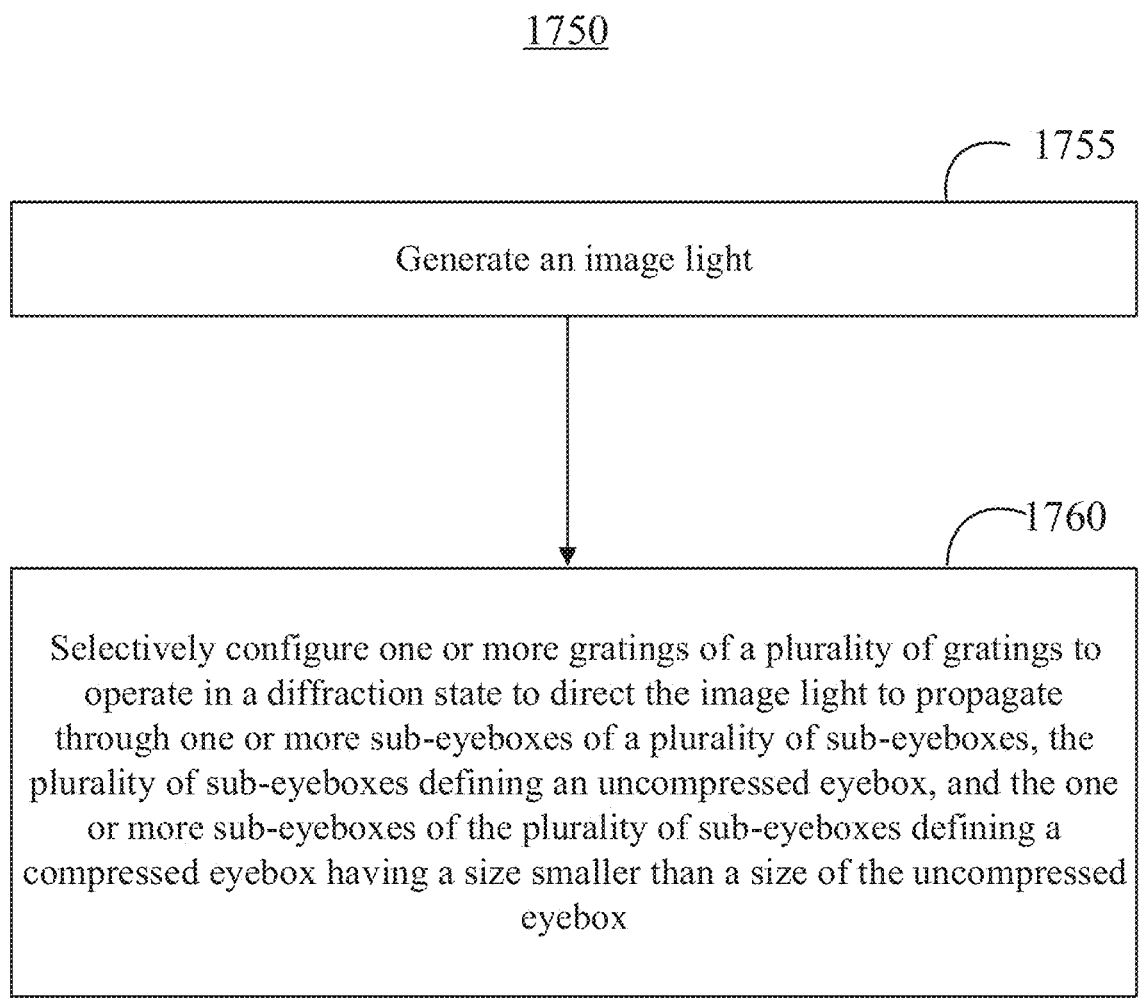
FIG. 17B is a flowchart illustrating a method for providing a compressed eyebox, according to another embodiment of the present disclosure.

FIG. 17B is a flowchart illustrating a method 1750 for providing a compressed eyebox, according to another embodiment of the present disclosure. The method 1750 may be performed by one or more components included in the disclosed optical system. The method 1750 may include generating an image light (Step 1755). For example, a light source may generate the image light. In some embodiments, the image light may represent a virtual image or a display image. In some embodiments, the light source may be controlled by controller to generate the image light having a predetermined optical property. The method 1750 may also include selectively configuring one or more gratings of a plurality of gratings to operate in a diffraction state to direct the image light to propagate through one or more sub-eyeboxes of a plurality of sub-eyeboxes, the plurality of sub-eyeboxes defining an uncompressed eyebox, and the one or more sub-eyeboxes of the plurality of sub-eyeboxes defining a compressed eyebox having a size smaller than a size of the uncompressed eyebox (step 1760). For example, as discussed above, the controller may selective configure one or more directly switchable grating and/or one or more indirectly switchable gratings included in at least one of an in-coupling element (e.g., an in-coupling grating set), an out-coupling element (e.g., an out-coupling grating set), or a redirecting element (e.g., a redirecting grating set) to operate in a diffraction state to direct the image light to propagate through one or more sub-eyeboxes that define the compressed eyebox. The one or more sub-eyeboxes may be a portion of the plurality of eyeboxes that define the uncompressed eyebox. The compressed eyebox may have a size that is smaller than the size of the uncompressed eyebox. In some embodiments, selectively configurating the one or more gratings of the plurality of gratings to operate in the diffraction state to direct the image light to propagate through the one or more sub-eyeboxes defining the compressed eyebox may include: selectively configuring the one or more gratings of the plurality of gratings to operate in the diffraction state to direct the image light to propagate through the one or more sub-eyeboxes defining the compressed eyebox based on eye tracking information. The method 1750 may also include obtaining the eye tracking information through an eye tracking system. In some embodiments, obtaining the eye tracking information may include obtaining image data of an eye pupil, and analyzing the image data to obtain at least one of a size of the eye pupil, a position of the eye pupil, a viewing direction of the eye pupil, or a moving direction of the eye pupil. In some embodiments, obtaining the eye tracking information may include predicting at least one of a size of the eye pupil, a position of the eye pupil, a viewing direction of the eye pupil, or a moving direction of the eye pupil. In some embodiments, the method 1750 may also include further comprising selectively configuring remaining one or more gratings of the plurality of gratings to operate in a non-diffraction state to transmit the image light with negligible diffraction.

Figure 18:
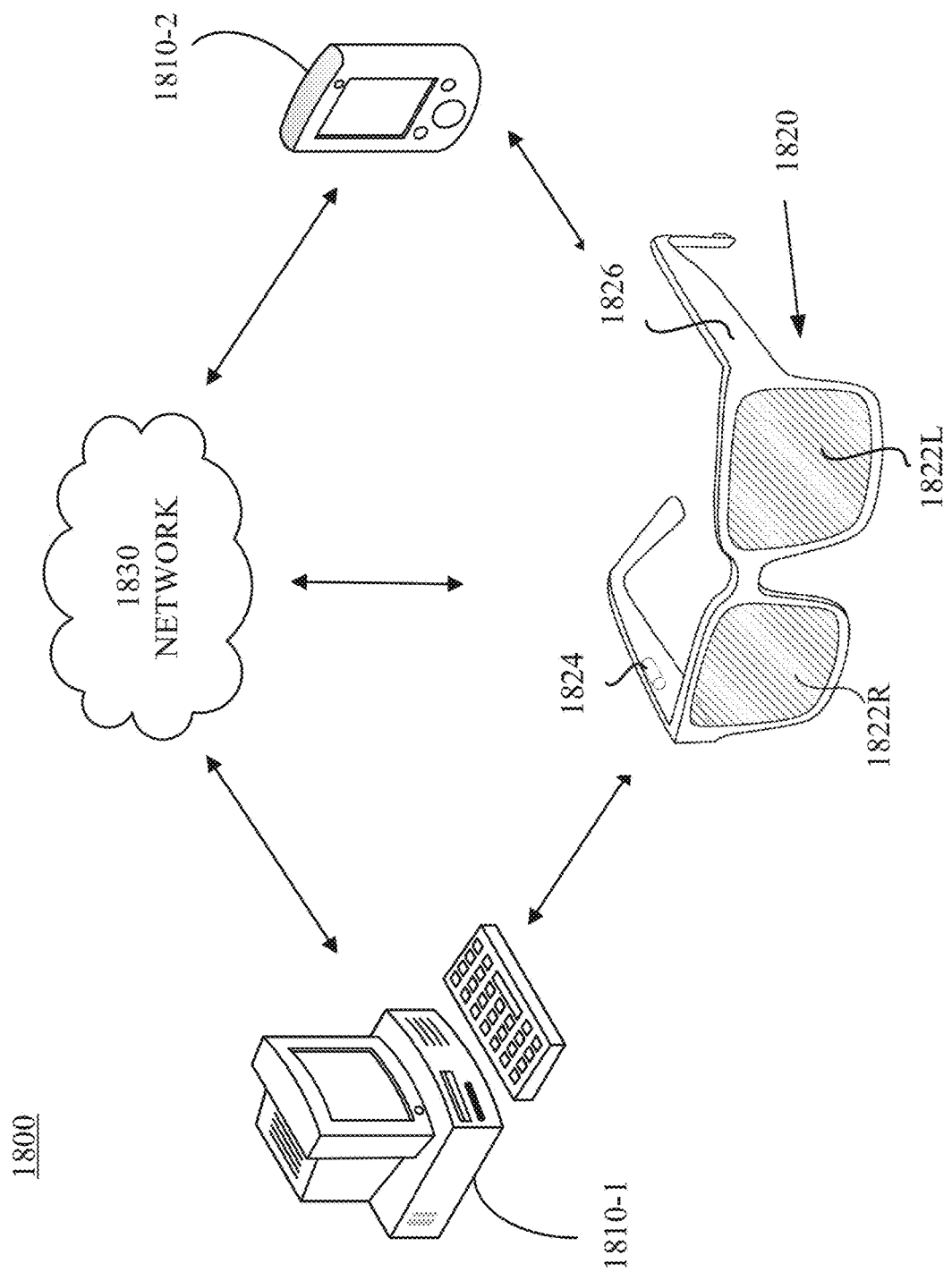
FIG. 18 illustrates a schematic diagram of a system including an NED, according to an embodiment of the present disclosure.

The disclosed optical device and method for providing a compressed eyebox may be implemented into a near-eye display ("NED"). FIG. 18 illustrates a schematic diagram of a system 1800 including an NED 1820, in accordance with an embodiment of the disclosure. The system 1800 may be an artificial reality system. Artificial reality is a form of reality that is artificially adjusted before being presented to a user (or viewer), which may include, e.g., a virtual reality ("VR"), an augmented reality ("AR"), a mixed reality ("MR"), a hybrid reality ("HR"), or some combination and/or derivatives thereof. Artificial reality systems may include VR systems where a virtual image is provided to a viewer by a computer-based image source, AR systems where a real-world image is partially embedded with "virtual" or computer-generated elements, and MR or HR systems where virtual elements are combined with real-world elements in an image. Accordingly, artificial reality content may include content that is entirely virtual device-generated and/or system-generated content. In some embodiments, the artificial reality content may include virtual content combined with real-world content directly viewable by the user (e.g., through a transparent or semi-transparent portion of the device). In some embodiments, the artificial reality content may include virtual content combined with real-world content captured by one or more system cameras and displayed to the user through a head mountable device. The artificial reality content may include video, audio, haptic feedback, or some combination thereof. The artificial reality content may be presented to the user in a single channel or in multiple channels (such as stereo video that produces a three-dimensional visual effect to the viewer). Additionally, artificial reality may also be associated with applications, products, accessories, services, or some combination thereof, that are used to, e.g., create content in an artificial reality and/or are otherwise used in (e.g., perform activities in) an artificial reality.

As shown in FIG. 18, the system 1800 may include computer devices 1810-1 or 1810-2 (hereinafter, collectively referred to as "client devices or computer devices 1810") and a network 1830 communicatively coupled with each other (via a wired or a wireless connection). Computer devices 1810 may include a desktop computer, workstation, or network server 1810-1 or a mobile device 1810-2. The system 1800 may provide audio, visual, tactile, and/or other sensory output of a device to a viewer wearing the NED 1820. The content provided to the NED 1820 may be created by any of computer devices 1810 and adjusted or modified by the NED 1820 relative to the real world. The system 1800 may include, e.g., a VR system, an AR system, an MR system, an HR system, or some combination and/or derivative thereof. The controller 260 may be included in the computer devices 1810 or may be included in the NED 1820.

In a VR configuration, the NED 1820 may display a computer-generated or pre-recorded content to a user and block out the user's view of real-world surroundings. In an MR configuration, the NED 1820 may provide any mixture of real-world and virtual content. In an AR configuration, the NED 1820 may provide real-world experiences (e.g., by displaying live imagery from the real world) with additional, computer-generated content. For example, virtual content may be projected onto a view of the real world (e.g., via optical or video see-through), which may result in AR or MR experiences for the user. The NED 1820 may include any of the disclosed optical system and/or may execute the disclosed methods to provide image lights to an eye of a user through a compressed eyebox.

The artificial reality system 1800 may be implemented on various platforms that include NEDs consistent with the present disclosure and implemented in many forms, e.g., as a windshield or rear-view mirror in an automobile or aircraft, or the lenses in a pair of glasses or visors, helmets, and/or hats. As shown in FIG. 18, the NED 1820 may include a frame 1826, a right display system 1822R, and a left display system 1822L. The frame 1826 may include a suitable type of mounting structure configured to mount the right display system 1822R and the left display system 1822L to a body part (e.g. a head) of the user (e.g., adjacent a user's eyes). The frame 1826 may be coupled to one or more optical elements, which may be configured to display media content to users. In some embodiments, the frame 1826 may represent a frame of eye-wear glasses. The right display system 1822R and the left display system 1822L may be configured to enable the user to view content presented by the NED 1820 and/or to view images of real-world objects (e.g., each of the right display system 1822R and the left display system 1822L may include a see-through optical element). In some embodiments, the right display system 1822R and the left display system 1822L may include any suitable display assembly (not shown) configured to generate a light (e.g., an image light corresponding to a virtual image) and to direct the image light to an eye of the user. In some embodiments, the NED 1820 may include a projection system. For illustrative purposes, FIG. 18 shows the projection system may include a light source assembly (e.g., a projector) 1824 coupled to the frame 1826.

Figure 19:
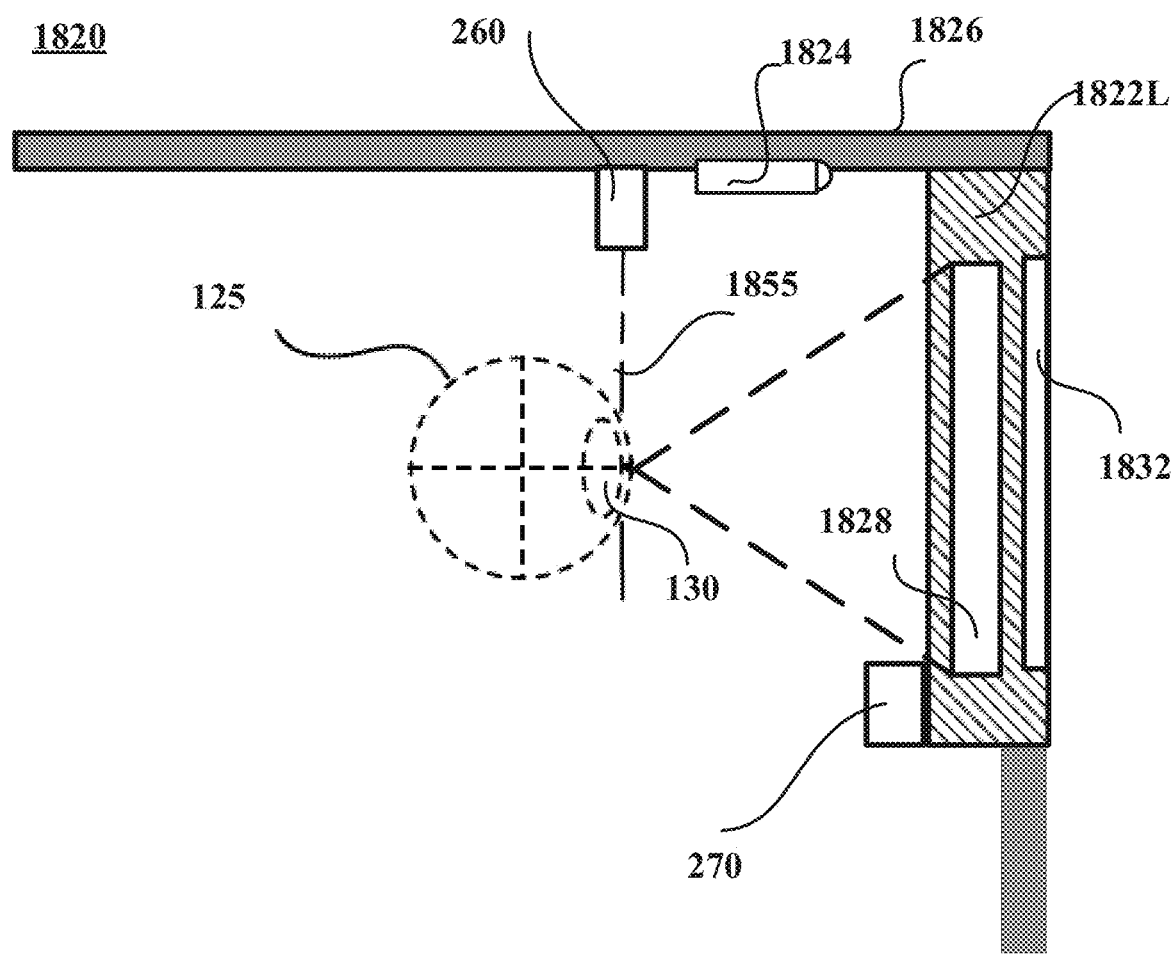
FIG. 19 illustrates a cross-sectional view of half of the NED shown in FIG. 18, according to an embodiment of the present disclosure.

FIG. 19 illustrates a cross-sectional view of half of the NED 1820 shown in FIG. 18, according to an embodiment of the disclosure. As shown in FIG. 19, the controller 260 and the eye tracking system 270 may be included in the NED 1820. For purposes of illustration, FIG. 19 shows the cross-sectional view associated with the left display system 1822L. As shown in FIG. 19, the left display system 1822L may include a waveguide display assembly 1828 for an eye 125 of the user. Reference number 1855 indicates an uncompressed eyebox. A compressed eyebox that may be formed by one or more sub-eyeboxes of the uncompressed eyebox 1855, is not shown in FIG. 19. The waveguide display assembly 1828 may include a waveguide, at least one in-coupling element coupled to the waveguide, at least one out-coupling element coupled to the waveguide, as disclosed herein and shown in other figures. In some embodiments, the waveguide display assembly 1828 may also include at least one redirecting element as disclosed herein and shown in other figures. The waveguide display assembly 1828 may be controlled by the control 260 to guide an image light emitted by the light source assembly 1824 to a compressed eyebox corresponding to the position of the eye pupil 130 of the user, based on the eyed tracking information provided by the eye tracking system 270. For purposes of illustration, FIG. 19 shows a single waveguide display assembly 1828 associated with a single eye 125. In some embodiments, another waveguide display assembly that is separate from and similar to the waveguide display assembly 1828 shown in FIG. 19, may be controlled by the control 260 to guide an image light emitted by the light source assembly 1824 to a compressed eyebox corresponding to the position of another eye of the user. In some embodiments, the waveguide display assembly 1828 for one eye may be separated or partially separated from the waveguide display assembly 1828 for the other eye. In some embodiments, a single waveguide display assembly 1828 may be configured to direct image lights to compressed eyeboxes for both eyes 125 of the user.

In some embodiments, the NED 1820 may include one or more optical elements disposed between the waveguide display assembly 1828 and the eye 125. The optical elements may be configured to, e.g., correct aberrations in an image light output from the waveguide display assembly 1828, magnify an image light output from the waveguide display assembly 1828, or perform another type of optical adjustment of an image light output from the waveguide display assembly 1828. Examples of the one or more optical elements may include an aperture, a Fresnel lens, a convex lens, a concave lens, a filter, any other suitable optical element that affects an image light, or a combination thereof. In some embodiments, the NED 1820 may include an adaptive dimming element 1832, which may dynamically adjust the transmittance of the image light of reflected by real-world objects, thereby switching the NED 1820 between a VR device and an AR device or between a VR device and a MR device. In some embodiments, along with switching between the AR/MR device and the VR device, the adaptive dimming element 1832 may be used in the AR and/or MR device to mitigate the differences in brightness of real and virtual objects (or contents).

Figure 20:
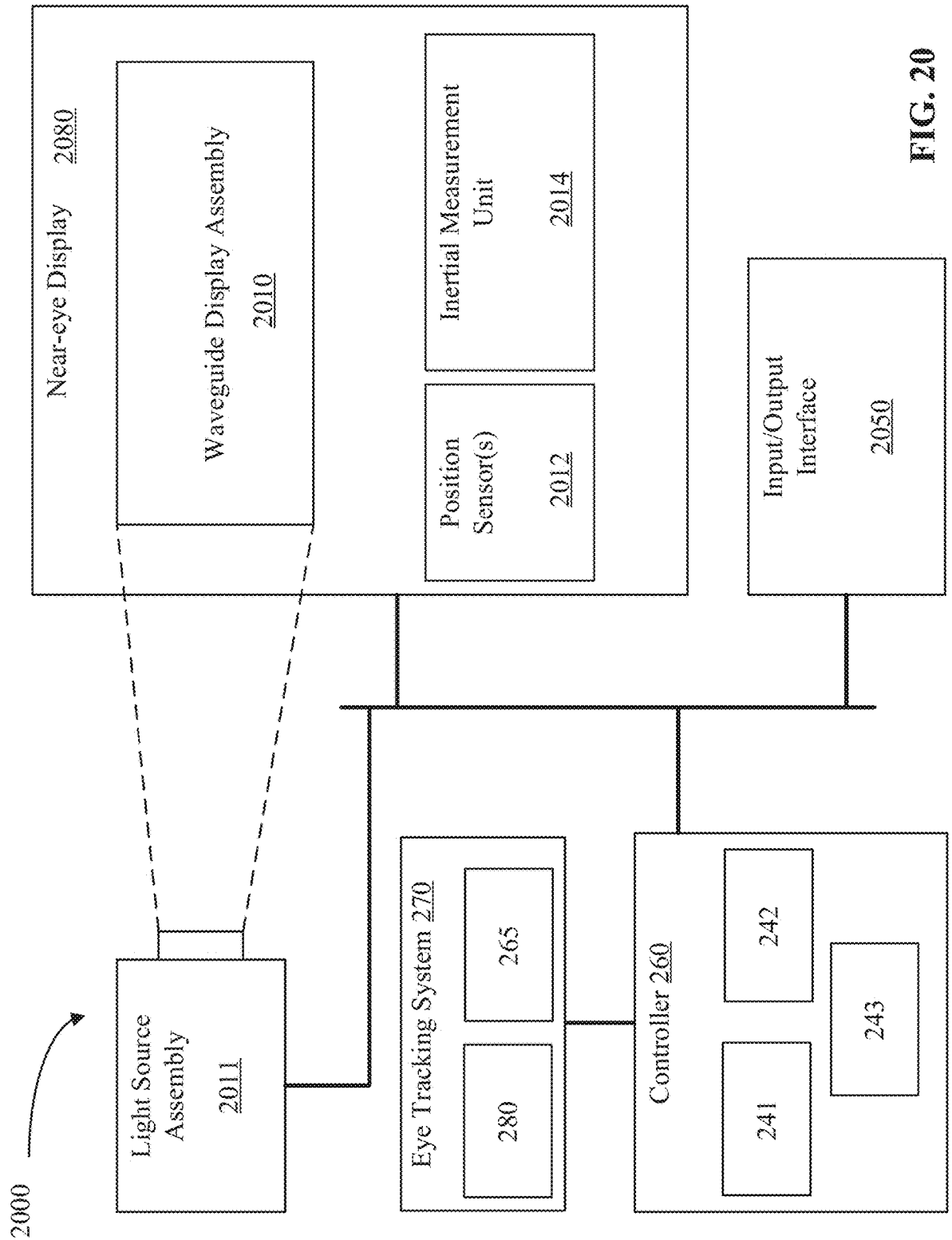
FIG. 20 illustrates a schematic block diagram of a system including an NED, according to an embodiment of the present disclosure.

FIG. 20 illustrates a schematic block diagram of a system 2000 including an NED, according to an embodiment of the present disclosure. In some embodiments, the system 2000 may be an embodiment of the system 1800 shown in FIG. 18 or may be included as parts of the system 1800. In some embodiments, the system 200 may be an embodiment of any other optical systems shown in other figures, or may be included in any other optical systems shown in other figures. The system 2000 may include optical elements, devices, or features shown in any other figures or disclosed herein and not shown in figures. The system 2000 may include an NED 2080, which may be any NED disclosed herein, such as the NED 1820 shown in FIGS. 18 and 19. The NED 2080 may include a waveguide display assembly 2010. The waveguide display assembly 2010 may be any embodiment shown in other figures. The waveguide display assembly 2010 may include one or more waveguides, one or more in-coupling elements, one or more out-coupling elements, and/or one or more redirecting elements, as disclosed herein. The waveguide display assembly 2010 may include any features, elements, or devices shown in other figures, or any combination thereof.

The NED 2080 may also include one or more position sensors 2012 and one or more inertial measurement units 2014 ("IMU 2014"). The IMU 2014 may include an electronic device configured to generate fast calibration data indicating an estimated position of the NED 2080 relative to an initial position of the NED 2080 based on measurement signals received from one or more of the position sensors 2012. The system 2000 may include a light source assembly 2011. The light source assembly 2011 may be any of the light source assemblies disclosed herein. The light source assembly 2011 may be configured to emit an image light to the waveguide display assembly 2010. The waveguide display assembly 2010 may be configured to direct the image light to the eye pupil of a user through a compressed eyebox, as described above. The system 2000 may include the eye tracking system 270 and the controller 260, which have been described above. In some embodiments, the eye tracking system 270 may include a light source (not shown) for emitting a light (e.g., an infrared light) to illuminate the eyes of the user for eye tracking purposes. The system 2000 may include a system level input/output interface 2050. The NED 2080 may communicate with external computer devices through the input/output interface 2050 and the network 1830 shown in FIG. 18. In some embodiments, the input/output interface 2050 may include a wired interface or a wireless interface, including a modem, and/or radio-frequency RF hardware and software (e.g., RF antennas, filter, amplifiers and the like, and digital, analog, digital to analog converters, analog to digital converters, digital signal processors, and the like).

The present disclosure provides an optical system and a method for providing a compressed eyebox, which may be dynamically aligned with a position of an eye pupil of a user. The optical system may include one or more waveguides, and a plurality of grating sets coupled with the one or more waveguides. The plurality of grating sets may include at least one in-coupling grating set configured to couple an image light into the one or more waveguides, and at least one out-coupling grating set configured to couple the image light out of the one or more waveguides. In some embodiments, the plurality of grating sets may also include at least one redirecting/folding grating set. Each grating set may include one or more gratings. The plurality of grating sets may be configurable to direct the image light to propagate through a plurality of sub-eyeboxes forming an uncompressed eyebox. In some embodiments, the optical system may also include a controller configured to selectively configure one or more gratings (or one or more combinations of gratings) selected from the plurality of grating sets to operate in a diffraction state to direct the image light to propagate through one or more sub-eyeboxes of the uncompressed eyebox, and selectively configure the remaining one or more gratings (or one or more combinations of gratings) of the plurality of grating sets to operate in a non-diffraction state. The one or more sub-eyeboxes through which the image light propagates may form a compressed eyebox, which has a size at least comparable with the size of the eye pupil and smaller than the size of the uncompressed eyebox. The location of the compressed eyebox may correspond to a location of the eye pupil. In some embodiments, the optical system may also include an eye tracking system configured to provide eye tracking information of the eye pupil.

The disclosed optical system and method may increase the light intensity of an image light delivered to the eye pupil through the compressed eyebox, reduce the loss of the image light directed to regions outside the eye pupil and the undesirable illumination around the eye pupil. As a result, the power efficiency of the optical system may be significantly improved. In addition, the image light propagating through the one or more sub-eyeboxes may have a substantially same FOV, which may be the same as the FOV of an image light propagating through the uncompressed eyebox. As a result, the ghosting effects, distortion, and interference among the one or more sub-eyeboxes may be suppressed and the image content delivered to the compressed eyebox may be substantially the same as the image content delivered to the uncompressed eyebox. In some embodiments, the image light propagating through the one or more sub-eyeboxes at different time instances or durations may have a substantially same FOV, which may be the same as the FOV of an image light emitted from a light source assembly coupled to the waveguide. Thus, the eye pupil located within the compressed eyebox formed by the one or more sub-eyeboxes may perceive the full content of an image generated by the light source assembly.

Variations of the above-described embodiments also fall within the scope of the present disclosure. In the above descriptions of the system and method for providing a compressed eyebox, it is presumed that the size and/or shape of the sub-eyeboxes is fixed. In some embodiments, the size and/or shape of the sub-eyeboxes may be variable or adjustable. For example, based on the measured or determined size of the eye pupil 130, the controller 260 may dynamically adjust a size of portions of the diffractive elements (e.g., in-coupling element, out-coupling element, and/or redirecting element) that are configured to operate in the diffraction state to dynamically adjust the size of a sub-eyebox. For example, when the size of the eye pupil 130 becomes smaller or larger, the size of the sub-eyebox may be adjusted accordingly. Thus, the dynamical adjustment of the compressed eyebox may be achieved by increasing or decreasing the number of sub-eyeboxes forming the compressed eyebox (e.g., controlling the number of combinations of gratings configured to operate in the diffraction state), or by increasing or decreasing the size of each sub-eyebox (as described above), or by a combination of both methods.

In some embodiments, a stack of in-coupling elements, a stack of out-coupling elements, or a stack of redirecting elements may include a combination of one or more switchable gratings and one or more non-switchable gratings. For example, in the optical system 1100 shown in FIGS. 11A-11C, the in-coupling element may include a non-switchable grating. In some embodiments, one or more non-switchable gratings may be included in the stack of gratings of the out-coupling element 1135. In some embodiments, in the optical system 1200 shown in FIGS. 12A-12C, the in-coupling element may include a non-switchable grating. In some embodiments, one or more non-switchable gratings may be included in the interleaved out-coupling element 1235. In some embodiments, in the optical system 1300 shown in FIGS. 13A-13D, at least one of the in-coupling element 1331, the out-coupling element 1335, or the redirecting element 1333 may include at least one non-switchable grating. In some embodiments, in the optical system 1400 shown in FIGS. 14A and 14B, at least one of the in-coupling element 1431 or the out-coupling element 1435 may include at least one non-switchable grating. In some embodiments, in the optical system 1500 shown in FIGS. 15A-15C, at least one of the in-coupling elements 1531A, 1531B, 1531C may include at least one non-switchable grating. In some embodiments, in the optical system 1500, at least one non-switchable grating may be included in at least one of the out-coupling elements 1535A, 1535B, 1535C, or 1535D. In some embodiments, in the optical system 1600 shown in FIGS. 16A-16C, the in-coupling element 1631 may include at least one non-switchable grating. In the optical system 1600, at least one non-switchable grating may be included in at least one of the out-coupling element 1635A, 1635B, or 1635C.

In some embodiments, a stack of gratings (or in-coupling elements or out-coupling elements) may include a combination of at least one directly switchable grating and at least one indirectly switchable grating. For example, in the optical system 1600 shown in FIGS. 16A-16C, a directly switchable out-coupling element (or grating) may be stacked with the indirectly switchable out-coupling elements 1635A, 1635B, and 1635C. In some embodiments, one of the out-coupling elements 1635A, 1635B, and 1635C may be replaced by a directly switchable out-coupling element. In some embodiments, in the optical system 1500 shown in FIGS. 15A-15C, a directly switchable out-coupling element (or grating) may be stacked with the indirectly switchable out-coupling elements 1535A, 1535B, and 1535C. In some embodiments, in the optical system 1400 shown in FIGS. 14A and 14B, a directly switchable in-coupling element (or grating) may be stacked with the indirectly switchable in-coupling grating 1431A or 1431B. In some embodiments, a directly switchable out-coupling element (or grating) may be stacked with the indirectly switchable out-coupling grating 1435A or 1435B.

In some embodiments, at least one of the in-coupling element 1331, the out-coupling element 1335, or the redirecting element 1333 included in the optical system 1300 shown in FIGS. 13A-13D may include a combination of at least one directly switchable grating and at least one indirectly switchable grating. In some embodiments, in the optical system 1200 shown in FIGS. 12A-12C, the array of gratings of the our-coupling element 1235 may include at least one directly switchable grating and at least one indirectly switchable grating. In some embodiments, in the optical system 1100 shown in FIGS. 11A-11C, the stack of out-coupling gratings included in the out-coupling element 1135 may include a combination of at least one directly switchable grating and at least one indirectly switchable grating. In some embodiments, in the optical system shown in FIGS. 2A, 2B, and 4, at least one of the in-coupling element 231, the out-coupling element 235, and/or the redirecting element 233 may include a combination of at least one directly switchable grating and at least one indirectly switchable grating.

In some embodiments, the optical system 1200 shown in FIGS. 12A-12C may include one or more gratings arranged in a stacked configuration, and then stacked with the interleaved out-coupling element 1235, similar to the configuration shown in FIG. 6C. In other words, the embodiments or features depicted in FIG. 11A and FIG. 12A may be combined in an optical system.

In some embodiments, as shown in FIGS. 15A-15C, each waveguide (1510A, 1510B, or 1510C) may be coupled with a stack of out-coupling elements and polarization switches, a stack of in-coupling elements and polarization switches, or both. In some embodiments, each stack of out-coupling elements coupled with each waveguide may have a configuration similar to the stack of out-coupling elements shown in FIG. 16A. In some embodiments, each stack of out-coupling elements coupled with each waveguide may have a stacked configuration of at least one interleaved indirectly switchable grating array and at least one polarization switch array. In some embodiments, each stack of out-coupling elements coupled with each waveguide may include two or more interleaved indirectly switchable grating arrays stacked together, similar to the configuration shown in FIG. 6D. In some embodiments, each stack of in-coupling elements coupled with each waveguide may have a configuration similar to the stack of gratings shown in FIGS. 6A-6D. In the optical system 1500 shown in FIG. 15A, in some embodiments, a common in-coupling element may be used for directing image lights into the three waveguides 1510A, 1510B, and 1510C. For example, a stack of in-coupling gratings included in the in-coupling element may be associated with different waveguides.

In some embodiments, at least one of the in-coupling elements (or in-coupling gratings) or the out-coupling elements (or out-coupling gratings) shown in FIGS. 14A-16C may include an interleaved grating array, similar to the configuration shown in FIG. 6B. In some embodiments, at least one additional in-coupling element (or in-coupling grating) and/or at least one additional out-coupling element (or out-coupling grating) having an interleaved grating array may be included in the optical systems shown in FIGS. 14A-16C. In some embodiments, the interleaved grating array may include all switchable gratings, all non-switchable gratings, or a combination of at least one switchable grating and at least one non-switchable grating. In some embodiments, the interleaved grating array may include all directly switchable gratings, all indirectly switchable gratings, or a combination of at least one directly switchable grating and at least one indirectly switchable grating.

In the present disclosure, the compressed eyebox is described as having a size smaller than the size of the uncompressed eyebox. This is one illustrative embodiment. With the disclosed optical systems and gratings, it is possible that at some time instances, all of the plurality of gratings coupled with the waveguide may be activated to direct image lights to the plurality of sub-eyeboxes (i.e., the uncompressed eyebox). Hence, at certain time instances or time periods, the size of the compressed eyebox may be the same as the size of the uncompressed eyebox.

The disclosed waveguide display assemblies and methods for providing a compressed eyebox, which may be dynamically aligned with a position of an eye pupil of a user, may be implemented into various systems, e.g., a near-eye display ("NED"), a head-up display ("HUD"), a head-mounted display ("HMD"), smart phones, laptops, or televisions, etc. In addition, the disclosed waveguide display systems are for illustrative purposes to explain the mechanism for providing a compressed eyebox that may be dynamically aligned with a position of an eye pupil of a user. The mechanism for providing a compressed eyebox that may be dynamically aligned with a position of an eye pupil of a user may be applicable to any suitable display systems other than the disclosed waveguide display systems. The polarization selective gratings shown and disclosed herein are for illustrative purposes. Any suitable polarization selective elements may be used and configured to provide the compressed eyebox, following the same or similar design principles described herein with respect to the polarization selective gratings. For example, the polarization selective element may include a polarization selective grating or a holographic element that includes sub-wavelength structures, liquid crystals, a photo-refractive holographic material, or a combination thereof. In some embodiments, polarization non-selective elements may also be implemented and configured to provide the compressed eyebox, following the same or similar design principles described herein with respect to the polarization selective gratings. In some embodiments, the polarization non-selective elements and polarization selective elements may be referred to as light deflecting elements. In some embodiments, the light deflecting elements may include diffraction gratings, cascaded reflectors, prismatic surface elements, and/or an array of holographic reflectors, or a combination thereof.

For example, in some embodiments, the disclosed optical system may include one or more waveguides, and a plurality of light deflecting elements coupled with the one or more waveguides. A plurality of combinations of the light deflecting elements may be configurable to direct (e.g., deflect) an image light to propagate through a plurality of sub-eyeboxes forming an uncompressed eyebox. The disclosed waveguide display assembly may also include a controller configured to selectively configure one or more combinations of the light deflecting elements to operate in a deflection state to direct (e.g., deflect) the image light to propagate through one or more sub-eyeboxes forming a compressed eyebox having a size smaller than a size of the uncompressed eyebox. The controller may be further configured to selectively configure one or more remaining combinations of the light deflecting elements to operate in a non-deflection state to transmit the image light with negligible deflection.

In some embodiments, the disclosed optical system may include a light source configured to emit an image light. The optical system may also include a plurality of light deflecting elements optically coupled with the light source. The optical system may further include a controller configured to selectively configure one or more light deflecting elements of the plurality of light deflecting elements to operate in a deflection state to direct (e.g., deflect) the image light to propagate through one or more sub-eyeboxes of a plurality of sub-eyeboxes. The plurality of sub-eyeboxes may define an uncompressed eyebox, and the one or more sub-eyeboxes may define a compressed eyebox having a size smaller than a size of the uncompressed eyebox. The controller may be further configured to selectively configure one or more remaining light deflecting elements to operate in a non-deflection state to transmit the image light with negligible deflection.

FIG. 17C is a flowchart illustrating a method 1780 for providing a compressed eyebox, according to an embodiment of the present disclosure. The method 1780 may include generating an image light (step 1785). The image light may represent a virtual image. The method 1780 may also include selectively configuring one or more light deflecting elements of a plurality of light deflecting elements to operate in a deflection state to direct the image light to propagate through one or more sub-eyeboxes of a plurality of sub-eyeboxes, the plurality of sub-eyeboxes defining an uncompressed eyebox, and the one or more sub-eyeboxes of the plurality of sub-eyeboxes defining a compressed eyebox having a size smaller than a size of the uncompressed eyebox (step 1790). The method 1780 may include additional steps. For example, in some embodiments, the disclosed method may include selectively configuring the one or more light deflecting elements of the plurality of light deflecting elements to operate in the deflection state to direct (e.g., deflect) the image light to propagate through the one or more sub-eyeboxes defining the compressed eyebox based on eye tracking information. In some embodiments, the disclosed method may include obtaining the eye tracking information through an eye tracking system. In some embodiments, obtaining the eye tracking information may include obtaining image data of an eye pupil; and analyzing the image data to obtain at least one of a size of the eye pupil, a position of the eye pupil, a viewing direction of the eye pupil, or a moving direction of the eye pupil. In some embodiments, obtaining the eye tracking information may include predicting at least one of a size of the eye pupil, a position of the eye pupil, a viewing direction of the eye pupil, or a moving direction of the eye pupil. In some embodiments, the disclosed method may also include selectively configuring one or more remaining light deflecting elements of the plurality of light deflecting elements to operate in a non-deflection state to transmit the image light with negligible deflection (e.g., the one or more remaining light deflecting elements operating in the non-deflection state may not change the propagation direction of the image light incident thereon).

The foregoing description of the embodiments of the disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the disclosure in terms of algorithms and symbolic representations of operations on information. These operations, while described functionally, computationally, or logically, may be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A system, comprising:
one or more waveguides;
a plurality of grating sets coupled with the one or more waveguides, wherein a plurality of combinations of gratings from the grating sets are configurable to operate in a diffraction state to direct an image light to propagate through a plurality of sub-eyeboxes forming an uncompressed eyebox; and
a controller configured to selectively configure one or more combinations of gratings to operate in the diffraction state to direct the image light to propagate through one or more sub-eyeboxes forming a compressed eyebox having a size smaller than a size of the uncompressed eyebox,
wherein the plurality of grating sets include an in-coupling grating set and an out-coupling grating set,
wherein the out-coupling grating set includes a first out-coupling grating and a second out-coupling grating,
wherein the first out-coupling grating includes a plurality of first sub-gratings, and the second out-coupling grating includes a plurality of second sub-gratings, and the plurality of first sub-gratings and the plurality of second sub-gratings are arranged in an interleaved configuration,
wherein when the controller is configured to control the first out-coupling grating to operate in the diffraction state, the controller controls the first sub-gratings together to operate in the diffraction state to diffract the image light to propagate through a same first sub-eyebox, and
wherein when the controller is configured to control the second out-coupling grating to operate in the diffraction state, the controller controls the second sub-gratings together to operate in the diffraction state to diffract the image light to propagate through a same second sub-eyebox.

2. The system of claim 1, wherein:
the controller is further configured to selectively configure remaining one or more combinations of gratings to operate in a non-diffraction state.

3. The system of claim 1, further comprising:
an eye tracking device configured to obtain eye tracking information of an eye pupil,
wherein the controller is coupled with the eye tracking device and configured to selectively configure the one or more combinations of gratings to operate in the diffraction state based on the eye tracking information.

4. The system of claim 3, wherein the eye tracking information includes at least one of a size of the eye pupil, a position of the eye pupil, a viewing direction of the eye pupil, or a moving direction of the eye pupil.

5. The system of claim 4, wherein the size of the compressed eyebox is at least comparable with the size of the eye pupil, and a location of the compressed eyebox corresponds to the position of the eye pupil.

6. The system of claim 1, further comprising one or more power sources configured to supply one or more voltages to the first out-coupling grating or the second out-coupling grating,
wherein the controller is configured to control the one or more power sources to supply the one or more voltages to configure the first sub-gratings or the second sub-gratings to operate in the diffraction state.

7. The system of claim 1, further comprising one or more polarization switches optically coupled with the first out-coupling grating or the second out-coupling grating,
wherein the controller is configured to control the one or more polarization switches to operate in a switching state to change a polarization of the image light before the image light is incident onto the first out-coupling grating or the second out-coupling grating, or to operate in a non-switching state to maintain the polarization of the image light before the image light is incident onto the first out-coupling grating or the second out-coupling grating.

8. The system of claim 1, wherein the plurality of sub-eyeboxes are at least partially overlapping.

9. The system of claim 1, wherein at least one of the first out-coupling grating or the second out-coupling grating has a varying slant angle.

10. The system of claim 1, wherein:
each of the one or more combinations of gratings from the grating sets includes an in-coupling grating from the in-coupling grating set and the first out-coupling grating or the second out-coupling grating from the out-coupling grating set.

11. The system of claim 1, wherein the controller is configured to selectively configure the one or more combinations of gratings to operate in the diffraction state to deliver a predetermined field of view of the image light toward each of the one or more sub-eyeboxes forming the compressed eyebox.

12. The system of claim 1, wherein a first field of view of the image light propagating through the uncompressed eyebox is substantially the same as a second field of view of the image light propagating through the compressed eyebox.

13. The system of claim 1, further comprising:
an eye tracking device configured to obtain eye tracking information of an eye pupil,
wherein the controller is coupled with the eye tracking device and configured to control the first sub-gratings and the second sub-gratings based on the eye tracking information.

* * * * *